US012645455B2

(12) United States Patent
Edwards et al.

(10) Patent No.: US 12,645,455 B2
(45) Date of Patent: *Jun. 2, 2026

(54) STORAGE OF TENSOR IN A CACHE

(71) Applicant: NVIDIA Corporation, Santa Clara, CA (US)

(72) Inventors: Harold Carter Edwards, Campbell, CA (US); Stephen Anthony Bernard Jones, San Francisco, CA (US); Alexander Lev Minkin, Los Altos, CA (US); Olivier Giroux, Santa Clara, CA (US); Gokul Ramaswamy Hirisave Chandra Shekhara, Bangalore (IN); Aditya Avinash Atluri, Redmond, WA (US); Apoorv Parle, Santa Clara, CA (US); Ronny Meir Krashinsky, Portola Valley, CA (US); Alan Kaatz, Seattle, WA (US); Andrew Robert Kerr, Atlanta, GA (US); Jack H. Choquette, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,478

(22) Filed: Dec. 21, 2022

(65) Prior Publication Data

US 2024/0168765 A1      May 23, 2024

(30) Foreign Application Priority Data

Nov. 16, 2022     (IN) ............................. 202211065742

(51) Int. Cl.
G06F 9/30          (2018.01)
G06F 12/0862     (2016.01)
(Continued)

(52) U.S. Cl.
CPC ...... G06F 9/30047 (2013.01); G06F 12/0862 (2013.01); G06T 1/20 (2013.01);
(Continued)

(58) Field of Classification Search
CPC ............... G06F 9/30047; G06F 9/3802; G06F 9/30043; G06F 12/0862
See application file for complete search history.

(56) References Cited

U.S. PATENT DOCUMENTS

| | | | |
|---|---|---|---|
| 4,432,079 | A | 2/1984 | Mackelburg et al. |
| 4,571,674 | A | 2/1986 | Hartung |
| | | (Continued) | |

FOREIGN PATENT DOCUMENTS

| | | |
|---|---|---|
| CN | 112907344 A | 6/2021 |
| CN | 118747163 A | 10/2024 |

OTHER PUBLICATIONS

Evangelos Georganas, Sasikanth Avancha, Kunal Banerjee, Dhiraj Kalamkar, Greg Henry, Hans Pabst, and Alexander Heinecke, "Anatomy Of High-Performance Deep Learning Convolutions On SIMD Architectures", November, ACM, pp. 1-12 (Year: 2018).*
(Continued)

*Primary Examiner* — Courtney P Spann
(74) *Attorney, Agent, or Firm* — Davis Wright Tremaine LLP

(57) ABSTRACT
Apparatuses, systems, and techniques to perform a tensor prefetch instruction to cause one or more tensors to be stored into one or more caches. In at least one embodiment, one or more circuits of a GPU are to perform a tensor prefetch instruction to cause one or more tensors to be stored into one or more GPU caches.

22 Claims, 64 Drawing Sheets

100

(51) Int. Cl.
 *G06T 1/20*     (2006.01)
 *G06F 3/06*     (2006.01)
 *G06F 17/16*     (2006.01)

(52) U.S. Cl.
 CPC ............ *G06F 3/0625* (2013.01); *G06F 17/16* (2013.01); *G06F 2212/608* (2013.01); *G06F 2212/62* (2013.01)

(56) References Cited

U.S. PATENT DOCUMENTS

| | | | |
|---|---|---|---|
| 4,955,346 A | 9/1990 | Kaneyasu et al. | |
| 5,487,172 A | 1/1996 | Hyatt | |
| 5,531,771 A | 7/1996 | van der Veen | |
| 5,539,886 A | 7/1996 | Aldred et al. | |
| 6,363,461 B1 | 3/2002 | Pawlowski et al. | |
| 6,412,049 B1 | 6/2002 | Baxter et al. | |
| 6,415,367 B1 | 7/2002 | Baxter et al. | |
| 6,510,470 B1 | 1/2003 | Capelli | |
| 6,792,931 B1 | 9/2004 | Schaar | |
| 6,956,579 B1 | 10/2005 | Diard et al. | |
| 7,047,480 B2 | 5/2006 | Kadatch et al. | |
| 7,107,199 B2 | 9/2006 | Schreiber et al. | |
| 7,157,638 B1 | 1/2007 | Sitrick | |
| 7,234,144 B2 | 6/2007 | Wilt et al. | |
| 7,421,694 B2 | 9/2008 | Gosalia et al. | |
| 7,506,126 B2 | 3/2009 | Lovett | |
| 7,634,621 B1 | 12/2009 | Coon et al. | |
| 7,684,144 B1 | 3/2010 | Goker et al. | |
| 8,165,414 B1 | 4/2012 | Yagnik | |
| 8,392,312 B2 | 3/2013 | Batsakis et al. | |
| 8,516,226 B1 | 8/2013 | Collard et al. | |
| 8,555,035 B1 | 10/2013 | Patney et al. | |
| 8,700,750 B2 | 4/2014 | Alam et al. | |
| 8,761,101 B1 | 6/2014 | Crosbie et al. | |
| 8,924,455 B1 | 12/2014 | Barman et al. | |
| 9,274,710 B1 | 3/2016 | Oikarinen et al. | |
| 9,280,555 B1 | 3/2016 | Bono et al. | |
| 9,817,585 B1 | 11/2017 | Trachtman | |
| 9,946,539 B1 | 4/2018 | Temam et al. | |
| 9,959,074 B1 | 5/2018 | Shain et al. | |
| 9,959,498 B1 | 5/2018 | Narayanaswami et al. | |
| 9,990,391 B1 | 6/2018 | Cole et al. | |
| 10,013,384 B1 | 7/2018 | Wang-Roveda et al. | |
| 10,032,435 B2 | 7/2018 | Newcombe et al. | |
| 10,108,658 B1 | 10/2018 | Cole et al. | |
| 10,157,442 B1 | 12/2018 | Mostak et al. | |
| 10,223,407 B2 | 3/2019 | Pijewski et al. | |
| 10,489,479 B1 | 11/2019 | Shalev et al. | |
| 10,740,341 B1 | 8/2020 | Batruni | |
| 10,802,762 B1 | 10/2020 | Gray et al. | |
| 10,891,156 B1 | 1/2021 | Zhao et al. | |
| 10,911,540 B1 | 2/2021 | Gunasekaran et al. | |
| 11,010,054 B1 | 5/2021 | Himelstein et al. | |
| 11,093,139 B1 | 8/2021 | Karr et al. | |
| 11,176,631 B1 | 11/2021 | Tu et al. | |
| 11,321,092 B1 * | 5/2022 | Raikin ................ | G06F 9/30196 |
| 11,327,676 B1 | 5/2022 | Fernandez et al. | |
| 11,341,605 B1 | 5/2022 | Singh et al. | |
| 11,388,047 B1 | 7/2022 | Hardwick et al. | |
| 11,442,669 B1 | 9/2022 | Frandzel et al. | |
| 11,450,059 B1 | 9/2022 | Morrical | |
| 11,494,321 B1 * | 11/2022 | Yu ........................ | G06F 9/30043 |
| 11,500,621 B2 | 11/2022 | Lethin et al. | |
| 11,500,680 B2 | 11/2022 | Wang et al. | |
| 11,507,817 B2 | 11/2022 | Abdelaziz et al. | |
| 11,544,229 B1 | 1/2023 | Seideman et al. | |
| 11,681,504 B1 | 6/2023 | D'Silva et al. | |
| 11,698,787 B2 * | 7/2023 | Grochowski ......... | G06F 9/3865 |
| | | | 712/208 |
| 11,726,950 B2 | 8/2023 | Sumbul et al. | |
| 11,836,491 B2 | 12/2023 | Liu et al. | |
| 11,861,221 B1 | 1/2024 | Richardson et al. | |
| 11,868,250 B1 | 1/2024 | Ross et al. | |
| 11,886,536 B2 | 1/2024 | Dikici et al. | |

| | | | |
|---|---|---|---|
| 11,928,176 B2 | 3/2024 | Liu et al. | |
| 11,995,884 B1 | 5/2024 | Sammoura et al. | |
| 12,045,309 B1 | 7/2024 | Huang et al. | |
| 12,079,710 B2 | 9/2024 | Fuks et al. | |
| 12,175,222 B1 | 12/2024 | Benfield et al. | |
| 12,190,225 B2 | 1/2025 | Liu et al. | |
| 12,204,606 B1 | 1/2025 | Andrianov | |
| 12,260,236 B1 | 3/2025 | Zhou et al. | |
| 12,266,184 B2 | 4/2025 | Kale | |
| 12,293,174 B1 | 5/2025 | Stephen et al. | |
| 12,346,274 B2 | 7/2025 | Underwood et al. | |
| 12,443,399 B1 | 10/2025 | Hanebutte et al. | |
| 2001/0042041 A1 | 11/2001 | Moshal et al. | |
| 2002/0152142 A1 | 10/2002 | Schellmann et al. | |
| 2003/0018831 A1 | 1/2003 | Lebena | |
| 2003/0220966 A1 | 11/2003 | Hepper et al. | |
| 2005/0046400 A1 | 3/2005 | Rotem | |
| 2005/0195860 A1 | 9/2005 | Ollis et al. | |
| 2006/0050153 A1 | 3/2006 | Boll | |
| 2006/0190517 A1 | 8/2006 | Guerrero | |
| 2006/0252413 A1 | 11/2006 | Ikeda | |
| 2007/0067373 A1 | 3/2007 | Higgins et al. | |
| 2007/0162425 A1 | 7/2007 | Betawadkar-Norwood et al. | |
| 2008/0077701 A1 | 3/2008 | Kongalath et al. | |
| 2008/0303833 A1 | 12/2008 | Swift et al. | |
| 2008/0303834 A1 | 12/2008 | Swift et al. | |
| 2008/0303835 A1 | 12/2008 | Swift et al. | |
| 2009/0016620 A1 | 1/2009 | Todoroki | |
| 2009/0273604 A1 | 11/2009 | Kim | |
| 2009/0313311 A1 | 12/2009 | Hoffmann et al. | |
| 2010/0122066 A1 | 5/2010 | Fischer | |
| 2010/0191884 A1 | 7/2010 | Holenstein et al. | |
| 2010/0235829 A1 | 9/2010 | Shukla et al. | |
| 2010/0268921 A1 | 10/2010 | Preble | |
| 2010/0274972 A1 | 10/2010 | Babayan et al. | |
| 2011/0122262 A1 | 5/2011 | Shinozaki et al. | |
| 2011/0173595 A1 | 7/2011 | Gustafsson et al. | |
| 2011/0219208 A1 | 9/2011 | Asaad et al. | |
| 2012/0113128 A1 | 5/2012 | Ryu et al. | |
| 2012/0146727 A1 | 6/2012 | Cyrusian | |
| 2012/0293519 A1 | 11/2012 | Ribble et al. | |
| 2013/0002691 A1 | 1/2013 | Swift et al. | |
| 2013/0067168 A1 | 3/2013 | Havewala et al. | |
| 2014/0072945 A1 | 3/2014 | Gu et al. | |
| 2014/0181171 A1 | 6/2014 | Dourbal | |
| 2014/0184630 A1 | 7/2014 | Krig | |
| 2014/0351826 A1 | 11/2014 | Llamas | |
| 2014/0362292 A1 | 12/2014 | Lee et al. | |
| 2015/0205757 A1 | 7/2015 | Dally | |
| 2015/0280959 A1 | 10/2015 | Vincent | |
| 2015/0363890 A1 | 12/2015 | Butters et al. | |
| 2016/0180194 A1 | 6/2016 | Karyodisa | |
| 2016/0188337 A1 * | 6/2016 | Lee ..................... | G06F 12/0811 |
| | | | 712/207 |
| 2016/0210721 A1 | 7/2016 | Taylor | |
| 2016/0210724 A1 | 7/2016 | Taylor et al. | |
| 2016/0321291 A1 | 11/2016 | Malhotra et al. | |
| 2017/0003972 A1 | 1/2017 | Elliott et al. | |
| 2017/0039396 A1 | 2/2017 | Sharp et al. | |
| 2017/0083999 A1 | 3/2017 | Saurabh et al. | |
| 2017/0134672 A1 | 5/2017 | Gibbons et al. | |
| 2017/0344880 A1 * | 11/2017 | Nekuii ................... | G06F 17/153 |
| 2017/0359281 A1 | 12/2017 | Yip et al. | |
| 2017/0364340 A1 | 12/2017 | Kreider et al. | |
| 2018/0018556 A1 | 1/2018 | Young et al. | |
| 2018/0024836 A1 * | 1/2018 | Gschwind ........... | G06F 9/30047 |
| | | | 712/207 |
| 2018/0103174 A1 | 4/2018 | Ito | |
| 2018/0181489 A1 | 6/2018 | DeLaurier et al. | |
| 2018/0293784 A1 | 10/2018 | Benthin et al. | |
| 2018/0307985 A1 | 10/2018 | Appu et al. | |
| 2018/0322078 A1 | 11/2018 | Qiu et al. | |
| 2018/0365561 A1 | 12/2018 | Temam et al. | |
| 2019/0042092 A1 | 2/2019 | Wu et al. | |
| 2019/0042241 A1 | 2/2019 | Akin | |
| 2019/0042336 A1 | 2/2019 | McElrath et al. | |
| 2019/0042478 A1 | 2/2019 | Chakrabarti et al. | |
| 2019/0043477 A1 | 2/2019 | Bang et al. | |
| 2019/0179635 A1 | 6/2019 | Jiao et al. | |

(56) References Cited

U.S. PATENT DOCUMENTS

| | | |
|---|---|---|
| 2019/0220308 A1 | 7/2019 | Cui et al. |
| 2019/0227936 A1 | 7/2019 | Jang |
| 2019/0238854 A1 | 8/2019 | Yeung et al. |
| 2019/0251005 A1 | 8/2019 | Guntoro et al. |
| 2019/0311243 A1 | 10/2019 | Whatmough et al. |
| 2019/0318225 A1 | 10/2019 | Heinecke et al. |
| 2020/0117993 A1 | 4/2020 | Martinez-Canales et al. |
| 2020/0134417 A1 | 4/2020 | Mohapatra et al. |
| 2020/0160226 A1 | 5/2020 | Ross et al. |
| 2020/0174840 A1 | 6/2020 | Zhao et al. |
| 2020/0193229 A1 | 6/2020 | Natarajan et al. |
| 2020/0264874 A1 | 8/2020 | Tepper et al. |
| 2020/0265098 A1 | 8/2020 | Tepper et al. |
| 2020/0272892 A1 | 8/2020 | Desappan et al. |
| 2020/0278847 A1 | 9/2020 | Lethin et al. |
| 2020/0285655 A1 | 9/2020 | Kaushik et al. |
| 2020/0293450 A1 | 9/2020 | Vemulapalli et al. |
| 2020/0293549 A1 | 9/2020 | Wang |
| 2020/0301764 A1 | 9/2020 | Thoresen et al. |
| 2020/0364088 A1 | 11/2020 | Ashwathnarayan et al. |
| 2020/0387413 A1 | 12/2020 | Malhotra et al. |
| 2020/0387414 A1 | 12/2020 | Malhotra et al. |
| 2020/0410330 A1 | 12/2020 | Liu et al. |
| 2021/0001231 A1 | 1/2021 | Kurabayashi |
| 2021/0019070 A1 | 1/2021 | Karr et al. |
| 2021/0019093 A1 | 1/2021 | Karr et al. |
| 2021/0019237 A1 | 1/2021 | Karr et al. |
| 2021/0019362 A1 | 1/2021 | Piveteau et al. |
| 2021/0042624 A1 | 2/2021 | Matveev et al. |
| 2021/0044204 A1 | 2/2021 | Kesterson et al. |
| 2021/0064987 A1 | 3/2021 | Springer et al. |
| 2021/0072957 A1 | 3/2021 | Eilert et al. |
| 2021/0072986 A1 | 3/2021 | Yudanov et al. |
| 2021/0072987 A1 | 3/2021 | Yudanov et al. |
| 2021/0074239 A1 | 3/2021 | Tao et al. |
| 2021/0103550 A1 | 4/2021 | Appu et al. |
| 2021/0110506 A1 | 4/2021 | Prakash et al. |
| 2021/0113128 A1 | 4/2021 | Goral et al. |
| 2021/0114616 A1 | 4/2021 | Altman |
| 2021/0117249 A1 | 4/2021 | Doshi et al. |
| 2021/0117806 A1 | 4/2021 | Liu et al. |
| 2021/0124582 A1 | 4/2021 | Kerr et al. |
| 2021/0192412 A1 | 6/2021 | Krishnaswamy |
| 2021/0258552 A1 | 8/2021 | Shima |
| 2021/0326137 A1 | 10/2021 | Kerr et al. |
| 2021/0326175 A1 | 10/2021 | Herbert |
| 2021/0334105 A1 | 10/2021 | Liu et al. |
| 2021/0342785 A1 | 11/2021 | Mann et al. |
| 2021/0368124 A1 | 11/2021 | Berkovich et al. |
| 2021/0373955 A1 | 12/2021 | Galles et al. |
| 2021/0397812 A1 | 12/2021 | Bharati |
| 2021/0398676 A1 | 12/2021 | Evans et al. |
| 2021/0400019 A1 | 12/2021 | Krstic et al. |
| 2022/0019367 A1 | 1/2022 | Freilich et al. |
| 2022/0019385 A1 | 1/2022 | Karr et al. |
| 2022/0035714 A1 | 2/2022 | Schultz et al. |
| 2022/0035890 A1 | 2/2022 | Liu et al. |
| 2022/0038532 A1 | 2/2022 | Horigane et al. |
| 2022/0083245 A1 | 3/2022 | Kant et al. |
| 2022/0099775 A1 | 3/2022 | Li et al. |
| 2022/0101118 A1 | 3/2022 | Yan et al. |
| 2022/0108135 A1 | 4/2022 | Brady et al. |
| 2022/0121880 A1 | 4/2022 | Buniatyan |
| 2022/0138551 A1 | 5/2022 | Marani et al. |
| 2022/0164642 A1 | 5/2022 | Li et al. |
| 2022/0172033 A1 | 6/2022 | Ross et al. |
| 2022/0179703 A1 | 6/2022 | Vincent et al. |
| 2022/0188614 A1 | 6/2022 | Liu et al. |
| 2022/0197719 A1 | 6/2022 | Gurtovoy et al. |
| 2022/0198250 A1 | 6/2022 | Kolhe et al. |
| 2022/0215343 A1 | 7/2022 | Bever et al. |
| 2022/0222321 A1 | 7/2022 | Chen et al. |
| 2022/0253488 A1 | 8/2022 | Li et al. |
| 2022/0277191 A1 | 9/2022 | Mathews |
| 2022/0293086 A1 | 9/2022 | Marchini |
| 2022/0300793 A1 | 9/2022 | Donthu et al. |
| 2022/0300826 A1 | 9/2022 | Chauhan et al. |
| 2022/0301097 A1 | 9/2022 | Rhodes et al. |
| 2022/0303178 A1 | 9/2022 | Hardwick et al. |
| 2022/0309336 A1 | 9/2022 | Minkin |
| 2022/0365750 A1 | 11/2022 | Bharambe et al. |
| 2022/0405348 A1 | 12/2022 | Lichtenau et al. |
| 2022/0414088 A1 | 12/2022 | Krishnan et al. |
| 2023/0023101 A1 | 1/2023 | Su et al. |
| 2023/0028317 A1 | 1/2023 | Yoon et al. |
| 2023/0065994 A1 | 3/2023 | Yamato |
| 2023/0070177 A1 | 3/2023 | Yu et al. |
| 2023/0071424 A1 | 3/2023 | Kibardin et al. |
| 2023/0104845 A1* | 4/2023 | Ray ............................ G06F 7/08 |
| | | 711/126 |
| 2023/0110438 A1 | 4/2023 | Ramani et al. |
| 2023/0123811 A1 | 4/2023 | Collins et al. |
| 2023/0185570 A1 | 6/2023 | Kerr et al. |
| 2023/0185641 A1 | 6/2023 | Hakke Patil et al. |
| 2023/0185642 A1 | 6/2023 | Hakke Patil et al. |
| 2023/0289190 A1 | 9/2023 | Parle et al. |
| 2023/0289242 A1 | 9/2023 | Guo et al. |
| 2023/0289292 A1 | 9/2023 | Minkin et al. |
| 2023/0289304 A1 | 9/2023 | Minkin et al. |
| 2023/0315410 A1 | 10/2023 | Yang et al. |
| 2023/0334747 A1 | 10/2023 | Sarokin et al. |
| 2023/0337131 A1 | 10/2023 | Lee et al. |
| 2023/0342419 A1 | 10/2023 | Lin |
| 2023/0360167 A1 | 11/2023 | Brailko |
| 2023/0394110 A1 | 12/2023 | Fan et al. |
| 2024/0011691 A1 | 1/2024 | Kim et al. |
| 2024/0045690 A1 | 2/2024 | Baum et al. |
| 2024/0069914 A1* | 2/2024 | George .............. G06F 9/30036 |
| 2024/0070450 A1 | 2/2024 | Ju et al. |
| 2024/0111534 A1 | 4/2024 | Fu et al. |
| 2024/0134553 A1* | 4/2024 | Symes ................. G06N 3/0464 |
| 2024/0161221 A1 | 5/2024 | Niemi et al. |
| 2024/0161223 A1 | 5/2024 | Edwards et al. |
| 2024/0161224 A1 | 5/2024 | Edwards et al. |
| 2024/0168829 A1 | 5/2024 | Edwards et al. |
| 2024/0168830 A1 | 5/2024 | Edwards et al. |
| 2024/0168831 A1 | 5/2024 | Edwards et al. |
| 2024/0169469 A1 | 5/2024 | Edwards et al. |
| 2024/0176663 A1 | 5/2024 | Hirisave Chandra Shekhara et al. |
| 2024/0195433 A1 | 6/2024 | Aksu et al. |
| 2024/0220316 A1 | 7/2024 | Hsu et al. |
| 2024/0289183 A1 | 8/2024 | Ramos et al. |
| 2024/0289193 A1 | 8/2024 | Ramos et al. |
| 2024/0289265 A1 | 8/2024 | Ramos et al. |
| 2024/0289323 A1 | 8/2024 | Ramos et al. |
| 2024/0320779 A1 | 9/2024 | Demirci et al. |
| 2024/0346691 A1 | 10/2024 | Tananaev |
| 2024/0362296 A1 | 10/2024 | Shapiro et al. |
| 2024/0370521 A1 | 11/2024 | Zhou et al. |
| 2024/0370704 A1 | 11/2024 | Levy et al. |
| 2025/0061377 A1 | 2/2025 | Ngo |
| 2025/0071040 A1 | 2/2025 | Wang et al. |
| 2025/0123969 A1 | 4/2025 | Edwards et al. |
| 2025/0156984 A1 | 5/2025 | Springer et al. |

OTHER PUBLICATIONS

Parallel Thread Execution ISA, January, NVIDIA, pp. 247-248 (Year: 2023).*
U.S. Appl. No. 17/473,655, filed Sep. 13, 2021.
U.S. Appl. No. 18/081,534, filed Dec. 14, 2022.
U.S. Appl. No. 18/086,426, filed Dec. 21, 2022.
U.S. Appl. No. 18/086,433, filed Dec. 21, 2022.
U.S. Appl. No. 18/086,442, filed Dec. 21, 2022.
U.S. Appl. No. 18/086,464, filed Dec. 21, 2022.
U.S. Appl. No. 18/086,459, filed Dec. 21, 2022.
U.S. Appl. No. 18/086,473, filed Dec. 21, 2022.
U.S. Appl. No. 18/086,476, filed Dec. 21, 2022.
U.S. Appl. No. 18/086,484, filed Dec. 21, 2022.
Caffe, "Im2col," retrieved from https://caffe.berkeleyvision.org/tutorial/layers/im2col.html, 2020, 1 page.

(56)          References Cited

OTHER PUBLICATIONS

Diaz et al., "A Survey of Parallel Programming Models and Tools in the Multi and Many-Core Era," IEEE Transactions on Parallel and Distributed Systems, 23(8): Aug. 2012, 18 pages.
IEEE, "IEEE Standard 754-2008 (Revision of IEEE Standard 754-1985): IEEE Standard for Floating-Point Arithmetic," Aug. 29, 2008, 70 pages.
International Search Report and Written Opinion for Application No. PCT/CN2022/132533, mailed Jul. 24, 2023, 7 pages.
Lili et al., "Streaming FFT Asynchronously on Graphics Processor Units," International Forum on Information Technology and Applications, 2010, 5 pages.
Mathworks, "Im2col," retrieved from https://www.mathworks.com/help/images/ref/im2col.html, 2021, 3 pages.
Octave Forge,"Im2col," retrieved from https://octave.sourceforge.io/image/function/im2col.html, (undated), 2 pages.
U.S. Appl. No. 17/691,276, "Method and Apparatus for Efficient Access to MultiDimensional Data Structures and-or Other Large Data Blocks," filed Mar. 10, 2022.
U.S. Appl. No. 17/691,288, "Programmatically Controlled Data Multicasting Across Multiple Compute Engines," filed Mar. 10, 2022.
U.S. Appl. No. 17/691,422, "Method and Apparatus for Efficient Access to MultiDimensional Data Structures and-or Other Large Data Blocks," filed Mar. 10, 2022.

Abhijit et al., "Implementing Adaptive and Dynamic Data Structures using CUDA Parallelism," IEEE International Conference on Advances in Engineering & Technology Research, Aug. 2014, 7 pages.
IEEE "IEEE Standard for Floating-Point Arithmetic", Microprocessor Standards Committee of the IEEE Computer Society, IEEE Std 754-2008, dated Jun. 12, 2008, 70 pages.
Nvidia, "CUDA Toolkit Documentation 12.2 Update 2," Retrieved from, https://docs.nvidia.com/cuda/archive/12.2.2/, Aug. 2023, 10 Pages.
Nvidia, CUDA: Parallel Thread Execution ISA Version 8.3, Retrieved from, https://docs.nvidia.com/cuda/parallel-thread-execution/index.html, Oct. 10, 2023, 594 Pages.
Nvidia, "Shared Memory," retrieved from https://docs.nvidia.com/cuda/cuda-c-programming-guide/index.html#shared-memory, May 2019, 597 pages.
Andersch, et al., "NVIDIA Hopper Architecture In-Depth", Mar. 22, 2022, NVIDIA Developer, 39 pages.
NVIDIA, "NVIDA H100 Tensor Core GPU Architecture", Mar. 2022, NVIDA Corporation, 71 pages.
Vasilache et al., "Tensor Comprehension: Framework-Agnostic High-Performance Machine Learning Abstractions", Facebook AI Research Technical Report, Feb. 13, 2018, 37 pages.
Zhang et al., "Understanding The GPU Microarchitecture to Achieve Bare-Metal Performance Tuning," Feb. 4, 2017, 13 Pages.

* cited by examiner

1300

Prefetch Using Tensor Map API

Tensor Map Identifier

Coordinate Information

1302

Prefetch Using Tensor Map API Response

Asynchronous hardware use indicator

1500

Obtaining an asynchronous reduction request — 1502

Performing asynchronous reduction operation — 1504

Performing Other Actions — 1506

1600

Obtaining an asynchronous reduction request — 1602

Performing asynchronous reduction using manual tracking — 1604

Performing Other Actions — 1606

1700

Obtaining a multicast copy request    1702

Performing multicast copy operation    1704

Performing Other Actions    1706

1800

Obtaining a tensor map generation request ⌐ 1802

Generating tensor map ⌐ 1804

Performing Other Actions ⌐ 1806

1900

2000

Obtaining a tensor memory address replacement request — 2002

Replacing memory address in a tensor map — 2004

Performing Other Actions — 2006

2100

Obtaining an asynchronous copy using a tensor map request — 2102

Performing asynchronous copy using tensor map — 2104

Performing Other Actions — 2106

2200

Obtaining an asynchronous copy using tensor map and manual tracking request ⟿ 2202

Performing asynchronous copy using tensor map and manual tracking ⟿ 2204

Performing Other Actions ⟿ 2206

2300

Obtaining an in-place tensor transformation request ⌐ 2302

Performing in-place tensor transformation using tensor map ⌐ 2304

Performing Other Actions ⌐ 2306

2400

Obtaining a prefetch to cache request　〜 2402

Storing data in a GPU cache　〜 2404

Performing Other Actions　〜 2406

2500

| | |
|---|---|
| Obtaining a prefetch to cache using tensor map request | 2502 |
| Storing tensor data in GPU cache using tensor map | 2504 |
| Performing Other Actions | 2506 |

2600

Obtaining an asynchronous copy to cache request ⌐ 2602

Performing asynchronous copy from global memory to cache using a tensor map ⌐ 2604

Performing Other Actions ⌐ 2606

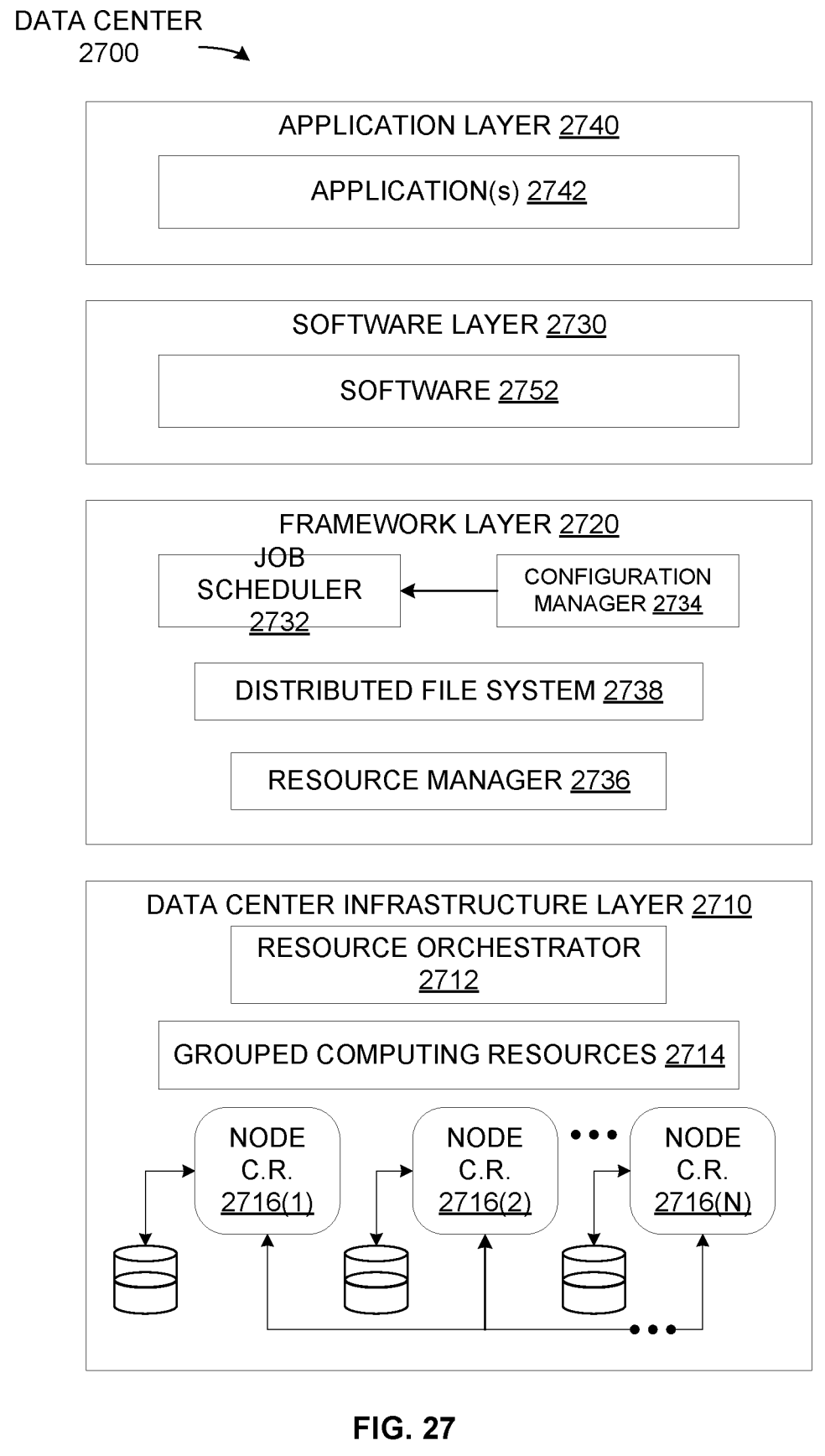

DATA CENTER
2700

APPLICATION LAYER 2740

APPLICATION(s) 2742

SOFTWARE LAYER 2730

SOFTWARE 2752

FRAMEWORK LAYER 2720

JOB SCHEDULER 2732 ← CONFIGURATION MANAGER 2734

DISTRIBUTED FILE SYSTEM 2738

RESOURCE MANAGER 2736

DATA CENTER INFRASTRUCTURE LAYER 2710

RESOURCE ORCHESTRATOR 2712

GROUPED COMPUTING RESOURCES 2714

NODE C.R. 2716(1)    NODE C.R. 2716(2)    • • •    NODE C.R. 2716(N)

FIG. 27

INTEGRATED
CIRCUIT
3100

APPLICATION
PROCESSOR(S)
3105

GRAPHICS
PROCESSOR
3110

IMAGE
PROCESSOR
3115

VIDEO
PROCESSOR
3120

USB
3125

UART
3130

SPI/
SDIO
3135

$I^2S/I^2C$
3140

DISPLAY
3145

SECURITY
ENGINE
3170

MEMORY
3165

FLASH
3160

MIPI
3155

HDMI
3150

3200

WIRELESS
NETWORK
ADAPTER
3219

NETWORK
ADAPTER
3218

DISPLAY
DEVICE(S)
3210A

I/O SWITCH
3216

ADD-IN
DEVICE(S)
3220

INPUT
DEVICE(S)
3208

I/O HUB
3207

SYSTEM
STORAGE
3214

I/O SUBSYSTEM 3211

COMMUNICATION
LINK 3206

PARALLEL
PROCESSOR(S)
3212

MEMORY
HUB
3205

SYSTEM
MEMORY
3204

COMMUNICATION
LINK 3213

DISPLAY
DEVICE(S)
3210B

PROCESSOR(S)
3202

PROCESSING
SUBSYSTEM
3201

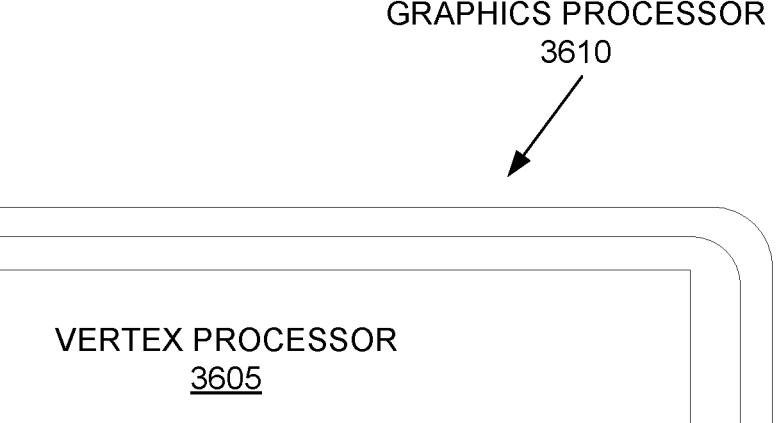
GRAPHICS PROCESSOR
3610
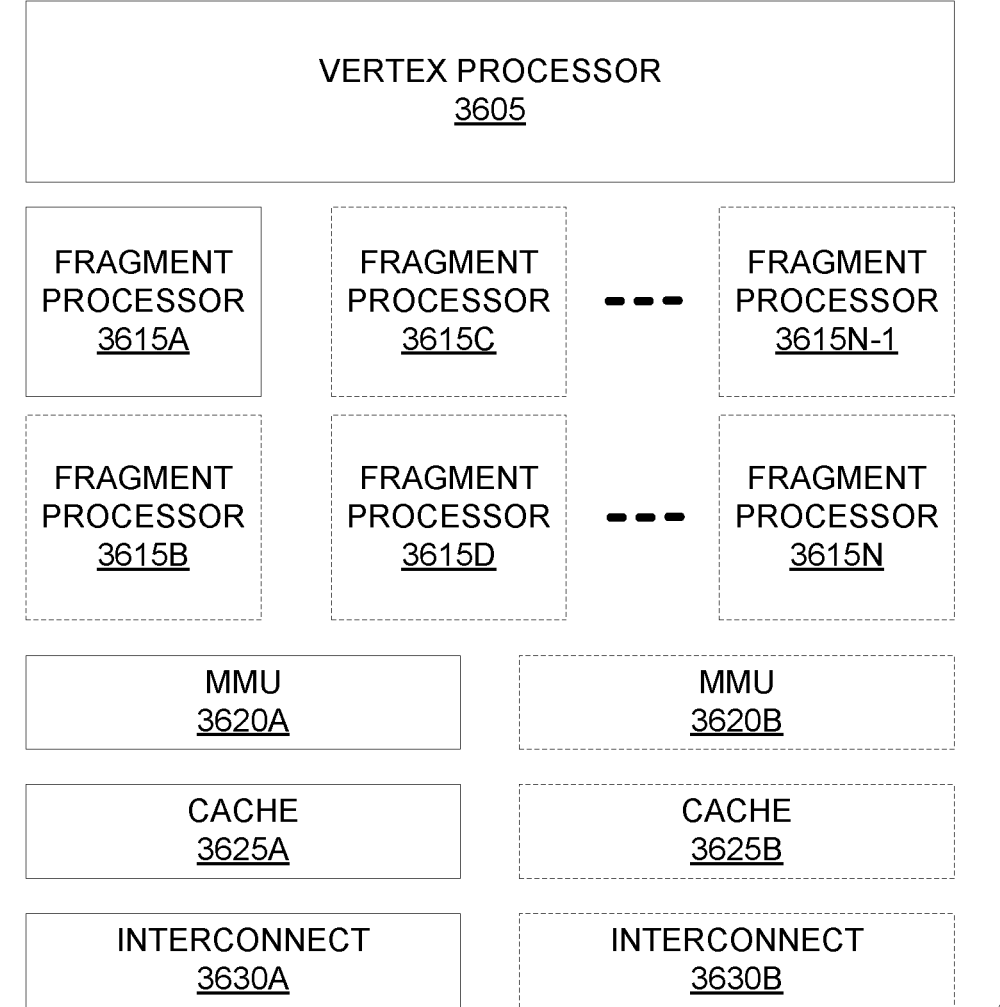
VERTEX PROCESSOR
3605
FRAGMENT
PROCESSOR
3615A
FRAGMENT
PROCESSOR
3615C
- - -
FRAGMENT
PROCESSOR
3615N-1
FRAGMENT
PROCESSOR
3615B
FRAGMENT
PROCESSOR
3615D
- - -
FRAGMENT
PROCESSOR
3615N
MMU
3620A
MMU
3620B
CACHE
3625A
CACHE
3625B
INTERCONNECT
3630A
INTERCONNECT
3630B
FIG. 36A

GRAPHICS PROCESSOR
3640

INTER-CORE TASK MANAGER
(e.g., THREAD DISPATCHER)
3645

SHADER CORE 3655A

SHADER CORE 3655C

SHADER CORE 3655E

- - -

SHADER CORE 3655N-1

SHADER CORE 3655B

SHADER CORE 3655D

SHADER CORE 3655F

- - -

SHADER CORE 3655N

TILING UNIT
3658

MMU
3620A

MMU
3620B

CACHE
3625A

CACHE
3625B

INTERCONNECT
3630A

INTERCONNECT
3630B

GRAPHICS CORE
3700

SHARED INSTRUCTION CACHE – 3702

3701A

3701N

INSTRUCTION CACHE - 3704A

INSTRUCTION CACHE - 3704N

THREAD SCHEDULER - 3706A

THREAD SCHEDULER - 3706N

THREAD DISPATCHER - 3708A

THREAD DISPATCHER - 3708N

REGISTER - 3710A

REGISTER - 3710N

AFU 3712A

FPU 3714A

ALU 3716A

AFU 3712N

FPU 3714N

ALU 3716N

ACU 3713A

DPFPU 3715A

MPU 3717A

TEXTURE UNIT 3718

ACU 3713N

DPFPU 3715N

MPU 3717N

CACHE/SHARED MEMORY – 3720

To/From Xbar

To/From Xbar

To/From Xbar

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
5410

↓

CUDA to HIP Translation Tool 5420

CUDA Kernel Launch Syntax 5510

KernelName<<<GridSize, BlockSize,
SharedMemorySize,
Stream>>>(KernelArguments);

→

HIP Kernel Launch Syntax 5520 hipLaunchKernelGGL(KernelName, GridSize,
BlockSize, SharedMemorySize, Stream,
KernelArguments);

↓

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
} int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
5430

FIG. 55

Grid <u>5720</u>
*GridSize = dim3(BX,BY,1)*    *BlockSize = dim3(TX,TY,1)*

Thread Block <u>5730(1,1)</u>

| Thread <u>5740(1,1)</u> | ••• | Thread <u>5740(1,TY)</u> |
|---|---|---|

| Thread <u>5740(TX,1)</u> | ••• | Thread <u>5740(TX,TY)</u> |
|---|---|---|

<u>5730(1,BY)</u>

<u>5730(BJ,1)</u>

<u>5730(BJ,BY)</u>

Shared Memory <u>5660(1)</u>

Compute Unit <u>5640(1)</u>

Compute Unit <u>5640(2)</u>

<u>5730(BJ+1,1)</u>

<u>5730(BJ+1,BY)</u>

<u>5730(BX,1)</u>

<u>5730(BX,BY)</u>

Shared Memory <u>5660(2)</u>

Compute Unit <u>5640(C)</u>

Programmable Processing Unit 5620(1)

STORAGE OF TENSOR IN A CACHE

TECHNICAL FIELD

At least one embodiment pertains to processing resources used to execute one or more programs written for a parallel computing platform and application interface. For example, at least one embodiment pertains to processors or computing systems that perform an application programming interface (API) according to various novel techniques described herein.

BACKGROUND

Performing data movement operations can use significant time, power, or computing resources. The amount of time, power, or computing resources can be improved.

BRIEF DESCRIPTION OF THE DRAWINGS

FIG. 27 illustrates an exemplary data center, in accordance with at least one embodiment;

FIGS. 36A-36B illustrate exemplary graphics processors, in accordance with at least one embodiment;

FIG. 55 illustrates an exemplary kernel translated by CUDA-to-HIP translation tool of FIG. 54C, in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
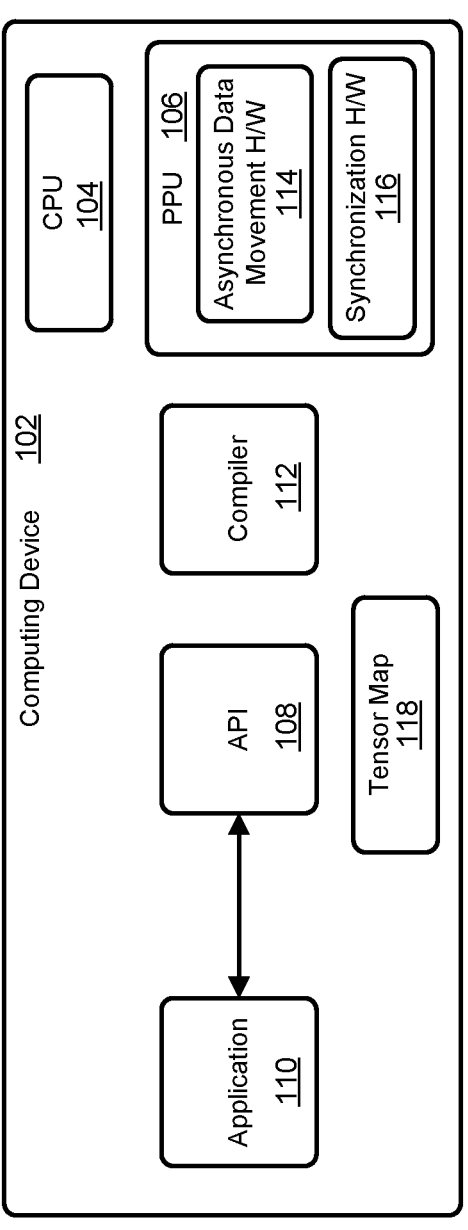
FIG. 1 is a block diagram that illustrates a system, according to at least one embodiment.

FIG. 1 is a block diagram that illustrates a system 100, according to at least one embodiment. In at least one embodiment, system 100 includes a computing device 102 that includes a central processing unit (CPU) 104 and a parallel processing unit (PPU) 106 (e.g., an accelerator such as a graphics processing unit (GPU), field programmable gate array (FPGA), application specific integrated circuit (ASIC), and/or some other suitable device). In at least one embodiment, computing device 102 includes one or more other components, not shown for clarity, such as main memory used by CPU 104, memory on PPU 106 (e.g., global memory, shared memory), a storage device, one or more networking components, one or more additional CPUs, and/or one or more additional PPUs. In at least one embodiment, an API 108 provides at least one function accessible to an application 110.

In at least one embodiment, API 108 provides an asynchronous reduction function (e.g., from global to shared memory on PPU 106). In at least one embodiment, API 108 provides one or more functions that use manual transaction accounting. In at least one embodiment, manual transaction accounting is referred to as manual tracking. In at least one embodiment, manual transaction accounting is when a user (e.g., computer program code, such as a kernel running on PPU 106) performs one or more aspects of tracking data to be asynchronously moved (e.g., tracking a count of data in bytes, transactions, or some other suitable count). In at least one embodiment, user provides this count to one or more APIs. In at least one embodiment, user is a program that calls and/or uses one or more API functions. In at least one embodiment, API 108 provides one or more functions to be used to generate and/or use one or more thread synchronization objects (e.g., barriers and/or pipelines) with one or more asynchronous operations that use manual transaction accounting. In at least one embodiment, API 108 provides one or more functions that use automatic transaction accounting. In at least one embodiment, a compiler 112 translates requests received via API 108 into instructions (e.g., instructions that are part of an instruction set architecture for PPU 106) that can be executed on PPU 106.

In at least one embodiment, PPU 106 includes asynchronous data movement hardware (H/W) 114. In at least one embodiment, asynchronous data movement hardware is referred to as a tensor memory accelerator (TMA) or some other suitable name. In at least one embodiment, PPU 106 includes synchronization hardware 116. In at least one embodiment, synchronization hardware 116 is referred to as a SyncUnit or some other suitable name. In at least one embodiment, a user (e.g., a thread performing computer program code being performed by PPU 106) initiates an asynchronous data movement operation (e.g., a copy and/or reduction operation) using one or more functions of API 108. In at least one embodiment, asynchronous data movement H/W 114 performs data movement operation in response to function of API initiated by thread. In at least one embodiment, when using manual transaction accounting, user tracks an expected count (e.g., in bytes, transactions, or some other suitable amount) of data to be moved (e.g., copied), and provides expected count using one or more functions of API 108. In at least one embodiment, expected count is previously defined and/or otherwise known to user. In at least one embodiment, expected count is provided to synchronization H/W 116 using a function of API 108 (e.g., a barrier arrive using manual transaction accounting function, or a consumer commit function, not shown for clarity). In at least one embodiment, asynchronous data movement H/W 114 indicates to synchronization H/W 116 when data movement operation is complete. In at least one embodiment, synchronization H/W 116 generates an indication of when a sequence of data movement operations to be performed by a group of threads are complete based, at least in part, on balancing a sum of completed data movement operations received from asynchronous data movement H/W 114 and a sum of expected counts of data to be moved received via one or more functions of API 108 from one or more users (e.g., computer program code being performed by PPU 106) performing manual transaction accounting.

In at least one embodiment, API 108 includes a function to generate a tensor map 118. In at least one embodiment, tensor map 118 is referred to as a tensor descriptor. In at least one embodiment, rather than being referred to as being same, tensor descriptor is a data structure that includes a tensor map (e.g., tensor map 118), and API 108 includes a function to generate tensor descriptor that includes tensor map. In at least one embodiment, API 108 includes functions to generate more than one type of tensor descriptor (e.g., a first function to generate a tensor descriptor to be used with a tiled tensor mapping, and a second function to generate a tensor descriptor to be used with an image-to-column tensor mapping).

In at least one embodiment, asynchronous data movement operations between memories (e.g., between global and shared memory) on a GPU are useful because threads that initiate asynchronous data movement can perform other operations while data is being moved. In at least one embodiment, a thread can perform an instruction to perform a data movement operation and, because operation is asynchronous, that thread can continue to perform additional instructions before data movement operation is complete.

Figure 2:
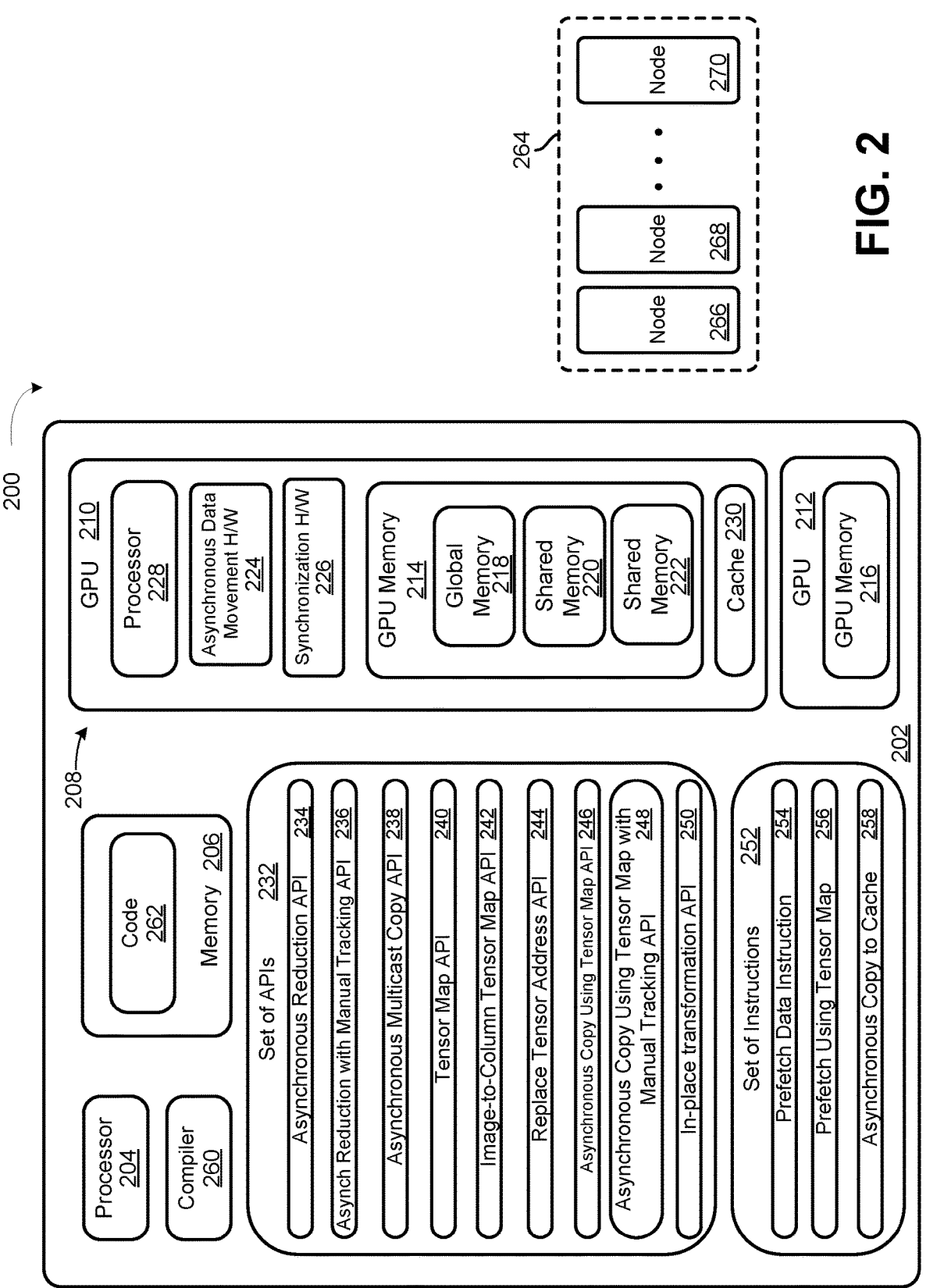
FIG. 2 is a block diagram that illustrates a computing environment, according to at least one embodiment.

FIG. 2 is a block diagram that illustrates a computing environment 200, according to at least one embodiment. In at least one embodiment, a computer system 202 includes a processor 204, a memory 206, and a set of graphics processing units (GPUs) 208. In at least one embodiment, computer system 202 includes one or more components of system 100 of FIG. 1. In at least one embodiment, set of GPUs 208 includes a GPU 210 and a GPU 212. In at least one embodiment, set of GPUs 208 includes a different number of GPUs (e.g., fewer or more than two GPUs). In at least one embodiment, GPU 210 includes a GPU memory 214 and GPU 212 includes a GPU memory 216. In at least one embodiment, GPU memory 214 and/or GPU memory 216 includes more than one level and/or type of memory (e.g., global memory accessible by entire GPU, memory accessible by a subset of processors on GPU, cache memory accessible by an individual processor on GPU, shared memory accessible by a particular group of threads). In at least one embodiment, GPU memory 214 includes global memory 218, first shared memory 220, and second shared memory 222. In at least one embodiment, GPU memory 214 includes a different number of shared memories (e.g., greater, or fewer than two).

In at least one embodiment, GPU 210 includes asynchronous data movement hardware (H/W) 224 (e.g., an NVIDIA tensor memory accelerator (TMA), and/or one or more other suitable asynchronous data movement hardware components). In at least one embodiment, GPU 210 includes synchronization H/W 226 (e.g., an NVIDIA SyncUnit, and/ or one or more other suitable synchronization hardware components). In at least one embodiment, GPU 210 includes one or more processors 228. In at least one embodiment, GPU 210 includes one or more caches (e.g., a cache 230). In at least one embodiment, cache 230 is an L2 cache. In at least one embodiment, GPU 212 includes one or more processors, one or more data movement H/W components, and/or one or more synchronization H/W components, not shown for clarity. In at least one embodiment, a different number of processors (e.g., more than one processor 204) and/or a different number of memories (e.g., more than one memory 206) are included in computer system 202. In at least one embodiment, processor 204 is a central processing unit (CPU). In at least one embodiment, computer system 202 includes one or more other components not shown for clarity (e.g., a network interface card, persistent storage device, one or more input devices, one or more output devices, and/or one or more other suitable components).

In at least one embodiment, processor 204 is a single-core processor. In at least one embodiment, processor 204 is a multi-core processor. In at least one embodiment, processor 204 is an element of a processing system such as processing system 2800 described herein. In at least one embodiment, processor 204 is an element of a computer system such as computer system 2900 described herein. In at least one embodiment, processor 204 is an element of a system such as system 3000 described herein. In at least one embodiment, processor 204 is an element of a computing system such as computing system 3200 described herein. In at least one embodiment, processor 204 is an element of a compute unit such as compute unit 5640 described herein. In at least one embodiment, processor 204 is some other processor shown and/or described herein. In at least one embodiment, one or more GPUs (e.g., GPU 210) in set of GPUs 208 is a graphics processor 3610 described herein. In at least one embodiment, one or more GPUs (e.g., GPU 210) in set of GPUs 208 is a graphics processor 3640 described herein. In at least one embodiment, one or more GPUs (e.g., GPU 210) in set of GPUs 208 is a graphics multiprocessor 3834 described herein. In at least one embodiment, one or more GPUs (e.g., GPU 210) in set of GPUs 208 is a graphics processor 3900 described herein. In at least one embodiment, one or more GPUs (e.g., GPU 210) in set of GPUs 208 is a graphics processor 4108 described herein. In at least one embodiment, one or more GPUs (e.g., GPU 210) in set of GPUs 208 is a GPU 5492 described herein. In at least one embodiment, one or more GPUs (e.g., GPU 210) in set of GPUs 208 is some other GPU shown and/or described herein. In at least one embodiment, computer system 202 includes one or more accelerators (e.g., one or more parallel processing units (PPUs), FPGAs, ASICS, and/or other suitable accelerators) instead of or in addition to GPUs in set of GPUs 208.

In at least one embodiment, computer system 202 includes a set of APIs 232. In at least one embodiment, when one or more APIs are referred to as performing an action or an aspect of a technique, one or more hardware components (e.g., a CPU, GPU, and/or other hardware component) of a computer system running an API perform that action or aspect of technique. In at least one embodiment, set of APIs 232 is a set of APIs for GPUs in set of GPUs 208. In at least one embodiment, one or more operations described with respect to GPUs in set of GPUs 208 and/or APIs in set of APIs 232 are performed by one or more accelerators, not shown for clarity, that are not GPUs. In at least one embodiment, set of APIs 232 is referred to as an API (e.g., a driver API) that includes multiple callable functions. In at least one embodiment, set of APIs 232 is implemented in a dynamic library. In at least one embodiment, set of APIs 232 is a handle-based, imperative API. In at least one embodiment, set of APIs 232 is a parallel processing framework API (e.g., a Compute Unified Device Architecture (CUDA) driver API, a Heterogeneous-Compute Interface for Portability (HIP) API, or some other API). In at least one embodiment, one or more APIs in set of APIs 232 are high-level APIs (e.g., accessed using a high-level programming language such as C++, Python, Java, Fortran, C, or some other suitable language). In at least one embodiment, one or more APIs in set of APIs 232 are low-level APIs (e.g., accessed using instructions of a programming frameworks such as CUDA PTX instructions or some other suitable intermediate representation that can be compiled to a machine-level binary representation for a particular hardware architecture). In at least one embodiment, one or more APIs of set of APIs 232 can also be implemented as instructions, such as PTX, assembly, x86, GPU instruction set architecture (ISA), machine-level, or some other suitable type of instructions. In at least one embodiment, set of APIs 232 is a set of APIs for a programming platform. In at least one embodiment, a programming platform may be, but is not limited to, CUDA, Radeon Open Compute Platform ("ROCm"), OpenCL (OpenCL™ is developed by Khronos group), SYCL, or Intel One API. In at least one embodiment, although some aspects of APIs and/or techniques for combining operations are discussed in relation to CUDA, including CUDA APIs and/or CUDA kernels, it should be understood that ROCm, OpenCL, SYCL, One API, and/or any other suitable APIs and/or kernels may be used. In at least one embodiment, one or more APIs in set of APIs 232 are accessed, at least in part, by including a header file in one or more portions of code that defines one or more functions of one or more APIs. In at least one embodiment, one or more APIs in set of APIs are functions (e.g., defined in a function library).

In at least one embodiment, set of APIs 232 includes an asynchronous reduction API 234. In at least one embodiment, asynchronous reduction API 234 is referred to as inplace_transform_n_async( ), or by some other suitable API name. In at least one embodiment, asynchronous reduction API 234 is to perform an asynchronous reduction operation on a GPU (e.g., GPU 210). In at least one embodiment, a reduction operation is an operation that combines multiple data to fewer data, such as by summation, bitwise AND, bitwise OR, or some other combination that results in a reduction. In at least one embodiment, performing asynchronous reduction API 234 causes asynchronous reduction operation to be performed using a first memory (e.g., a global memory such as global memory 218) of a GPU using data from a second memory (e.g., a shared memory such as shared memory 220) of GPU. In at least one embodiment, asynchronous reduction API 234 is to perform a reduction operation that uses automatic transaction accounting (e.g., uses a synchronization object that is not later updated by another API with an expected transaction count). In at least one embodiment, inputs to asynchronous reduction API 234 include a destination memory location, a memory source location, a shape of data (e.g., information that indicates one or dimensions of data, a number of dimensions of data, and/or a size of data), a reduction operation to be performed, and an identifier of a synchronization object (e.g., a thread synchronization object such as a barrier or pipeline). In at least one embodiment, asynchronous reduction API 234 returns an indication of whether asynchronous data movement hardware (e.g., asynchronous data movement H/W 224) is to be used to perform reduction operation. In at least one embodiment, asynchronous reduction API 234 is to perform multiple asynchronous reduction operations in multiple destination locations (e.g., by using a data structure that includes multiple destination locations rather than a single location as destination memory location input, such as described with respect to asynchronous multicast copy API 238) using data from source location.

In at least one embodiment, set of APIs 232 includes an asynchronous reduction with manual tracking API 236. In at least one embodiment, asynchronous reduction with manual tracking API 236 is referred to as inplace_transform-_n_async_tx( ), or by some other suitable API name. In at least one embodiment, asynchronous reduction with manual tracking API 236 is to perform an asynchronous reduction operation on a GPU using manual transaction accounting. In at least one embodiment, inputs to asynchronous reduction with manual tracking API 236 include a destination memory location, a memory source location, a shape of data, a reduction operation to be performed, and an identifier of a synchronization object (e.g., a thread synchronization object such as a barrier or pipeline). In at least one embodiment, thread synchronization object is to be updated by another API that provides an expected transaction count (e.g., an amount of data to be used in reduction operation). In at least one embodiment, asynchronous reduction with manual tracking API 236 returns an indication of whether asynchronous data movement hardware (e.g., asynchronous data movement H/W 224) is to be used to perform reduction operation. In at least one embodiment, asynchronous reduction with manual tracking API 236 is to perform multiple asynchronous reduction operations in multiple destination locations (e.g., by using a data structure that includes multiple destination locations rather than a single location as destination memory location input, such as described with respect to asynchronous multicast copy API 238) using data from source location.

In at least one embodiment, set of APIs 232 includes an asynchronous multicast copy API 238. In at least one embodiment, asynchronous multicast copy API 238 causes data to be asynchronously copied from a source memory location on a GPU (e.g., in global memory 218) to multiple destination memory locations on that GPU (e.g., in multiple shared memory locations such as first shared memory 220 and second shared memory 222). In at least one embodiment, asynchronous multicast copy API 238 functionality is included in one or more implementations of APIs referred to as memcpy_async( ), memcpy_async_tx( ), memcpy_tensor_async( ), memcpy_tensor_async_tx( ), or some other suitable API. In at least one embodiment, asynchronous multicast copy API 238 takes, as input, a data structure that includes multiple destination memory locations, a source memory location, a shape of data to be copied, and an identifier of a synchronization object. In at least one embodiment, data structure that includes multiple destination memory locations is referred to as a multicast pointer. In at least one embodiment, asynchronous multicast copy API 238 returns an indication of whether asynchronous data movement hardware (e.g., asynchronous data movement H/W 224) is to be used to perform asynchronous multicast operation.

In at least one embodiment, set of APIs 232 includes a tensor map API 240. In at least one embodiment, tensor map API 240 is referred to as cuTensorMapEncodeTiled( ), or by some other suitable API name. In at least one embodiment, tensor map API 240 is to generate a data structure that indicates a transformation between a first tensor in global memory (e.g., global memory 218) of a GPU and a second tensor in shared memory (e.g., shared memory 220) of that GPU. In at least one embodiment, transformation is between a tile of first tensor and second tensor. In at least one embodiment, transformation is between a tile of first tensor and a tile of second tensor. In at least one embodiment, generated data structure is referred to as a tensor map (e.g., tensor map 118 of FIG. 1). In at least one embodiment, tensor map is referred to as a tensor descriptor. In at least one embodiment, a tensor map is a data structure that indicates how to obtain second tensor from tensor data (e.g., a tile or subtensor) of first tensor. In at least one embodiment, performing tensor map API 240 causes a tensor map to be generated at a location specified by an input to tensor map API 240. In at least one embodiment, one or more other inputs to tensor map API 240 are used to perform transformation of tensor data. In at least one embodiment, inputs to tensor map API 240 include a location to store a generated tensor map data structure, a tensor data type, a tensor rank, a global address, global tensor dimensions, global strides, box dimensions, element strides, an interleave data structure, a swizzle data structure, an L2 promotion data structure, an out of bounds fill data structure, and/or other suitable inputs. In at least one embodiment, tensor map API 240 returns an indication of whether tensor map generation was successful.

In at least one embodiment, set of APIs 232 includes an image to column (I2C) tensor map API 242. In at least one embodiment, image to column tensor map API 242 is referred to as cuTensorMapEncodeIm2Col( ), or by some other suitable API name. In a least one embodiment, performing image to column tensor map API 242 causes a tensor map (e.g., tensor map 118 of FIG. 1) that includes one or more I2C transformations to be generated. In at least one embodiment, tensor map generated by image to column tensor map API 242 also includes one or more additional types of transformations (e.g., as described with respect to tensor map API 240). In at least one embodiment, an I2C transformation rearranges data in a tensor into columns of a matrix (e.g., such as to allow a convolution operation to be performed as a matrix multiplication operation). In at least one embodiment, I2C tensor map API 242 takes, as inputs, one or more inputs described with respect to tensor map API 240. In at least one embodiment, I2C tensor map API 242 includes one or more additional inputs that indicate which data of input tensor to arrange in columns of output matrix.

In at least one embodiment, set of APIs 232 includes a replace tensor address API 244. In at least one embodiment, replace tensor address API 244 is referred to as cuTensorMapReplaceAddress( ), or some other suitable API name. In at least one embodiment, replace tensor address API 244 is to replace a memory address (e.g., an address in global memory 218) of a tensor in a tensor map with a memory address of another tensor. In at least one embodiment, performing replace tensor address API 244 causes a first global address in a tensor map data structure (e.g., generated by tensor map API 240 or I2C tensor map API 242) to be replaced with a second address specified as an input to replace tensor address API 244. In at least one embodiment, inputs to replace tensor address API 244 are a pointer to a tensor map, and a memory address of a tensor that is replacing an existing tensor in tensor map. In at least one embodiment, replace tensor address API 244 returns an indication of whether memory address replacement was successful.

In at least one embodiment, set of APIs 232 includes an asynchronous copy using tensor map API 246. In at least one embodiment, asynchronous copy using tensor map API 246 is referred to as memcpy_tensor_async( ), or some other suitable API name. In at least one embodiment, asynchronous copy using tensor map API 246 is to perform asynchronous data copy operations using a tensor map (e.g., generated by tensor map API 240 or I2C tensor map API 242). In at least one embodiment, performing asynchronous copy using tensor map API 246 causes a tensor to be generated and stored in memory according to a tensor map (e.g., tensor map 118 of FIG. 1 and/or a tensor map generated by tensor map API 240 or I2C tensor map API 242). In at least one embodiment, asynchronous copy using tensor map API 246 uses automatic transaction accounting (e.g., uses a synchronization object that is not later updated by another API with an expected transaction count). In at least one embodiment, inputs to asynchronous copy using tensor map API 246 are a destination memory location (e.g., a pointer to a location in shared memory), an identifier of a tensor map data structure (e.g., a data structure that includes tensor map), a data structure that indicates a location (e.g., coordinates) of a subset of data (e.g., a tile or subtensor) in a tensor in global memory that is to be copied, and an identifier of a synchronization object that tracks asynchronous data copy operations. In at least one embodiment, asynchronous copy using tensor map API 246 returns an indication of whether a particular hardware unit (e.g., asynchronous data movement H/W 224) on GPU was used to perform asynchronous copy using tensor map operation.

In at least one embodiment, set of APIs 232 includes an asynchronous copy using tensor map with manual tracking API 248. In at least one embodiment, asynchronous copy using tensor map with manual tracking API 248 is referred to as memcpy_tensor_async_tx( ), or some other suitable API name. In at least one embodiment, asynchronous copy using tensor map with manual tracking API 248 is to perform asynchronous data copy operations using a tensor map (e.g., generated by tensor map API 240 or I2C tensor map API 242). In at least one embodiment, performing asynchronous copy using tensor map with manual tracking API 248 causes a tensor to be generated and stored in memory according to a tensor map (e.g., tensor map 118 of FIG. 1 and/or a tensor map generated by tensor map API 240 or I2C tensor map API 242). In at least one embodiment, asynchronous copy using tensor map with manual tracking API 248 uses manual transaction accounting. In at least one embodiment, inputs to asynchronous copy using tensor map with manual tracking API 248 are a destination memory location (e.g., a pointer to a location in shared memory), an identifier of a tensor map data structure (e.g., a data structure that includes tensor map), a data structure that indicates a location (e.g., coordinates) of a subset of data (e.g., a tile or subtensor) in a tensor in global memory that is to be copied, and an identifier of a synchronization object that tracks asynchronous data copy operations. In at least one embodiment, identified thread synchronization object is to be updated by another API that provides an expected transaction count (e.g., an amount of data to be used in asynchronous copy using tensor map with manual tracking operation). In at least one embodiment, asynchronous copy using tensor map with manual tracking API 248 returns an indication of whether a particular hardware unit (e.g., asynchronous data movement H/W 224) on GPU was used to perform asynchronous copy using tensor map operation.

In at least one embodiment, set of APIs 232 includes an in-place transformation API 250. In at least one embodiment, in-place transformation API 250 is referred to as inplace_transform_tensor_async( ), or some other suitable API name. In at least one embodiment, performing in-place transformation API 250 is to perform an in-place transformation using a tensor map. In at least one embodiment, in-place transformation of a tensor is a transformation of tensor that stores result of transformation in same memory in which untransformed tensor is stored. In at least one embodiment, in-place transformation is a reduction operation performed on a first tensor using a second tensor and a tensor map (e.g., generated by tensor map API 240 or I2C tensor map API 242). In at least one embodiment, performing in-place transformation API 250 can cause a first tensor to be transformed to a second tensor that is stored in memory, then cause second tensor to be transformed into a third tensor that uses memory that stores second tensor (e.g., by overwriting second tensor with third tensor). In at least one embodiment, in-place transformation API takes, as input, one or more of a pointer to a tensor map data structure, a parameter data structure (e.g., that includes one or more additional parameters such as an identifier of a reduction operation to be performed and/or coordinate information for a portion of a tensor to be used), an identifier of a source location, an identifier of a synchronization object to be used, and/or other suitable parameters. In at least one embodiment, in-place transformation API 250 returns an indication of whether a particular hardware unit (e.g., asynchronous data movement H/W 224) on GPU was used to perform in-place transformation operation. In at least one embodiment, in-place transformation API 250 is to perform multiple asynchronous reduction operations using tensors in multiple destination locations (e.g., by using a data structure that includes multiple destination locations rather than a single location as destination memory location input, such as described with respect to asynchronous multicast copy API 238) using data from source location.

In at least one embodiment, computer system 202 includes a set of instructions 252. In at least one embodiment, set of instructions 252 includes low-level and/or intermediate level instructions (e.g., CUDA PTX instructions). In at least one embodiment, one or more instructions included set of instructions 252 are included in set of APIs 232. In at least one embodiment, set of instructions 252 includes a prefetch data instruction 254. In at least one embodiment, prefetch data instruction 254 is referred to as prefetch.bulk.global.L2, or some other suitable instruction name. In at least one embodiment, prefetch data instruction 254 is to prefetch data by asynchronously copying data from global memory of a GPU (e.g., global memory 218) to cache memory (e.g., cache 230) of GPU. In at least one embodiment, cache memory is L2 cache memory. In at least one embodiment, inputs to prefetch data instruction 254 are a pointer to a source location of data to be copied, and an indication of a size of data. In at least one embodiment, prefetch data instruction 254 with representation of inputs to be provided is referred to as prefetch.bulk.global.L2 [srcPtr], cp-size.

In at least one embodiment, set of instructions 252 includes a prefetch using tensor map 256. In at least one embodiment, prefetch using tensor map 256 is referred to as prefetch.bulk.tensor.dim.global.L2, or some other suitable instruction name. In at least one embodiment, prefetch using tensor map 256 is to prefetch data by asynchronously copying data from global memory of a GPU (e.g., global memory 218) to cache memory (e.g., cache 230) of GPU using a tensor map (e.g., generated by tensor map API 240). In at least one embodiment, cache memory is L2 cache memory. In at least one embodiment, inputs to prefetch using tensor map 256 are a pointer to tensor map data structure (e.g., a tensor map and/or tensor descriptor), and a parameter that indicates a portion of tensor to which tensor map is to be applied (e.g., coordinates). In at least one embodiment, tensor map data structure includes a source location of data to be copied (e.g., a pointer to a tensor in global memory). In at least one embodiment, prefetch using tensor map 256 with representation of inputs to be provided is referred to as prefetch.bulk.tensor.dim.global.L2 [srcPtr], coord. In at least one embodiment, performing prefetch using tensor map 256 causes a tensor in global memory of a GPU to be transformed according to a tensor map and result to be stored in L2 cache memory of GPU.

In at least one embodiment, set of instructions 252 includes asynchronous copy to cache 258. In at least one embodiment, asynchronous copy to cache 258 is referred to as prefetch.bulk.tensor.dim.im2col.global.L2, or some other suitable instruction name. In at least one embodiment, asynchronous copy to cache 258 is to asynchronously copy data from global memory of a GPU (e.g., global memory 218) to cache memory (e.g., cache 230) of GPU based on a tensor map data structure (e.g., generated by I2C tensor map API 242) that includes image-to-column transformation information. In at least one embodiment, asynchronous copy to cache is referred to as a prefetch. In at least one embodiment, cache memory is L2 cache memory. In at least one embodiment, inputs to asynchronous copy to cache 258 are a pointer to a tensor map data structure, a parameter indicating a portion of a tensor to which tensor map is to apply (e.g., coordinates), and an offset value used in image-to-column transformation. In at least one embodiment, asynchronous copy to cache 258 with representation of inputs to be provided is referred to as prefetch.bulk.tensor.dim.im2col.global.L2 [srcPtr], coord, i2cOff. In at least one embodiment, performing asynchronous copy to cache 258 causes a tensor in global memory of a GPU to be transformed according to tensor map including one or more image-to-column transformations, and result to be stored in L2 cache memory of GPU.

In at least one embodiment, a compiler 260 translates requests received via APIs in set of APIs 232 into instructions (e.g., generates instructions that are part of an instruction set architecture for GPU 210) that can be executed on GPU 210. In at least one embodiment, generated instructions are stored as code 262 that is copied to one or more GPUs in set of GPUs 208 (e.g., GPU 210) to be performed. In at least one embodiment, one or more threads use one or more APIs in set of APIs 232, and can pass one or more arguments to APIs in set of APIs. In at least one embodiment, set of APIs 232 includes one or more APIs that can be used by code implemented at a higher level (e.g., C++ style implementation) and/or that can be used by code implemented at an intermediate level (e.g., as PTX style instructions). In at least one embodiment, compiler 260 translates requests received via instructions in set of instructions 252 into lower-level instructions (e.g., that are part of an instruction set architecture) stored as code 262 (e.g., as part of a kernel) that can be executed on GPU 210.

In at least one embodiment, computer system 202 includes a set of nodes 264. In at least one embodiment, set of nodes 264 includes a node 266, a node 268, and a node 270. In at least one embodiment, set of nodes 264 includes a different number of nodes. In at least one embodiment, nodes in set of nodes 264 include one or more GPUs. In at least one embodiment, kernel information (e.g., based, at least in part, on code 262) is copied to one or more GPUs included in one or more nodes in set of nodes 264. In at least one embodiment, one or more components and/or aspects of computer system 202 and/or set of nodes 264 are implemented with one or more hardware components, one or more software components, one or more circuits, dedicated hardware such as fixed function circuitry, and/or any other suitable type of hardware, software, or combination thereof. In at least one embodiment, one or more aspects shown or described with respect to FIG. 2 are implementations of, or same as, one or more aspects shown or described with respect to FIG. 1. In at least one embodiment, set of APIs 232 is included in API 108 of FIG. 1, set of instructions 252 is included in API 108 of FIG. 1, GPU 210 is PPU 106 of FIG. 1, asynchronous data movement H/W 224 is asynchronous data movement H/W 114 of FIG. 1, synchronization H/W 226 is synchronization H/W 116 of FIG. 1, processor 204 is CPU 104 of FIG. 1, and/or compiler 260 is compiler 112 of FIG. 1. In at least one embodiment, set of APIs 232 includes one or more other APIs, not shown for clarity (e.g., one or more synchronization APIs such as a barrier arrive API, a commit API, a wait API and/or a wait priority API, one or more cooperative thread group APIs, one or more pipeline APIs, and/or some other suitable APIs).

In at least one embodiment, as used in any implementation described herein, unless otherwise clear from context or stated explicitly to contrary, terms such as "module" and nominalized verbs (e.g., compiler, and/or other terms) each refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

In at least one embodiment, a processor (e.g., processor 228, processor 204, or some other suitable processor) includes one or more circuits to perform an API (e.g., asynchronous reduction API 234) to cause information corresponding to one or more memory transactions resulting from performance of API to be transformed and stored. In at least one embodiment, one or more memory transactions are asynchronous reduction operations to be performed by a graphics processing unit (GPU). In at least one embodiment, one or more memory transactions are asynchronous reduction operations to be performed by a graphics processing unit (GPU), and information includes data from a first memory of GPU and a second memory of GPU. In at least one embodiment, one or more memory transactions are to move information to be moved between shared memory of a graphics processing unit (GPU) and global memory of GPU. In at least one embodiment, API is to receive one or more inputs indicating a source memory location and a destination memory location of one or more memory transactions. In at least one embodiment, API is to receive information indicating a shape of information. In at least one embodiment, API is to provide an indication of whether a type of hardware unit is used to transform information.

In at least one embodiment, a system (e.g., computer system 202, system 100 of FIG. 1, or some other suitable computer system) includes one or more processors to perform an API (e.g., asynchronous reduction API 234) to cause information corresponding to one or more memory transactions resulting from performance of API to be transformed and stored. In at least one embodiment, one or more memory transactions comprise asynchronous operations to be performed by a graphics processing unit (GPU). In at least one embodiment, one or more memory transactions comprise reduction operations to be performed by a graphics processing unit (GPU). In at least one embodiment, one or more memory transactions are asynchronous reduction operations to be performed by a graphics processing unit (GPU), and information includes data from a first memory of GPU and a second memory of GPU. In at least one embodiment, API is to receive as input an identifier of a synchronization object. In at least one embodiment, API is to receive as input an indication of a reduction operation to be performed.

In at least one embodiment, a processor (e.g., processor 228, processor 204, or some other suitable processor) includes one or more circuits to perform an API (e.g., asynchronous reduction with manual tracking API 236) to cause information corresponding to one or more memory transactions resulting from performance of API to be transformed. In at least one embodiment, one or more memory transactions are asynchronous reduction operations to be performed by a graphics processing unit (GPU) using manual transaction accounting. In at least one embodiment, one or more memory transactions are asynchronous reduction operations to be performed by a graphics processing unit (GPU) using manual transaction accounting, and information includes data from a first memory of GPU and a second memory of GPU. In at least one embodiment, API is to receive as input information indicating a source memory location and a destination memory location to be used to perform one or more memory transactions. In at least one embodiment, API is to receive as input information indicating a shape of data to be copied using one or more memory transactions. In at least one embodiment, one or more memory transactions are to move data between shared memory of a graphics processing unit (GPU) and global memory of GPU. In at least one embodiment, API is to provide to a user an indication of one or more hardware units to be used to perform one or more memory transactions.

In at least one embodiment, a system (e.g., computer system 202, system 100 of FIG. 1, or some other suitable computer system) includes one or more processors to perform an API (e.g., asynchronous reduction with manual tracking API 236) to cause information corresponding to one or more memory transactions resulting from performance of API to be transformed. In at least one embodiment, one or more memory transactions are asynchronous reduction operations to be performed by a graphics processing unit (GPU) using manual transaction accounting. In at least one embodiment, one or more memory transactions are asynchronous reduction operations to be performed by a graphics processing unit (GPU). In at least one embodiment, information to be stored is to be used to perform manual transaction accounting. In at least one embodiment, API is to receive as input one or more characteristics of data to be transformed. In a least one embodiment, API is to indicate whether a particular hardware unit on a graphics processing unit (GPU) is to perform one or more memory transactions.

In at least one embodiment, a processor (e.g., processor 228, processor 204, or some other suitable processor) includes one or more circuits to perform an API (e.g., asynchronous multicast copy API 238) to cause information to be stored in a plurality of storage locations allocated to a first graphics processing unit (GPU). In at least one embodiment, one or more circuits are to perform API to cause an asynchronous copy operation to be performed to copy information from a first memory location of first GPU to a plurality of second memory locations of GPU. In at least one embodiment, API is to cause information to be stored in plurality of locations asynchronously. In at least one embodiment, API is to receive as input a data structure to indicate plurality of storage locations. In at least one embodiment, API is to receive as input a shape of information to be used to store information. In at least one embodiment, API is to receive as input a synchronization object to be updated when storing information in plurality of storage locations. In at least one embodiment, API is to further indicate whether a particular hardware unit is to be used to store information in plurality of storage locations.

In at least one embodiment, a system (e.g., computer system 202, system 100 of FIG. 1, or some other suitable computer system) includes one or more processors to perform an API (e.g., asynchronous multicast copy API 238) to cause information to be stored in a plurality of storage locations allocated to a first graphics processing unit (GPU). In at least one embodiment, one or more circuits are to perform API to cause an asynchronous copy operation to be performed to copy information from a first memory location of first GPU to a plurality of second memory locations of first GPU. In at least one embodiment, API is to cause information to asynchronously be stored in plurality of storage locations. In at least one embodiment, API is to cause information to be stored multiple times among plurality of storage locations (e.g., in first shared memory 220 and second shared memory 222). In at least one embodiment, API is to receive as input information indicating a data structure storing identifiers of plurality of storage locations. In at least one embodiment, API is to receive, as input, a shape of information.

In at least one embodiment, a processor (e.g., processor 228, processor 204, or some other suitable processor) includes one or more circuits to perform an API (e.g., tensor map API 240) to cause a mapping from a first tensor to a second tensor to be generated. In at least one embodiment, mapping is from a tile (e.g, a subtensor) of first tensor to second tensor. In at least one embodiment, mapping is from a tile (e.g., a subtensor) of first tensor to a tile (e.g., subtensor) of second tensor. In at least one embodiment, one or more circuits are to perform API to cause a data structure that includes mapping to be generated. In at least one embodiment, one or more circuits are to perform API to cause a data structure that includes mapping to be generated, and data structure also includes information that indicates a structure of a first tensor stored in a first memory of a graphics processing unit (GPU), and indicates a structure of a second tensor to be stored in a second memory of GPU based, at least in part, on mapping and first tensor. In at least one embodiment, mapping is to be used to store data of first tensor to be stored according to mapping. In at least one embodiment, API is to receive as input information indicating a storage location in which to store mapping. In at least one embodiment, API is to receive as input a tensor data type. In at least one embodiment, API is to receive as input a tensor rank.

In at least one embodiment, a system (e.g., computer system 202, system 100 of FIG. 1, or some other suitable computer system) includes one or more processors to perform an API (e.g., tensor map API 240) to perform an application programming interface (API) to cause a mapping from a first tensor to a second tensor to be generated. In at least one embodiment, one or more circuits are to perform API to cause a data structure that includes mapping to be generated. In at least one embodiment, API is to further cause to be generated information that indicates a structure of a first tensor stored in a first memory of a graphics processing unit (GPU), and indicates a structure of a second tensor to be stored in a second memory of GPU based, at least in part, on mapping. In at least one embodiment, mapping is to be used to store data of first tensor to be stored according to mapping. In at least one embodiment, API is to receive as input information indicating where to store mapping. In at least one embodiment, API is to receive as input a plurality of characteristics of first tensor (e.g., a shape of tensor, location in memory, size, data type, and/or other suitable characteristics).

In at least one embodiment, a processor (e.g., processor 228, processor 204, or some other suitable processor) includes one or more circuits to perform an API (e.g., image-to-column tensor map API 242) to indicate how to generate one or more image-to-column transformations. In at least one embodiment, one or more circuits are to perform API to cause a data structure to be generated that indicates how to use one or more image-to-column transformations to generate one or more second tensors based, at least in part, on one or more first tensors. In at least one embodiment, API is further to cause a mapping from a first tensor to a second tensor to be generated. In at least one embodiment, one or more image-to-column transformations are to store tensor data of a tensor into columns of a matrix. In at least one embodiment, API is to receive as input information indicating how data in a tensor to be used in one or more image-to-column transformations is stored. In at least one embodiment, API is to receive as input information indicating a location into which information indicating how to generate one or more image-to-columns transformations is to be stored. In at least one embodiment, API is to receive as input a layout of tensor data in memory to be used to perform one or more image-to-column transformations.

In at least one embodiment, a system (e.g., computer system 202, system 100 of FIG. 1, or some other suitable computer system) includes one or more processors to perform an API (e.g., image-to-column tensor map API 242) to indicate how to generate one or more image-to-column transformations. In at least one embodiment, API is further to cause a mapping from a first tensor to a second tensor to be generated. In at least one embodiment, one or more image-to-column transformations are to store tensor data of a tensor into columns of a matrix. In at least one embodiment, one or more image-to-column transformations is to enable a convolution operation to be performed as a matrix multiplication operation. In at least one embodiment, API is to receive as input information indicating a portion of a tensor to which one or more image-to-column transformations are to be applied. In at least one embodiment, API is to receive as input a layout of one or more tensors to be used to perform one or more image-to-column transformations.

In at least one embodiment, a processor (e.g., processor 228, processor 204, or some other suitable processor) includes one or more circuits to perform an API (e.g., replace tensor address API 244) to indicate one or more storage locations of information to be mapped from a first tensor to a second tensor. In at least one embodiment, one or more circuits are to perform API to indicate one or more storage locations based, at least in part, replacing an indication of a first memory location with an indication of a second memory location. In at least one embodiment, API is to modify a data structure that indicates a mapping of first tensor to second tensor. In at least one embodiment, API is to update a mapping of a third tensor to second tensor to a mapping of first tensor to second tensor. In at least one embodiment, API is to reuse a mapping with a different set of tensors. In at least one embodiment, API is to receive as input an indication of a storage location in which a mapping between tensors is stored. In at least one embodiment, API is to replace a first memory address with a second memory address in a data structure.

In at least one embodiment, a system (e.g., computer system 202, system 100 of FIG. 1, or some other suitable computer system) includes one or more processors to perform an API (e.g., replace tensor address API 244) to indicate one or more storage locations of information to be mapped from a first tensor to a second tensor. In at least one embodiment, API is to indicate one or more storage locations based, at least in part, replacing an indication of a first memory location with an indication of a second memory location. In at least one embodiment, API is to update a data structure to replace a first memory address of a third tensor with a memory address of first tensor. In at least one embodiment, API is to update a mapping of a third tensor to second tensor to a mapping of first tensor to second tensor. In at least one embodiment, API is to reuse a tensor map with at least one different tensor. In at least one embodiment, API is to indicate a memory location of a mapping to be updated.

In at least one embodiment, a processor (e.g., processor 228, processor 204, or some other suitable processor) includes one or more circuits to perform an API (e.g., asynchronous copy using tensor map API 246) to cause a first tensor to be translated into a second tensor according to a tensor map. In at least one embodiment, one or more circuits are to perform API to asynchronously store second tensor. In at least one embodiment, one or more circuits are to perform API to asynchronously store second tensor in a memory of a graphics processing unit (GPU). In at least one embodiment, first tensor is to be stored in a first memory of a graphics processing unit (GPU), and one or more circuits are to perform API to asynchronously translate first tensor into second tensor and store second tensor in a second memory of GPU. In at least one embodiment, API is to be performed using automatic transaction accounting. In at least one embodiment, API is to receive as input an indication of a location in which tensor map is stored. In at least one embodiment, API is to receive as input an indication of a portion of first tensor to be translated into second tensor.

In at least one embodiment, a system (e.g., computer system 202, system 100 of FIG. 1, or some other suitable computer system) includes one or more processors to perform an API (e.g., asynchronous copy using tensor map API 246) to cause a first tensor to be translated into a second tensor according to a tensor map. In at least one embodiment, API is to cause first tensor to be translated into second tensor asynchronously. In at least one embodiment, API is to asynchronously store second tensor in a memory of a graphics processing unit (GPU). In at least one embodiment, API is to be performed using automatic transaction accounting. In at least one embodiment, API is to asynchronously copy data from first tensor according to tensor map. In at least one embodiment, API is to indicate whether a particular hardware unit is to be used to perform API.

In at least one embodiment, a processor (e.g., processor 228, processor 204, or some other suitable processor) includes one or more circuits to perform an API (e.g., asynchronous copy using tensor map with manual tracking API 248) to cause a first tensor to be translated into a second tensor according to a tensor map without storing information about one or more memory transactions corresponding to translation. In at least one embodiment, one or more circuits are to perform API to cause first tensor to be translated based, at least in part, on asynchronously storing second tensor in one or more second memory locations based, at least in part, on first tensor data stored in one or more first memory locations. In at least one embodiment, one or more circuits are to perform API to cause first tensor to be translated based, at least in part, on asynchronously storing second tensor in one or more second memory locations of a graphics processing unit (GPU) based, at least in part, on first tensor data stored in one or more first memory locations of GPU. In at least one embodiment, one or more circuits are to perform API to cause first tensor to be translated based, at least in part, on a data structure that includes a tensor map, and one or more circuits are to perform API to cause second tensor to be asynchronously stored. In at least one embodiment, API is to cause first tensor to be translated into second tensor without storing information by using manual transaction accounting. In at least one embodiment, API is to be performed using one or more asynchronous memory transactions. In at least one embodiment, API is to receive as input a data structure to indicate how to translate first tensor into second tensor.

In at least one embodiment, a system (e.g., computer system 202, system 100 of FIG. 1, or some other suitable computer system) includes one or more processors to perform an API (e.g., asynchronous copy using tensor map with manual tracking API 248) to cause a first tensor to be translated into a second tensor according to a tensor map without storing information about one or more memory transactions corresponding to translation. In at least one embodiment, API is to cause first tensor to be translated based, at least in part, on asynchronously storing second tensor in one or more second memory locations based, at least in part, on first tensor data stored in one or more first memory locations. In at least one embodiment, API is to cause first tensor to be translated based, at least in part, on asynchronously storing second tensor in one or more second memory locations of a graphics processing unit (GPU) based, at least in part, on first tensor data stored in one or more first memory locations of GPU. In at least one embodiment, API is to cause first tensor to be translated based, at least in part, on a data structure that includes a tensor map, and one or more circuits are to perform API to cause second tensor to be asynchronously stored. In at least one embodiment, API is to cause first tensor to be translated into second tensor using manual transaction accounting. In at least one embodiment, API is to receive as input a data structure to indicate how to translate first tensor into second tensor.

In at least one embodiment, a processor (e.g., processor 228, processor 204, or some other suitable processor) includes one or more circuits to perform an API (e.g., in-place transformation API 250) to cause a first tensor to be translated into a second tensor according to a tensor map. In at least one embodiment, API is to cause second tensor to be stored by overwriting at least a portion of memory storing first tensor. In at least one embodiment, API is to cause memory storing first tensor to be used to store second tensor. In at least one embodiment, API is to indicate whether a particular hardware unit is to perform API. In at least one embodiment, API is to cause second tensor to be stored in memory storing first tensor asynchronously. In at least one embodiment, API is to indicate complete performance of API before second tensor is stored. In at least one embodiment, API is to cause at least a portion of memory storing first tensor to store second tensor.

In at least one embodiment, a system (e.g., computer system 202, system 100 of FIG. 1, or some other suitable computer system) includes one or more processors to perform an API (e.g., in-place transformation API 250) to cause a first tensor to be translated into a second tensor according to a tensor map. In at least one embodiment, one or more memory transactions includes at least one memory transaction to be asynchronously performed. In at least one embodiment, API is to perform an in-place transform involving first tensor and second tensor. In at least one embodiment, API is to receive as input an indication of a location of first tensor in storage. In at least one embodiment, API is to cause memory storing first tensor to be used to store second tensor. In a least one embodiment, API is to cause second tensor to be stored in memory asynchronously.

In at least one embodiment, a GPU (e.g., GPU 210) and/or a processor (e.g., processor 228, processor 204, or some other suitable processor) includes one or more circuits to perform an instruction (e.g., prefetch data instruction 254) to cause a variable amount of information to be stored into one or more GPU caches. In at least one embodiment, one or more GPU caches comprise one or more level two (L2) caches. In at least one embodiment, GPU prefetch instruction is compiled from an assembly-level instruction to cause a variable amount of information to be stored into one or more GPU caches. In at least one embodiment, instruction is part of a graphics instruction set architecture (ISA). In at least one embodiment, GPU prefetch instruction is to be compiled to executable binary code to be performed by GPU. In at least one embodiment, GPU is to perform GPU prefetch instruction by obtaining information from GPU global memory. In at least one embodiment, an input to GPU prefetch instruction comprises a pointer to a source location of information. In at least one embodiment, an input to GPU prefetch instruction includes an indication of a size of data to be copied (e.g., where indication of size specifies variable amount of information to be stored in bytes or some other suitable metric).

In at least one embodiment, a system (e.g., computer system 202, system 100 of FIG. 1, or some other suitable computer system) includes one or more processors to perform an instruction (e.g., a GPU prefetch instruction such as prefetch data instruction 254) to cause a variable amount of information to be stored into one or more GPU caches. In at least one embodiment, an input to GPU prefetch instruction includes an indication of a size of data to be copied (e.g., where indication of size specifies variable amount of information to be stored in bytes or some other suitable metric). In at least one embodiment, one or more GPU caches comprise one or more level two (L2) caches. In at least one embodiment, GPU prefetch instruction is an assembly-level instruction. In at least one embodiment, instruction is part of a graphics instruction set architecture (ISA). In at least one embodiment, GPU prefetch instruction is to be compiled to executable binary code. In at least one embodiment, one or more GPU processors can perform GPU prefetch instruction. In at least one embodiment, a CPU or some other processor can perform GPU prefetch instruction. In at least one embodiment, system includes a GPU, and one or more processors are to perform GPU prefetch instruction by compiling GPU prefetch instruction into one or more instructions in binary executable code to be performed by a GPU of system.

In at least one embodiment, a GPU (e.g., GPU 210) and/or a processor (e.g., processor 228, processor 204, or some other suitable processor) includes one or more circuits to perform an instruction (e.g., prefetch using tensor map instruction 256) to cause one or more tensors to be stored into one or more GPU caches. In at least one embodiment, tensor prefetch instruction is to further cause a first tensor to be transformed to a second tensor comprising one or more tensors. In at least one embodiment, one or more GPU caches comprise a level two (L2) cache. In at least one embodiment, instruction is to further cause GPU to use a tensor map when causing one or more tensors to be stored. In at least one embodiment, tensor prefetch instruction is in a graphics instruction set architecture (ISA). In at least one embodiment, tensor prefetch instruction is to obtain one or more tensors from GPU global memory. In at least one embodiment, an input to tensor prefetch instruction comprises a pointer to a location in which one or more tensors are stored.

In at least one embodiment, a system (e.g., computer system 202, system 100 of FIG. 1, or some other suitable computer system) includes one or more processors to perform an instruction (e.g., a tensor prefetch instruction such as prefetch using tensor map instruction 256) to cause one or more tensors to be stored into one or more graphics processing unit (GPU) caches. In at least one embodiment, tensor prefetch instruction is to further cause a first tensor to be transformed to a second tensor comprising one or more tensors. In at least one embodiment, one or more GPU caches comprise one or more level two (L2) caches. In at least one embodiment, an input to tensor prefetch instruction indicates a transformation to be performed on first tensor. In at least one embodiment, an input to tensor prefetch instruction indicates a tensor map. In at least one embodiment, tensor prefetch instruction is to obtain tensor data from GPU memory different from one or more GPU caches.

In at least one embodiment, a GPU (e.g., GPU 210) and/or a processor (e.g., processor 228, processor 204, or some other suitable processor) includes one or more circuits to perform an instruction (e.g., asynchronous copy to cache 258) to cause tensor data to be transformed and stored into one or more GPU caches. In at least one embodiment, tensor prefetch instruction is to cause one or more tensors to be stored asynchronously. In at least one embodiment, one or more GPU caches comprise a level two (L2) cache. In at least one embodiment, an input to tensor prefetch instruction indicates a tensor map data structure to use to transform one or more tensors. In at least one embodiment, one or more tensors are to be transformed using one or more image-to-column transformations. In at least one embodiment, an input to tensor prefetch instruction indicates a portion of a tensor to be transformed. In at least one embodiment, an input to tensor prefetch instruction comprises an offset to be used to transform one or more tensors.

In at least one embodiment, a system (e.g., computer system 202, system 100 of FIG. 1, or some other suitable computer system) includes one or more processors to perform an instruction (e.g., a tensor prefetch instruction such as asynchronous copy to cache 258) to cause one or more tensors to be transformed and stored into one or more graphics processing unit (GPU) caches. In at least one embodiment, tensor prefetch instruction is to cause one or more tensors to be transformed and stored asynchronously. In at least one embodiment, one or more portions of transform are performed asynchronously with one or more other portions of transform performed asynchronously. In at least one embodiment, tensor prefetch instruction is to cause one or more tensors to be stored asynchronously. In at least one embodiment, one or more GPU caches comprise a level two (L2) cache. In at least one embodiment, one or more tensors are to be transformed using one or more image-to-column transformations. In at least one embodiment, an input to tensor prefetch instruction indicates a memory location to be used to transform one or more tensors.

Figure 3:
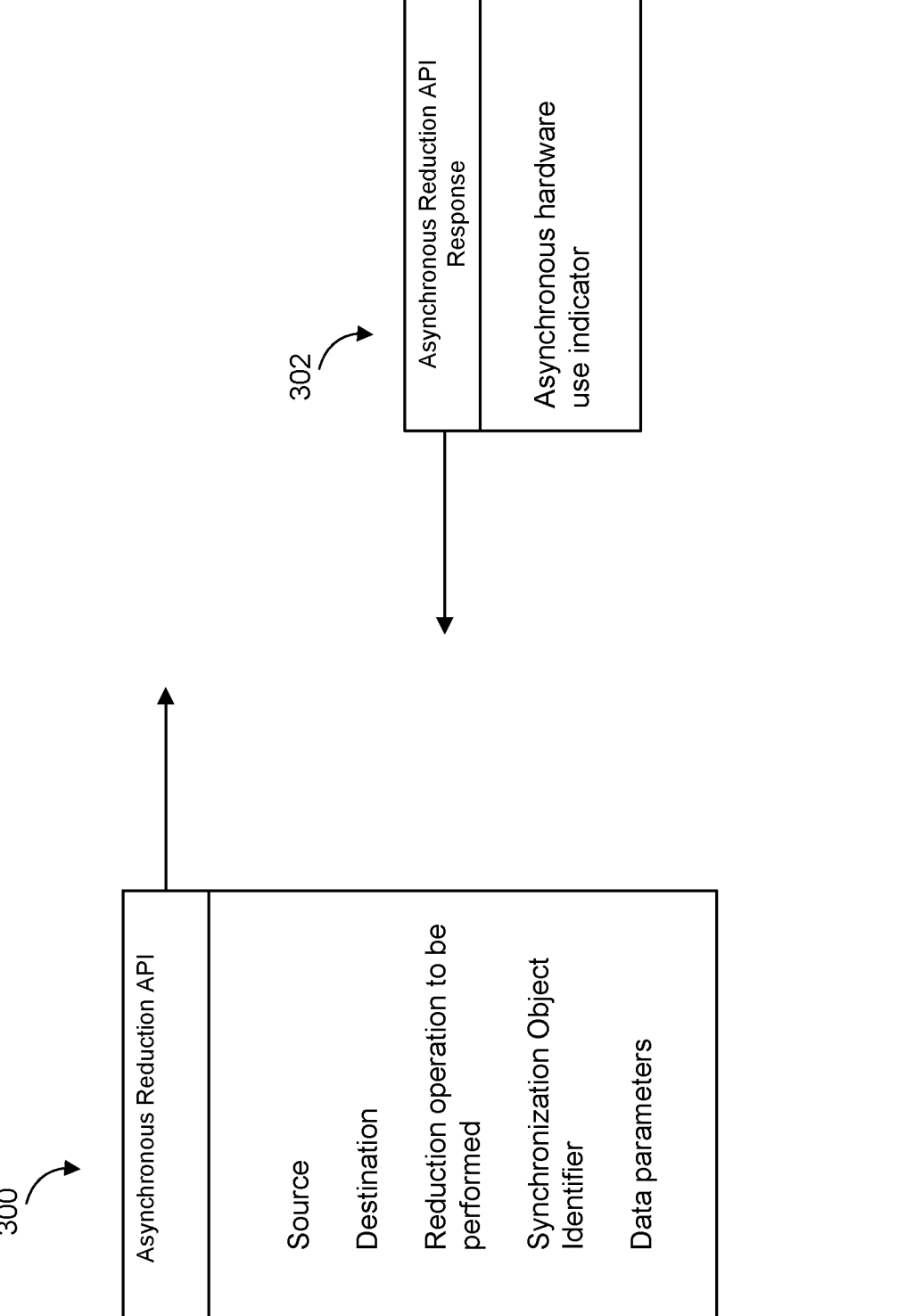
FIG. 3 illustrates performing an API to cause an asynchronous reduction operation to be performed, according to at least one embodiment.

FIG. 3 illustrates performing an API 300 to cause an asynchronous reduction operation to be performed, according to at least one embodiment. In at least one embodiment, one or more processors of a GPU (e.g., GPU 210 of FIG. 2) are to perform API 300. In at least one embodiment, API 300 is to be performed using asynchronous reduction API 234 of FIG. 2. In a least one embodiment, API 300 includes one or more parameters. In at least one embodiment, parameters of API 300 include a source memory location, a destination memory location, a reduction operation to be performed (e.g., an identifier of a summation, bitwise AND, bitwise OR, or some other reduction operation), and an identifier of a synchronization object (e.g., an identifier of a barrier or pipeline to be used). In at least one embodiment, API 300 is referred to as inplace_transform_n_async( ), or some other suitable API name.

In at least one embodiment, a response 302 to performing API 300 includes an asynchronous hardware use indicator. In at least one embodiment, asynchronous hardware use indicator indicates whether asynchronous data movement hardware (e.g., asynchronous data movement H/W 224 of FIG. 2) is to be used to perform asynchronous reduction operation. In at least one embodiment, asynchronous hardware use indicator is a Boolean value, an enumerated value, a data structure, or some other suitable indicator. In at least one embodiment, asynchronous hardware use indicator indicates, if asynchronous data movement hardware is not to be used, a reason why asynchronous data movement hardware is not to be used (e.g., not present on GPU in use, data not properly aligned, or some other suitable reason such as by using a reason code that corresponds to a particular reason). In at least one embodiment, asynchronous hardware use indicator is referred to as an AsyncContractFulfillment data structure or data type, an AsyncContractFulfilled value, or some other suitable name. In at least one embodiment, response 302 provides an operation status in addition to, or instead of, asynchronous hardware use indicator. In at least one embodiment, response 302 is not present (e.g., when API 300 has a void return type).

Figure 4:
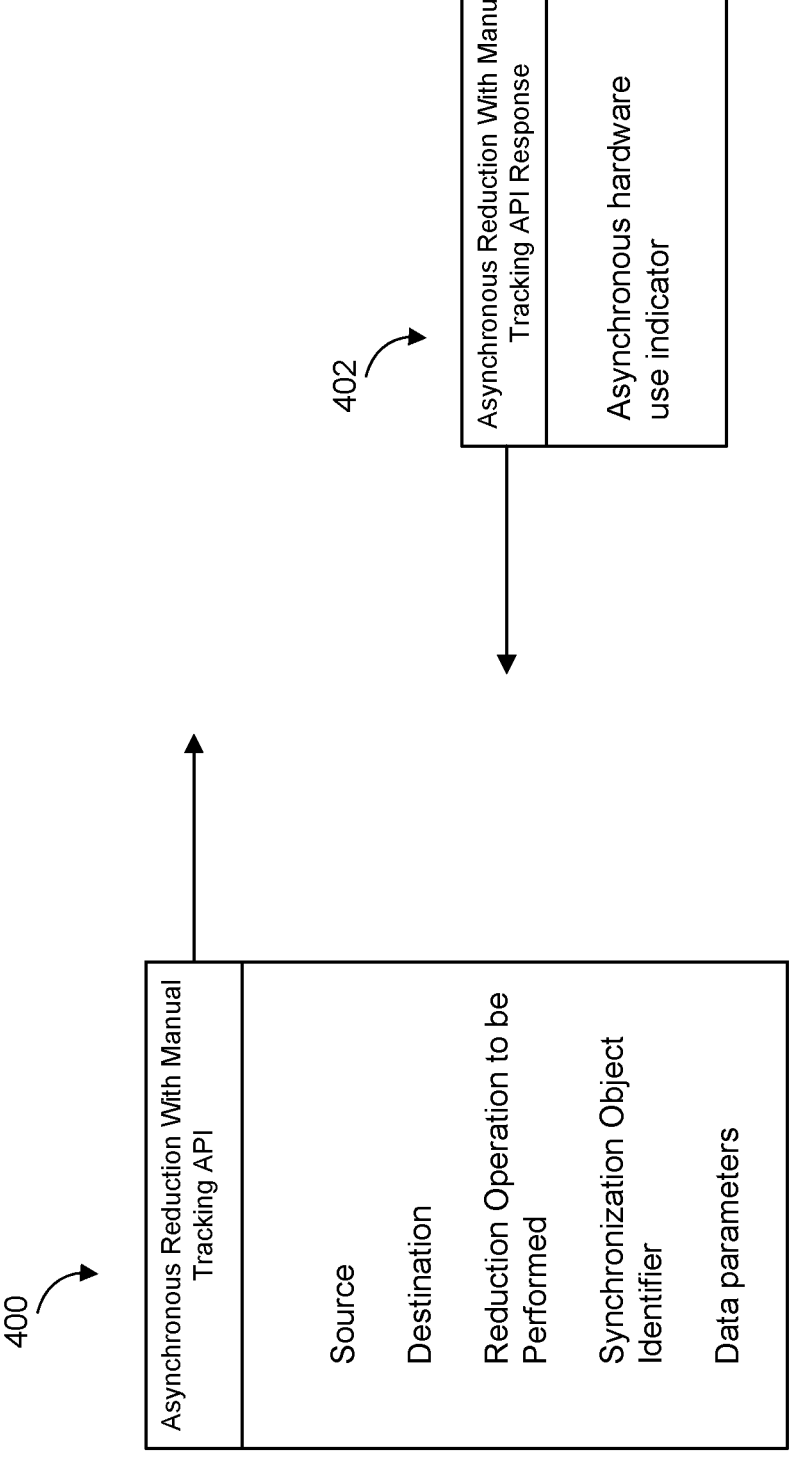
FIG. 4 illustrates performing an API to cause an asynchronous reduction operation to be performed using manual transaction accounting, according to at least one embodiment.

FIG. 4 illustrates performing an API 400 to cause an asynchronous reduction operation to be performed using manual transaction accounting, according to at least one embodiment. In at least one embodiment, one or more processors of a GPU (e.g., GPU 210 of FIG. 2) are to perform API 400. In at least one embodiment, API 400 is to be performed using asynchronous reduction with manual tracking API 236 of FIG. 2. In a least one embodiment, API 400 includes one or more parameters. In at least one embodiment, parameters of API 400 include a source memory location, a destination memory location, a reduction operation to be performed (e.g., an identifier of a summation, bitwise AND, bitwise OR, or some other reduction operation), and an identifier of a synchronization object (e.g., an identifier of a barrier or pipeline to be used that can be updated with an expected transaction account by another API). In at least one embodiment, API 400 is referred to as inplace_transform_n_async_tx( ), or some other suitable API name.

In at least one embodiment, a response 402 to performing API 400 includes an asynchronous hardware use indicator. In at least one embodiment, asynchronous hardware use indicator indicates whether asynchronous data movement hardware (e.g., asynchronous data movement H/W 224 of FIG. 2) is to be used to perform asynchronous reduction operation. In at least one embodiment, asynchronous hardware use indicator is a Boolean value, an enumerated value, a data structure, or some other suitable indicator. In at least one embodiment, asynchronous hardware use indicator indicates, if asynchronous data movement hardware is not to be used, a reason why asynchronous data movement hardware is not to be used (e.g., not present on GPU in use, data not properly aligned, or some other suitable reason such as by using a reason code that corresponds to a particular reason). In at least one embodiment, asynchronous hardware use indicator is referred to as an AsyncContractFulfillment data structure or data type, an AsyncContractFulfilled value, or some other suitable name. In at least one embodiment, response 402 provides an operation status in addition to, or instead of, asynchronous hardware use indicator. In at least one embodiment, response 402 is not present (e.g., when API 400 has a void return type).

Figure 5:
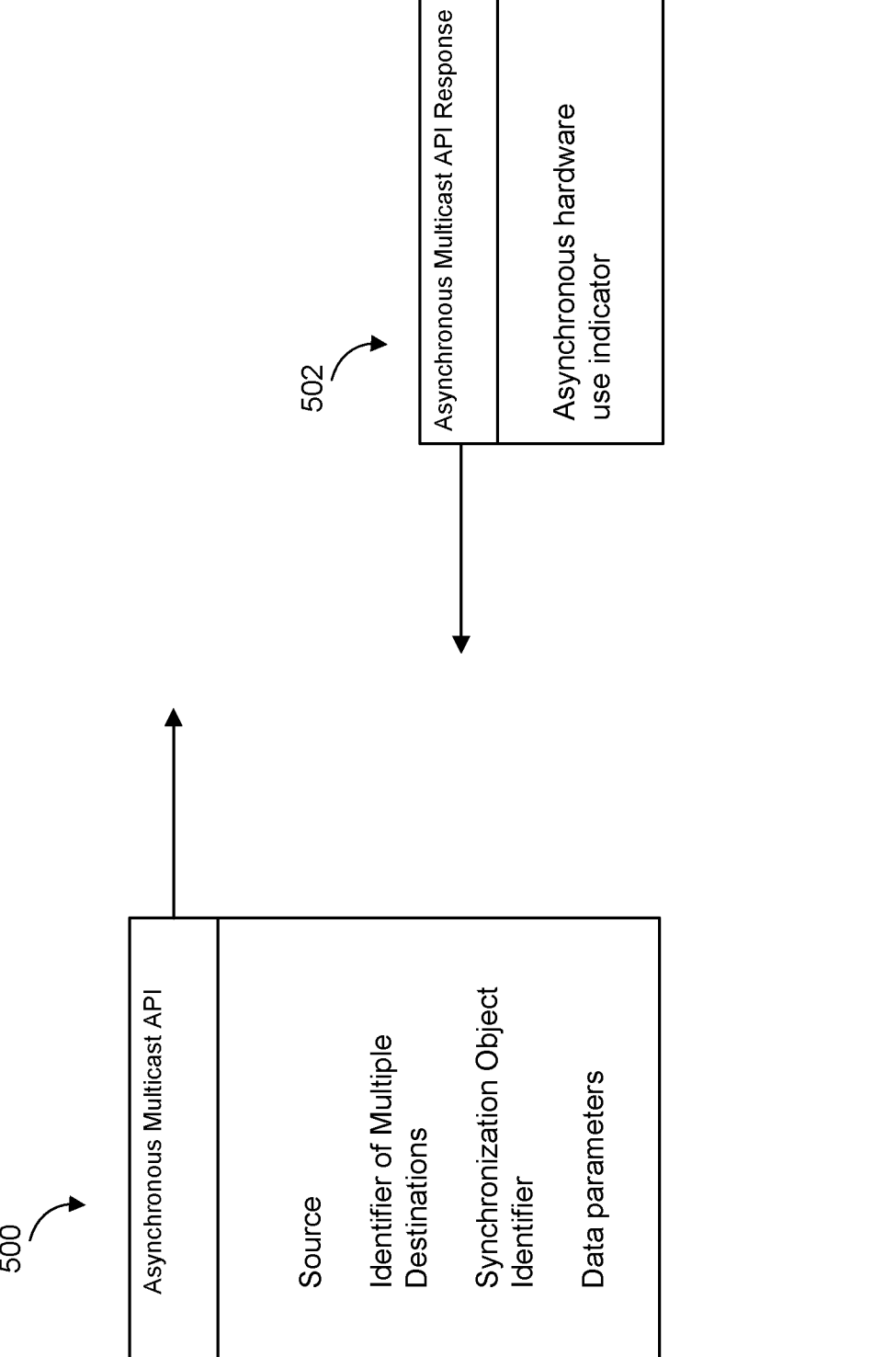
FIG. 5 illustrates performing an API to cause an asynchronous multicast copy operation to be performed, according to at least one embodiment.

FIG. 5 illustrates performing an API 500 to cause an asynchronous multicast copy operation to be performed, according to at least one embodiment. In at least one embodiment, one or more processors of a GPU (e.g., GPU 210 of FIG. 2) are to perform API 500. In at least one embodiment, API 500 is to be performed using asynchronous multicast API 238 of FIG. 2. In a least one embodiment, API 500 includes one or more parameters. In at least one embodiment, parameters of API 500 include a pointer to a data structure that includes multiple destination memory locations (e.g., in first shared memory 220 and second shared memory 222 of FIG. 2), a source memory location (e.g., in global memory 218 of FIG. 2), a shape of data to be copied (e.g., dimensions and/or size of data), and an identifier of a synchronization object. In at least one embodiment, API 500 is to perform an asynchronous multicast copy operation using an API such as memcpy_async( ), memcpy_async_tx( ), memcpy_tensor_async( ), memcpy-_tensor_async_tx( ), or some other suitable API. In at least one embodiment, a response 502 to performing API 500 includes an asynchronous hardware use indicator that indicates whether particular hardware (e.g., asynchronous data movement H/W 224 of FIG. 2) is to be used to perform copy asynchronous multicast copy operation. In at least one embodiment, asynchronous hardware use indicator can be as described above (e.g., with respect to API 400 of FIG. 4). In at least one embodiment, response 502 provides an operation status in addition to, or instead of, asynchronous hardware use indicator. In at least one embodiment, response 502 is not present (e.g., when API 500 has a void return type).

Figure 6:
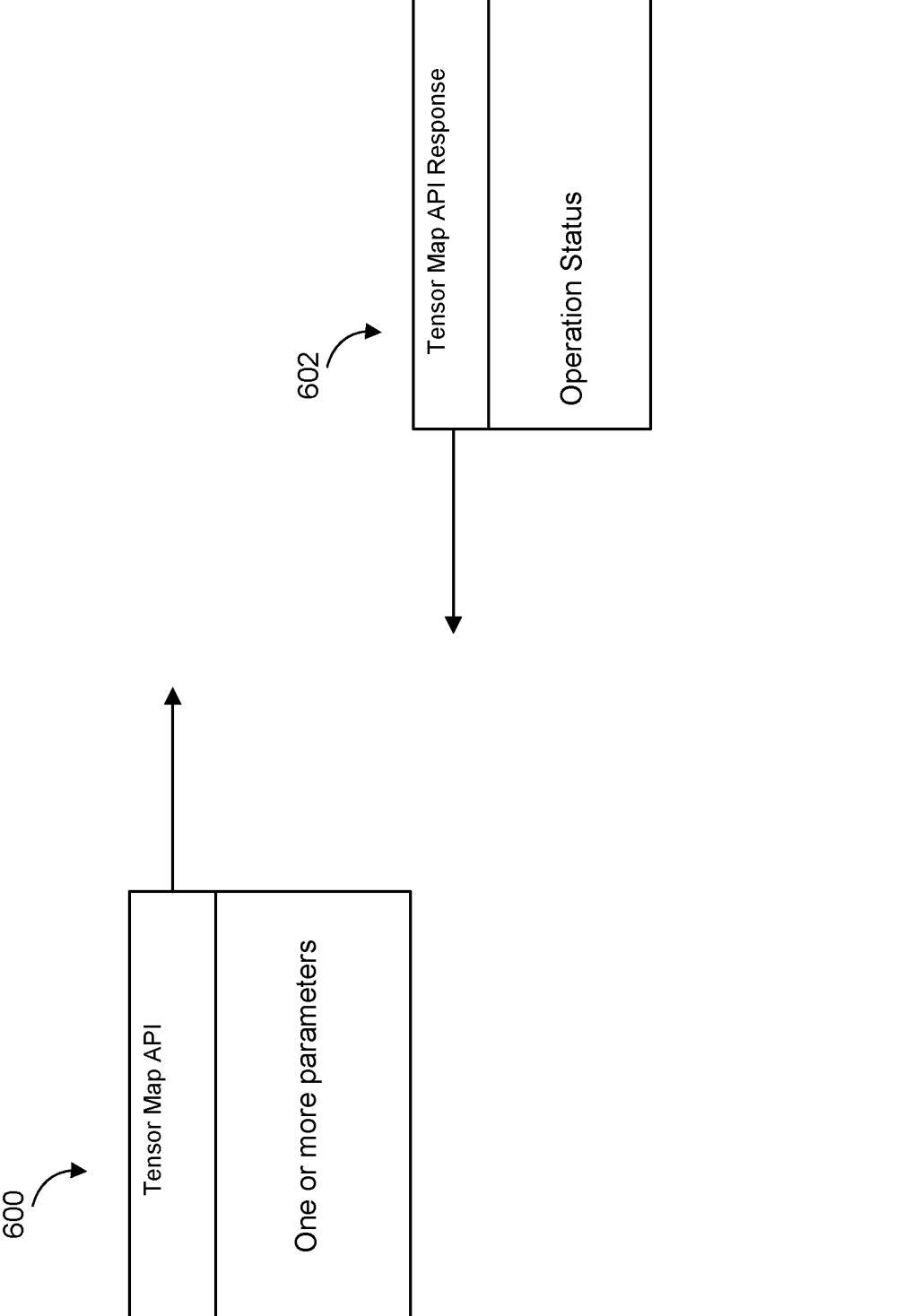
FIG. 6 illustrates performing an API to cause a tensor map data structure to be generated, according to at least one embodiment.

FIG. 6 illustrates performing an API 600 to cause a tensor map data structure (e.g., tensor map 118 of FIG. 1) to be generated, according to at least one embodiment. In at least one embodiment, tensor map data structure is referred to as a tensor descriptor. In at least one embodiment, one or more processors (e.g., processor 204 or processor 228 of FIG. 2) are to perform API 600. In at least one embodiment, API 600 is to be performed using tensor map API 240 of FIG. 2. In a least one embodiment, API 600 includes one or more parameters. In at least one embodiment, parameters of API 600 include a location to store a generated tensor map data structure, a tensor data type, a tensor rank, a global address, global tensor dimensions, global strides, box dimensions, element strides, an interleave data structure, a swizzle data structure, an L2 promotion data structure, an out of bounds fill data structure, and/or other suitable parameters. In at least one embodiment, API 600 is referred to as cuTensor-MapEncodeTiled( ), or some other suitable API name. In at least one embodiment, a response 602 to performing API 600 includes an indication of whether tensor map generation was successful. In at least one embodiment, response 602 is not present (e.g., when API 600 has a void return type).

Figure 7:
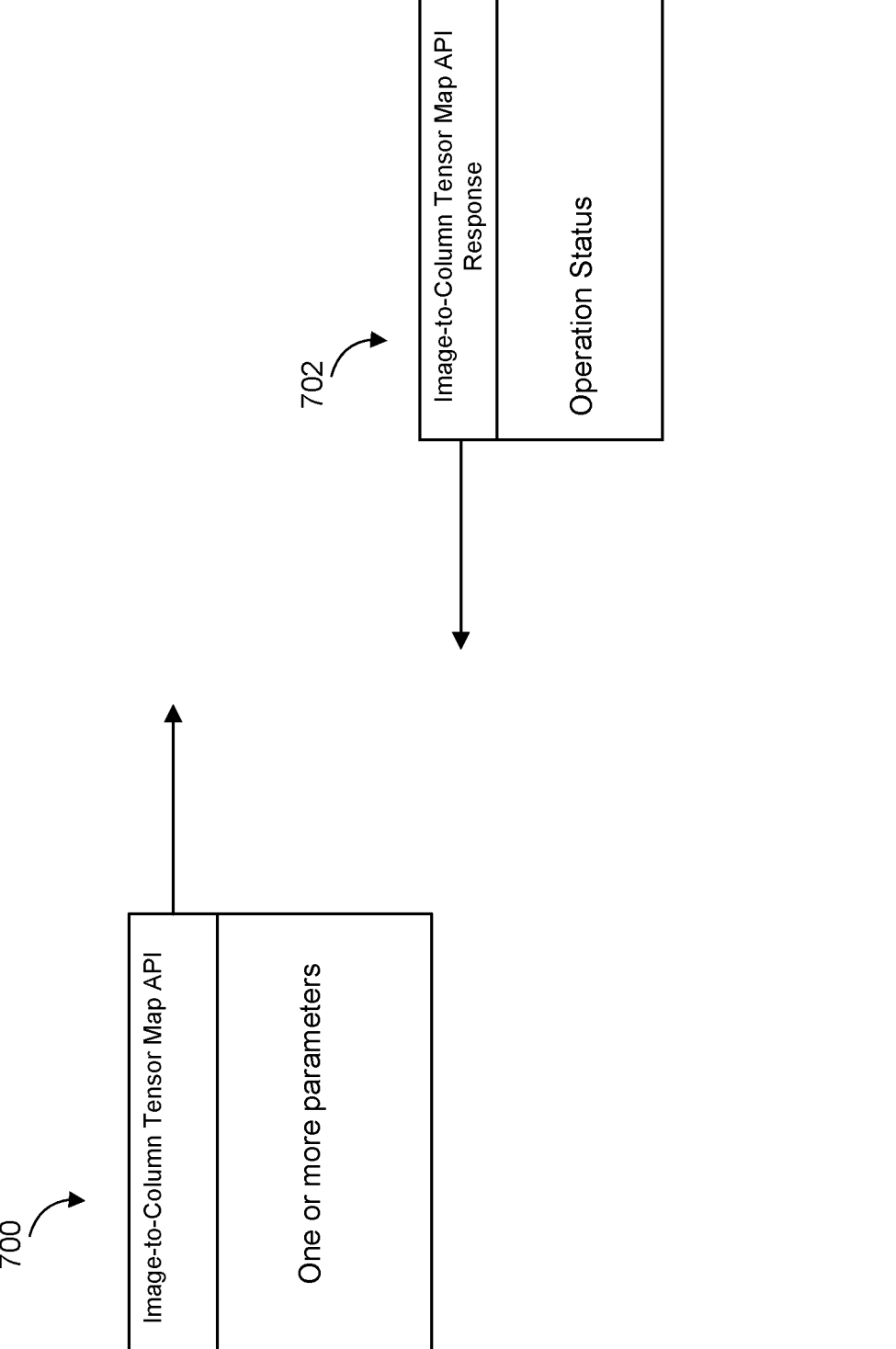
FIG. 7 illustrates performing an API to cause an image to column tensor map data structure to be generated, according to at least one embodiment.

FIG. 7 illustrates performing an API 700 to cause an image to column tensor map data structure (e.g., tensor map 118 of FIG. 1) to be generated, according to at least one embodiment. In at least one embodiment, tensor map data structure is referred to as a tensor descriptor. In at least one embodiment, one or more processors (e.g., processor 204 or processor 228 of FIG. 2) are to perform API 700. In at least one embodiment, API 700 is to be performed using image-to-column tensor map API 242 of FIG. 2. In a least one embodiment, API 700 includes one or more parameters. In at least one embodiment, parameters of API 700 include a location to store a generated tensor map data structure, a tensor data type, a tensor rank, a global address, global tensor dimensions, global strides, box dimensions, element strides, an interleave data structure, a swizzle data structure, an L2 promotion data structure, an out of bounds fill data structure, one or more additional inputs that indicate which data of an input tensor to arrange in columns of an output matrix, and/or other suitable parameters. In at least one embodiment, API 700 is referred to as cuTensorMapEncodeIm2Col( ), or some other suitable API name. In at least one embodiment, a response 702 to performing API 700 includes an indication of whether tensor map generation was successful. In at least one embodiment, response 702 is not present (e.g., when API 700 has a void return type).

Figure 8:
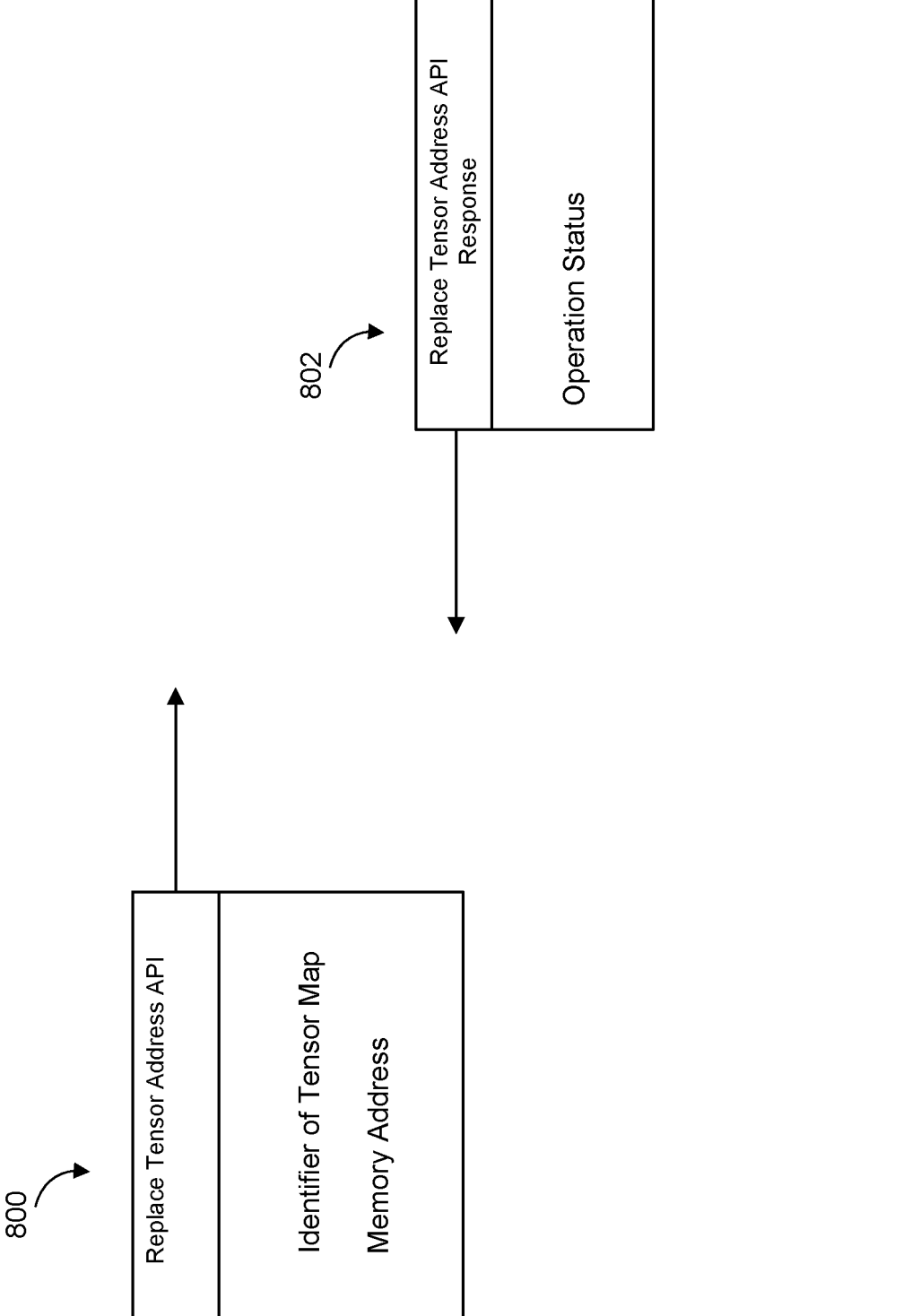
FIG. 8 illustrates performing an API to cause a memory address of a tensor in a tensor map to be replaced, according to at least one embodiment.

FIG. 8 illustrates performing an API 800 to cause a memory address of a tensor in a tensor map to be replaced, according to at least one embodiment. In at least one embodiment, one or more processors (e.g., processor 204 or processor 228 of FIG. 2) are to perform API 800. In at least one embodiment, API 800 is to be performed using replace tensor address API 244 of FIG. 2. In a least one embodiment, API 800 includes one or more parameters. In at least one embodiment, parameters of API 800 include an identifier of a tensor map (e.g., a pointer to tensor map), a memory address that is replacing an existing memory address in tensor map (e.g., a second global memory address of a second tensor to replace a first global memory address of a first tensor in tensor map), and/or other suitable parameters. In at least one embodiment, API 800 is referred to as cuTensorMapReplaceAddress( ), or some other suitable API name. In at least one embodiment, a response 802 to performing API 800 includes an indication of whether address replacement was successful. In at least one embodiment, response 802 is not present (e.g., when API 800 has a void return type). In at least one embodiment, some other identifier of a memory address is used as a parameter (e.g., a pointer to a memory location).

Figure 9:
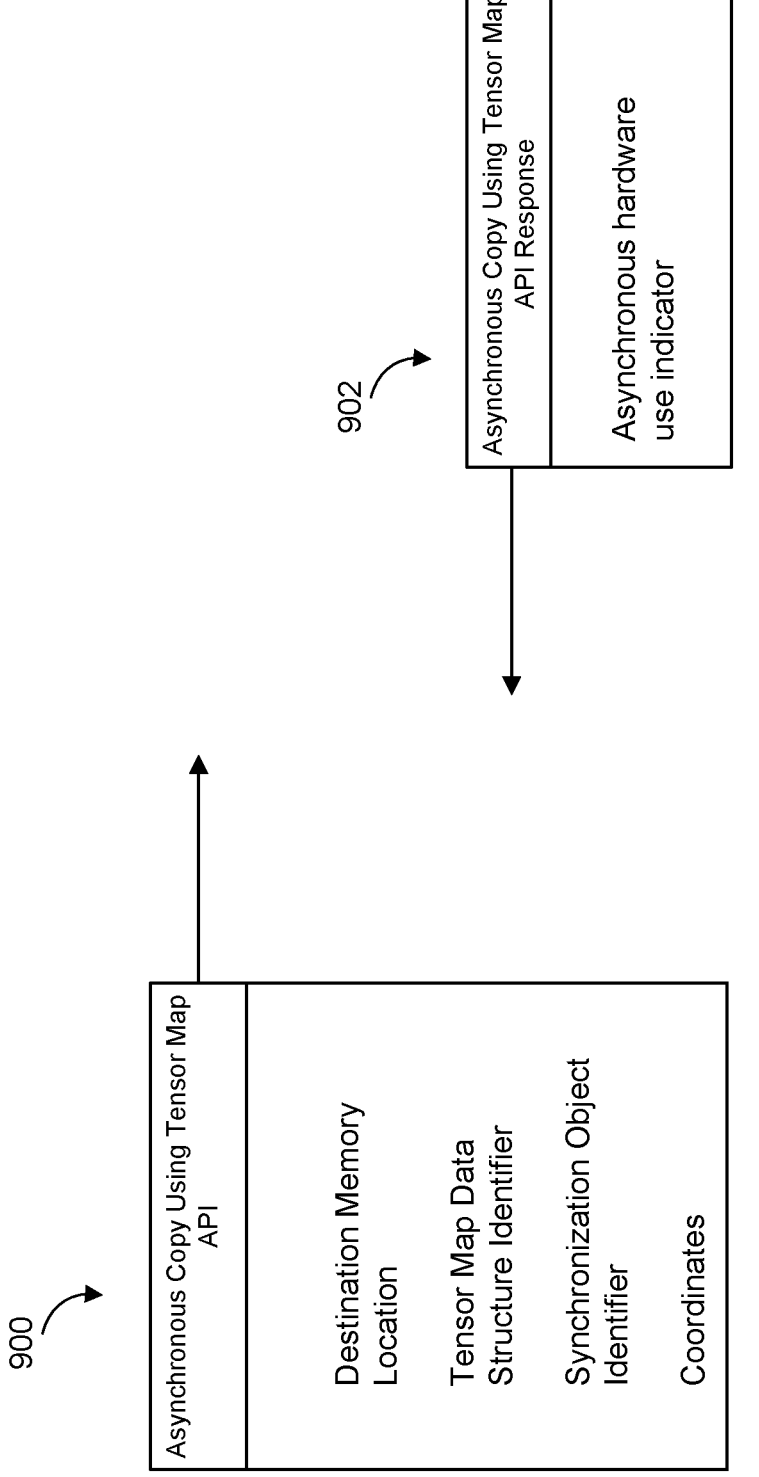
FIG. 9 illustrates performing an API to cause an asynchronous data copy operation to be performed using a tensor map, according to at least one embodiment.

FIG. 9 illustrates performing an API 900 to cause an asynchronous data copy operation to be performed using a tensor map, according to at least one embodiment. In at least one embodiment, one or more processors of a GPU (e.g., GPU 210 of FIG. 2) are to perform API 900. In at least one embodiment, API 900 is to be performed using asynchronous copy using tensor map API 246 of FIG. 2. In a least one embodiment, API 900 includes one or more parameters. In at least one embodiment, parameters of API 900 include a destination memory location, an identifier of a tensor map data structure, coordinates of a subset of tensor data to be copied, and an identifier of a synchronization object. In at least one embodiment, API 900 is referred to as memcpy_tensor_async( ), or some other suitable API name. In at least one embodiment, a response 902 to performing API 900 includes an asynchronous hardware use indicator that indicates whether particular hardware (e.g., asynchronous data movement H/W 224 of FIG. 2) is to be used to perform asynchronous copy using tensor map operation. In at least one embodiment, asynchronous hardware use indicator can be as described above (e.g., with respect to API 400 of FIG. 4). In at least one embodiment, response 902 provides an operation status in addition to, or instead of, asynchronous hardware use indicator. In at least one embodiment, response 902 is not present (e.g., when API 900 has a void return type).

Figure 10:
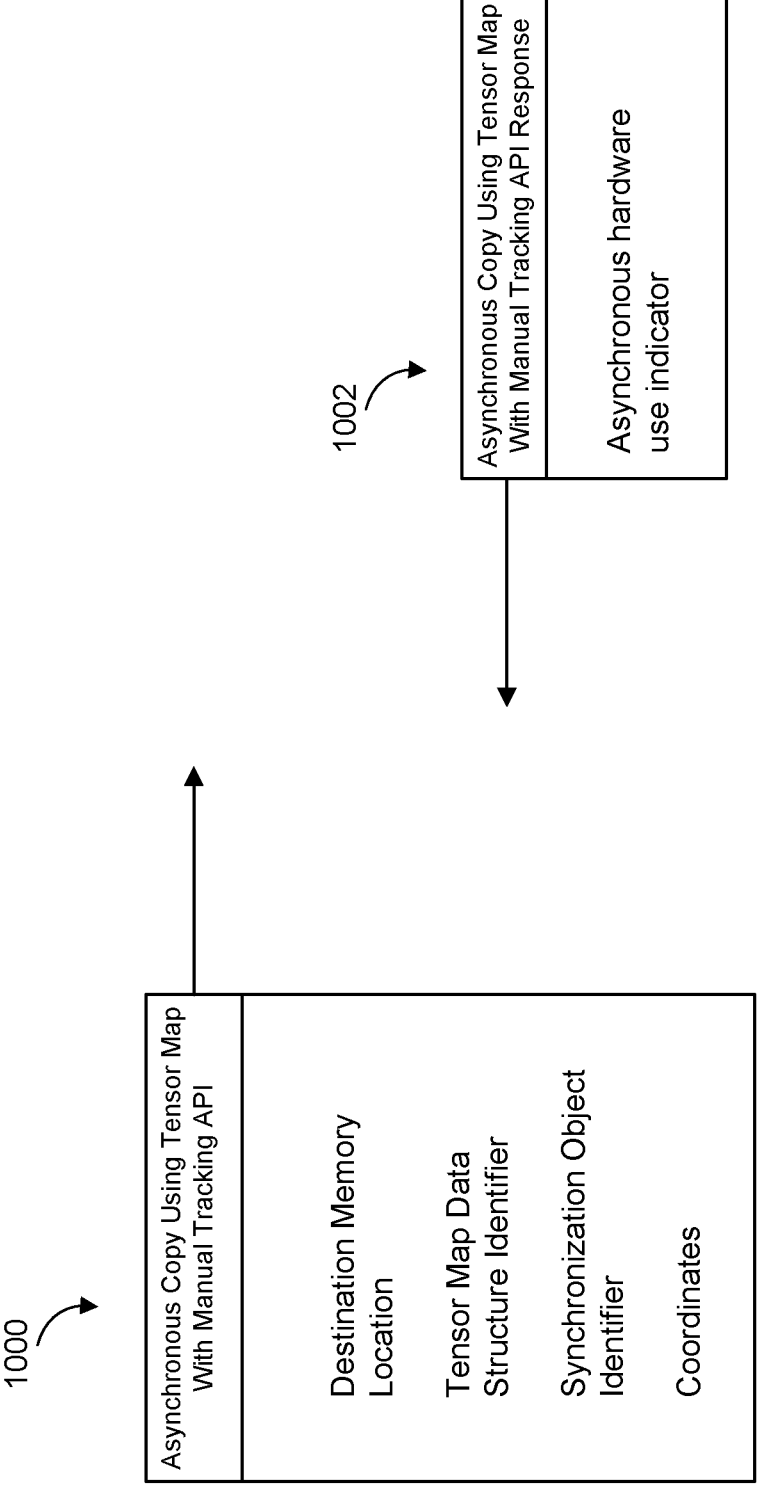
FIG. 10 illustrates performing an API to cause an asynchronous data copy operation to be performed using a tensor map and manual transaction accounting, according to at least one embodiment.

FIG. 10 illustrates performing an API 1000 to cause an asynchronous data copy operation to be performed using a tensor map and manual transaction accounting, according to at least one embodiment. In at least one embodiment, one or more processors of a GPU (e.g., GPU 210 of FIG. 2) are to perform API 1000. In at least one embodiment, API 1000 is to be performed using asynchronous copy using tensor map with manual tracking API 248 of FIG. 2. In a least one embodiment, API 1000 includes one or more parameters. In at least one embodiment, parameters of API 1000 include a destination memory location (e.g., a pointer to a location in shared memory), an identifier of a tensor map data structure (e.g., a data structure that includes tensor map), a data structure that indicates a location (e.g., coordinates) of a subset of data in a tensor in global memory that is to be copied, and an identifier of a synchronization object that tracks asynchronous data copy operations. In at least one embodiment, API 1000 is referred to as memcpy_tensor_async_tx( ), or some other suitable API name. In at least one embodiment, identified thread synchronization object is to be updated by another API that provides an expected transaction count (e.g., an amount of data to be used in asynchronous copy using tensor map with manual tracking operation).

In at least one embodiment, a response 1002 to performing API 1000 includes an asynchronous hardware use indicator that indicates whether particular hardware (e.g., asynchronous data movement H/W 224 of FIG. 2) is to be used to perform asynchronous copy using tensor map with manual tracking operation. In at least one embodiment, asynchronous hardware use indicator can be as described above (e.g., with respect to API 400 of FIG. 4). In at least one embodiment, response 1002 provides an operation status in addition to, or instead of, asynchronous hardware use indicator. In at least one embodiment, response 1002 is not present (e.g., when API 1000 has a void return type).

Figure 11:
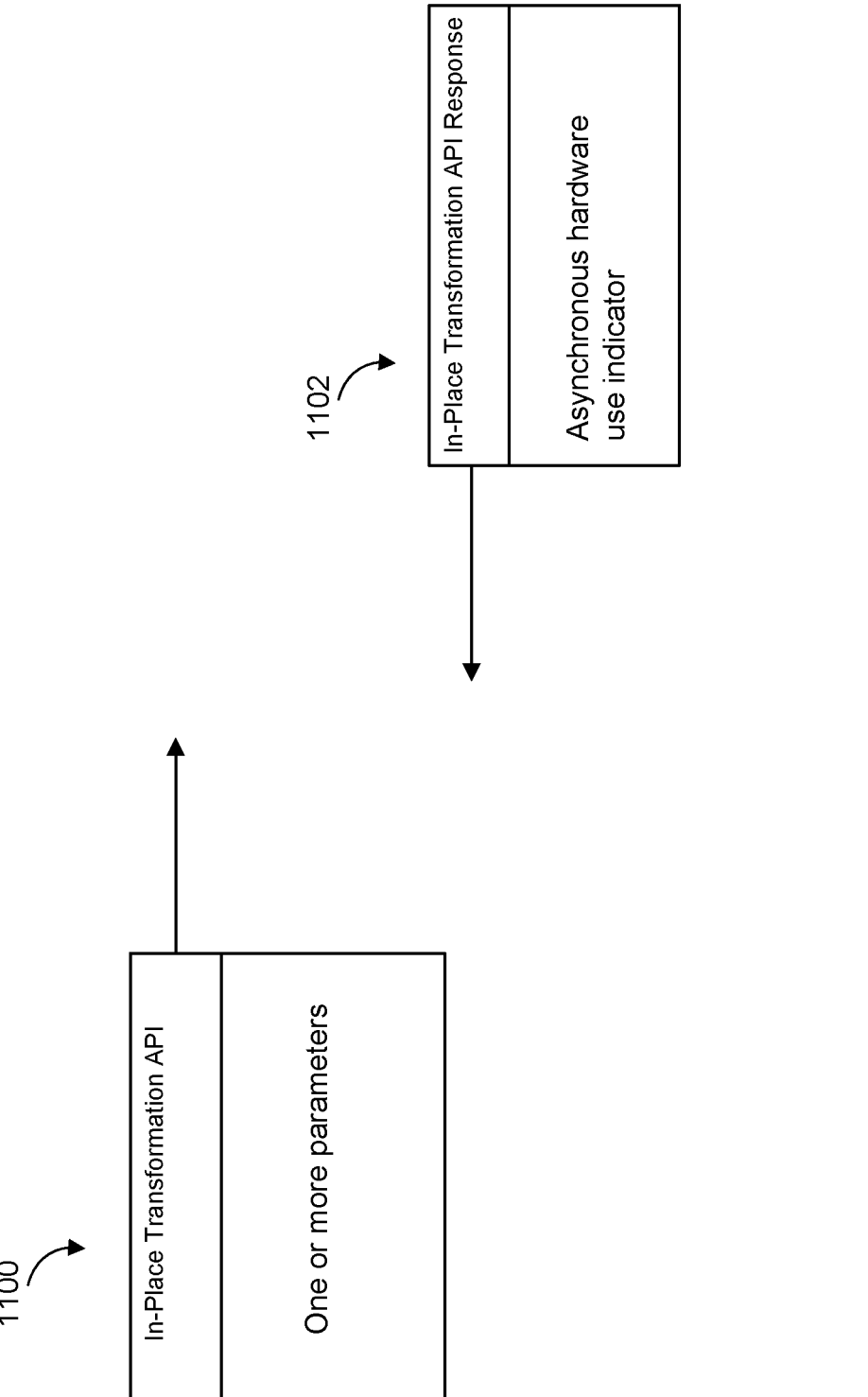
FIG. 11 illustrates performing an API to cause an in-place transformation of a tensor to be performed using a tensor map, according to at least one embodiment.

FIG. 11 illustrates performing an API 1100 to cause an in-place transformation of a tensor to be performed using a tensor map, according to at least one embodiment. In at least one embodiment, one or more processors of a GPU (e.g., GPU 210 of FIG. 2) are to perform API 1100. In at least one embodiment, API 1100 is to be performed using in-place transformation API 250 of FIG. 2. In a least one embodiment, API 1100 includes one or more parameters. In at least one embodiment, parameters of API 1100 include a pointer to a tensor map data structure, a parameter data structure (e.g., that includes one or more additional parameters such as an identifier of a reduction operation to be performed and/or coordinate information for a portion of a tensor to be used), an identifier of a source location, an identifier of a synchronization object to be used, and/or other suitable parameters. In at least one embodiment, API 1100 is referred to as inplace_transform_tensor_async( ), or some other suitable API name. In at least one embodiment, a response 1102 to performing API 1100 includes an asynchronous hardware use indicator that indicates whether particular hardware (e.g., asynchronous data movement H/W 224 of FIG. 2) is to be used to perform asynchronous copy using tensor map with manual tracking operation. In at least one embodiment, asynchronous hardware use indicator can be as described above (e.g., with respect to API 400 of FIG. 4). In at least one embodiment, response 1102 provides an operation status in addition to, or instead of, asynchronous hardware use indicator. In at least one embodiment, response 1102 is not present (e.g., when API 1100 has a void return type).

Figure 12:
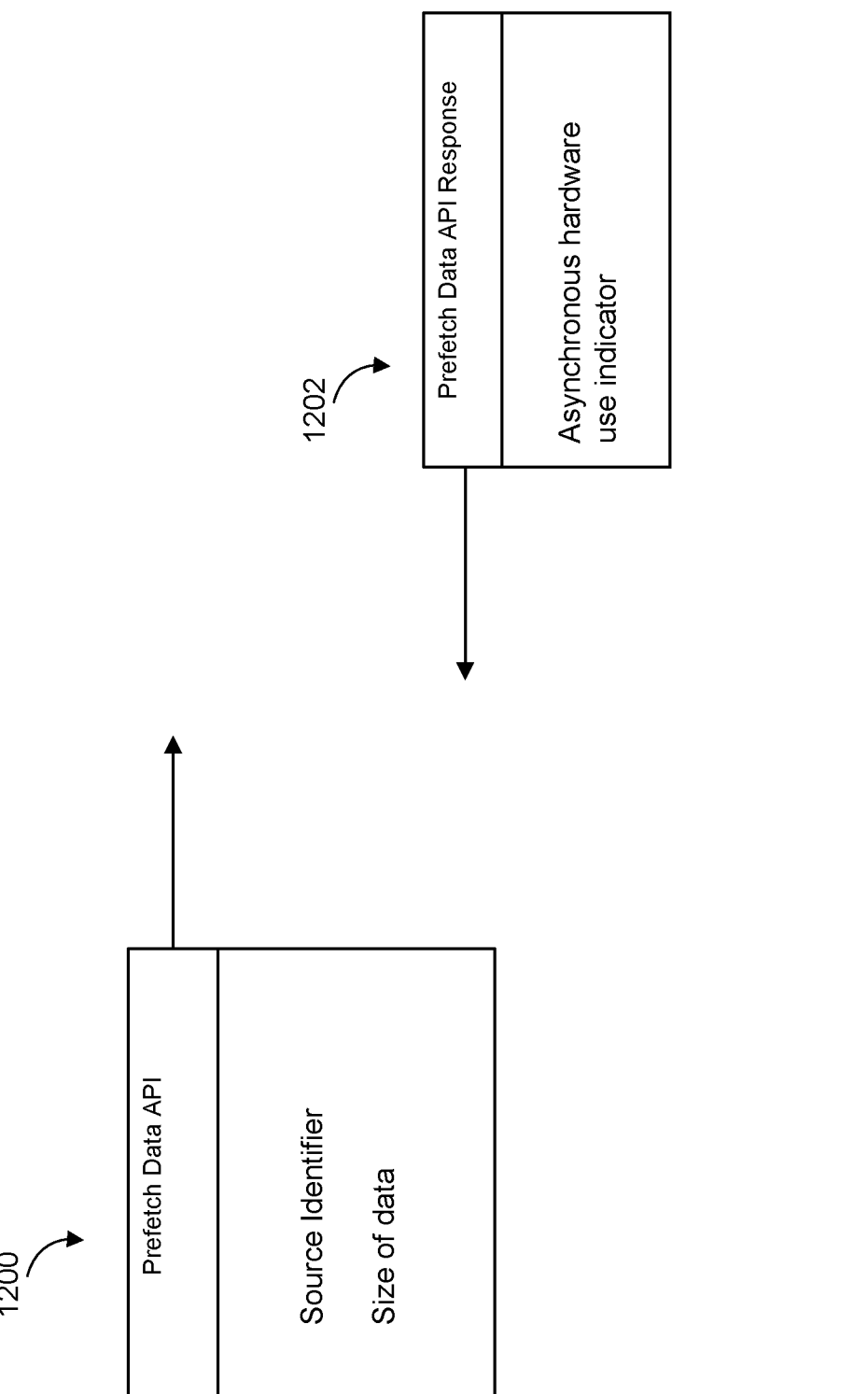
FIG. 12 illustrates performing an API to prefetch data, according to at least one embodiment.

FIG. 12 illustrates performing an API 1200 to prefetch data, according to at least one embodiment. In at least one embodiment, performing API 1200 includes performing an instruction to prefetch data (e.g., prefetch data instruction 254 of FIG. 2). In at least one embodiment, API 1200 includes one or more parameters. In at least one embodiment, parameters of API 1200 include an identifier of a source location of data to be copied (e.g., a pointer to source memory location), and an indication of size of data (e.g., in bytes or some other metric). In at least one embodiment, a response 1202 to performing API 1200 includes an asynchronous hardware use indicator that indicates whether particular hardware (e.g., asynchronous data movement H/W 224 of FIG. 2) is to be used to perform data prefetch operation. In at least one embodiment, asynchronous hardware use indicator can be as described above (e.g., with respect to API 400 of FIG. 4). In at least one embodiment, response 1202 provides an operation status in addition to, or instead of, asynchronous hardware use indicator. In at least one embodiment, response 1202 is not present (e.g., when API 1200 has a void return type, or when API 1200 is performed as an instruction where no return value is used).

Figure 13:
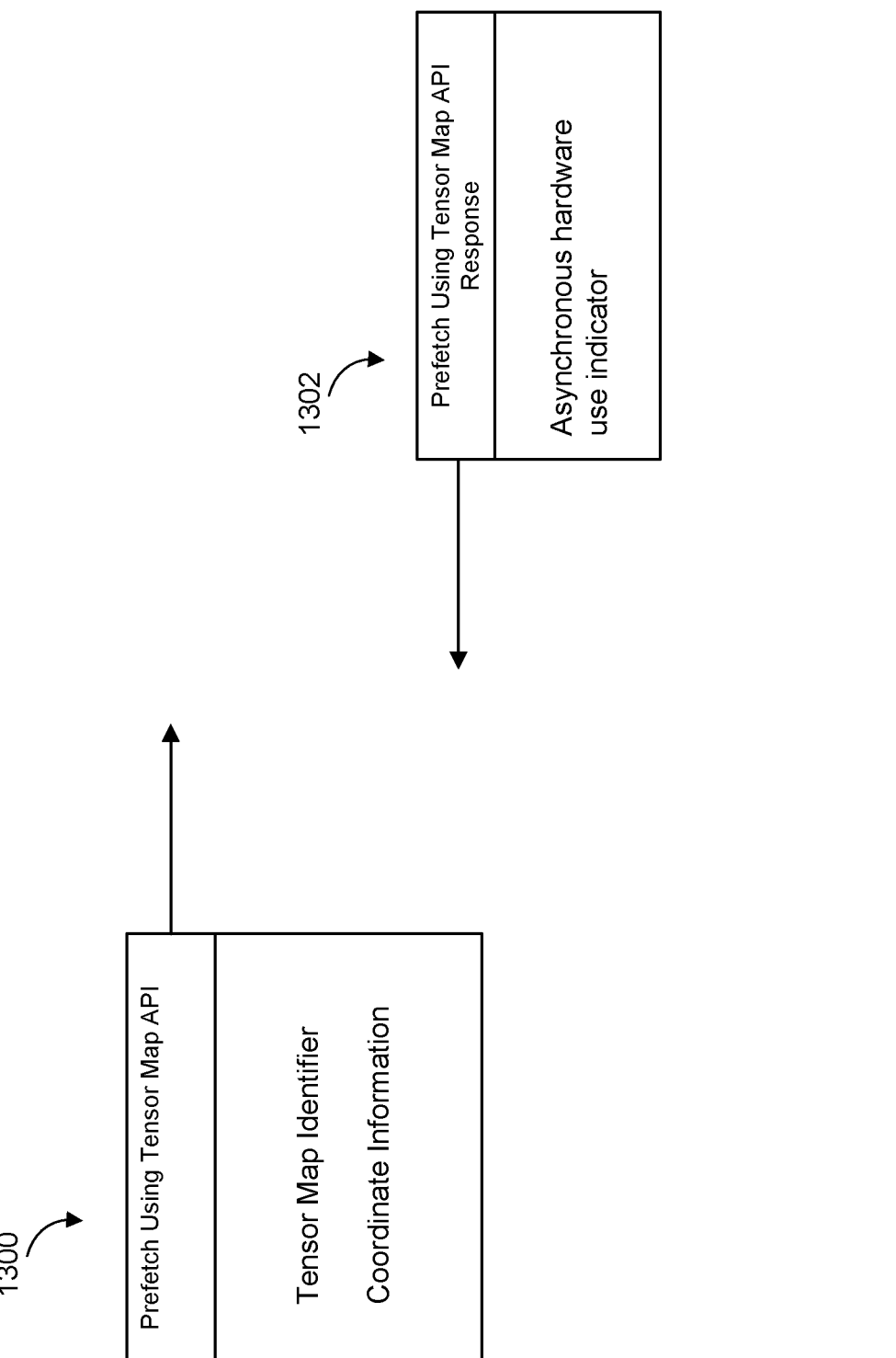
FIG. 13 illustrates performing an API to prefetch data using a tensor map, according to at least one embodiment.

FIG. 13 illustrates performing an API 1300 to prefetch data using a tensor map, according to at least one embodiment. In at least one embodiment, API 1300 includes performing an instruction to prefetch data using a tensor map (e.g., prefetch using tensor map 256 of FIG. 2). In at least one embodiment, API 1300 includes one or more parameters. In at least one embodiment, parameters of API 1300 include a tensor map identifier (e.g., a pointer to a tensor map data structure), and coordinate information such as a parameter that indicates a portion of tensor to which tensor map is to be applied (e.g., a set of coordinates or a data structure that includes one or more coordinates). In at least one embodiment, a response 1302 to performing API 1300 includes an asynchronous hardware use indicator that indicates whether particular hardware (e.g., asynchronous data movement H/W 224 of FIG. 2) is to be used to perform data prefetch using tensor map operation. In at least one embodiment, asynchronous hardware use indicator can be as described above (e.g., with respect to API 400 of FIG. 4). In at least one embodiment, response 1302 provides an operation status in addition to, or instead of, asynchronous hardware use indicator. In at least one embodiment, response 1302 is not present (e.g., when API 1300 has a void return type, or when API 1300 is performed as an instruction where no return value is used).

Figure 14:
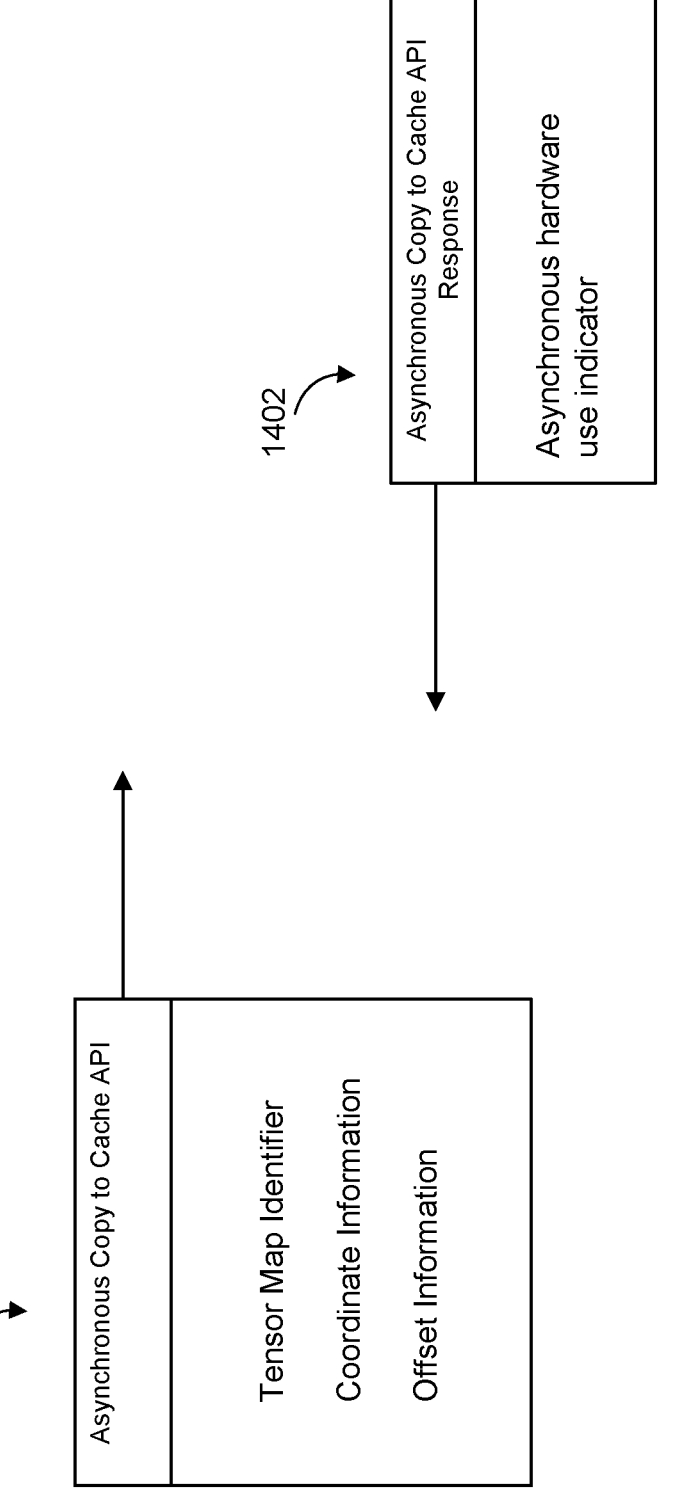
FIG. 14 illustrates performing an API to asynchronously copy data from global memory to cache, according to at least one embodiment.

FIG. 14 illustrates performing an API 1400 to perform an asynchronous copy to cache, according to at least one embodiment. In at least one embodiment, performing API 1400 includes performing an instruction to asynchronously copy data from global memory to cache (e.g., asynchronous copy to cache 258 of FIG. 2). In at least one embodiment, parameters of API 1400 include a tensor map identifier (e.g., a pointer to a tensor map data structure), coordinate information such as a parameter that indicates a portion of tensor to which tensor map is to be applied (e.g., a set of coordinates or a data structure that includes one or more coordinates), and offset information that indicates one or more offsets to be used in image-to-column transformation. In at least one embodiment, a response 1402 to performing API 1400 includes an asynchronous hardware use indicator that indicates whether particular hardware (e.g., asynchronous data movement H/W 224 of FIG. 2) is to be used to perform asynchronous copy to cache operation. In at least one embodiment, asynchronous hardware use indicator can be as described above (e.g., with respect to API 400 of FIG. 4). In at least one embodiment, response 1402 provides an operation status in addition to, or instead of, asynchronous hardware use indicator. In at least one embodiment, response

1402 is not present (e.g., when API 1400 has a void return type, or when API 1400 is performed as an instruction where no return value is used).

Figure 15:
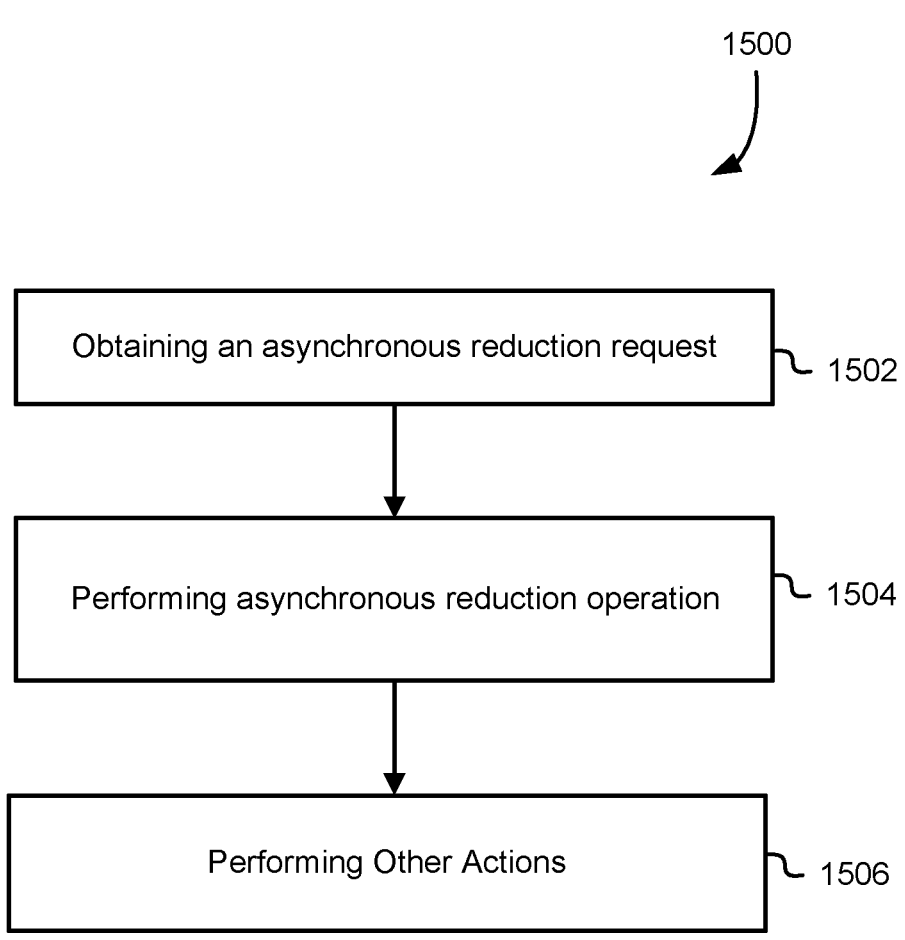
FIG. 15 is a flowchart of a technique of performing an asynchronous reduction operation, according to at least one embodiment.

FIG. 15 is a flowchart of a technique 1500 of performing an asynchronous reduction operation, according to at least one embodiment. In at least one embodiment, one or more aspects of technique 1500 are performed by one or more aspects shown or described with respect to FIG. 1 and/or FIG. 2 (e.g., CPU 104, PPU 106, API 108, compiler 112 of FIG. 1, asynchronous reduction API 234, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 1500 includes performing one or more aspects of API 300 of FIG. 3. In at least one embodiment, at a block 1502, technique 1500 includes obtaining an asynchronous reduction operation request (e.g., via an API such as asynchronous reduction API 234 of FIG. 2). In at least one embodiment, at a block 1504, technique 1500 includes performing asynchronous reduction operation (e.g., performing asynchronous reduction API 234 of FIG. 2 and/or API 300 of FIG. 3). In at least one embodiment, at a block 1506, technique 1500 includes performing other actions (e.g., returning an indication that reduction operation was successfully performed and/or returning to block 1502 to obtain another asynchronous reduction operation request. In at least one embodiment, performing other actions at block 1506 includes returning an asynchronous hardware use indicator. In at least one embodiment, asynchronous hardware use indicator indicates whether asynchronous data movement hardware (e.g., asynchronous data movement H/W 224 of FIG. 2) is to be used to perform asynchronous reduction operation. In at least one embodiment, asynchronous hardware use indicator is a Boolean value, an enumerated value, a data structure, or some other suitable indicator. In at least one embodiment, asynchronous hardware use indicator indicates, if asynchronous data movement hardware is not to be used, a reason why asynchronous data movement hardware is not to be used (e.g., not present on GPU in use, data not properly aligned, or some other suitable reason such as by using a reason code that corresponds to a particular reason).

In at least one embodiment, at least one aspect of technique 1500 includes performing an API (e.g., asynchronous reduction API 234 of FIG. 2, API 300 of FIG. 3, and/or API 108 of FIG. 1) to cause information corresponding to one or more memory transactions resulting from performance of API to be transformed and stored. In at least one embodiment, one or more memory transactions comprise asynchronous operations to be performed by a graphics processing unit (GPU). In at least one embodiment, one or more memory transactions comprise one or more asynchronous reduction operations to be performed by a graphics processing unit (GPU). In at least one embodiment, API is to indicate whether a particular hardware unit is to be used to perform one or more memory transactions. In at least one embodiment, API is to be performed using automatic transaction accounting. In at least one embodiment, API is to receive as input information indicating a plurality of characteristics of data to be transformed. In at least one embodiment, a non-transitory computer-readable medium having stored thereon a set of instructions, which if performed by one or more processors, cause one or more processors to at least perform one or more aspects of technique 1500.

Figure 16:
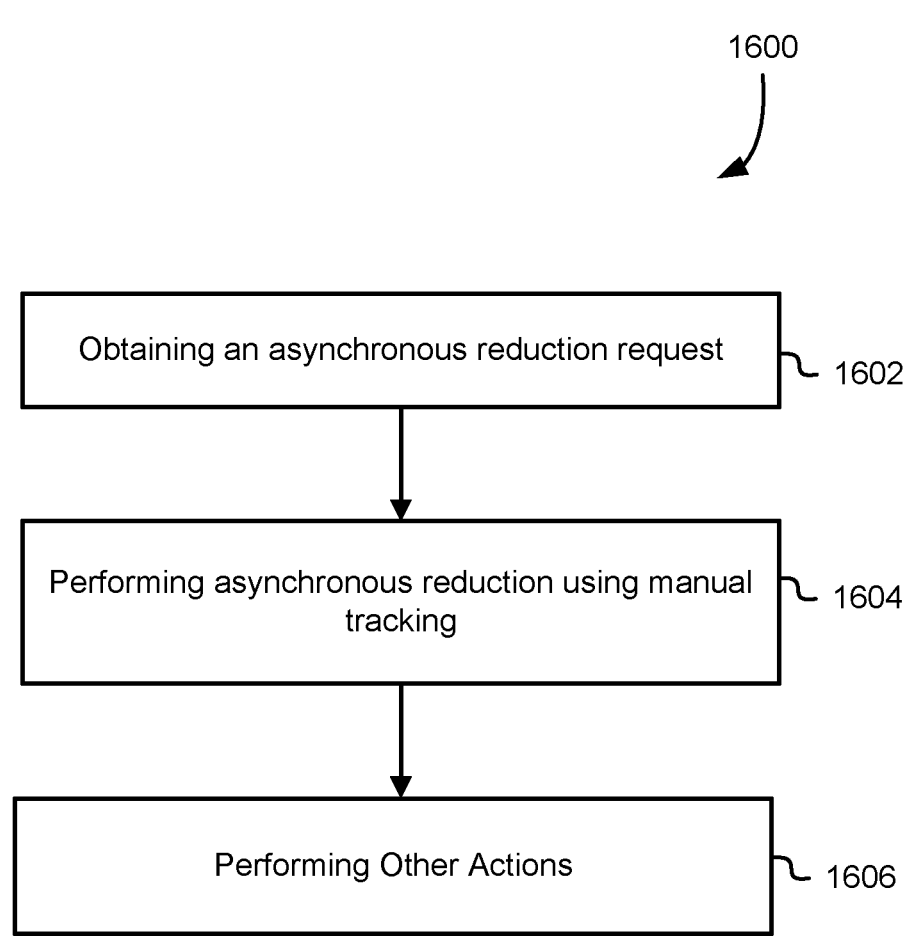
FIG. 16 is a flowchart of a technique of performing an asynchronous reduction operation using manual transaction accounting, according to at least one embodiment.

FIG. 16 is a flowchart of a technique 1600 of performing an asynchronous reduction operation using manual transaction accounting, according to at least one embodiment. In at least one embodiment, one or more aspects of technique 1600 are performed by one or more aspects shown or described with respect to FIG. 1 and/or FIG. 2 (e.g., CPU 104, PPU 106, API 108, compiler 112 of FIG. 1, asynchronous reduction with manual tracking API 236, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 1600 includes performing one or more aspects of API 400 of FIG. 4. In at least one embodiment, at a block 1602, technique 1600 includes obtaining an asynchronous reduction operation request (e.g., via an API such as asynchronous reduction with manual tracking API 236 of FIG. 2). In at least one embodiment, at a block 1504, technique 1500 includes performing asynchronous reduction operation with manual tracking (e.g., performing asynchronous reduction with manual tracking API 236 of FIG. 2 and/or API 400 of FIG. 4). In at least one embodiment, using manual tracking includes using a synchronization object (e.g., a barrier or pipeline) that is to receive an expected transaction count using another API (e.g., an arrive API or a commit API, not shown for clarity). In at least one embodiment, at a block 1606, technique 1600 includes performing other actions (e.g., returning an indication that reduction operation was successfully performed and/or returning to block 1602 to obtain another asynchronous reduction operation request. In at least one embodiment, performing other actions at block 1606 includes returning an asynchronous hardware use indicator. In at least one embodiment, asynchronous hardware use indicator indicates whether asynchronous data movement hardware (e.g., asynchronous data movement H/W 224 of FIG. 2) is to be used to perform asynchronous reduction operation. In at least one embodiment, asynchronous hardware use indicator is a Boolean value, an enumerated value, a data structure, or some other suitable indicator. In at least one embodiment, asynchronous hardware use indicator indicates, if asynchronous data movement hardware is not to be used, a reason why asynchronous data movement hardware is not to be used (e.g., not present on GPU in use, data not properly aligned, or some other suitable reason such as by using a reason code that corresponds to a particular reason).

In at least one embodiment, at least one aspect of technique 1600 includes performing an API (e.g., asynchronous reduction with manual tracking API 236 of FIG. 2, API 400 of FIG. 4, and/or API 108 of FIG. 1) to cause information corresponding to one or more memory transactions resulting from performance of API to be transformed. In at least one embodiment, one or more memory transactions are to be performed by a graphics processing unit (GPU) using manual transaction accounting. In at least one embodiment, API is to perform a reduction operation. In at least one embodiment, one or more memory transactions are to be performed by a graphics processing unit (GPU) using manual transaction accounting, and information includes data from a first memory of GPU and a second memory of GPU. In at least one embodiment, API is to receive as input an identifier of information (e.g., a synchronization object) to be used to perform transaction accounting. In at least one embodiment, API is to be performed using global memory of a graphics processing unit (GPU) and shared memory of GPU. In at least one embodiment, a non-transitory computer-readable medium having stored thereon a set of instructions, which if performed by one or more processors, cause one or more processors to at least perform one or more aspects of technique 1600.

Figure 17:
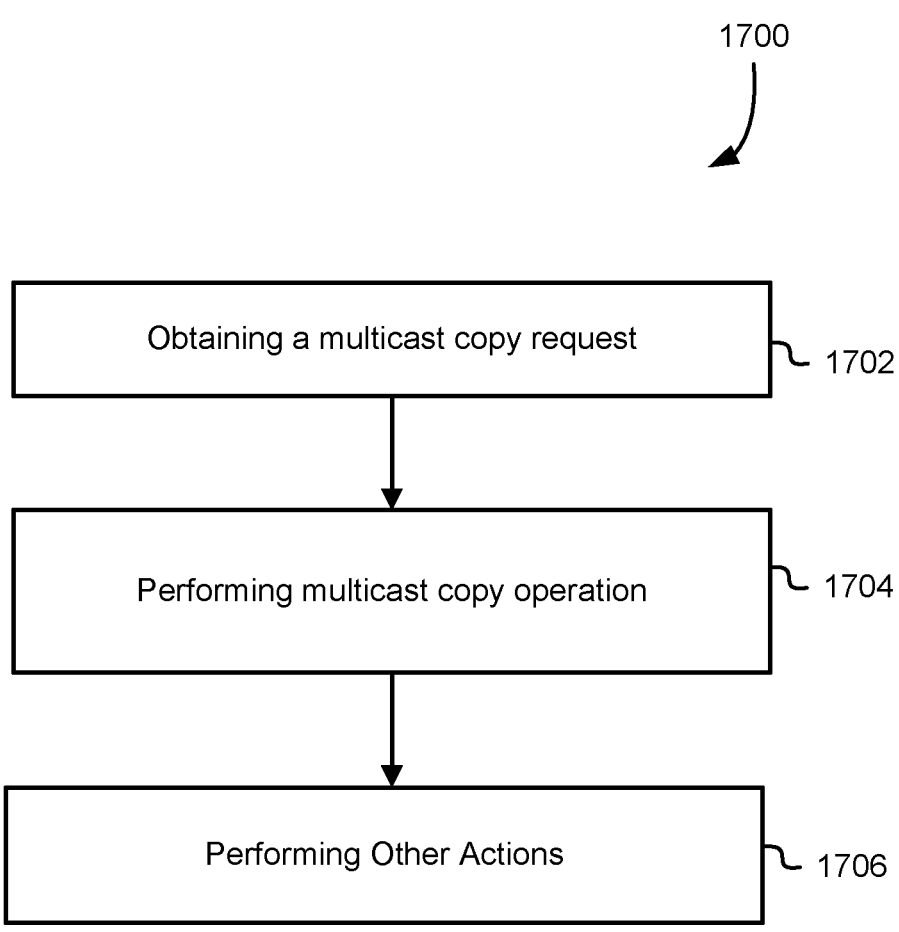
FIG. 17 is a flowchart of a technique of performing an asynchronous multicast copy operation, according to at least one embodiment.

FIG. 17 is a flowchart of a technique 1700 of performing an asynchronous multicast copy operation, according to at least one embodiment. In at least one embodiment, one or more aspects of technique 1700 are performed by one or more aspects shown or described with respect to FIG. 1 and/or FIG. 2 (e.g., CPU 104, PPU 106, API 108, compiler 112 of FIG. 1, asynchronous multicast copy API 238, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 1700 includes performing one or more aspects of API 500 of FIG. 5. In at least one embodiment, at a block 1702, technique 1700 includes obtaining an asynchronous multicast copy request (e.g., via an API such as asynchronous multicast copy API 238 of FIG. 2). In at least one embodiment, at a block 1704, technique 1700 includes performing asynchronous multicast copy operation (e.g., performing asynchronous multicast copy API 238 of FIG. 2 and/or API 500 of FIG. 5). In at least one embodiment, at a block 1706, technique 1700 includes performing other actions (e.g., returning an indication that multicast copy operation was successfully performed and/or returning to block 1702 to obtain another asynchronous multicast copy operation request. In at least one embodiment, performing other actions at block 1706 includes returning an asynchronous hardware use indicator.

In at least one embodiment, at least one aspect of technique 1700 includes performing an API (e.g., asynchronous multicast copy API 238 of FIG. 2, API 500 of FIG. 5, and/or API 108 of FIG. 1) to cause information to be stored in a plurality of storage locations allocated to a first graphics processing unit (GPU). In at least one embodiment, API is to cause an asynchronous copy operation to be performed to copy information from a first memory location of first GPU to a plurality of second memory locations of GPU. In at least one embodiment, API is to receive as input one or more characteristics of information. In at least one embodiment, API is to indicate whether a particular hardware unit is to be used to store information in plurality of storage locations. In at least one embodiment, API is to receive as input an indicator of a synchronization object to be used to track storage of information. In at least one embodiment, API is to receive as input a shape of information. In at least one embodiment, a non-transitory computer-readable medium having stored thereon a set of instructions, which if performed by one or more processors, cause one or more processors to at least perform one or more aspects of technique 1700.

Figure 18:
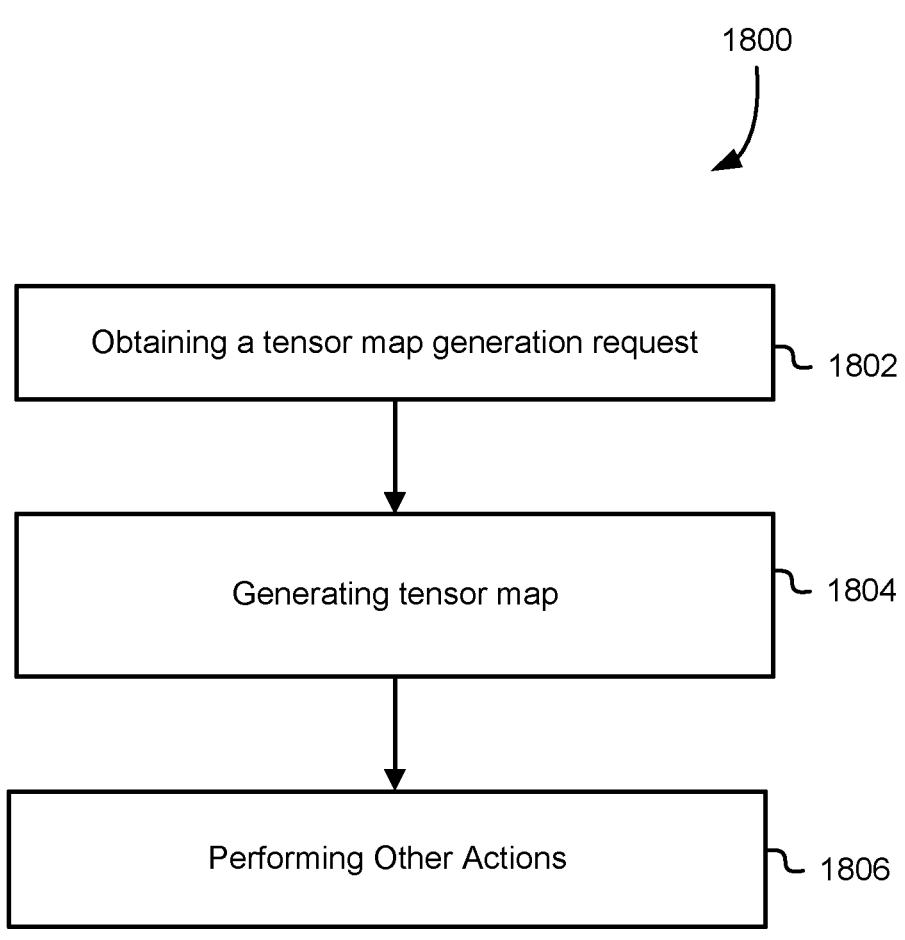
FIG. 18 is a flowchart of a technique of generating a tensor map data structure, according to at least one embodiment.

FIG. 18 is a flowchart of a technique 1800 of generating a tensor map data structure, according to at least one embodiment. In at least one embodiment, one or more aspects of technique 1800 are performed by one or more aspects shown or described with respect to FIG. 1 and/or FIG. 2 (e.g., CPU 104, PPU 106, API 108, compiler 112 of FIG. 1, tensor map API 240, processor 204, compiler 260, processor 228) and/or one or more components, techniques, and/or other aspects shown or described with respect to other figures herein. In at least one embodiment, technique 1800 includes performing one or more aspects of API 600 of FIG. 6. In at least one embodiment, at a block 1802, technique 1800 includes obtaining a tensor map generation request (e.g., via an API such as tensor map API 240 of FIG.

2). In at least one embodiment, at a block 1804, technique 1800 includes generating tensor map (e.g., performing tensor map API 240 of FIG. 2 and/or API 600 of FIG. 6). In at least one embodiment, at a block 1806, technique 1800 includes performing other actions (e.g., returning an indication that tensor map generation was successfully performed and/or returning to block 1802 to obtain another tensor map generation request.

In at least one embodiment, at least one aspect of technique 1800 includes performing an API (e.g., tensor map API 240 of FIG. 2, API 600 of FIG. 6, and/or API 108 of FIG. 1) to cause a mapping from a first tensor to a second tensor to be generated. In at least one embodiment, one or more circuits are to perform API to cause a data structure that includes mapping to be generated. In at least one embodiment, API is to receive as input a plurality of characteristics of first tensor (e.g., data type, rank, global address, tensor dimensions, strides, box dimensions, element strides, interleave data structure, swizzle data structure, L2 promotion data structure, and/or other suitable characteristics). In at least one embodiment, characteristics can be referred to by one or more other terms such as attributes, properties, and/or some other suitable term. In at least one embodiment, API is to receive as input an indication where to store mapping. In a least one embodiment, mapping indicates how to obtain data of first tensor from global memory of a graphics processing unit (GPU), to transform data of first tensor to obtain second tensor, and a location in shared memory of GPU in which to store second tensor. In at least one embodiment, API is to receive as input information indicating how first tensor is laid out in memory. In at least one embodiment, a non-transitory computer-readable medium having stored thereon a set of instructions, which if performed by one or more processors, cause one or more processors to at least perform one or more aspects of technique 1800.

Figure 19:
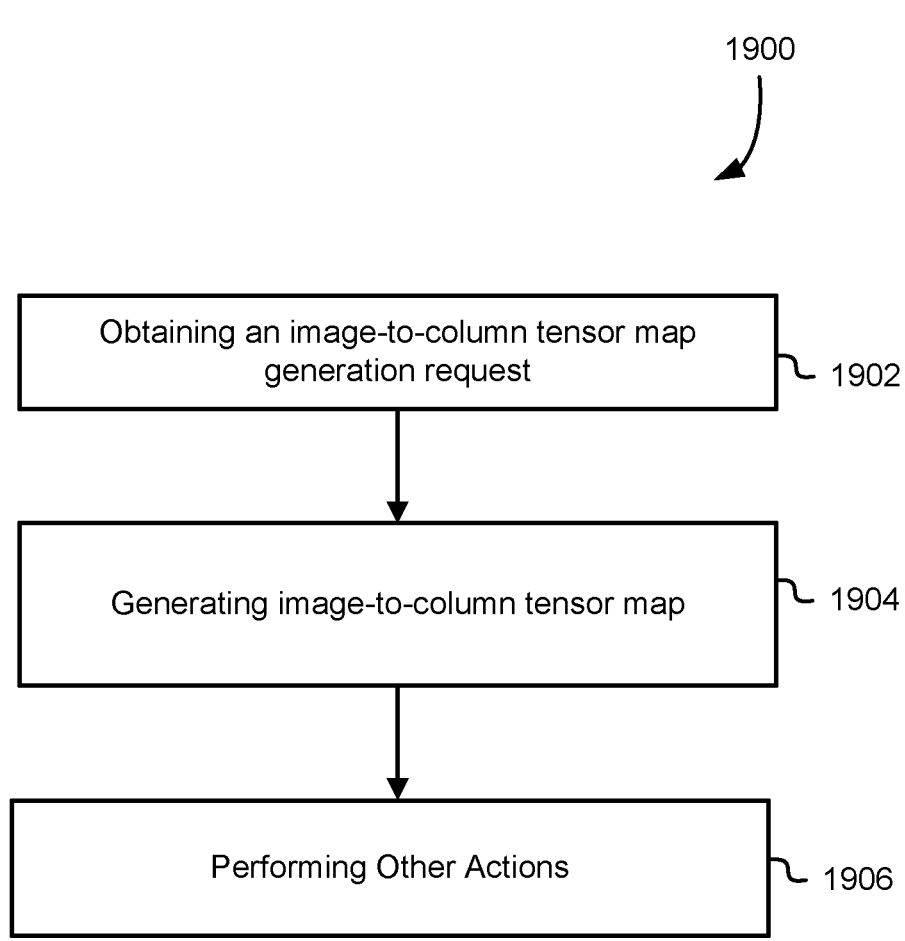
FIG. 19 is a flowchart of a technique of generating an image to column tensor map data structure, according to at least one embodiment.

FIG. 19 is a flowchart of a technique 1900 of generating an image to column tensor map data structure, according to at least one embodiment. In at least one embodiment, one or more aspects of technique 1800 are performed by one or more aspects shown or described with respect to FIG. 1 and/or FIG. 2 (e.g., CPU 104, PPU 106, API 108, compiler 112 of FIG. 1, image-to-column tensor map API 242, processor 204, compiler 260, processor 228) and/or one or more components, techniques, and/or other aspects shown or described with respect to other figures herein. In at least one embodiment, technique 1900 includes performing one or more aspects of API 700 of FIG. 7. In at least one embodiment, at a block 1902, technique 1900 includes obtaining an image-to-column tensor map generation request (e.g., via an API such as image-to-column tensor map API 242 of FIG. 2). In at least one embodiment, at a block 1904, technique 1900 includes generating image-to-column tensor map (e.g., performing image-to-column tensor map API 242 of FIG. 2 and/or API 700 of FIG. 7). In at least one embodiment, at a block 1906, technique 1900 includes performing other actions (e.g., returning an indication that image-to-column tensor map generation was successfully performed and/or returning to block 1902 to obtain another image-to-column tensor map generation request.

In at least one embodiment, at least one aspect of technique 1900 includes performing an API (e.g., image-to-column tensor map API 242 of FIG. 2, API 700 of FIG. 7, and/or API 108 of FIG. 1) to indicate how to generate one or more image-to-column transformations. In at least one embodiment, API is to generate a data structure to store data to indicate how to generate one or more image-to-column transformations. In at least one embodiment, technique 1900 includes storing a data structure indicating how to generate one or more image-to-column transformations in a memory location indicated in an input of API. In at least one embodiment, performing API does not comprise performing one or more image-to-column transformations. In at least one embodiment, API includes performing one or more image-to-column transformations. In at least one embodiment, performing API comprises generating a data structure with data indicating how to perform one or more image-to-column transformations. In at least one embodiment, API is to receive, as input, information indicating a plurality of characteristics of a tensor to be an operand of one or more image-to-column transformations. In at least one embodiment, a non-transitory computer-readable medium having stored thereon a set of instructions, which if performed by one or more processors, cause one or more processors to at least perform one or more aspects of technique 1900.

Figure 20:
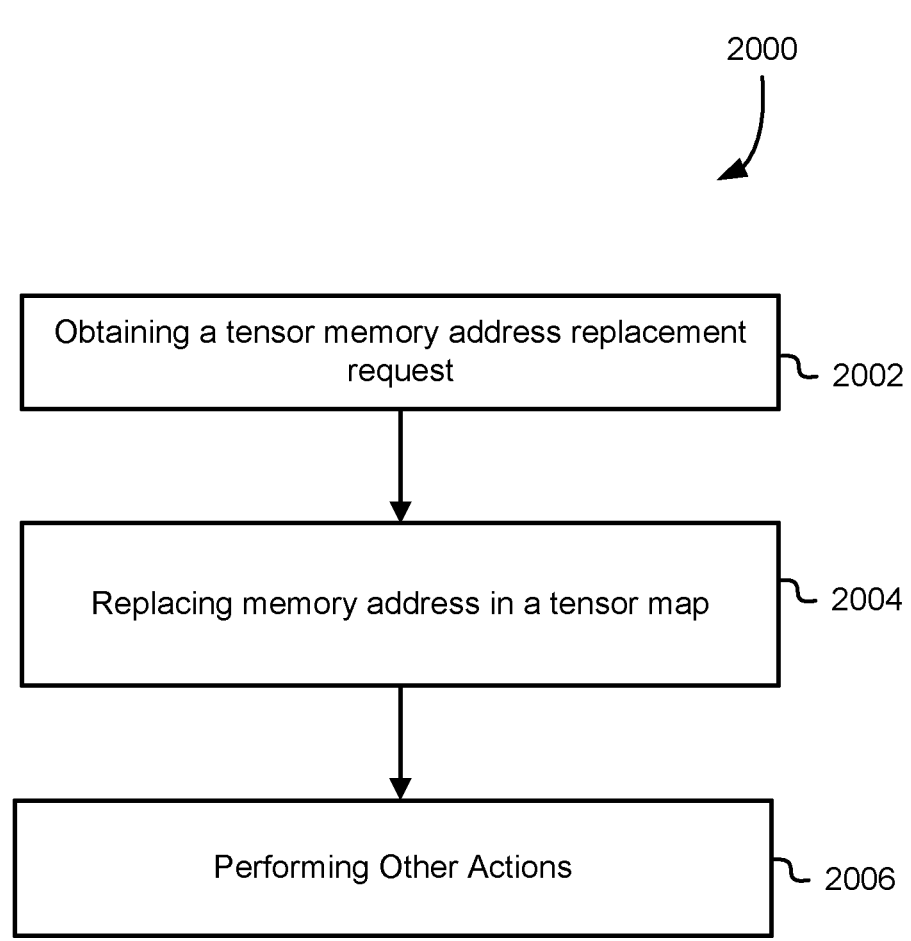
FIG. 20 is a flowchart of a technique of replacing a memory address of a tensor in a tensor map, according to at least one embodiment.

FIG. 20 is a flowchart of a technique 2000 of replacing a memory address of a tensor in a tensor map, according to at least one embodiment. In at least one embodiment, one or more aspects of technique 2000 are performed by one or more aspects shown or described with respect to FIG. 1 and/or FIG. 2 (e.g., CPU 104, PPU 106, API 108, compiler 112 of FIG. 1, replace tensor address API 244, processor 204, compiler 260, processor 228) and/or one or more components, techniques, and/or other aspects shown or described with respect to other figures herein. In at least one embodiment, technique 2000 includes performing one or more aspects of API 800 of FIG. 8. In at least one embodiment, at a block 2002, technique 2000 includes obtaining a tensor memory address replacement request (e.g., via an API such as replace tensor address API 244 of FIG. 2). In at least one embodiment, at a block 2004, technique 2000 includes replacing a memory address in a tensor map (e.g., performing replace tensor address API 244 of FIG. 2 and/or API 800 of FIG. 8). In at least one embodiment, at a block 2006, technique 2000 includes performing other actions (e.g., returning an indication that tensor address replacement was successfully performed and/or returning to block 2002 to obtain another tensor memory address replacement request.

In at least one embodiment, at least one aspect of technique 2000 includes performing an API (e.g., replace tensor address API 244 of FIG. 2, API 800 of FIG. 8, and/or API 108 of FIG. 1) to indicate one or more storage locations of information to be mapped from a first tensor to a second tensor. In at least one embodiment, storage location corresponds to a tensor. In at least one embodiment, API is to replace an indication of another storage location with an indication of storage location. In at least one embodiment, performing API includes updating a tensor map. In at least one embodiment, performing API includes replacing one or more indications of one or more storage locations. In at least one embodiment, performing API includes updating a data structure that stores information indicating how to transform first tensor to obtain second tensor. In at least one embodiment, a non-transitory computer-readable medium having stored thereon a set of instructions, which if performed by one or more processors, cause one or more processors to at least perform one or more aspects of technique 2000.

Figure 21:
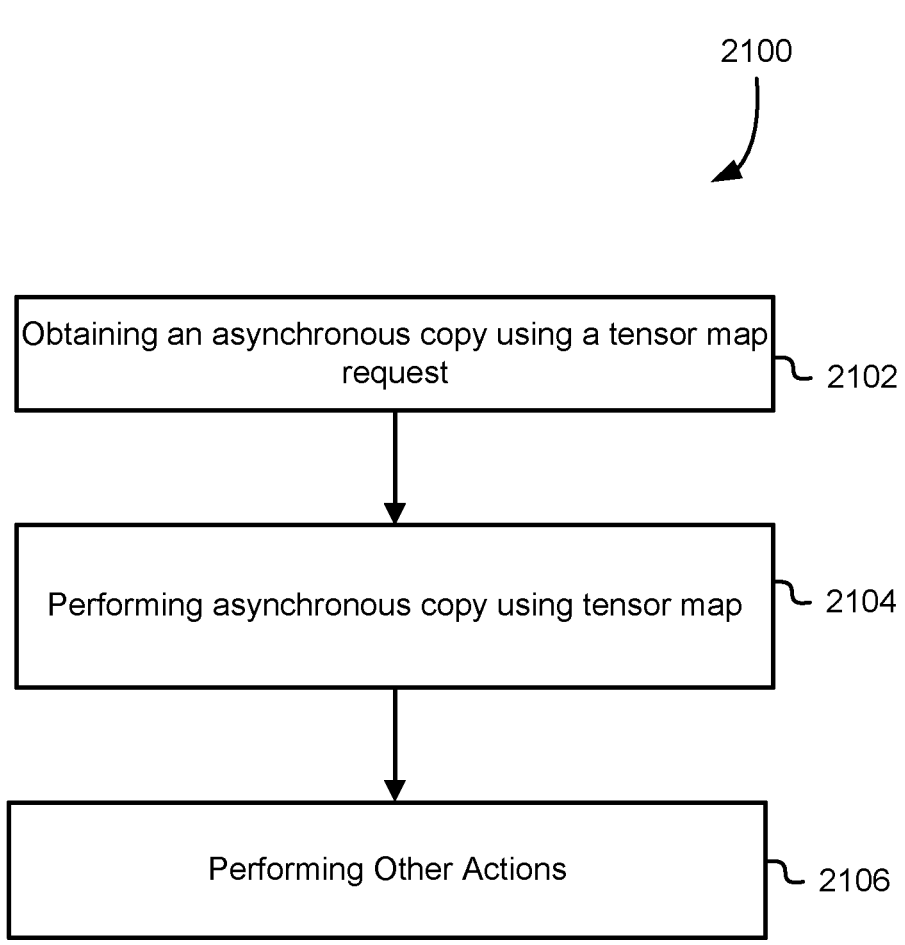
FIG. 21 is a flowchart of a technique of performing an asynchronous data copy operation using a tensor map, according to at least one embodiment.

FIG. 21 is a flowchart of a technique 2100 of performing an asynchronous data copy operation using a tensor map, according to at least one embodiment. In at least one embodiment, one or more aspects of technique 2100 are performed by one or more aspects shown or described with respect to FIG. 1 and/or FIG. 2 (e.g., CPU 104, PPU 106, API 108, compiler 112 of FIG. 1, asynchronous copy using tensor map API 246, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 2100 includes performing one or more aspects of API 900 of FIG. 9. In at least one embodiment, at a block 2102, technique 2100 includes obtaining an asynchronous copy using tensor map request (e.g., via an API such as asynchronous copy using tensor map API 246 of FIG. 2). In at least one embodiment, at a block 2104, technique 2100 includes performing asynchronous copy using tensor map operation (e.g., performing asynchronous copy using tensor map API 244 of FIG. 2 and/or API 900 of FIG. 9). In at least one embodiment, at a block 2106, technique 2100 includes performing other actions (e.g., returning an indication that asynchronous copy using tensor map operation was successfully performed and/or returning to block 2102 to obtain another asynchronous copy using tensor map operation request. In at least one embodiment, performing other actions at block 2106 includes returning an asynchronous hardware use indicator.

In at least one embodiment, at least one aspect of technique 2100 includes performing an API (e.g., asynchronous copy using tensor map API 246 of FIG. 2, API 900 of FIG. 9, and/or API 108 of FIG. 1) to cause a first tensor to be translated into a second tensor according to a tensor map. In at least one embodiment, performing API includes initiating one or more memory copy operations to be performed asynchronously. In at least one embodiment, API is to use transaction accounting different from manual transaction accounting. In at least one embodiment, tensor map is stored in a data structure that indicates information about first tensor and second tensor. In at least one embodiment, performing API includes using an input of API to obtain tensor map from memory. In at least one embodiment, performing API comprises using an input of API to obtain a portion of first tensor to be translated into second tensor. In at least one embodiment, a non-transitory computer-readable medium having stored thereon a set of instructions, which if performed by one or more processors, cause one or more processors to at least perform one or more aspects of technique 2100.

Figure 22:
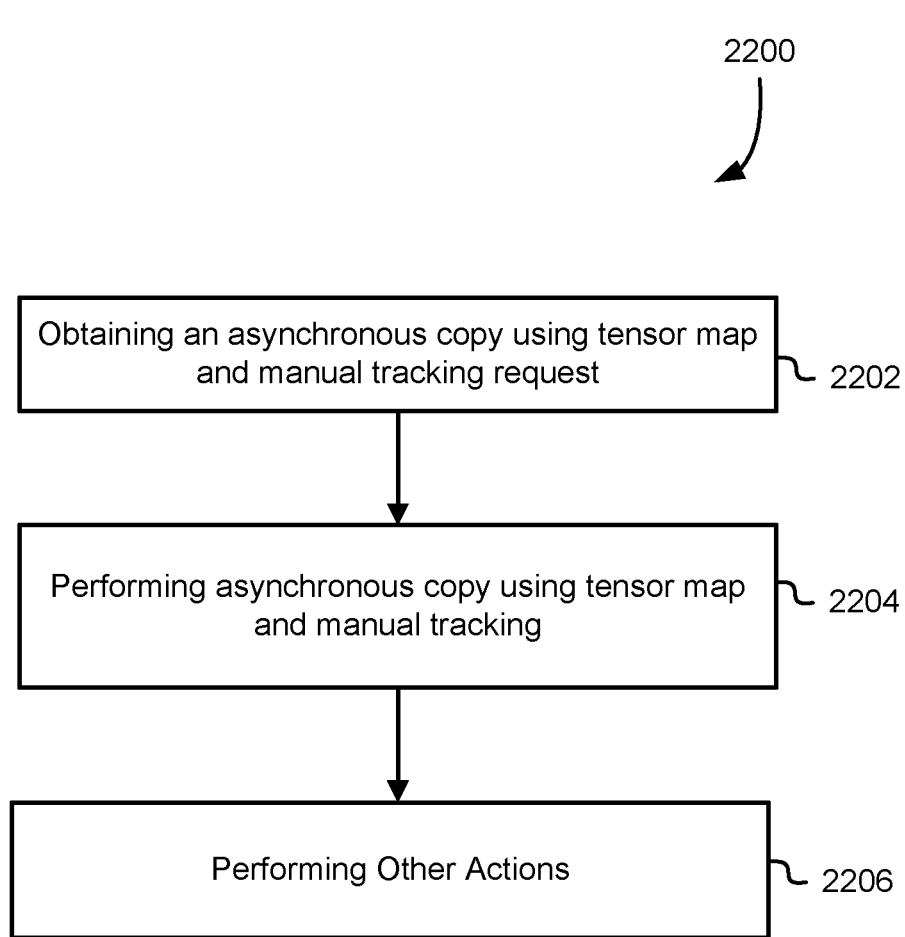
FIG. 22 is a flowchart of a technique of performing an asynchronous data copy operation using a tensor map and manual transaction accounting, according to at least one embodiment.

FIG. 22 is a flowchart of a technique 2200 of performing an asynchronous data copy operation using a tensor map and manual transaction accounting, according to at least one embodiment. In at least one embodiment, one or more aspects of technique 2200 are performed by one or more aspects shown or described with respect to FIG. 1 and/or FIG. 2 (e.g., CPU 104, PPU 106, API 108, compiler 112 of FIG. 1, asynchronous copy using tensor map with manual tracking API 248, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 2200 includes performing one or more aspects of API 1000 of FIG. 10. In at least one embodiment, at a block 2202, technique 2200 includes obtaining an asynchronous copy using tensor map with manual tracking request (e.g., via an API such as asynchronous copy using tensor map with manual tracking API 248 of FIG. 2). In at least one embodiment, at a block 2204, technique 2200 includes performing asynchronous copy using tensor map with manual tracking operation (e.g., performing asynchronous copy using tensor map with manual tracking API 244 of FIG. 2 and/or API 1000 of FIG.

10). In at least one embodiment, at a block 2206, technique 2200 includes performing other actions (e.g., returning an indication that multicast copy operation was successfully performed and/or returning to block 2202 to obtain another asynchronous copy using tensor map with manual tracking operation request. In at least one embodiment, performing other actions at block 2206 includes returning an asynchronous hardware use indicator.

In at least one embodiment, at least one aspect of technique 2200 includes performing an API (e.g., asynchronous copy using tensor map with manual tracking API 248 of FIG. 2, API 1000 of FIG. 10, and/or API 108 of FIG. 1) to cause a first tensor to be translated into a second tensor according to a tensor map without storing information about one or more memory transactions corresponding to translation. In at least one embodiment, performing API includes causing asynchronous storage of second tensor of second tensor in one or more second memory locations based, at least in part, on first tensor data of first tensor stored in one or more first memory locations. In at least one embodiment, performing API includes causing asynchronous storage of second tensor in one or more second memory locations of a graphics processing unit (GPU) based, at least in part, on first tensor data stored in one or more first memory locations of GPU. In at least one embodiment, performing API includes causing first tensor to be translated based, at least in part, on a data structure that comprises a tensor map. In at least one embodiment, performing API includes using a type of transaction accounting different from automatic transaction accounting. In at least one embodiment, performing API uses manual transaction accounting. In at least one embodiment, a non-transitory computer-readable medium having stored thereon a set of instructions, which if performed by one or more processors, cause one or more processors to at least perform one or more aspects of technique 2200.

Figure 23:
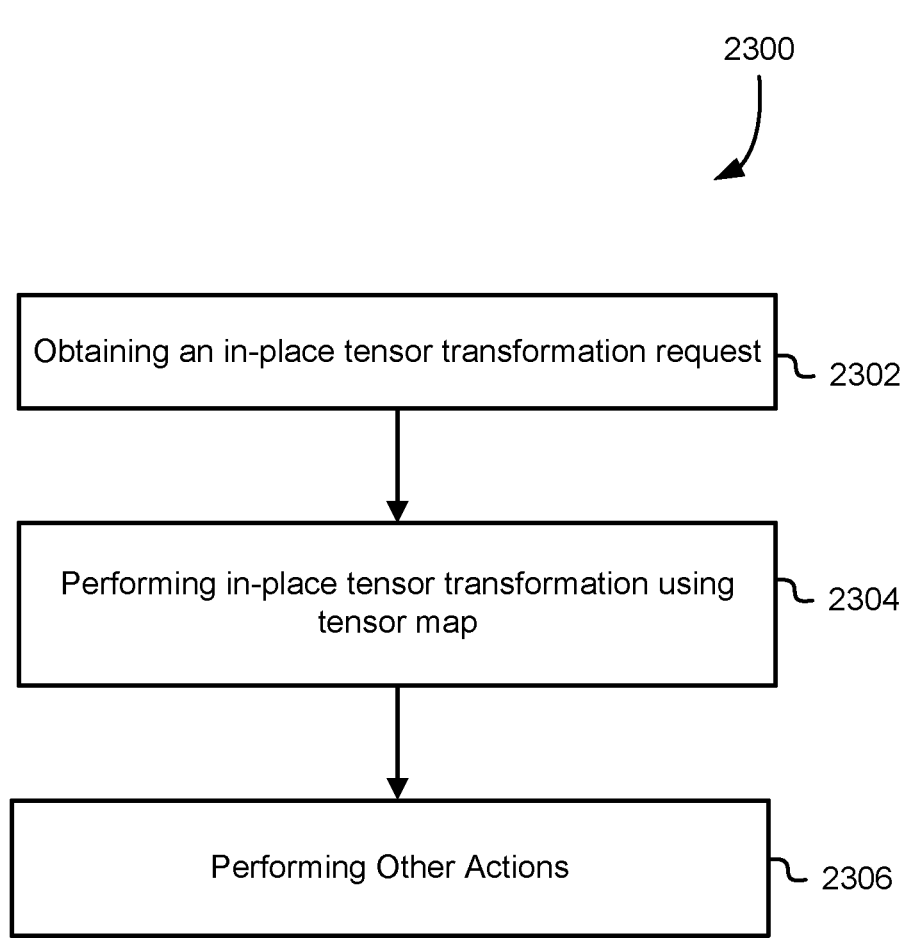
FIG. 23 is a flowchart of a technique of performing an in-place transformation of a tensor using a tensor map, according to at least one embodiment.

FIG. 23 is a flowchart of a technique 2300 of performing an in-place transformation of a tensor using a tensor map, according to at least one embodiment. In at least one embodiment, one or more aspects of technique 2300 are performed by one or more aspects shown or described with respect to FIG. 1 and/or FIG. 2 (e.g., CPU 104, PPU 106, API 108, compiler 112 of FIG. 1, in-place transformation API 250, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 2300 includes performing one or more aspects of API 1100 of FIG. 11. In at least one embodiment, at a block 2302, technique 2300 includes obtaining an in-place transformation operation request (e.g., via an API such as in-place transformation API 250 of FIG. 2). In at least one embodiment, at a block 2304, technique 2300 includes performing in-place transformation operation (e.g., performing in-place transformation API 250 of FIG. 2 and/or API 1100 of FIG. 11). In at least one embodiment, at a block 2306, technique 2300 includes performing other actions (e.g., returning an indication that in-place transformation operation was successfully performed and/or returning to block 2302 to obtain another in-place transformation operation request. In at least one embodiment, performing other actions at block 2306 includes returning an asynchronous hardware use indicator.

In at least one embodiment, at least one aspect of technique 2300 includes performing an API (e.g., in-place transformation API 250 of FIG. 2, API 1100 of FIG. 11, and/or API 108 of FIG. 1) to cause a first tensor to be translated into a second tensor according to a tensor map. In at least one embodiment, API is to be performed using manual transaction accounting. In at least one embodiment, API is to cause second tensor to be stored by overwriting at least a portion of memory storing first tensor. In at least one embodiment, performing API includes obtaining tensor map from a storage location determined based, at least in part, on an input to API. In at least one embodiment, performing API includes overwriting tensor data in memory. In at least one embodiment, performing API includes indicating whether performing API causes one or more particular hardware units to be used. In at least one embodiment, a non-transitory computer-readable medium having stored thereon a set of instructions, which if performed by one or more processors, cause one or more processors to at least perform one or more aspects of technique 2300.

Figure 24:
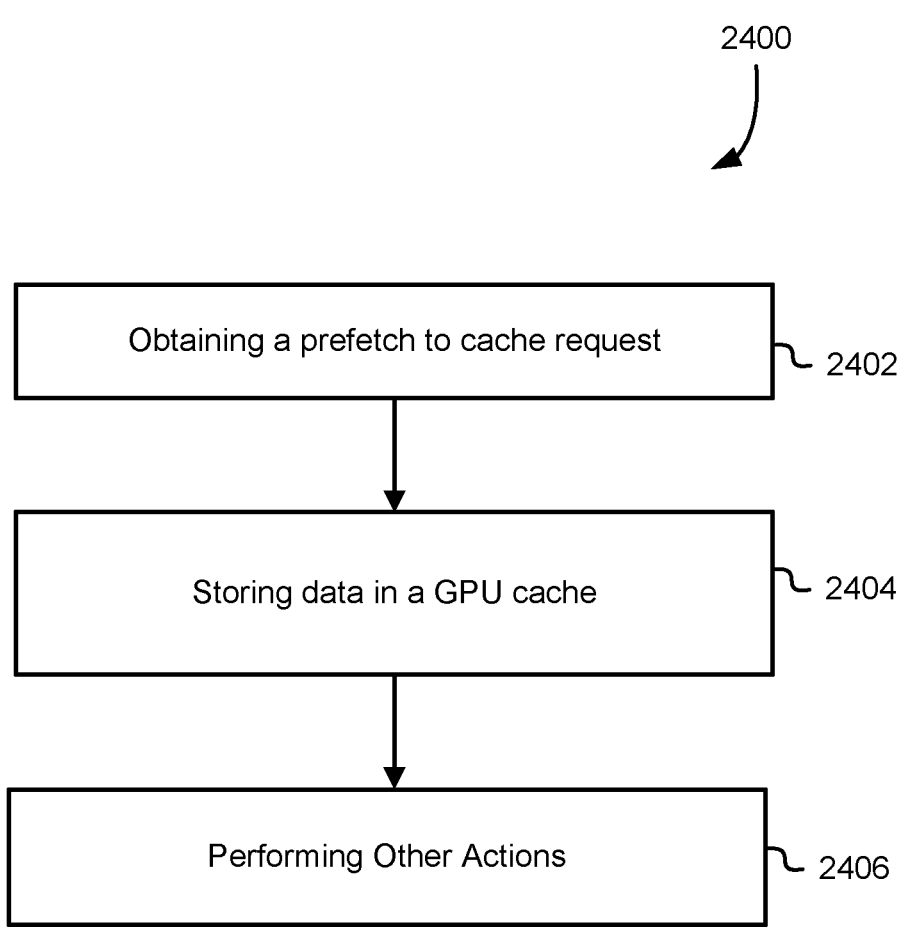
FIG. 24 is a flowchart of a technique of prefetching data, according to at least one embodiment.

FIG. 24 is a flowchart of a technique 2400 of prefetching data, according to at least one embodiment. In at least one embodiment, one or more aspects of technique 2400 are performed by one or more aspects shown or described with respect to FIG. 1 and/or FIG. 2 (e.g., CPU 104, PPU 106, API 108, compiler 112 of FIG. 1, prefetch data instruction 254, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 2400 includes performing one or more aspects of API 1200 of FIG. 12. In at least one embodiment, at a block 2402, technique 2400 includes obtaining a prefetch to cache request (e.g., via an instruction such as prefetch data instruction 254 of FIG. 2). In at least one embodiment, at a block 2404, technique 2400 includes performing prefetch to cache operation (e.g., performing prefetch data instruction 254 of FIG. 2 and/or API 1200 of FIG. 12). In at least one embodiment, at a block 2406, technique 2400 includes performing other actions (e.g., returning an indication that prefetch to cache operation was successfully performed and/or returning to block 2402 to obtain another prefetch to cache request. In at least one embodiment, performing other actions at block 2406 includes returning an asynchronous hardware use indicator.

In at least one embodiment, at least one aspect of technique 2400 includes performing an instruction (e.g., a GPU prefetch instruction such as prefetch data instruction 254 of FIG. 2, API 1200 of FIG. 12, and/or an instruction to be performed by API 108 of FIG. 1) to cause a variable amount of information to be stored into one or more GPU caches. In at least one embodiment, one or more GPU caches comprise one or more level two (L2) caches. In at least one embodiment, performing GPU prefetch instruction includes compiling GPU prefetch instruction to executable binary code to be performed by a GPU. In at least one embodiment, an input to GPU prefetch instruction includes an indication of a storage location from which information is to be obtained to be stored into one or more GPU caches. In at least one embodiment, an input to GPU prefetch instruction includes an indication of a size of data to be copied (e.g., where indication of size specifies variable amount of information to be stored in bytes or some other suitable metric). In at least one embodiment, GPU prefetch instruction is an assembly-level instruction. In at least one embodiment, instruction is of a graphics instruction set architecture (ISA). In at least one embodiment, a non-transitory computer-readable medium having stored thereon a set of instructions, which if performed by one or more processors, cause one or more processors to at least perform one or more aspects of technique 2400.

Figure 25:
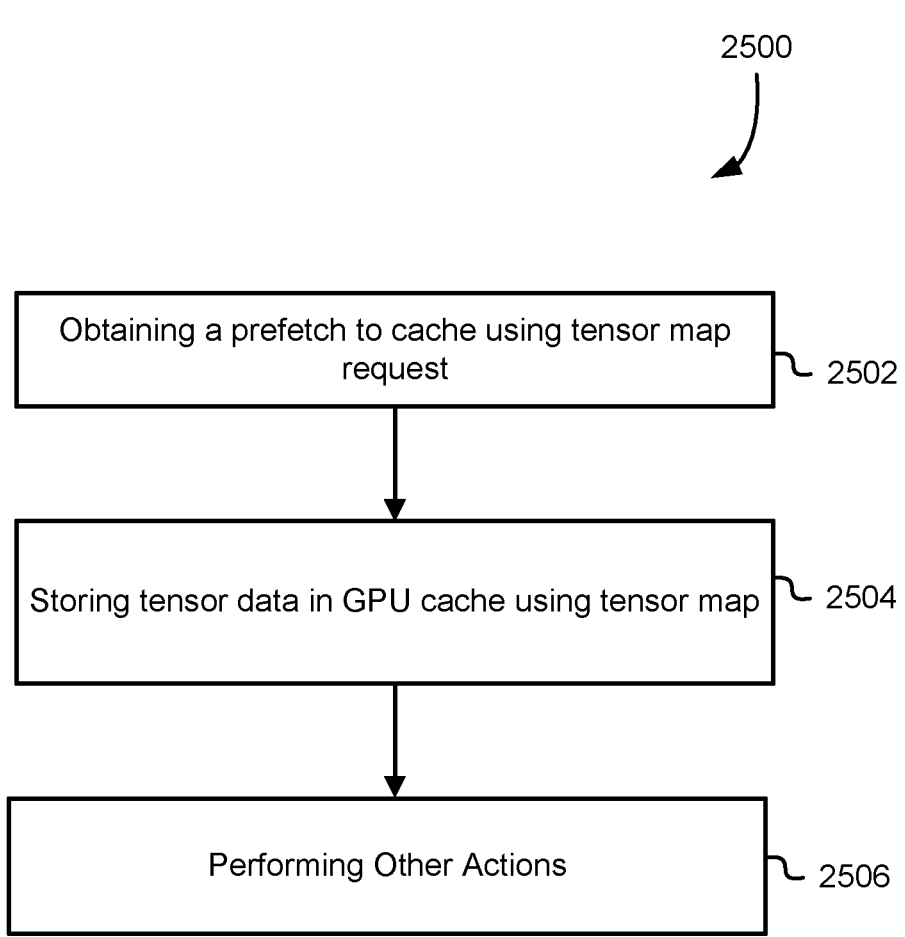
FIG. 25 is a flowchart of a technique of prefetching data using a tensor map, according to at least one embodiment.

FIG. 25 is a flowchart of a technique 2500 of prefetching data using a tensor map, according to at least one embodiment. In at least one embodiment, one or more aspects of technique 2500 are performed by one or more aspects shown or described with respect to FIG. 1 and/or FIG. 2 (e.g., CPU 104, PPU 106, API 108, compiler 112 of FIG. 1, prefetch using tensor map 256, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 2500 includes performing one or more aspects of API 1300 of FIG. 13. In at least one embodiment, at a block 2502, technique 2500 includes obtaining a prefetch to cache using tensor map request (e.g., via an instruction such as prefetch using tensor map 256 of FIG. 2). In at least one embodiment, at a block 2504, technique 2500 includes performing prefetch to cache using tensor map operation (e.g., performing prefetch using tensor map 256 of FIG. 2 and/or API 1300 of FIG. 13). In at least one embodiment, at a block 2506, technique 2500 includes performing other actions (e.g., returning an indication that prefetch to cache using tensor map operation was successfully performed and/or returning to block 2502 to obtain another prefetch to cache using tensor map request. In at least one embodiment, performing other actions at block 2506 includes returning an asynchronous hardware use indicator.

In at least one embodiment, at least one aspect of technique 2500 includes performing an instruction (e.g., a tensor prefetch instruction such as prefetch using tensor map 256 of FIG. 2, API 1300 of FIG. 13, and/or an instruction to be performed by API 108 of FIG. 1) to cause one or more tensors to be stored into one or more graphics processing unit (GPU) caches. In at least one embodiment, performing tensor prefetch instruction includes transforming one or more tensors. In at least one embodiment, performing tensor prefetch instruction includes obtaining a tensor map indicating a transformation to apply to one or more tensors. In at least one embodiment, one or more caches include one or more level two (L2) caches. In at least one embodiment, performing tensor prefetch instruction includes generating executable binary code based, at least in part, on tensor prefetch instruction. In at least one embodiment, an input to tensor prefetch instruction indicates a tensor and a transformation to apply to tensor prior to storing tensor data into one or more GPU caches. In at least one embodiment, a non-transitory computer-readable medium having stored thereon a set of instructions, which if performed by one or more processors, cause one or more processors to at least perform one or mora aspects of technique 2500.

Figure 26:
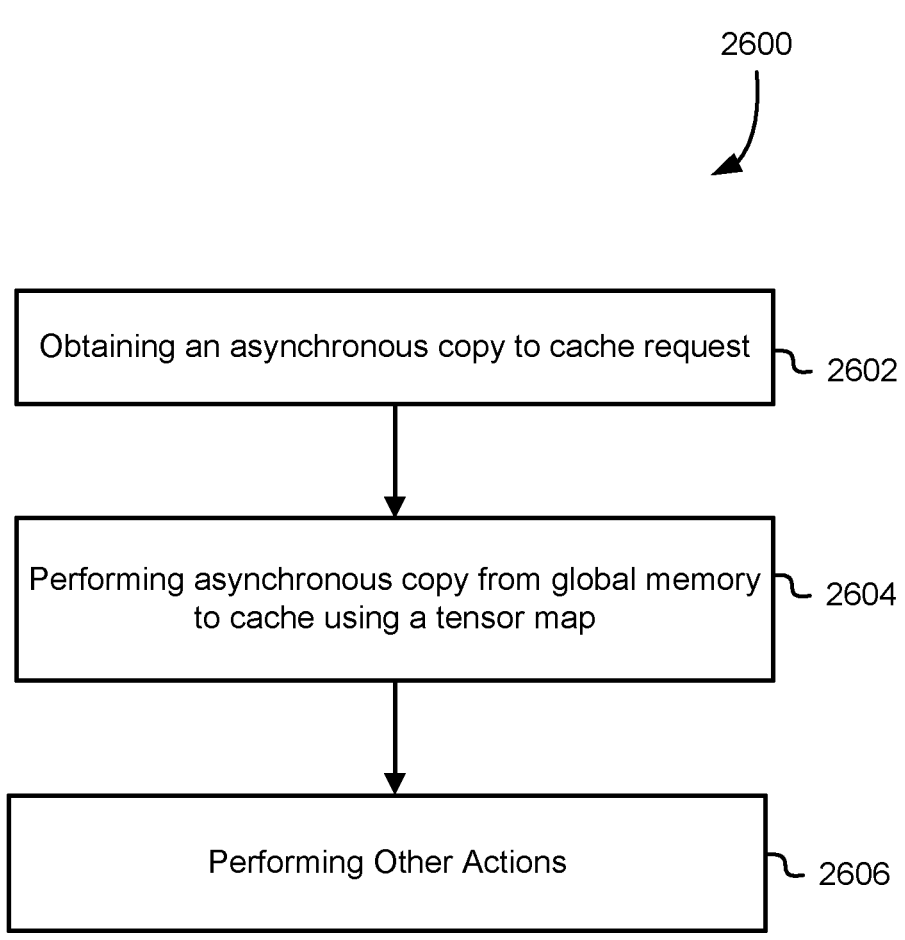
FIG. 26 is a flowchart of a technique of asynchronously copying data from global memory to cache, according to at least one embodiment.

FIG. 26 is a flowchart of a technique 2600 of asynchronously copying data from global memory to cache, according to at least one embodiment. In at least one embodiment, one or more aspects of technique 2600 are performed by one or more aspects shown or described with respect to FIG. 1 and/or FIG. 2 (e.g., CPU 104, PPU 106, API 108, compiler 112 of FIG. 1, asynchronous copy to cache 258, processor 204, compiler 260, processor 228, asynchronous data movement H/W 224, and/or synchronization H/W 226 of FIG. 2) and/or one or more components, techniques, and/or other aspects shown or described with respect to other figures herein. In at least one embodiment, technique 2600 includes performing one or more aspects of API 1400 of FIG. 14. In at least one embodiment, at a block 2602, technique 2600 includes obtaining an asynchronous copy to cache request (e.g., via an instruction such as asynchronous copy to cache 258 of FIG. 2). In at least one embodiment, at a block 2604, technique 2600 includes performing asynchronous copy to cache operation (e.g., performing asynchronous copy to cache 258 of FIG. 2 and/or API 1400 of FIG. 14). In at least one embodiment, at a block 2606, technique 2600 includes performing other actions (e.g., returning an indication that asynchronous copy to cache operation was successfully performed and/or returning to block 2602 to obtain another asynchronous copy to cache request. In at least one embodiment, performing other actions at block 2606 includes returning an asynchronous hardware use indicator.

In at least one embodiment, at least one aspect of technique 2600 includes performing an instruction (e.g., a tensor prefetch instruction such as asynchronous copy to cache 258 of FIG. 2, API 1400 of FIG. 14, and/or an instruction to be performed by API 108 of FIG. 1) to cause one or more tensors to be transformed and stored into one or more graphics processing unit (GPU) caches. In at least one embodiment, an input to tensor prefetch instruction indicates a tensor map data structure to use to transform one or more tensors. In at least one embodiment, performing tensor prefetch instruction includes performing one or more image-to-column transformations. In at least one embodiment, performing tensor prefetch instruction includes compiling tensor prefetch instruction to obtain one or more instructions performable by GPU. In at least one embodiment, performing tensor prefetch instruction includes using a tensor map to obtain one or more tensors. In at least one embodiment, performing tensor prefetch instruction includes obtaining a portion of a tensor based, at least in part, on an input to tensor prefetch instruction. In at least one embodiment, a non-transitory computer-readable medium having stored thereon a set of instructions, which if performed by one or more processors, cause one or more processors to at least perform one or more aspects of technique 2600.

In at least one embodiment, one or more aspects shown or described with respect to FIGS. 1-26 are implemented based, at least in part, on one or more aspects described below and/or shown in figures described below. In at least one embodiment, one or more aspects shown or described with respect to implementing an API using a particular language (e.g., C++ or C) can be implemented using one or more other languages (e.g., Java, Python, or some other suitable language). In at least one embodiment, one or more aspects shown or described with respect to implementing an API and/or an instruction using a particular type of instruction and/or intermediate representation (e.g., NVIDIA PTX instructions) can be implemented using one or more other types of instructions (e.g., assembly-level) and/or intermediate representations.

In at least one embodiment, with respect to cluster execution and distributed shared memory (DSMEM), tensor memory accelerator (TMA)-bulk operations can target peer-cooperating thread array (CTA) DSMEM within a cluster and thus use peer-CTAs that are active prior to issuing and through completion of these operations. In at least one embodiment, TMA is and/or includes asynchronous data movement H/W 224 of FIG. 2 and/or asynchronous data movement H/W 114 of FIG. 1).

In at least one embodiment, with respect to CTA_CGA vs. CTA_GRID, compiler, and link time optimization, some TMA-bulk features use kernels that are explicitly launched as a Cluster (CTA_CGA) as opposed to a legacy kernel launch (CTA_GRID). In at least one embodiment, CUDA exposure of TMA-bulk features queries runtime CTA_CGA vs. CTA_GRID status and emulates TMA-bulk features when not available due to CTA_GRID launch. In at least one embodiment, CTA_CGA status can be optionally set at compilation and be verified at kernel launch. In at least one embodiment, when statically set at compilation TMA-bulk emulation code is elided by compiler, and link time optimization elides TMA-bulk emulation code in separately compiled functions.

In at least one embodiment, with respect to SyncUnit, TMA-bulk operations with destination as DSMEM use transactions on SyncUnit barriers to synchronize operation completion. In at least one embodiment, SyncUnit is and/or includes synchronization H/W 226 of FIG. 2 and/or synchronization H/W 116 of FIG. 1) In at least one embodiment, one or more bulk transfer operations can be used to asynchronously copy contiguous block of memory from global to shared memory. In at least one embodiment, this global to shared asynchronous copy includes a wait for write to complete. In at least one embodiment, one or more bulk transfer operations can be used to asynchronously copy contiguous block of memory from shared to global memory. In at least one embodiment, this shared to global asynchronous copy includes a wait for write to complete and a wait for read to complete. In at least one embodiment, one or more bulk transfer operations can be used to asynchronously copy contiguous block of memory from shared to Cluster peer-CTA shared memory. In at least one embodiment, this shared to Cluster peer-CTA shared asynchronous copy is from a shared memory of a first SM to shared memory of a second SM within a Cluster that includes first SM and second SM. In at least one embodiment, this shared to Cluster peer-CTA shared asynchronous copy includes a wait for read to complete and a wait for write to complete.

In at least one embodiment, one or more bulk transfer operations can be used to asynchronously copy and perform a reduction operation (e.g., an atom-add or some other suitable reduction operation such as by using asynchronous reduction API 234 of FIG. 2) on a contiguous block of memory from shared to global memory (GMEM). In at least one embodiment, this asynchronous shared to global copy and reduction operation is referred to as a reduction operation (e.g., that uses data copied from shared memory (SMEM) to perform a reduction operation on data in global memory). In at least one embodiment, this asynchronous shared to global copy and reduction operation includes a wait for read to complete and a wait for reduce to complete.

In at least one embodiment, one or more bulk transfer operations can be used to aggregate multiple asynchronous copy and/or reduce operations from same source to same destination. In at least one embodiment, this aggregation of multiple asynchronous copy and/or reduce operations includes a wait for all reads from shared memory to complete, if applicable, and a wait for all writes to complete. In at least one embodiment, one or more bulk transfer operations can be used to organize aggregated asynchronous copy and/or reduce operations into a multi-stage pipeline. In at least one embodiment, one or more bulk transfer operations can be used to coordinate Cluster-wide set of shared to Cluster peer-CTA shared asynchronous copy and/or reduce operations.

In at least one embodiment, with respect to SyncUnit Barrier synchronization of write-DSMEM, TMA-bulk operations with DSMEM destination use a SyncUnit barrier to synchronize asynchronous data operation transaction. In at least one embodiment, one or more techniques use synchronization with a SyncUnit barrier with automatic transaction accounting strategies. In at least one embodiment, one or more techniques use synchronization with a SyncUnit barrier with manual transaction accounting strategies.

In at least one embodiment, with respect to synchronization of write-GMEM, TMA-bulk operations with GMEM destination use scoreboard, instruction flushing, and memory barriers for synchronization. In at least one embodiment, with respect to TMA-bulk unicast operations, TMA-bulk operations are exposed (e.g., via one or more APIs) for unicast (point-to-point) of GMEM to SMEM, SMEM to GMEM, SMEM to DSMEM, and GMEM to L2 (e.g., prefetch). In at least one embodiment, with respect to TMA-bulk multicast operation TMA-bulk operation is exposed (e.g., via one or more APIs) for multicast of GMEM to multiple DSMEM within a Cluster. In at least one embodiment, with respect to synchronization of TMA-bulk read-SMEM, TMA-bulk operations with SMEM source can use scoreboard for synchronization.

In at least one embodiment, with respect to write and optional read synchronization, TMA-bulk operations writing to DSMEM update SyncUnit transaction barriers with a transaction count. In at least one embodiment, waiting for barrier phase completion includes waiting for asynchronous writes to DSMEM. In at least one embodiment, these operations have either automatic or manual transaction accounting exposures with either CUDA barrier or CUDA pipeline. In at least one embodiment, TMA-bulk operations writing to GMEM do not use SyncUnit barriers. In at least one embodiment, waiting for GMEM write completion via scoreboard and cache invalidation is supported with CUDA pipeline. In at least one embodiment, TMA-bulk operations reading from SMEM can wait for read completion via scoreboard and is supported with CUDA pipeline.

In at least one embodiment, one or more CUDA APIs for TMA-bulk features are implemented with inline PTX which lower to one or more SASS instructions. In at least one embodiment, with respect to CTA_CGA vs. CTA_GRID and PTX vs. CUDA, TMA-bulk features for shared-to-shared use explicit Cluster launch (CTA_CGA) while TMA-bulk features for shared-to-global or global-to-shared work for either CTA_CGA or legacy launch (CTA_GRID). In at least one embodiment, CTA_CGA feature is used for PTX exposure. In at least one embodiment, for CUDA exposure TMA bulk shared-to-shared features have a runtime check for CTA_CGA and are emulated for CTA_GRID. In at least one embodiment, front-end compiler has an option to statically set CTA_CGA status such that (1) kernel is to be launched as CTA_CGA and (2) emulation code can be statically elided.

In at least one embodiment, notation of, ".shared::cta" is SMEM in issuing thread's block. In at least one embodiment, ".shared::cluster" is DSMEM in issuing thread's Cluster. In at least one embodiment, ".shared::cta" is a subset of .shared::cluster.

In at least one embodiment, with respect to an asynchronous copy operation, also referred to as, Async-Copy, one or more PTX instructions can be further illustrated as follows:
    cp.async.bulk.mbarrier.shared::cluster.global [dstBarPtr], [dstDataPtr], [srcPtr], cp-size;
    cp.async.bulk.mbarrier.shared::cluster.global [dstBarPtr], [dstDataPtr], [srcPtr], cp-size;
In at least one embodiment, two PTX instructions above use 16 byte alignment of destination and source data. In at least one embodiment, two PTX instructions above use destination barrier and data memory in submitting-CTA.

In at least one embodiment, with respect to an asynchronous multicast copy operation, a PTX instruction can be further illustrated as follows:
    cp.async.bulk.multicast.mbarrier.shared::CTA.global [dstBarPtr], [dstDataPtr], [srcPtr], mask, cp-size;
In at least one embodiment, PTX instruction above uses 16 byte alignment of destination and source data. In at least one embodiment, PTX instruction above uses destination barrier and data memory in submitting-CTA.

In at least one embodiment, with respect to an asynchronous copy operation from shared memory to shared memory, a PTX instruction can be further illustrated as follows:
    cp.async.bulk.mbarrier.shared::cluster.shared::cta [dstBarPtr], [dstDataPtr], [srcPtr], cp-size;
In at least one embodiment, PTX instruction above uses CTA_CGA. In at least one embodiment, PTX instruction above uses 16 byte alignment of destination and source data. In at least one embodiment, PTX instruction above uses destination barrier and data memory in Cluster peer-CTA. In at least one embodiment, PTX instruction above uses source data memory in submitting-CTA.

In at least one embodiment, with respect to an asynchronous copy operation from shared memory to global memory, a PTX instruction can be further illustrated as follows:
    cp.async.bulk.global.shared::cta [dstPtr], [srcPtr], cp-size;
In at least one embodiment, PTX instruction above uses 16 byte alignment of destination and source data. In at least one embodiment, PTX instruction above uses source data memory in submitting-CTA.

In at least one embodiment, with respect to an asynchronous reduction operation, also referred to as an asynchronous inplace operation, an asynchronous reduction operation, Async-Element-Wise-Reduce, and/or in some other suitable manner, a PTX instruction can be further illustrated as follows:
    cp.red.op.async.bulk.mbarrier.shared::cluster.shared:: cta.type [dstBarPtr], [dstDataPtr], [srcPtr], cp-size;
In at least one embodiment, PTX instruction above uses CTA_CGA. In at least one embodiment, PTX instruction above uses 16 byte alignment of destination and source data. In at least one embodiment, PTX instruction above uses destination barrier and data memory in Cluster peer-CTA. In at least one embodiment, PTX instruction above uses source data memory in submitting-CTA. In at least one embodiment, .op.type specifies reduction operation and data type.

In at least one embodiment, with respect to another asynchronous reduction operation, a PTX instruction can be further illustrated as follows:
    cp.red.op.async.bulk.global.shared::cta.type [dstPtr], [srcPtr], cp-size;
In at least one embodiment, PTX instruction above uses 16 byte alignment of destination and source data. In at least one embodiment, PTX instruction above uses source data memory in submitting-CTA. In at least one embodiment, .op.type specifies reduction operation and data type.

In at least one embodiment, a prefetch includes a copy operation from global memory (e.g., global memory 218 of FIG. 2) to cache (e.g., L2 cache such as cache 230 of FIG. 2). In at least one embodiment, prefetch is asynchronous. In at least one embodiment, with respect to prefetch, a PTX instruction (e.g., such as prefetch data instruction 254 of FIG. 2) can be further illustrated as follows:
    prefetch.bulk.global.L2 [srcPtr], cp-size;
In at least one embodiment, PTX instruction above uses 16 byte alignment of destination and source data.

In at least one embodiment, with respect to synchronization, and a commit operation, a PTX instruction can be further illustrated as follows:

cp.async.bulk.commit;

In at least one embodiment, commit prior cp.async.bulk as a batch of operations to wait upon. In at least one embodiment, thread that submitted cp.async.bulk is to perform commit.

In at least one embodiment, with respect to synchronization and a wait read operation, a PTX instruction can be further illustrated as follows:

cp.async.bulk.wait.read.shared::cta;

In at least one embodiment, wait for shared memory read completion of prior shared to shared or shared to global asynchronous operation. In at least one embodiment, thread that submitted cp.async.bulk.commit is to perform wait.

In at least one embodiment, with respect to synchronization and a wait write operation, a PTX instruction can be further illustrated as follows:

cp.async.bulk.wait.write.global;

In at least one embodiment, wait for global memory read completion of prior shared to global asynchronous operation. In at least one embodiment, thread that submitted cp.async.bulk.commit is to perform wait.

In at least one embodiment, one or more techniques are to perform one or more updates using a pipeline and/or barrier. In at least one embodiment, with respect to CUDA async-update using pipeline or barrier, CUDA async-update operations have per-thread semantics. In at least one embodiment, T, DstT, and SrcT are copyable data types. In at least one embodiment, SyncT is barrier or pipeline with appropriate thread_scope. In at least one embodiment, one or more techniques are to use appropriate memory space of dst, src, and syncObj. In at least one embodiment, launch status is CTA_CGA or CTA_GRID. In at least one embodiment, with respect to multicast, SyncT may be a cluster multicast pointer to a barrier. In at least one embodiment, with respect to inplace transform, data type is further restricted to types supported by UBLKRED operations. In at least one embodiment, these aspects are present and statically available for compiler to evaluate an implementation switch reflected below. In at least one embodiment, when usage conditions are not right (e.g., UBLKCP or UBLKRED usage conditions), one or more techniques are to use a fallback approach that uses other mechanisms, such as LD/ST/ATOM operations to fulfill functional contract.

In at least one embodiment, one or more intended specialized overloads of one or more unicast asynchronous copy operations utilize UBLKCP. In at least one embodiment, one or more API signatures for unicast asynchronous copy are represented as follows:

```
template< class T, class ShapeT, class SyncT >
info_async_utilization
memcpy_async( T*dst, const T*src, ShapeT shape, SyncT & syncObj );
template< class T, class ShapeT, class SyncT >
info_async_utilization
memcpy_async_tx( T*dst, const T*src, ShapeT shape, SyncT &
syncObj );
template< class DstT, class DstP, class SrcT, class SrcP, class ShapeT,
class SyncT >
info_async_utilization
memcpy_async( annotated_ptr<DstT,DstP> dst,
    annotated_ptr<SrcT,SrcP> src,
    ShapeT shape, SyncT & syncObj );
template< class DstT, class DstP, class SrcT, class SrcP, class ShapeT,
class SyncT >
info_async_utilization
```

-continued

```
memcpy_async_tx( annotated_ptr<DstT,DstP> dst,
    annotated_ptr<SrcT,SrcP> src,
    ShapeT shape, SyncT & syncObj );
```

In at least one embodiment, one or more intended specialized overloads of one or more unicast asynchronous copy with destination update operations utilize UBLKRED. In at least one embodiment, one or more API signatures for unicast asynchronous copy with destination update are represented as follows:

```
template< class T, class ShapeT, class BinaryOp, class SyncT >
info_async_utilization
inplace_transform_n_async( T*dst, const T*src, ShapeT shape,
    BinaryOp OP, SyncT & syncObj );
template< class T, class ShapeT, class BinaryOp, class SyncT >
info_async_utilization
inplace_transform_n_async_tx( T*dst, const T*src, ShapeT shape,
    BinaryOp OP, SyncT & syncObj );
template< class DstT, class DstP, class SrcT, class SrcP, class ShapeT,
class BinaryOp, class SyncT >
info_async_utilization
inplace_transform_n_async( annotated_ptr<DstT,DstP> dst,
    annotated_ptr<SrcT,SrcP> src,
    ShapeT shape, BinaryOp OP, SyncT & syncObj );
template< class DstT, class DstP, class SrcT, class SrcP, class ShapeT,
class BinaryOp, class SyncT >
info_async_utilization
inplace_transform_n_async_tx( annotated_ptr<DstT,DstP> dst,
    annotated_ptr<SrcT,SrcP> src,
    ShapeT shape, BinaryOp OP, SyncT & syncObj
);
```

In at least one embodiment, one or more intended specialized overloads of one or more multicast asynchronous copy operations utilize UBLKCP. In at least one embodiment, one or more APIs signatures for multicast asynchronous copy are represented as follows:

```
template< class T, class ShapeT, class SyncT >
info_async_utilization
memcpy_async( cluster_multicast_ptr<T> dst, const T*src, ShapeT
shape, SyncT & syncObj );
template< class T, class ShapeT, class SyncT >
info_async_utilization
memcpy_async_tx( cluster_multicast_ptr<T> dst, const T*src,
ShapeT shape, SyncT & syncObj );
template< class T, class SrcT, class SrcP, class ShapeT, class SyncT >
info_async_utilization
memcpy_async( cluster_multicast_ptr<T> dst,
    annotated_ptr<SrcT,SrcP> src,
    ShapeT shape, SyncT & syncObj );
template< class T, class SrcT, class SrcP, class ShapeT, class SyncT >
info_async_utilization
memcpy_async_tx( cluster_multicast_ptr<T> dst,
    annotated_ptr<SrcT,SrcP> src,
    ShapeT shape, SyncT & syncObj );
```

In at least one embodiment, with respect to unicast copy with automatic transaction accounting, in order to utilize a cp.async.bulk (UBLKCP) instruction, memcpy_async is to be invoked with right destination, source, shape, and synchronization object. In at least one embodiment, when not invoked with right arguments, an implementation of memcpy_async provides a fallback that uses other mechanisms, such as LD/ST operations, to fulfill 'memcpy' functional contract. In at least one embodiment, memcpy_async enables asynchronous multicast copies (e.g., from global memory 218 to first shared memory 220 and second shared memory 222 of FIG. 2), asynchronous shared memory to shared memory copies (e.g., from first shared memory 220 to second shared memory 222 of FIG. 2 for threads within a cluster), and/or asynchronous shared memory to global memory copies (e.g., from first shared memory 220 to global memory 218 of FIG. 2), which provides advantages over legacy approaches that do not enable these types of asynchronous copy operations.

In at least one embodiment, one or more aspects of a unicast copy with automatic transaction accounting API can be represented as follows:

```
template< class SyncT >
info_async_utilization
memcpy_async( void * dst, const void * src,
    const aligned_size_t<16> shape, SyncT & syncObj );
template< class DstT, class DstP, class SrcT, class SrcP, class SyncT >
info_async_utilization
memcpy_async( annotated_ptr<DstT,DstP> dst,
    annotated_ptr<SrcT,SrcP> src,
    const aligned_size_t<16> shape, SyncT & syncObj );
```

In at least one embodiment, unicast copy with automatic transaction accounting API, as represented above, expects dst, src, and shape to satisfy aligned_size_t<16> contract for 16-byte aligned pointers and length. In at least one embodiment, dst is a pointer to global, shared::cta, or shared::cluster memory spaces in one of following "when/then" clauses. In at least one embodiment, src is a pointer to global or shared::cta memory spaces in one of following "when/then" clauses. In at least one embodiment, syncObj is one of synchronization objects in one of following "when/then" clauses. In at least one embodiment, one or more effects of unicast copy with automatic transaction accounting API, are to cause shape.value bytes to be copied from src to dst and syncObj to be updated as per one of following "when/then" clauses. In at least one embodiment, if no "when/then" clause is applicable, a fallback is to be used.

In at least one embodiment, one or more of following "when/then" clauses can be used to further illustrate unicast copy with automatic transaction accounting API, as represented above.

| When | • | SyncT is cuda::pipeline<thread_scope_thread> |
|------|---|---|
| | • | dst is .global |
| | • | src is .shared::cluster |
| Then | • | pipe.bulkFlag = commit \| read \| write |
| | • | cp.async.bulk.global.shared::cta [dst], [src], shape.value; |
| | • | return info_async_fully |

| When | • | SyncT is cuda::barrier<thread_scope_block> |
|------|---|---|
| | • | dst and syncObj are .shared::cta |
| | • | src is .global |
| Then | • | cp.async.bulk.mbarrier.shared::cta.global [&syncObj], [dst], [src], shape.value; |
| | • | mbarrier.expect_tx.shared::cta [&syncObj], shape.value; |

| When | • | SyncT is cuda::barrier<thread_scope_block> |
|------|---|---|
| | • | dst and syncObj are .shared::cluster and have same cta_rank |
| | • | src is .global |
| | • | is CTA_CGA |
| Then | • | cp.async.bulk.mbarrier.shared::cluster.global [&syncObj], [dst], [src], shape.value; |
| | • | mbarrier.expect_tx.shared::cluster [&syncObj], shape.value; |

| When | • | SyncT is cuda::barrier<thread_scope_block> |
|------|---|---|
| | • | dst and syncObj are .shared::cluster and have same cta_rank |
| | • | src is .shared::cta |
| | • | is CTA_CGA |
| Then | • | cp.async.bulk.mbarrier.shared::cluster.shared::cta [&syncObj], [dst], [src], shape.value; |
| | • | mbarrier.expect_tx.shared::cluster [&syncObj], shape.value; |

| When | • | SyncT is cuda::pipeline<thread_scope_block> |
|------|---|---|
| | • | dst and syncObj.state are .shared::cta |
| | • | src is .global |
| Then | • | bar = syncObj.state.barArray + syncObj.head |
| | • | cp.async.bulk.mbarrier.shared::cta.global [bar], [dst], [src], shape.value; |
| | • | syncObj.txCnt += shape.value; |
| | • | return info_async_fully |

| When | • | SyncT is cuda::pipeline<thread_scope_cluster> |
|------|---|---|
| | • | dst is .shared::cta |
| | • | src is .global |
| Then | • | bar = syncObj.state.barArray + syncObj.head |
| | • | cp.async.bulk.mbarrier.shared::cta.global [bar], [dst], [src], shape.value; |
| | • | syncObj.txCnt[ self_cta_rank ] += shape.value; |
| | • | return info_async_fully |

| When | • | SyncT is cuda::pipeline<thread_scope_cluster> |
|------|---|---|
| | • | dst is .shared::cluster |
| | • | src is .global |
| | • | is CTA_CGA |
| Then | • | rank = get_dsmem_rank( dst ) |
| | • | bar = map_dsmem_rank( syncObj.state.barArray + syncObj.head , rank ) |
| | • | cp.async.bulk.mbarrier.shared::cluster.global [bar], [dst], [src], shape.value; |
| | • | syncObj.txCnt[ rank ] += shape.value; |
| | • | return info_async_fully |

| When | • | SyncT is cuda::pipeline<thread_scope_cluster> |
|------|---|---|
| | • | dst is .shared::cluster |
| | • | src is .shared::cta |
| | • | is CTA_CGA |
| Then | • | syncObj.bulkFlag = commit \| read |
| | • | rank = get_dsmem_rank( dst ) |
| | • | bar = map_dsmem_rank( syncObj.state.barArray + syncObj.head , rank ) |
| | • | cp.async.bulk.mbarrier.shared::cluster.shared::cta [bar], [dst], [src], shape.value; |
| | • | syncObj.txCnt[ rank ] += shape.value; |
| | • | return info_async_fully |

In at least one embodiment, with respect to a unicast inplace transform with automatic transaction accounting API (e.g., asynchronous reduction API 234 of FIG. 2), in order to utilize cp.red.OP.async.bulk (UBLKRED) instruction, inplace_transform_n_async is to be invoked with right destination, source, shape, binary operator (e.g., that indicates a particular type of reduction operation to be performed), and synchronization object. In at least one embodiment, when not invoked with right arguments, an implementation of inplace_transform_n_async provides a fallback that uses other mechanisms to fulfill functional contract.

In at least one embodiment, one or more aspects of a unicast inplace transform with automatic transaction accounting API can be represented as follows:

```
template< class T, class BinaryOp, class SyncT >
info_async_utilization
inplace_transform_n_async( T*dst, const T*src, const
    aligned_size_t<16> shape, BinaryOp OP, SyncT & syncObj );
template< class DstT, class DstP, class SrcT, class SrcP, class
BinaryOp, class SyncT >
info_async_utilization
inplace_transform_n_async( annotated_ptr<DstT,DstP> dst,
    annotated_ptr<SrcT,SrcP> src,
    const aligned_size_t<16> shape,
    BinaryOp OP, SyncT & syncObj );
```

In at least one embodiment, unicast inplace transform with automatic transaction accounting API, as represented above, expects dst, src, and shape to satisfy aligned_size_t<16> contract for 16-byte aligned pointers and length. In at least one embodiment, dst is a pointer to global, shared::cta, or shared::cluster memory spaces in one of following "when/then" clauses. In at least one embodiment, src is a pointer to global or shared::cta memory spaces in one of following "when/then" clauses. In at least one embodiment, OP is an operator function object denoting dst[i]=OP(dst[i],src[i]) operation to be performed. In at least one embodiment, syncObj is one of synchronization objects in one of following "when/then" clauses. In at least one embodiment, one or more effects of unicast inplace transform with automatic transaction accounting API are to cause dst[i]=OP(dst[i], src[i]) for all 'i' in range defined by shape and syncObj to be updated as per {T, OP} supported by cp.red.OP.async.bulk (UBLKRED) and as per one of following "when/then" clauses. In at least one embodiment, if no "when/then" clause is applicable, a fallback is used. In at least one embodiment, OP of min and max are CUDA specific operator function object.

In at least one embodiment, one or more of following "when/then" clauses can be used to further illustrate unicast inplace transform with automatic transaction accounting API, as represented above.

| When | • | SyncT is cuda::pipeline<thread_scope_thread> |
| | • | dst is .global |
| | • | src is .shared::cta |
| Then | • | pipe.bulkFlag = commit ǀ read ǀ write |
| | • | cp.red.OP.async.bulk.global.shared::cta.TYPE [dst], [src], shape.value; |
| | • | return info_async_fully |

| When | • | SyncT is cuda::barrier<thread_scope_block> |
| | • | dst and syncObj are .shared::cluster and have same cta_rank |
| | • | src is .shared::cta |
| | • | is CTA_CGA |
| Then | • | cp.red.OP.async.bulk.mbarrier.shared::cluster.shared::cta.TYPE [&bar], [dst], [src], shape.value; |
| | • | mbarrier.expect_tx.shared::cluster [&bar], shape.value; |

| When | • | SyncT is cuda::pipeline<thread_scope_cluster> |
| | • | dst is .shared::cluster |
| | • | src is .shared::cta |
| | • | is CTA_CGA |
| Then | • | syncObj.bulkFlag = commit ǀ read |
| | • | rank = get_dsmem_rank( dst ) |
| | • | bar = map_dsmem_rank( syncObj.state.barArray + syncObj.head , rank ) |
| | • | cp.red.OP.async.bulk.mbarrier.shared::cluster.shared::cta.TYPE [bar], [dst], [src], shape.value; |
| | • | syncObj.txCnt[ rank ] += shape.value; |
| | • | return info_async_fully |

In at least one embodiment, with respect to unicast copy with manual transaction accounting, in order to utilize cp.async.bulk (UBLKCP) instruction, memcpy_async_tx is to be invoked with right destination, source, shape, and synchronization object. In at least one embodiment, when not invoked with right arguments, an implementation of memcpy_async_tx provides a fallback that uses other mechanisms, such as load/store (LD/ST) operations, to fulfill 'memcpy' functional contract. In at least one embodiment, a fallback syncObj functionally supports manual transaction accounting.

In at least one embodiment, one or more aspects of a unicast copy with manual transaction accounting API can be represented as follows:

```
template< class SyncT >
info_async_utilization
memcpy_async_tx( void * dst, const void * src,
    const aligned_size_t<16> shape, SyncT & syncObj );
template< class DstT, class DstP, class SrcT, class SrcP, class SyncT >
info_async_utilization
memcpy_async_tx( annotated_ptr<DstT,DstP> dst,
    annotated ptr<SrcT,SrcP> src,
    const aligned_size_t<16> shape, SyncT & syncObj );
```

In at least one embodiment, unicast copy with manual transaction accounting API, as represented above, expects dst, src, and shape to satisfy aligned_size_t<16> contract for 16-byte aligned pointers and length. In at least one embodiment, dst is a pointer to shared::cta or shared::cluster memory spaces in one of following "when/then" clauses. In at least one embodiment, src is a pointer to global or shared::cta memory spaces in one of following "when/then" clauses. In at least one embodiment, syncObj is one of synchronization objects in one of following "when/then" clauses. In at least one embodiment, one or more effects of unicast copy with manual transaction accounting API are to cause shape.value bytes to be copied from src to dst and syncObj to be updated as per one of following "when/then" clauses. In at least one embodiment, if no "when/then" clause is applicable, a fallback is used.

In at least one embodiment, one or more of following "when/then" clauses can be used to further illustrate unicast copy with manual transaction accounting API, as represented above.

| When | • | SyncT is cuda::barrier<thread_scope_block> |
| | • | dst and syncObj are .shared::cta |
| | • | src is .global |
| Then | • | cp.async.bulk.mbarrier.shared::cta.global [&syncObj], [dst], [src], shape.value; |
| | • | return info_async_fully |

| When | • | SyncT is cuda::barrier<thread_scope_block> |
| | • | dst and syncObj are .shared::cluster and same cta_rank |
| | • | src is .global |
| | • | is CTA_CGA |
| Then | • | cp.async.bulk.mbarrier.shared::cluster.global [&syncObj], [dst], [src], shape.value; |
| | • | return info_async_fully |

| When | • | SyncT is cuda::barrier<thread_scope_block> |
| | • | dst and syncObj are .shared::cluster and same cta_rank |

-continued

| | • | src is .shared::cta |
| | • | is CTA_CGA |
| Then | • | cp.async.bulk.mbarrier.shared::cluster.shared::cta [&syncObj], [dst], [src], shape.value; |
| | • | return info_async_fully |

| When | • | SyncT is cuda::pipeline_tx<thread_scope_block> |
| | • | dst and syncObj.state are .shared::cta |
| | • | src is .global |
| Then | • | bar = syncObj.state.barArray + syncObj.head |
| | • | cp.async.bulk.mbarrier.shared::cta.global [bar], [dst], [src], shape.value; |
| | • | return info_async_fully |

| When | • | SyncT is cuda::pipeline_tx<thread_scope_cluster> |
| | • | dst is .shared::cta |
| | • | src is .global |
| Then | • | bar = syncObj.state.barArray + syncObj.head |
| | • | cp.async.bulk.mbarrier.shared::cta.global [bar], [dst], [src], shape.value; |
| | • | return info_async_fully |

| When | • | SyncT is cuda::pipeline_tx<thread_scope_cluster> |
| | • | dst is .shared::cluster |
| | • | src is .shared::cta |
| | • | is CTA_CGA |
| Then | • | syncObj.bulkFlag = commit | read |
| | • | rank = get_dsmem_rank( dst ) |
| | • | bar = map_dsmem_rank( syncObj.state.barArray + syncObj.head , rank ) |
| | • | cp.async.bulk.mbarrier.shared::cluster.shared::cta [bar], [dst], [src], shape.value; |
| | • | return info_async_fully |

In at least one embodiment, one or more aspects of a unicast inplace transform with manual transaction accounting API can be represented as follows:

```
template< class T, class BinaryOp, class SyncT >
info_async_utilization
inplace_transform_n_async_tx( T*dst, const T*src, const
    aligned_size_t<16> shape, BinaryOp OP, SyncT & syncObj );
template< class DstT, class DstP, class SrcT, class SrcP, class
BinaryOp, class SyncT >
info_async_utilization
inplace_transform_n_async_tx( annotated_ptr<DstT,DstP> dst,
    annotated_ptr<SrcT,SrcP> src,
    const aligned_size_t<16> shape,
    BinaryOp OP, SyncT & syncObj );
```

In at least one embodiment, unicast inplace transform with manual transaction accounting API (e.g., asynchronous reduction with manual tracking API 236 of FIG. 2), as represented above with respect to inplace_transform_n_async_tx( ), expects dst, src, and shape to satisfy aligned_size_t<16> contract for 16-byte aligned pointers and length. In at least one embodiment, dst is a pointers to global, shared::cta, or shared::cluster memory spaces in one of following "when/then" clauses. In at least one embodiment, src is a pointer to global or shared::cta memory spaces in one of following "when/then" clauses. In at least one embodiment, OP is an operator function object denoting dst[i]=OP (dst[i],src[i]) operation to be performed. In at least one embodiment, syncObj is one of synchronization objects in one of following "when/then" clauses. In at least one embodiment, one or more effects of unicast inplace transform with manual transaction accounting API are to cause dst[i]=OP(dst[i], src[i]) for all 'i' in range defined by shape and syncObj to be updated as per {T, OP} supported by cp.red.OP.async.bulk (UBLKRED) and as per one of following "when/then" clauses. In at least one embodiment, if no "when/then" clause is applicable, a fallback is used. In at least one embodiment, OP of min and max are CUDA specific operator function object.

In at least one embodiment, one or more of following "when/then" clauses can be used to further illustrate unicast inplace transform with manual accounting API, as represented above.

```
When  •   SyncT is cuda::barrier<thread_scope_block>
      •   dst and syncObj are .shared::cluster and same cta_rank
      •   src is .shared::cta
      •   is CTA_CGA
Then  •   cp.red.OP.async.bulk.mbarrier.shared::cluster.shared::cta.TYPE [&syncObj],
          [dst], [src], shape.value;
      •   return info_async_fully
```

```
When  •   SyncT is cuda::pipeline_tx<thread_scope_cluster>
      •   dst is .shared::cluster
      •   src is .shared::cta
      •   is CTA_CGA
Then  •   syncObj.bulkFlag = commit | read
      •   rank = get_dsmem_rank( dst )
      •   bar = map_dsmem_rank( syncObj.state.barArray + syncObj.head , rank )
      •   cp.red.OP.async.bulk.mbarrier.shared::cluster.shared::cta.TYPE [bar], [dst],
          [src], shape.value;
      •   return info_async_fully
```

In at least one embodiment, a multicast pointer can be described as follows:

```
template< class T >
class cluster_multicast_ptr {
private:
    unsigned ptr, mask ; /* exposition */
    template<class T>
    cluster_multicast_ptr( T*pointer, unsigned
    cluster_block_rank_mask );
    friend class cluster group ;
};
template<class T>
cluster_multicast_ptr<T>
cluster_group::map_shared_cluster(T*pointer, unsigned
cluster_block_rank_mask ) const;
```

In at least one embodiment, with respect to multicast pointer as represented above, cluster_block_rank_mask identifies cta ranks within Cluster. In at least one embodiment, multicast pointer is .shared::cluster and valid in each identified cta in cta_rank_mask.

In at least one embodiment, one or more aspects of a multicast with automatic transaction accounting API (e.g., asynchronous multicast copy API 236 of FIG. 2) that uses a barrier can be represented as follows:

```
template< class T, class SyncT >
info_async utilization
memcpy_async( cluster_multicast_ptr<T> dst,
```

-continued

```
    const T * src, const aligned_size_t<16> shape,
        const cluster_multicast_ptr<barrier<thread_scope_block> > &
syncObj );
    template< class T, class SrcT, class SrcP, class SyncT >
    info_async_utilization
    memcpy_async( cluster multicast_ptr<T> dst,
        annotated_ptr<SrcT,SrcP> src,
        const aligned_size_t<16> shape,
        const cluster_multicast_ptr<barrier<thread_scope_block> > &
syncObj );
```

In at least one embodiment, following "when/then" clause can be used to further illustrate multicast with automatic transaction accounting API that uses a barrier, as represented above.

```
When  •   src is .global
      •   dst.mask == syncObj.mask
Then  •   cp.async.bulk.multicast.mbarrier.shared::cluster.global
          [syncObj.ptr], [dst.ptr], [src], syncObj.mask, shape.value;
      •   for each CTA_rank in syncObj.mask
          ○  b = map_dsmem_rank( syncObj.bar , CTA_rank );
          ○  mbarrier.tx.shared::cluster [b], shape.value;
```

In at least one embodiment, one or more aspects of a multicast with automatic transaction accounting API (e.g., asynchronous multicast copy API 238 of FIG. 2) that uses a pipeline can be represented as follows:

```
template< class T, class SyncT >
info_async_utilization
memcpy_async( cluster_multicast_ptr<T> dst,
    const T * src, const aligned size t<16> shape,
    pipeline<thread_scope_cluster> & syncObj );
template< class T, class SrcT, class SrcP >
info_async_utilization
memcpy_async( cluster_multicast_ptr<T> dst,
    annotated_ptr<SrcT,SrcP> src,
    const aligned_size_t<16> shape,
    pipeline<thread_scope_cluster> & syncObj );
```

49

In at least one embodiment, following "when/then" clause can be used to further illustrate multicast with automatic transaction accounting API that uses a pipeline, as represented above.

```
When  •  src is .global
Then  •  bar = syncObj.barArray + syncObj.head
      •  cp.async.bulk.multicast.mbarrier.shared.global [bar], [dst.ptr],
         [src], dst.mask, shape.value;
      •  for each CTA_rank in dst.mask
           ○  syncObj.txCnt[ CTA_rank ] += shape.value;
```

In at least one embodiment, one or more aspects of a multicast with manual transaction accounting API that uses a barrier can be represented as follows:

```
template< class T, class SyncT >
info_async_utilization
memcpy_async_tx( cluster_multicast_ptr<T> dst,
    const T * src, const aligned_size_t<16> shape,
    const cluster_multicast_ptr<barrier<thread_scope_block> >
&syncObj );
    template< class T, class SrcT, class SrcP, class SyncT >
info_async_utilization
memcpy_async_tx( cluster_multicast_ptr<T> dst,
    annotated_ptr<SrcT,SrcP> src,
    const aligned_size_t<16> shape,
    const cluster_multicast_ptr<barrier<thread_scope_block> > &
syncObj );
```

In at least one embodiment, following "when/then" clause can be used to further illustrate multicast with manual transaction accounting API that uses a barrier, as represented above.

```
When   •  src is .global
       •  dst.mask == syncObj.mask
Then   •  cp.async.bulk.multicast.mbarrier.shared::cluster.global
          [syncObj.ptr], [dst.ptr], [src], syncObj.mask, shape.value;
       •  return shape.value;
```

In at least one embodiment, one or more aspects of a multicast with manual transaction accounting API that uses a pipeline can be represented as follows:

```
template< class T, class SyncT >
info_async_utilization
memcpy_async_tx( cluster_multicast_ptr<T> dst,
    const T * src,
    const aligned_size_t<16> shape,
    pipeline_tx<thread_scope_cluster> & syncObj );
template< class T, class SrcT, class SrcP >
info_async_utilization
memcpy_async_tx( cluster_multicast_ptr<T> dst,
    annotated_ptr<SrcT,SrcP> src,
    const aligned_size_t<16> shape,
    pipeline<thread_scope_cluster> & syncObj );
```

In at least one embodiment, following "when/then" clause can be used to further illustrate multicast with manual transaction accounting API that uses a pipeline, as represented above.

```
When  •  src is .global
Then  •  bar = syncObj.barArray + syncObj.head
      •  cp.async.bulk.multicast.mbarrier.shared::cluster.global [bar],
```

50

-continued

```
         [dst.ptr], [src], dst.mask, shape.value;
      •  return shape.value;
```

In at least one embodiment, one or more barrier APIs (e.g., CUDA barrier APIs) leverage a synchronization unit (e.g., SyncUnit) and are used in synchronizing one or more asynchronous updates of shared memory. In at least one embodiment, with respect to using a barrier with automatic accounting, automatically accounted asynchronous copy and copy-with-update operations can be submitted to a barrier<thread_scope_block> residing in shared memory. In at least one embodiment, barrier is specified to asynchronous operation by 'syncObj' argument. In at least one embodiment, these asynchronous operations have destination(s) in shared memory.

In at least one embodiment, an asynchronous operation occurs during a current barrier phase when (1) a successful barrier wait for previous phase happens before asynchronous operation is submitted and (2) submission of asynchronous operation happens before an arrive operation for current barrier phase. In at least one embodiment, completion of asynchronous operations submitted during current barrier phase happens before a successful barrier wait operation for current phase. In at least one embodiment, a successful wait for previous barrier phase happens before submission of asynchronous operation to current barrier phase, which happens before barrier arrive operation for current barrier phase. In at least one embodiment, an asynchronous operation completion happens before successful wait operation for current barrier phase.

In at least one embodiment, with respect to using a barrier with manual accounting, manually accounted asynchronous operations can be submitted in same manner as automatic accounting asynchronous operations. In at least one embodiment, however, manual accounting uses an additional operation that submits one or more expected transaction counts that equal asynchronous operation's actual transaction count during current barrier phase. In at least one embodiment, an aspect of manual transaction accounting (e.g., a transaction balancing equation such as can be used by synchronization hardware such as synchronization H/W 226 of FIG. 2) can be represented as:

$$0=\Sigma_j\text{threadExpectedTransactionCount}_{j}-\Sigma_K\text{asyncOpCompletionTransactionCount}_K$$

In at least one embodiment, an expected transaction count may be submitted as part of an arrive operation, using either token-returning arrive_tx member function or barrier_arrive_tx non-member function.

In at least one embodiment, a barrier arrive with manual transaction accounting API can be represented as follows:

```
barrier<thread_scope_block>::arrival token
barrier<thread_scope_block>::arrive_tx( ptrdiff_t
    arrive_count_update, ptrdiff_t transaction_count_update
);
    void_barrier_arrive_tx( barrier<thread_scope_block> & bar,
    ptrdiff_t arrive_count_update,
    ptrdiff_t transaction_count_update );
```

In at least one embodiment, a successful wait for previous barrier phase happens before submission of asynchronous operation to current barrier phase, which happens before barrier arrive operation and balancing expected transaction update operation for current barrier phase. In at least one embodiment, asynchronous operation completion happens before successful wait operation for current barrier phase.

In at least one embodiment, one or more pipeline APIs (e.g., CUDA pipeline APIs) leverage a synchronization unit (e.g., SyncUnit) and are used in synchronizing one or more asynchronous operations. In at least one embodiment, with respect to using a pipeline with automatic accounting, and a consumer wait for update completion, automatically accounted asynchronous copy and copy-with-update operations can be submitted to a pipeline. In at least one embodiment, pipeline is specified to asynchronous operation by 'syncObj' argument. In at least one embodiment, a pipeline producer_acquire operation is sequenced before submission of an asynchronous operation, and submission of asynchronous operation is sequenced before a pipeline producer_commit. In at least one embodiment, completion of asynchronous operations submitted during current pipeline phase happens before a pipeline consumer_wait for current phase.

In at least one embodiment, a producer_acquire( ) is sequenced before submission of asynchronous operations, which are sequenced before producer_commit( ). In at least one embodiment, an synchronous operation completion happens before consumer_wait( ), which is sequenced before consumer_release( ).

In at least one embodiment, with respect to a wait for shared memory destination update, asynchronous operations with destination in shared memory are submitted to a pipeline<thread_scope_block> or pipeline<thread_scope_cluster>. In at least one embodiment, these pipelines use an array of barrier<thread_scope_block> to wait for update completion. In at least one embodiment, with respect to a wait for global memory destination update, asynchronous operations with destination in global memory are submitted to a pipeline<thread_scope_thread>.

In at least one embodiment, a producer_commit can be represented as follows:

void        pipeline<thread_scope_thread>::producer_
       commit( );

In at least one embodiment, when an asynchronous operation using UBLKCP or UBLKRED with a destination in global memory is submitted to a pipeline, pipeline's bulk-commit-required flag is set. In at least one embodiment, producer_commit operation checks this flag, if set it commits operation and clears flag. In at least one embodiment, this can be represented as follows:

```
if ( this->bulkFlag.commit ) then
    cp.async.bulk.commit
    this->bulkFlag.commit = 0
```

In at least one embodiment, a consumer_wait can be represented as follows:

void pipeline<thread_scope_thread>::consumer_wait( );

In at least one embodiment, when an asynchronous operation using UBLKCP or UBLKRED with a destination in global memory is submitted to a pipeline, pipeline's bulk-commit-write flag is set. In at least one embodiment, consumer_wait operation checks this flag, if set it blocks until write is complete and clears flag. In at least one embodiment, this can be represented as follows:

```
if ( this->bulkFlag.writeGlobal ) then
    cp.async.bulk.wait.write
    this->bulkFlag.writeGlobal = 0
```

In at least one embodiment, with respect to a pipeline with manual accounting and consumer_wait for update completion, manually accounted asynchronous operations can be submitted in a similar manner as automatic accounting asynchronous operations. In at least one embodiment, however, manual accounting (1) uses pipeline_tx variant of pipeline which (2) moves expected transaction count balancing to a single consumer operation. In at least one embodiment, an aspect of manual transaction accounting can be represented as:

$$0 = \text{expectedTransactionCount} - \Sigma_K \text{asyncOpCompletionTransactionCount}_K$$

In at least one embodiment, manual transaction accounting is available for updates to shared memory submitted to a pipeline_tx<thread_scope_block> or pipeline_tx<thread_scope_cluster>. In at least one embodiment, a producer_acquire( ) is sequenced before submission of asynchronous operations. In at least one embodiment, a single consumer commit(expectedTransactionCount) and asynchronous operation completion happens before consumer_wait( ), which is sequenced before consumer_release( ).

In at least one embodiment, with respect to pipeline and producer wait for read completion, when a source of asynchronous operations submitted to a pipeline is in shared memory, producer_acquire operation blocks until read of previously submitted operations have completed. In at least one embodiment, a producer_commit for thread_scope_thread can be represented as follows:

void        pipeline<thread_scope_thread>::producer_
       commit( ); // shared to global In at least one embodiment, a producer_commit for thread_scope_cluster can be represented as follows:

void        pipeline<thread_scope_cluster>::producer_
       commit( ); // shared to peer_shared In at least one embodiment, when an asynchronous operation using UBLKCP or UBLKRED with a source in shared memory is submitted to a pipeline, pipeline's bulk-commit-required flag is set. In at least one embodiment, producer_commit operation checks this flag, if set it commits operation and clears flag. In at least one embodiment, this can be represented as follows:

```
if ( this->bulkFlag.commit ) then
    cp.async.bulk.commit
    this->bulkFlag.commit = 0
```

In at least one embodiment, a producer_acquire for thread_scope_thread can be represented as follows:

void        pipeline<thread_scope_thread>::producer_
       acquire( );

In at least one embodiment, a producer_acquire for thread_scope_cluster can be represented as follows:

void        pipeline<thread_scope_cluster>::producer_
       acquire( );

In at least one embodiment, when an asynchronous operation using UBLKCP or UBLKRED with a source in shared memory is submitted to a pipeline, pipeline's bulk-commit-read flag is set. In at least one embodiment, producer_acquire operation checks this flag, if set it blocks until previous read is complete and clears flag. In at least one embodiment, this can be represented as follows:

```
if ( this->bulkFlag.read ) then
    cp.async.bulk.wait.read
    this->bulkFlag.read = 0
```

In at least one embodiment, with respect to error attribution, UBLK* instructions do not verify that a global memory address is within _isGlobal aperture or whether shared memory address has a valid CTA-of-Cluster rank. In at least one embodiment, ranges of destination and source memory are not verified. In at least one embodiment, a consequence is individual copy-and-update memory operations generated by TMA may contain invalid addresses causing a fault in MMU. In at least one embodiment, these operations may be generated well after original UBLK* instruction was issued to TMA, and not attributable to particular TMA submission responsible for error.

In at least one embodiment, one or more implementations of one or more APIs (e.g., a debug build of CUDA memcpy_async* and inplace_transform_n_async* function implementations) includes verification that begin and end of each memory range are in required memory space. In at least one embodiment, one or more implementations of one or more APIs includes verification that CTA-of-Cluster ranks are within Cluster size, both for shared memory addresses and multicast pointer masks. In at least one embodiment, one or more implementations of one or more APIs includes verification that shared memory destination and barrier have same CTA-of-Cluster rank. In at least one embodiment, a development tool (e.g., DevTools sanitizer) includes these verifications, and memory bounds checking for destination and source memory ranges.

In at least one embodiment, using tensor memory accelerator (TMA) (e.g., asynchronous data movement H/W 224 of FIG. 2) includes one or more of asynchronous data movement operations using TMA-Tensor instructions, TMA-Tensor descriptor management, and/or TMA-Tensor descriptor encoding. In at least one embodiment, a driver (e.g., one or more CUDA drivers) are to perform TMA-Descriptor encoding.

In at least one embodiment, with respect to passing Host to Device, a technique to pass TMA-Tensor descriptors from host code to device code for use by TMA unit is to pass them as a Grid Private Hard Constant Kernel Parameter (e.g., as _grid_constant_parameter). In at least one embodiment, TMA-Tensor descriptors may also be passed as constant objects. In at least one embodiment, TMA-Tensor descriptor encoding in CUDA Driver host code is for host memory which is copied to kernels through _constant_ objects or _grid_constant_ parameters.

In at least one embodiment, TMA-Tensor descriptor encodings target TMA functionality in one or more particular GPU architectures (e.g., NVIDIA GH100 architecture). In at least one embodiment, with respect to descriptor versioning, TMA descriptors support a version field. In at least one embodiment, TMA on one or more architectures will verify that value of that field is compatible with architecture. In at least one embodiment, with respect to architecture specialized encoding, CUDA Driver encoding functions query device architecture, encode TMA descriptors according to that architecture, or generate an error for unsupported architectures. In at least one embodiment, with respect to emulation, a TMA-Tensor operation in device code executing on an architecture without compatible TMA hardware provides a fallback implementation. In at least one embodiment, fallback uses a cooperating group of threads to perform fallback and meta-data for fallback code.

In at least one embodiment, one or more techniques are to encode TMA-Tensor descriptor in host memory using an API (e.g., a particular API of CUDA Driver API). In at least one embodiment, one or more techniques are to copy that TMA-Tensor descriptor to code that is to use descriptor (e.g., copy to a CUDA kernel through _constant_ object or as _grid_constant_parameter). In at least one embodiment, one or more techniques are to use _constant_ or _grid_constant_ copy of TMA-Tensor descriptor in TMA _device_ functions.

In at least one embodiment, one or more techniques are to encode and re-use TMA-Tensor descriptor. In at least one embodiment, one or more techniques are to encode TMA-Tensor descriptor in host memory using CUDA Driver API. In at least one embodiment, just prior to kernel launch, one or more techniques are to update device memory address within TMA-Tensor descriptor. In at least one embodiment, one or more techniques are to copy that TMA-Tensor descriptor to a CUDA kernel through _constant_ object or as _grid_constant_ parameter. In at least one embodiment, one or more techniques are to use _constant_ or _grid_constant_ copy of TMA-Tensor descriptor in TMA _device_ functions.

In at least one embodiment, with respect to opaque type and encoding, a TMA-Tensor descriptor has many packed bit-fields to define shape and mapping between tensors in global and shared memory. In at least one embodiment, one or more techniques us one or more opaque types and encoding operations for generating values of those types. In at least one embodiment, descriptor encoding results in a valid descriptor or returns an error.

In at least one embodiment, with respect to CUDA Driver target-architecture specific encoding, a TMA-Tensor descriptor has architecture dependent encodings. In at least one embodiment, architecture dependencies are managed through CUDA driver. In at least one embodiment, a TMA-Tensor descriptor is 64 bytes in size and 64 byte aligned.

In at least one embodiment, with respect to transaction accounting metadata, asynchronous data movement operations with automatic transaction accounting are used to automatically update a SyncUnit barrier with an expected transaction count value balancing asynchronous operation's actual transaction count update. In at least one embodiment, TMA-Tensor asynchronous operations update "N" bytes in distributed shared memory and update corresponding SyncUnit barriers with an actual transaction count of "N". In at least one embodiment, value "N" is non-trivially determinable from TMA-Tensor descriptor. In at least one embodiment, publicly exposed TMA-Tensor descriptor is increased in size to 128 bytes, bit-encoding also computes "N", and that value is stored in adjacent 64 bytes.

In at least one embodiment, with respect to updating address of global memory tensor in opaque type, one or more techniques are to update address of global memory tensor within TMA-Tensor descriptor. In at least one embodiment, descriptor encoding results in a valid descriptor or returns an error.

In at least one embodiment, an opaque data type for TMA descriptor is defined. In at least one embodiment, opaque data type is suitable to be passed host to device through _constant_ or _grid_ constant variables. In at least one embodiment, opaque data type object is compatible with use in device code TMA instructions. In at least one embodiment, encoding functions query device architecture and encode TMA descriptor accordingly. In at least one embodiment, opaque data type is sufficiently large to accommodate additional meta-data for usability and cross-architecture compatibility. In at least one embodiment, encoding functions include identified meta-data. In at least one embodiment, encoding functions observe and return error for invalid combination of input parameters.

In at least one embodiment, opaque data type is at least 64 byte aligned for correct use in device code TMA instructions, and is 128 bytes in size to accommodate both 64 byte (e.g., to be used on one or more architectures) TMA descriptor and an additional 64 bytes to hold current and future meta-data. In at least one embodiment TMA descriptor, also referred to as a tensor map (e.g., tensor map 118 of FIG. 1), can be further illustrated as follows:

generates a tensor descriptor, also referred to as a tensor map (e.g., tensor map 118 of FIG. 1) at *tensor_map, and returns CUresult (e.g., as response 602 of FIG. 6).

In at least one embodiment, one or more techniques are to query a device architecture, encode TMA-Tensor descriptor according to that architecture, and encode derived meta-data. In at least one embodiment, derived meta-data includes one or more of shared memory asynchronous data movement byte count and shared memory required alignment. In at least one embodiment, tiled descriptor type encoding for a particular architecture (e.g., NVIDIA GH100) can be further illustrated as follows:

```
struct cuTensorMap { alignas(64) uint64_t opaque[16]; }
enum cuTensorMapDataType {
  /* standard types */
  cuTensorMapDataType_uint8,
  cuTensorMapDataType_uint16,
  cuTensorMapDataType_uint32,
  cuTensorMapDataType_int32,
  cuTensorMapDataType_uint64,
  cuTensorMapDataType_int64,
  cuTensorMapDataType_float16,
  cuTensorMapDataType_float32,
  cuTensorMapDataType_float64,
  /* specialized types and treatments */
  cuTensorMapDataType_bfloat16,
  cuTensorMapDataType_float32ftz,     /* f32, GMEM RED ftz */
  cuTensorMapDataType_tfloat32,        /* GMEM f32, SMEM tf32 */
  cuTensorMapDataType_tfloat32ftz     /* GMEM f32, SMEM tf32, GMEM RED
ftz */
};
enum cuTensorMapInterleave {
  cuTensorMapInterleave_none,
  cuTensorMapInterleave_16B,
  cuTensorMapInterleave_32B };
enum cuTensorMapSwizzle {
  cuTensorMapSwizzle_none,
  cuTensorMapSwizzle_32B,
  cuTensorMapSwizzle_64B,
  cuTensorMapSwizzle_128B };
enum cuTensorMapFloatOOBfill {
  cuTensorMapFloatOOBfill_none,
  cuTensorMapFloatOOBfill_nan_request_zero_fma };
enum cuTensorMapL2promotion {
  cuTensorMapL2promotion_none,
  cuTensorMapL2promotion_L2_64B,
  cuTensorMapL2promotion_L2_128B,
  cuTensorMapL2promotion_L2_256B };
```

In at least one embodiment, an encode tiled descriptor type can be further illustrated as follows:

```
CUresult cuTensorMapEncodeTiled(
    struct cuTensorMap * tensor_map,
    cuTensorMapDataType    tensor_data_type,
    uint32_t                tensor_rank,
    void                    * global_address,
    const uint64_t          * global_dimensions,
    const uint64_t          * global_strides,
    const uint32_t          * box_dimensions,
    const uint32_t          * element_strides
    cuTensorMapInterleave   interleave,
    cuTensorMapSwizzle      swizzle,
    cuTensorMapL2promotion  l2promotion,
    cuTensorMapFloatOOBfill oobfill
    );
```

In at least one embodiment, cuTensorMapEncodeTiled( ), above, is an API (e.g., tensor map API 240 of FIG. 2) that Tiled Descriptor Type encoding for GH100

| Tensor Descriptor Field | Encoding |
|---|---|
| tensorGlobalAddress = | globalAddress |
| descriptorType = | tiled |
| version = | 0 |
| dimensionality = | Dim |
| format = | tensor_data_type |
| interleaved = | elemInterleaveSize == 32 ? interleaved_32B |
| | elemInterleaveSize == 16 ? interleaved_16B |
| | : disable |
| SMEMswizzleMode = | sharedSwizzle |
| OOBfillMode = | oobfill |
| F32toTF32 = | via tensor_data_type |
| L2sectorPromotion = | l2Promote |
| tensorStride[ k ] = | globalStride[ k ] , k = 0..Dim-2 |
| tensorSize[ k ] = | globalSize[ k ] , k = 0..Dim-1 |
| traversalStride[ k ] = | elemStride[ k ] , k = 0..Dim-1 |
| boxSize[ k ] = | boxSize[ k ] , k = 0..Dim-1 |

In at least one embodiment, an encode IM2COL descriptor type can be further illustrated as follows:

```
CUresult cuTensorMapEncodeIm2col(
    struct cuTensorMap * tensor_map,
    cuTensorMapDataType    tensor_data_type,
    uint32_t               tensor_rank,
    void                   * global_address,
    const uint64_t         * global_dimensions,
    const uint64_t         *global_strides,
    const int32_t          * pixelBoxLowerCorner, /* DHW dimensions */
    const int32_t          * pixelBoxUpperCorner,
    uint32_t               channelsPerPixel,
    uint32_t               pixelsPerColumn,
    const uint32_t         * element_strides,
    cuTensorMapInterleave    interleave,
    cuTensorMapSwizzle       swizzle,
    cuTensorMapL2promotion l2promotion,
    cuTensorMapFloatOOBfill oobfill
);
```

In at least one embodiment, cuTensorMapEncodeIm2col( ), above, is an API (e.g., image-to-column tensor map API 242 of FIG. 2) that generates a tensor descriptor, also referred to as a tensor map (e.g., tensor map 118 of FIG. 1) at *tensor_map, and returns CUresult (e.g., as response 702 of FIG. 7).

In at least one embodiment, one or more techniques are to query a device architecture, encode TMA-Tensor descriptor according to that architecture, and encode derived meta-data. In at least one embodiment, derived meta-data includes one or more of shared memory asynchronous data movement byte count and shared memory required alignment. In at least one embodiment, for IM2COL TMA-Tensor descriptors, a channel slice dimension is limited when combined with interleave mode. In at least one embodiment, TMA-Tensor descriptor encoding returns an error when this limit is violated. In at least one embodiment, IM2COL descriptor type encoding for a particular architecture (e.g., NVIDIA GH100) can be further illustrated as follows:

| IM2COL Descriptor Type encoding for GH100 | |
| --- | --- |
| Tensor Descriptor Field | Encoding |
| tensorGlobalAddress = | globalAddress |
| descriptorType = | im2col |
| version = | 0 |
| dimensionality = | Dim |
| format = | tensor_data_type |
| interleaved = | channelInterleave ? interleave_xxB : disable |
| SMEMswizzleMode = | sharedSwizzle |
| OOBfillMode = | oobfill |
| F32toTF32 = | tensor_data_type |
| tensorStride[ k ] = | globalStride[ k ] , k = 0..Dim-2 |
| tensorSize[ k ] = | globalSize[ k ] , k = 0..Dim-1 |
| traversalStride[ k ] = | elemStride[ k ] , k = 0..Dim-1 |
| rangeNDHW | pixelsPerColumn |
| rangeC | channelsPerPixel |
| boxBaseCornerDHW.D = | boxLowerOffset[0] |
| boxBaseCornerDHW.H = | boxLowerOffset[1] |
| boxBaseCornerDHW.W = | boxLowerOffset[2] |
| boxFarCornerDHW.D = | boxUpperOffset[0] |
| boxFarCornerDHW.H = | boxUpperOffset[1] |
| boxFarCornerDHW.W = | boxUpperOffset[2] |

In at least one embodiment, a replace global address API is to cause a global address in a tensor map (e.g., a tiled descriptor such as TMA-Tensor descriptor of tiled type, or an image to column descriptor such as TMA-Tensor descriptor of IM2COL type) to be replaced. In at least one embodiment, replace global address API (e.g., replace tensor address API 244 of FIG. 2) can be further illustrated with respect to following:

```
CUresult cuTensorMapReplaceAddress(
    struct cuTensorMap * tensor_map,
    void                  * global_address,
);
```

In at least one embodiment, given a previously correctly encoded cuTensorMap, replace global address API is to replace global address while retaining all other properties. In at least one embodiment, replace global address API is to re-verify encoding.

In at least one embodiment, one or more techniques are to use meta-data and/or TMA-Tensor descriptor derived attributes. In at least one embodiment, with respect to a shared memory buffer (Tensor) alignment, a shared memory buffer has an alignment derived from a swizzle mode used in TMA and associated MMA operations. In at least one embodiment, this alignment ensures that copy operations between global and shared memory have an address-independent result. In at least one embodiment, shared memory buffer alignment can be further illustrated as follows:

| Swizzle Mode | Required Shared Memory Alignment | Innermost dimension constraint of box |
| --- | --- | --- |
| swizzle_128B | 1024 bytes | max 128 bytes |
| swizzle_64B | 512 bytes | max 64 bytes |
| swizzle_32B | 256 bytes | max 32 bytes |
| disable | 16 bytes | no constraint |

In at least one embodiment, asynchronous data movement operations (e.g., either always or just in debug mode), verify that shared memory address has required alignment.

In at least one embodiment, with respect to a shared memory transaction size, a TMA operation which copies data to shared memory also updates a SyncUnit barrier transaction count by a value derived from TMA-Tensor descriptor. In at least one embodiment, asynchronous data movement operations with automatic transaction accounting query shared memory transaction byte count from TMA-Tensor descriptor meta data and update SyncUnit barriers' expected transaction counts accordingly.

In at least one embodiment, one or more techniques include asynchronous data movement operations using TMA-tensor instructions, TMA tensor descriptor management, and/or TMA tensor descriptor encoding. In at least one embodiment, with respect to cluster execution and distributed shared memory (DSMEM), TMA-tensor operations can target peer-CTA DSMEM within a cluster and thus use peer-CTAs that are active prior to issuing and through completion of these operations. In at least one embodiment, with respect to a SyncUnit, TMA-tensor operations with destination as DSMEM use transactions on SyncUnit barriers to synchronize operation completion. In at least one embodiment, one or more techniques are to pass TMA Descriptors from host code to device code in a grid private hard constant kernel parameter to be used by TMA unit.

In at least one embodiment, one or more techniques are to perform TMA descriptor generation in host or device code, and use in device code. In at least one embodiment, one or more techniques are to generate descriptor on host, pass to device, and use on device. In at least one embodiment, this approach is used for generating and using TMA descriptors within a kernel. In at least one embodiment, TMA descriptor is a member of a parameter structure that is encoded in host code and passed as a kernel argument to device code where it is used. In at least one embodiment, parameter struct is in global memory space. In at least one embodiment, this uses grid private hard constant kernel parameters to prevent kernel parameter value accessed by thread from being mapped and copied to a thread private (LMEM) variable.

In at least one embodiment, a kernel launch operation copies parameter value to device memory, and fences that parameter's memory range so that intended TMA descriptor value will be cached in TMA unit. In at least one embodiment, entire memory range is fenced because a TMA descriptor value could be located anywhere in that range. In at least one embodiment, this is further illustrated with respect to following:

```
_global_ void kernel_A( _grid_constant_CaskParamType parm )
{
   /* setup... */
   if ( elected )
      memcpy_async( shBuf, &(param.tensor_map), tensor_offset, bar );
}
void global_A( )
{
   CaskParamType param ;
   param.tensor_map = cuda::tensor_map<Dim>( ... config_args );
   kernel_A<<< ... >>>( param );
}
```

In at least one embodiment, one or more techniques are to generate descriptor on host, copy symbol to device, and use on device. In at least one embodiment, TMA descriptor is a member of a parameter structure that is encoded in host code and passed as a _constant_ object to device code where it is used. In at least one embodiment, a user (e.g., code of an application) is to copy (e.g., using cudaMemcpyToSymbol) parameter structure from host to device memory. In at least one embodiment, kernel launch fences that parameter's memory range so that intended TMA descriptor value will be cached in TMA unit. In at least one embodiment, entire memory range is fenced because a TMA descriptor value could be located anywhere in that range. In at least one embodiment, this is further illustrated with respect to following:

```
_constant_ CaskParamType devParam ;
_global_void kernel_B( )
{
   /* setup... */
   if ( elected )
      memcpy_async( shBuf, &(devParam.tensor_map),
         tensor_offset, bar);
}
void global_B( )
{
   CaskParamType param ;
   param.tensor_map = cuda::tensor_map<Dim>( ... config_args );
   cudaMemcpyToSymbol( devParam, ¶m, sizeof(CaskParamType) );
   kernel_B<<< ... >>>( );
}
```

In at least one embodiment, if _constant_ memory is not implicitly fenced such that any properly aligned portion of that memory could hold a TMA descriptor that is ready for access by TMA unit, then TMA descriptor memory fencing is performed in another manner. In at least one embodiment, one or more techniques are to perform memory fencing in cudaMemcpyToSymbol function since opaque-to-CUDA parameter could contain a TMA descriptor. In at least one embodiment, one or more techniques are to perform memory fencing during kernel launch for entire _constant_ memory range, as is done for GCC range invalidate of _constant_ memory range. In at least one embodiment, one or more techniques are to define and/or use a grid-versioned memory space in which TMA descriptors are allowed to reside in order to limit a size of implicit fencing. In at least one embodiment, one or more techniques are to perform explicit fencing of TMA descriptor memory region.

In at least one embodiment, one or more techniques are to generate a descriptor on host, copy and fence to device, and use on device. In at least one embodiment, TMA descriptor is a member of a parameter structure that is encoded in host code and passed using cudaMemcpy to device code where it is used. In at least one embodiment, a user (e.g., application code) explicitly fences a memory range containing TMA descriptor. In at least one embodiment, this fence operation is performed in host code after memory containing a TMA descriptor has been copied to device memory. In at least one embodiment, fence operation enables any kernel launched after fence operation to use TMA descriptor. In at least one embodiment, kernel launch operation effectively applies this fence operation to entire grid private hard constant memory. In at least one embodiment, this can be further illustrated with respect to following:

```
_global_ void kernel_C( const CaskParamType * param )
{
   /* setup... */
   if ( elected )
      memcpy_async( shBuf, &(param->tensor_map),
         tensor_offset, bar );
}
void global_C( )
{
   CaskParamType param ;
   param.tensor_map = cuda::tensor_map<Dim>( ... config_args );
   CaskParamType * devParam ;
   cudaMalloc( &devParam sizeof(CaskParamType) );
   cudaMemcpy( &devParam, ¶m, sizeof(CaskParam),
         cudaMemcpyHostToDevice);
   /* Fence updated tensor map memory for visibility by threads in grid.
    * Internally: Null QMD for GCC range-invalidate of memory.
    * Done in same stream as user kernel or
    * user's kernel synchronizes with fencing stream prior
    * to kernel execution.
    */
   cudaStreamFenceConstant( stream, &(devParam->tensor_map) );
   kernel_A<<< ... , stream >>>( devParam );
}
```

In at least one embodiment, if _constant_ object memory is not implicitly fenced, then this fencing operation is also applied in previous _constant_ memory use case.

In at least one embodiment, one or more techniques are to generate descriptor on device, fence on device, and use on device. In at least one embodiment, TMA descriptor is generated by a CUDA thread in any properly aligned and managed device memory, and used by any CUDA thread which synchronizes with generating CUDA thread. In at least one embodiment, user (e.g., application code) explicitly release-fences TMA descriptor memory after generation and acquire-fences TMA descriptor memory before use. In at least one embodiment, generating thread is to generate TMA descriptor and release-fence. In at least one embodiment, generating thread is to synchronize-with using thread. In at least one embodiment, using thread is to acquire-fence and use TMA descriptor. In at least one embodiment, this can be further illustrated with respect to following:

```
__device__ cuda::tensor_map<Dim> devTensorMap ;
__global__ void kernel_C( )
{
    /* ... setup ... */
    if( is_setupthread( threadIdx , blockIdx ) ) {
            devTensorMap = cuda::tensor_map<Dim>( ... config_args );
            atomic_thread_fence( memory_order_release,
                    memory_proxy_constant,
                    devTensorMap );
    /* MEMBAR.GL, push visibility of update to L2
    * so that GCC fetch will see that value */
    }
    /* Generating synchronizes-with using thread */
    // __syncthreads( );
    // this_grid.sync( );
    if ( elected )
        atomic_thread_fence( memory_order_acquire,
                    memory_proxy_constant,
                    devTensorMap );
            /* UTMACCTL.IV, make sure local TMA-cache and GCC
            * are invalidated and will fetch updated value */
    if ( elected ) memcpy_async( shBuf, &devTensorMap, tensor_offset, bar );
}
```

In at least one embodiment, generating thread is to perform a MEMBAR.GL to push updated TMA descriptor memory into L2. In at least one embodiment, then 'N' using threads perform a UTMACCTL.IV to ensure updated value is fetched to GCC and TMA cache.

In at least one embodiment, with respect to TMA-tensor unicast operations, TMA-tensor operations are exposed for one or more of unicast (point-to-point) of GMEM to SMEM, SMEM to DSMEM, GMEM to L2 (prefetch), and/or other sources and/or destinations. In at least one embodiment, with respect to TMA-tensor multicast operation TMA-tensor operations are exposed for multicast of GMEM to multiple DSMEM within a Cluster.

In at least one embodiment, with respect to TMA-tensor descriptor memory and cache management, TMA descriptor cache is a component within const-cache hierarchy. In at least one embodiment, TMA cache coherency is managed to prevent stale TMA tensor descriptors from being used in TMA instructions and enable their prefetch into const-cache hierarchy. In at least one embodiment, with respect to TMA-tensor descriptor opaque type and encoding, a TMA descriptor has many packed bit-fields to define shape and mapping between tensors in global and shared memory. In at least one embodiment, one or more techniques are to define and/or use one or more opaque types and encoding operations for generating values of those types. In at least one embodiment, descriptor encoding results in a valid descriptor or generates and error.

In at least one embodiment, with respect to TMA-tensor operation transaction accounting, a TMA-tensor operation with DSMEM destination updates a SyncUnit barrier transaction count by a value derived from tensor-descriptor. In at least one embodiment, one or more techniques are to provide and/or use this derived value for automatic and/or manual transaction accounting.

In at least one embodiment, with respect to TMA load out-of-bounds (OOB) fill not-a-number (NAN) observation, TMA load global to shared has option to fill out-of-bounds (OOB) floating point values with a particular NAN value that indicates intent for subsequent FMA operations with value to result in zero and not propagate a NAN value. In at least one embodiment, kernel code is able to observe whether a floating point value is equal to particular NAN value.

In at least one embodiment, with respect to write and optional read synchronization, TMA-tensor operations writing to DSMEM update SyncUnit transaction barriers with a transaction count. In at least one embodiment, waiting for barrier phase completion includes waiting for asynchronous writes to DSMEM. In at least one embodiment, these operations have either automatic or manual transaction accounting exposures with either CUDA barrier or CUDA pipeline.

In at least one embodiment, TMA-tensor operations writing to GMEM do not use SyncUnit barriers. In at least one embodiment, waiting for GMEM write completion via scoreboard and cache invalidation is supported with CUDA pipeline. In at least one embodiment, TMA-tensor operations reading from SMEM can wait for read completion via scoreboard and is supported with CUDA pipeline.

In at least one embodiment, one or more APIs (e.g., CUDA APIs for TMA-tensor data movement operations) are implemented with inline intermediate code (e.g., PTX) which lower to one or more assembly level (e.g., SASS) instructions. In at least one embodiment, with respect to tensor descriptor cache management, TMA unit accesses its descriptors through const-cache hierarchy, in particular GMEM to L2 to GCC to TMA-cache. In at least one embodiment, GCC and TMA-cache are not automatically consistent, and/or synchronization actions are used to guarantee values are not stale in GCC or TMA-cache.

In at least one embodiment, with respect to implicit synchronization, prior to a kernel's CTA being scheduled on an SM, TMA-cache is automatically invalidated by hardware's "task bind" operation. In at least one embodiment, when a descriptor resides in address range associated with a kernel's const-bank prior to kernel launch, and that GCC range is automatically invalidated at kernel launch, then GCC and TMA-cache are guaranteed to be consistent with descriptor value. In at least one embodiment, kernel launch automatic/implicit synchronization (cache invalidation) of GCC and TMA-cache are concurrent, and/or there is no guarantee which invalidation happens before other.

In at least one embodiment, with respect to explicit synchronization, when a descriptor value is not implicitly synchronized, then explicit synchronization operations are performed either from host code prior to kernel launch or from device code during kernel execution.

472504In at least one embodiment, one or more APIs and/or techniques are to use and/or be implemented using one or more PTX instructions. In at least one embodiment, identification of SMEM vs. DSMEM is via a qualifier on .shared memory space. In at least one embodiment, ".shared::cta" isSMEM in issuing thread's block. In at least one embodiment, ".shared::cluster" is DSMEM in issuing thread's Cluster.

In at least one embodiment, with respect to async-copy using tensor descriptor, a PTX instruction to perform an asynchronous dopy from global to block shared memory can be further illustrated as follows:

cp.async.bulk.tensor.dim.mbarrier.shared::block.global [dstBarPtr], [dstDataPtr], [srcPtr], coord;

In at least one embodiment, with respect to async-copy using IM2COL tensor descriptor, a PTX instruction to perform an asynchronous dopy from global to block shared memory can be further illustrated as follows:

cp.async.bulk.tensor.dim.im2col.mbarrier.shared:: block.global [dstBarPtr], [dstDataPtr], [srcPtr], coord, i2cOff;

In at least one embodiment, with respect to async-copy using tensor descriptor, a PTX instruction to perform an asynchronous copy from global to cluster shared memory can be further illustrated as follows:

cp.async.bulk.tensor.dim.mbarrier.shared::cluster.global [dstBarPtr], [dstDataPtr], [srcPtr], coord;

In at least one embodiment, with respect to async-copy using IM2COL tensor descriptor, a PTX instruction to perform an asynchronous copy from global to cluster shared memory can be further illustrated as follows:

cp.async.bulk.tensor.dim.im2col.mbarrier.shared:: cluster.global [dstBarPtr], [dstDataPtr], [srcPtr], coord, i2cOff;

In at least one embodiment, one or more of previous four async-copy PTX instructions shown above use 16 byte alignment of destination memory and source tensor descriptor. In at least one embodiment, for .shared::cta, PTX instructions are to use a destination barrier and data in submitting thread's CTA. In at least one embodiment, for .shared::cluster, PTX instructions are to use barrier and data in same CTA within submitting thread's Cluster.

In at least one embodiment, with respect to async-copy using tensor descriptor, a PTX instruction to perform an asynchronous copy from global to multicast cluster shared memory can be further illustrated as follows:

cp.async.bulk.tensor.dim.multicast.mbarrier.shared::cluster.global [dstBarPtr], [dstDataPtr], [srcPtr], coord, mask;

In at least one embodiment, with respect to async-copy using IM2C tensor descriptor, a PTX instruction to perform an asynchronous copy from global to multicast cluster shared memory can be further illustrated as follows:

cp.async.bulk.tensor.dim.im2col.multicast.mbarrier.shared:: cluster.global [dstBarPtr], [dstDataPtr], [srcPtr], coord, i2cOff, mask;

In at least one embodiment, one or more of previous two async-copy PTX instructions shown above use 16 byte alignment of destination and source data. In at least one embodiment, PTX instructions are to use a destination barrier and data memory in submitting-CTA.

In at least one embodiment, with respect to async-copy using tensor descriptor, a PTX instruction to perform an asynchronous copy from shared to global memory can be further illustrated as follows:

cp.async.bulk.tensor.dim.global.shared::cta    [dstPtr], coord, [srcPtr];

In at least one embodiment, with respect to async-copy using IM2COL tensor descriptor, a PTX instruction to perform an asynchronous copy from shared to global memory can be further illustrated as follows:

cp.async.bulk.tensor.dim.im2col.global.shared::cta [dstPtr], coord, [srcPtr];

In at least one embodiment, one or more of previous two async-copy PTX instructions shown above use 16 byte alignment of destination and source data. In at least one embodiment, one or more PTX instructions use source data memory in submitting-CTA.

In at least one embodiment, with respect to async-reduce using tensor descriptor, a PTX instruction to perform a reduction operation can be further illustrated as follows:

cp.reduce.async.bulk.tensor.dim.op.mbarrier.global. shared::cta [dstPtr], [srcPtr], coord;

In at least one embodiment, with respect to async-reduce using IM2COL tensor descriptor, a PTX instruction to perform a reduction operation can be further illustrated as follows:

cp.reduce.async.bulk.tensor.dim.im2col.op.mbarrier. global.shared::cta [dstPtr], [srcPtr], coord;

In at least one embodiment, one or more of previous two async-copy PTX instructions shown above use CTA_CGA, and use 16 byte alignment of destination and source data. In at least one embodiment, ".op" specifies reduction operation.

In at least one embodiment, with respect to a prefetch of tensor data using a tensor descriptor, a PTX instruction (e.g., prefetch using tensor map 256 of FIG. 2) to perform a prefetch can be further illustrated as follows:

prefetch.bulk.tensor.dim.global.L2 [srcPtr], coord;

In at least one embodiment, prefetch is performed using an asynchronous copy from global memory to L2 cache.

In at least one embodiment, with respect to a prefetch of tensor data using an IM2C tensor descriptor, a PTX instruction (e.g., asynchronous copy to cache 258 of FIG. 2) to perform a prefetch can be further illustrated as follows:

prefetch.bulk.tensor.dim.im2col.global.L2    [srcPtr], coord, i2cOff;

In at least one embodiment, prefetch is performed using an asynchronous copy from global memory to L2 cache.

In at least one embodiment, one or more of previous two prefetch PTX instructions shown above use 16 byte alignment of destination memory and source tensor descriptor. In at least one embodiment, for .shared::cta, PTX instructions are to use a destination barrier and data in submitting thread's CTA. In at least one embodiment, for .shared:: cluster, PTX instructions are to use destination barrier and data in same CTA within submitting thread's Cluster.

In at least one embodiment, with respect to tensor descriptor cache control, one or more of following instructions can be used:

tensor. prefetch [ptr];

tensor.inval [ptr];

In at least one embodiment, instruction invalidates TMA-cache line containing [ptr], 64 byte line and/or invalidates GCC-line containing [ptr], 256 byte line.

In at least one embodiment, with respect to CUDA async-copy and async-inplace-transform using pipeline or barrier, SyncT is barrier or pipeline with appropriate thread_ scope, alignment is a multiple of 16 for UBLK utilization. In at least one embodiment, a memory space includes dst, src, and syncObj. In at least one embodiment, launch status is CTA_CGA or CTA_GRI. In at least one embodiment, these aspects are present and statically available for compiler to evaluate an implementation switch reflected below.

In at least one embodiment, a tensor map and parameters can be further understood with respect to following:

```
enum class tensor_map_interleave;
template<unsigned Dim, tensor_map_interleave> class
    tensor_map;
template<unsigned Dim, tensor_map_interleave> class
    tensor_map_im2col;
template<unsigned Dim> class tensor_map_parameters;
template<unsigned          Dim>          class
    tensor_map_im2ol_parameters;
```

In at least one embodiment, one or more implementations of tensor_map and tensor_map_im2col classes are opaque and contain a TMA descriptor value. In at least one embodiment, one or more implementations contain expected transaction byte count for TMA operations that use TMA descriptors. In at least one embodiment, this pre-computed byte count is used by implementation of asynchronous operations with automatic transaction accounting.

In at least one embodiment, sizeof and alignof for tensor_map and tensor_map_im2col values is 128 bytes. In at least one embodiment, TMA descriptor value within these classes is aligned to base 64 bytes of tensor_map value such that address of tensor_map value is address of TMA descriptor it contains. In at least one embodiment, publicly exposed 128 byte size provides space for supporting data, such as transaction byte count, and extensibility for future versions of TMA descriptors to grow in size. In at least one embodiment, this can be further illustrated as follows:

```
/* exposition only */
template<unsigned Dim, tensor_map_interleave>
class alignas(128) tensor_map {
private:
    uint64_t desc[8]; /* 64byte encoded descriptor */
    uint64_t pad[7];    /* padding */
    uint64_t cpsize;    /* expected transaction count */
};
template<unsigned Dim, tensor_map_interleave>
class alignas(128) tensor_map_im2col {
private:
    uint64_t desc[8]; /* 64byte encoded descriptor */
    uint64_t pad[7]; /* padding */
    uint64_t cpsize; /* expected transaction count */
};
```

In at least one embodiment, an API signature of an API (e.g., asynchronous copy using tensor map API 246 of FIG. 2) to perform unicast and multicast copy from global memory to shared memory (e.g., using UTMALDG) can be further illustrated as follows:

```
// unicast with automatic transaction accounting
template< class T, unsigned Dim, tensor_map_interleave Interleave, class SyncT >
info_async_utilization
memcpy_tensor_async( T * dst,
    const tensor_map<Dim,Interleave> * map,
    const tensor_map_parameters<Dim> & param,
    SyncT & syncObj );
template< class T, unsigned Dim, tensor_map_interleave Interleave, class SyncT >
info_async_utilization
memcpy_tensor_async( T * dst,
    const tensor_map_im2col<Dim,Interleave> * map,
    const tensor_map_im2col_parameters<Dim> & param,
    SyncT & syncObj );
// unicast with manual transaction accounting
template< class T, unsigned Dim, tensor_map_interleave Interleave, class SyncT >
info_async_utilization
memcpy_tensor_async_tx( T * dst,
    const tensor_map<Dim,Interleave> * map,
    const tensor_map_parameters<Dim> & param,
    SyncT & syncObj );
template< class T, unsigned Dim, tensor_map_interleave Interleave, class SyncT >
info_async_utilization
memcpy_tensor_async_tx( T * dst,
    const tensor_map_im2col<Dim,Interleave> * map,
    const tensor_map_im2col_parameters<Dim> & param,
    SyncT & syncObj );
// multicast with automatic transaction accounting
template< class T, unsigned Dim, tensor_map_interleave Interleave, class SyncT >
info_async_utilization
memcpy_tensor_async( cluster_multicast_ptr<T> dst,
    const tensor_map<Dim,Interleave> * map,
    const tensor_map_parameters<Dim> & param,
    SyncT & syncObj );
template< class T, unsigned Dim, tensor_map_interleave Interleave, class SyncT >
info_async_utilization
memcpy_tensor_async( cluster_multicast_ptr<T> dst,
    const tensor_map_im2col<Dim,Interleave> * map,
    const tensor_map_im2col_parameters<Dim> & param,
    SyncT & syncObj );
// multicast with manual transaction accounting
template< class T, unsigned Dim, tensor_map_interleave Interleave, class SyncT >
info_async_utilization
memcpy_tensor_async_tx( cluster_multicast_ptr<T> dst,
    const tensor_map<Dim,Interleave> * map,
    const tensor_map_parameters<Dim> & param,
    SyncT & syncObj );
template< class T, unsigned Dim, tensor_map_interleave Interleave, class SyncT >
info_async_utilization
memcpy_tensor_async_tx( cluster_multicast_ptr<T> dst,
    const tensor_map_im2col<Dim,Interleave> * map,
```

-continued

```
const tensor_map_im2col_parameters<Dim> & param,
SyncT & syncObj );
```

In at least one embodiment, one or more API signatures of one or more APIs to perform unicast copy and inplace transform from shared memory to global memory (e.g., using UTMASTG and UTMAREDG) can be further illustrated as follows:

```
template< unsigned Dim, tensor_map_interleave Interleave >
info_async_utilization
memcpy_tensor_async( const tensor_map<Dim,Interleave> * map,
    const tensor_map_parameters<Dim> & param,
    const T * src,
    pipeline<thread_scope_thread> & syncObj );
template< unsigned Dim, tensor_map_interleave Interleave, class T >
info_async_utilization
memcpy_tensor_async( const tensor_map_im2col<Dim,Interleave> * map,
    const tensor_map_im2col_parameters<Dim> & param,
    const T * src,
    pipeline<Sco> & syncObj );
template< unsigned Dim, tensor_map_interleave Interleave, class T, thread_scope
Sco >
info_async_utilization
inplace_transform_tensor_async( const tensor_map<Dim,Interleave> * map,
    const tensor_map_parameters<Dim> & param,
    const T * src,
    pipeline<thread_scope_thread> & syncObj );
```

In at least one embodiment, an API to perform unicast copy using a tensor map, with automatic transaction accounting can be further illustrated as follows:

```
template< class T, unsigned Dim, tensor_map_interleave Interleave, class SyncT >
info_async_utilization
memcpy_tensor_async( T * dst,
    const tensor_map<Dim,Interleave> * map,
    const tensor_map_parameters<Dim> & param,
    SyncT & syncObj );
template< class T, unsigned Dim, tensor_map_interleave Interleave, class SyncT >
info_async_utilization
memcpy_tensor_async( T * dst,
    const tensor_map_im2col<Dim,Interleave> * map,
    const tensor_map_im2col_parameters<Dim> & param,
    SyncT & syncObj );
```

In at least one embodiment, one or more of following "when/then" clauses can be used to further illustrate API to perform unicast copy using a tensor map, with automatic transaction accounting, as represented above.

| | | |
|---|---|---|
| When | • | SyncT is cuda::barrier<thread_scope_block> |
| | • | dst and syncObj are .shared::cta |
| | • | map is .global |
| Then | • | cp.async.bulk.mbarrier.shared::cta.global.tensor.dim{.im2col}. [&syncObj], [dst], [map], param.coord {, param.i2cOff}; |
| | • | mbarrier.expect_tx.shared::cta [&syncObj], map->cpsize; |
| | • | return info_async_fully |
| When | • | SyncT is cuda::barrier<thread_scope_block> |
| | • | dst and syncObj are .shared::cluster and have same cta_rank |
| | • | map is .global |
| Then | • | cp.async.bulk.mbarrier.shared::cluster.global.tensor.dim{.im2col} [&syncObj], [dst], [map], param.coord {, param.i2cOff}; |
| | • | mbarrier.expect_tx.shared::cluster [&syncObj], map->cpsize; |
| | • | return info_async_fully |

```
When  •   SyncT is cuda::pipeline<thread_scope_block>
      •   dst and syncObj.state are .shared::cta
      •   map is .global
Then  •   bar = syncObj.state.barArray + syncObj.head
      •   cp.async.bulk.mbarrier.shared::cta.global.tensor.dim{.im2col}. [bar], [dst],
          [map], param.coord {, param.i2cOff};
      •   syncObj.txCount += map->cpsize;
      •   return info_async_fully
```

```
When  •   SyncT is cuda::pipeline<thread_scope_cluster>
      •   dst is .shared::cta
      •   map is .global
Then  •   bar = syncObj.state.barArray + syncObj.head
      •   cp.async.bulk.tensor.dim{.im2col}.mbarrier.shared::cta.global [bar], [dst],
          [map], param.coord {, param.i2cOff};
      •   syncObj.txCount += map->cpsize;
      •   return info_async_fully
```

```
When  •   SyncT is cuda::pipeline<thread_scope_cluster>
      •   dst is .shared::cluster
      •   map is .global
      •   is CTA_CGA
Then  •   rank = get_dsmem_rank( dst )
      •   bar = map_dsmem_rank( syncObj.state.barArray + syncObj.head , rank )
      •   cp.async.bulk.tensor.dim{.im2col}.mbarrier.shared::cta.global [bar], [dst],
          [map], param.coord {, param.i2cOff};
      •   syncObj.txCount[ rank ] += map->cpsize;
      •   return info_async_fully
```

In at least one embodiment, an API to perform unicast copy using a tensor map, with automatic transaction accounting can be further illustrated as follows:

```
template< unsigned Dim, tensor_map_interleave Interleave, class T, class
SyncT >
info_async_utilization
memcpy_tensor_async( const tensor_map<Dim,Interleave> * map,
    const tensor_map_parameters<Dim> & param,
    const T * src, pipeline<thread_scope_thread> & pipe );
template< unsigned Dim, tensor_map_interleave Interleave, class T, class
SyncT >
info_async_utilization
memcpy_tensor_async( const tensor_map_im2col<Dim,Interleave> *
map,
    const tensor_map_im2col_parameters<Dim> & param,
    const T * src, pipeline<thread_scope_thread> & pipe );
```

In at least one embodiment, one or more of following "when/then" clauses can be used to further illustrate API to perform unicast copy using a tensor map, with automatic transaction accounting, as represented above.

```
When  •   map is .global
      •   src is .shared::cta
Then  •   pipe.bulkFlag = commit | read | write
      •   cp.async.bulk.tensor.dim{.im2col}.global.shared::cta [map],
```

-continued

```
      param.coord, [src];
  •   return info_async_fully
```

In at least one embodiment, an API (e.g., in-place transformation API 250 of FIG. 2) to perform unicast reduce using a tensor map, with automatic transaction accounting can be further illustrated as follows:

```
template< unsigned Dim, tensor_map_interleave Interleave, class T >
info_async_utilization
inplace_transform_tensor_async( const tensor_map<Dim,Interleave>
* map,
    const tensor_map_parameters<Dim> & param,
    const T * src,
    pipeline<thread_scope_thread> & pipe );
template< unsigned Dim, tensor_map_interleave Interleave, class T >
info_async_utilization
inplace_transform_tensor_async(
const tensor_map_im2col<Dim,Interleave> * map,
    const tensor_map_im2col_parameters<Dim> & param,
    const T * src,
    pipeline<thread_scope_thread> & pipe );
```

In at least one embodiment, following "when/then" clause can be used to further illustrate API to perform unicast reduce using a tensor map, with automatic transaction accounting, as represented above.

```
When  •   map is .global
      •   src is .shared::cta
```

-continued

```
Then    •    pipe.bulkFlag = commit | read | write
        •    cp.reduce.async.bulk.tensor.dim{.im2col}.OP.global.shared::cta [map],
             param.coord, [src];
        •    return info_async_fully
```

In at least one embodiment, in relation to API described below, manual transaction accounting is applicable when destination is .shared{::cta::cluster}. In at least one embodiment, an API (e.g., asynchronous copy using tensor map with manual tracking API 248 of FIG. 2) to perform unicast copy using a tensor map, with manual transaction accounting can be further illustrated as follows:

```
template< class T, unsigned Dim, tensor_map_interleave Interleave, class SyncT >
info_async_utilization
memcpy_tensor_async_tx( T * dst,
                        const tensor_map<Dim,Interleave> * map,
                        const tensor_map_parameters<Dim> & param,
                        SyncT & syncObj );
template< class T, unsigned Dim, tensor_map_interleave Interleave, class SyncT >
info_async_utilization
memcpy_tensor_async_tx( T * dst,
                        const tensor_map_im2col<Dim,Interleave> * map,
                        const tensor_map_im2col_parameters<Dim> & param,
                        SyncT & syncObj );
```

In at least one embodiment, one or more of following "when/then" clauses can be used to further illustrate API to perform unicast copy using a tensor map, with manual transaction accounting, as represented above.

```
When    •    map is .global
        •    SyncT is cuda::barrier<thread_scope_block>
        •    dst and syncObj are .shared::cta
Then    •    cp.async.bulk.mbarrier.shared::cta.global.tensor.dim{.im2col} [&syncObj],
             [dst], [map], param.coord {, param.i2cOff};
        •    return info_async_fully
```

```
When    •    map is .global
        •    SyncT is cuda::barrier<thread_scope_block>
        •    dst and syncObj are .shared::cluster and have same cta_rank
Then    •    cp.async.bulk.tensor.dim{.im2col}.mbarrier.shared::cluster.global [&syncObj],
             [dst], [map], param.coord {, param.i2cOff};
        •    return map->cpsize;
```

```
When    •    map is .global
        •    SyncT is cuda::pipeline_tx<thread_scope_block>
        •    dst and syncObj.state are .shared::cta
Then    •    bar = syncObj.state.barArray + syncObj.head
        •    cp.async.bulk.tensor.dim{.im2col}.mbarrier.shared::cta.global
             [bar], [dst], [map], param.coord {, param.i2cOff};
        •    return info_async_fully
```

```
When    •    map is .global
        •    SyncT is cuda::pipeline_tx<thread_scope_cluster>
        •    dst is .shared::cta
Then    •    bar = syncObj.state.barArray + syncObj.head
        •    cp.async.bulk.tensor.dim{.im2col}.mbarrier.shared::cta.global
             [bar], [dst], [map], param.coord {, param.i2cOff};
        •    return info_async_fully
```

```
When    •    map is .global
        •    SyncT is cuda::pipeline_tx<thread_scope_cluster>
        •    dst is .shared::cluster
        •    is CTA_CGA
Then    •    rank = get_dsmem_rank( dst )
        •    bar = map_dsmem_rank( syncObj.state.barArray +
             syncObj.head , rank )
        •    cp.async.bulk.tensor.dim{.im2col}.mbarrier.shared::cta.global
             [bar], [dst], [map], param.coord {, param.i2cOff};
        •    return info_async_fully
```

In at least one embodiment, an API to perform multicast copy using a tensor map, with automatic transaction accounting can be further illustrated as follows:

```
template< class T, unsigned Dim, tensor_map_interleave Interleave >
info_async_utilization
memcpy_tensor_async( cluster_multicast_ptr<T> dst,
        const tensor_map<Dim,Interleave> * map,
        const tensor_map_parameters<Dim> & param,
        const cluster_multicast_ptr<barrier<thread_scope_block> > & syncObj );
template< class T, unsigned Dim, tensor_map_interleave Interleave>
info_async_utilization
memcpy_tensor_async( cluster_multicast_ptr<T> dst,
        const tensor_map_im2col<Dim,Interleave> * map,
        const tensor_map_im2col_parameters<Dim> & param,
        const cluster_multicast_ptr<barrier<thread_scope_block> > & syncObj );
```

In at least one embodiment, following "when/then" clause can be used to further illustrate API to perform multicast copy using a tensor map, with automatic transaction accounting, as represented above.

```
When  •   map is .global
      •   dst.mask == syncObj.mask
Then  •   cp.async.bulk.multicast.mbarrier.shared::cta.global.tensor.dim{.im2col}
          [syncObj.ptr], [dst.ptr], [map], param.coord {, param.i2cOff}, syncObj.mask;
      •   for each CTA_rank in syncObj.mask
          ○   b = map_cluster_rank( syncObj.bar , CTA_rank );
          ○   mbarrier.expect_tx.shared::cluster [b], map->cpsize;
      •   return info_async_fully
```

In at least one embodiment, an API to perform multicast copy using a tensor map, with automatic transaction accounting can be further illustrated as follows:

```
template< class T, unsigned Dim, tensor_map_interleave Interleave >
info_async_utilization
memcpy_tensor_async( dsmem_multicast_ptr<T> dst,
        const tensor_map<Dim, Interleave> * map,
        const tensor_map_parameters<Dim> & param,
        pipeline<thread_scope_cluster> & syncObj );
template< class T, unsigned Dim, tensor_map_interleave Interleave >
info_async_utilization
memcpy_tensor_async( dsmem_multicast_ptr<T> dst,
        const tensor_map_im2col<Dim,Interleave> * map,
        const tensor_map_im2col_parameters<Dim> & param,
        pipeline<thread_scope_cluster> & syncObj );
```

In at least one embodiment, following "when/then" clause can be used to further illustrate API to perform multicast copy using a tensor map, with automatic transaction accounting, as represented above.

```
When  •   map is .global
Then  •   bar = syncObj.barArray + syncObj.head
      •   cp.async.bulk.multicast.mbarrier.shared::cta.global.tensor.dim{.im2col} [bar],
          [dst.ptr], [map], param.coord {, param.i2cOff}, dst.mask;
      •   for each CTA_rank in dst.mask
          ○   syncObj.txCount[ CTA_rank ] += map->cpsize;
      •   return info_async_fully
```

In at least one embodiment, an API to perform multicast copy using a tensor map, with manual transaction accounting can be further illustrated as follows:

```
template< class T, unsigned Dim, tensor_map_interleave Interleave >
info_async_utilization
memcpy_tensor_async_tx(
    cluster_multicast_ptr<T> dst,
    const tensor_map<Dim,Interleave> * map,
```

-continued

```
        const tensor_map parameters<Dim> & param,
        const cluster_multicast_ptr<barrier<thread_scope_block> > & syncObj );
template< class T, unsigned Dim, tensor_map_interleave Interleave>
info_async_utilization
memcpy_tensor_async_tx(
    cluster_multicast_ptr<T> dst,
    const tensor_map_im2col<Dim,Interleave> * map,
    const tensor_map_im2col_parameters<Dim> & param,
    const cluster_multicast_ptr<barrier<thread_scope_block> > & syncObj );
```

In at least one embodiment, following "when/then" clause can be used to further illustrate API to perform multicast copy using a tensor map, with manual transaction accounting, as represented above.

```
When •   map is .global
     •   dst.mask == syncObj.mask
Then •   cp.async.bulk.multicast.mbarrier.shared::cta.global.tensor.dim{.im2col}
         [syncObj.ptr], [dst.ptr], [map], param.coord {, param.i2cOff}, syncObj.mask;
     •   return info_async_fully
```

In at least one embodiment, an API to perform multicast copy using a tensor map, with manual transaction accounting can be further illustrated as follows:

```
template< class T, unsigned Dim, tensor_map_interleave Interleave, class SyncT >
info_async_utilization
memcpy_tensor_async_tx(
    cluster_multicast_ptr<T> dst,
    const tensor_map<Dim,Interleave> * map,
    const tensor_map parameters<Dim> & param,
    pipeline_tx<thread_scope_cluster> & syncObj );
template< class T, unsigned Dim, tensor_map_interleave Interleave, class SyncT >
info_async_utilization
memcpy_tensor_async_tx(
    cluster multicast_ptr<T> dst,
    const tensor_map_im2col<Dim,Interleave> * map,
    const tensor_map_im2col_parameters<Dim> & param,
    pipeline_tx<thread_scope_cluster> & syncObj syncObj );
```

In at least one embodiment, following "when/then" clause can be used to further illustrate API to perform multicast copy using a tensor map, with manual transaction accounting, as represented above.

```
When •   map is .global
Then •   bar = syncObj.barArray + syncObj.head
     •   cp.async.bulk.multicast.mbarrier.shared::cta.global.tensor.dim{.im2col} [bar],
         [dst.ptr], [map], param.coord {, param.i2cOff}, dst.mask;
     •   return info_async_fully
```

In at least one embodiment, with respect to TMA descriptor constant-memory synchronization, TMA descriptors reside in .global device memory that is "constant view" synchronized prior to use in device code. In at least one embodiment, with respect to implicit synchronization, TMA descriptors passed from host to device through _constant_ or _ grid_constant_ (Grid Private Hard Constant Kernel Parameter) memory are implicitly (automatically) synchronized. In at least one embodiment, _constant_: cudaMemcpyToSymbol range invalidates GCC line and then kernel launch task bind invalidates TMA-cache. In at least one embodiment, _grid_constant_: kernel launch range invalidates GCC line and task bind invalidates TMA-cache. In at least one embodiment, with respect to explicit synchronization, TMA descriptors residing in .global device memory that are not passed host to device through _constant_ or _grid_constant_ are explicitly synchronized between update and use.

In at least one embodiment, with respect to host to device not in _constant_ or _grid_constant_ memory, a TMA descriptor may be encoded in host code and copied to .global memory. In at least one embodiment, host code places a memory fence after copy and prior to launching a kernel. In at least one embodiment, this is further illustrated with respect to following:

```
template< class TensorMapType >
_host_
void cudaStreamFenceConstant( cudaStream_t s, const TensorMapType * ... devPtr );
```

In at least one embodiment, cudaStreamFenceConstant function submits a NULL QMD to stream which issues a GCC range invalidate for memory referenced by TMA descriptor pointers.

In at least one embodiment, with respect to device to device, a TMA descriptor may be encoded in device code in .global memory. In at least one embodiment, synchronization uses three steps performed by producing thread (e.g., thread which encodes descriptor) and consuming threads (e.g., threads which use descriptor in TMA instructions). In at least one embodiment, producing thread is to release-fence .global memory. In at least one embodiment, a consuming thread is to synchronize with producer thread. In at least one embodiment, a consuming thread is to acquire-fence .global memory. In at least one embodiment, this can be further illustrated as follows:

```
template< class TensorMapType >
_device_
void atomic_thread_fence( memory_order , memory_proxy_constant_t,
                          const TensorMapType * ptr );
```

| Producing Thread | Consuming Thread |
|---|---|
| encode tensor_map at 'ptr' in .global<br>atomic_thread_fence( memory_order_release,<br>memory_proxy_constant, ptr );<br>/* MEMBAR.GPU (or MEMBAR.SYS) to<br>assure visibility across grid * / | |
| synchronize | |
| | atomic_thread_fence(<br>memory_order_acquire,<br>memory_proxy_constant, ptr );<br>/* UTMACCTL.IV [ptr] to invalidate TMA-<br>cache line and GCC cache line */<br>use tensor_map at 'ptr' in .global |

In at least one embodiment, tensor descriptor encoding can be further illustrated as follows:

```
enum class tensor_map_interleave { none, interleave_16B, interleave_32B };
template<unsigned Dim, tensor_map_interleave> class tensor_map ;
template<unsigned Dim, tensor_map_interleave> class tensor_map_im2col ;
enum class tensor_map_shared_swizzle { none, swizzle_32B, swizzle_64B,
swizzle_128B };
enum tensor_map_float_specialization : unsigned {
  tensor_map_float_specialization_none = 0,
  tensor_map_float_specialization_global_f32_to_shared_tf32 = 0x01,
  tensor_map_float_specialization_shared_oob_fill_nan_request zero_fma = 0x02,
  tensor_map_float_specialization_global_f32_reduce_ftz = 0x04 };
enum class tensor_map_l2promote { none, L2_64B, L2_128B, L2_256B };
```

In at least one embodiment, tensor map and tensor_map_im2col are opaque types. In at least one embodiment, objects of these types contain a TMA tensor descriptor and other companion state information supporting use of objects. In at least one embodiment, this is further illustrated as follows:

sizeof(tensor_marDim>)==sizeof
(tensor_map_im2col<Dim>)==128
alignof(tensor_marDim>)==alignof
(tensor_map_im2col<Dim>)==128

In at least one embodiment, a tiled type tensor map is used as a default. In at least one embodiment, one or more aspects of tiled type tensor map can be further illustrated as follows:

```
template< unsigned Dim, tensor_map_interleave Interleave >
template< class DataT >
_host_ _device_
tensor_map<Dim,Interleave>::tensor_map(
  DataT *              globalAddress,
  const_size_t         globalSize[ ],
  const_size_t         global Stride[ ],
  const unsigned       boxSize[ ],/* shared mem size may be larger */
  const unsigned       elemStride[ ], /* non-interleaved elemStride[0] is forced == 1 */
  tensor_map_shared_swizzle   sharedSwizzle =
```

-continued

```
tensor_map_shared_swizzle::none,
    unsigned              specialization = tensor_map_florat_specialization_none,
    tensor_map_l2promoe    l2promote = tensor_map_l2_promote::none );
```

| Tensor Descriptor Field | Encoding |
|---|---|
| tensorGlobalAddress = | globalAddress |
| descriptorType = | Tiled |
| version = | 0 |
| dimensionality = | Dim |
| format = | u8 ← DataT == char |
| | u16 ← DataT == unsigned short |
| | u32 ← DataT == unsigned |
| | s32 ← DataT == int |
| | u64 ← DataT == unsigned long long |
| | s64 ← DataT == long long |
| | f16 ← DataT == _—half |
| | f64.rn ← DataT == double |
| | bf16.rn ← DataT == _—nv_bfloat16 |
| | f32.rn ← DataT == float and ! ( specialization & |
| | tensor_map_float_specialization_global_f32_reduce_ftz ) |
| | f32.ftz.rn ← DataT == float and ( specialization & |
| | tensor_map_float_specialization_global_f32_reduce_ftz ) |
| |     f32.ftz.rn is used for global reduction ATOMG |
| |     this should not be default |
| interleaved = | elemInterleaveSize == 32 ? interleaved_32B |
| | elemInterleaveSize == 16 ? interleaved_16B |
| |   : disable |
| SMEMswizzleMode = | sharedSwizzle |
| OOBfillMode = | 0 != ( specialization & |
| | tensor_map_float_specialization_shared_oob_fill_nan_request_zero_f |
| | ma ) |
| F32toTF32 = | 0 != ( specialization & |
| | tensor_map_float_specialization_global_f32_to_shared_tf32 ) |
| L2sectorPromotion = | l2Promote |
| tensorStride[ k ] = | globalStride[ k ] , k = 0..Dim-2 |
| tensorSize[ k ] = | globalSize[ k ] , k = 0..Dim-1 |
| traversalStride[ k ] = | elemStride[ k ] , k = 0..Dim-1 |
| boxSize[ k ] = | boxSize[ k ] , k = 0..Dim-1 |

In at least one embodiment, one or more aspects of IM2COL type tensor map can be further illustrated as follows:

```
template< unsigned Dim, tensor_map_interleave Interleave > template< class DataT >

_host_ _device_ tensor_map<Dim,Interleave>::tensor_map_im2col(

Data T *                  globalAddress, const size_t           globalSize[ ], const size_t           globalStride[ ], const int              pixelBoxLowerCorner[ ], /* DHW dimensions */ const int              pixelBoxUpperCorner[ ], const unsigned         channelsPerPixel, cost unsigned          pixelsPerColumn, const unsigned    elemStride[], /* non-interleaved elemStride[0] is forced == 1 */ tensor_map_shared_swizzle sharedSwizzle = tensor_map_swizzle::none, unsigned              specialization = tensor_map_float_specialization_none, tensor_map_l2promote    l2promote        = tensor_map_l2_promote::none );
```

| Tensor Descriptor Field | Encoding |
|---|---|
| tensorGlobalAddress = | globalAddress |
| descriptorType = | im2col |
| version = | 0 |
| dimensionality = | Dim |
| format = | u8 ← DataT == char |
| | u16 ← DataT == unsigned short |
| | u32 ← DataT == unsigned |
| | s32 ← DataT == int |
| | u64 ← DataT == unsigned long long |
| | s64 ← DataT == long long |
| | f16 ← DataT == _—half |
| | f64.rn ← DataT == double |
| | bf16.rn ← DataT == _—nv_bfloat16 |
| | f32.rn ← DataT == float and ! ( specialization & tensor_map_float_specialization_global_f32_reduce_ftz ) |
| | f32.ftz.rn ← DataT == float and ( specialization & tensor_map_float_specialization_global_f32_reduce_ftz ) |
| | f32.ftz.rn is used for global reduction ATOMG this should not be default |
| interleaved = | channelInterleave ? interleave_xxB : disable |
| SMEMswizzleMode = | sharedSwizzle |
| OOBfillMode = | 0 != ( specialization & tensor_map_float_specialization_shared_oob_fill_nan_request_zero_fma ) |
| F32toTF32 = | 0 != ( specialization & tensor_map_float_specialization_global_f32_to_shared_tf32 ) |
| tensorStride[ k ] = | globalStride[ k ] , k = 0..Dim-2 |
| tensorSize[ k ] = | globalSize[ k ] , k = 0..Dim-1 |
| traversalStride[ k ] = | elemStride[ k ] , k = 0..Dim-1 |
| rangeNDHW | pixelsPerColumn |
| rangeC | channelsPerPixel |
| boxBaseCornerDHW. D = | boxLowerOffset[0] |
| boxBaseCornerDHW. H = | boxLowerOffset[1] |
| boxBaseCornerDHW. W = | boxLowerOffset[2] |
| boxFarCornerDHW. D= | boxUpperOffset[0] |
| boxFarCornerDHW. H= | boxUpperOffset[1] |
| boxFarCornerDHW. W= | boxUpperOffset[2] |

In at least one embodiment, tensor descriptor derived attributes include shared memory buffer tensor alignment. In at least one embodiment, shared memory buffer has an alignment derived from swizzle mode used in TMA and associated MMA operations. In at least one embodiment, this alignment ensures that copy operations between global and shared memory have address-independent result. In at least one embodiment, this can be further illustrated as follows:

| Swizzle Mode | Required Shared Memory Alignment | Innermost dimension constraint of box |
|---|---|---|
| swizzle_128B | 1024 bytes | max 128 bytes |
| swizzle_64B | 512 bytes | max 64 bytes |
| swizzle_32B | 256 bytes | max 32 bytes |
| disable | 16 bytes | no constraint |

```
template< unsigned Dim, tensor_map_interleave Interleave >
_host_ _device_
size_t tensor_map<Dim,Interleave>::required_tensor_alignment( ) const;
template< unsigned Dim, tensor_map_interleave Interleave >
_host_ _device_
size_t tensor_map_im2col<Dim,Interleave>:: required_tensor_alignment( ) const;
```

In at least one embodiment, tensor descriptor derived attributes include shared memory transaction size. In at least one embodiment, a TMA operation which copies data to shared memory also updates a SyncUnit barrier transaction count by a value derived from tensor descriptor. In at least one embodiment, this can be further illustrated as follows:

```
template< unsigned Dim, tensor_map_interleave Interleave >
_host_ _device_
size_t tensor_map<Dim,Interleave>::bytes_moved( ) const;
template< unsigned Dim, tensor_map_interleave Interleave >
_host_ _device_
size_t tensor_map_im2col<Dim,Interleave>:: bytes_moved( ) const;
```

In at least one embodiment, with respect to tensor load global memory to shared memory out-of-bounds (OOB) observation, global to shared loading of a tensor with OOB set with tensor_map_float_specialization_shared_ oob_fill_nan_request_zero_fma option uses subsequent observation of whether a resulting value in shared memory is a particular not-a-number (nan) value. In at least one embodiment, these values are:

| floating point type | nan_request_zero_fma value |
|---|---|
| f16, bf16, E6M9 | 0x7ff7 |
| f32, tf32 | 0x7ff77ff7 |
| f64 | 0x7ff77ff77ff77ff7 |

In at least one embodiment, a function provides observation of whether particular value is present. In at least one embodiment, this can be further illustrated as follows:

```
template< class T >
_device_
bool is_nan_request_zero_fma( const T & );
```

In the following description, numerous specific details are set forth to provide a more thorough understanding of at least one embodiment. However, it will be apparent to one skilled in the art that the inventive concepts may be practiced without one or more of these specific details.

Data Center

The following figure sets forth, without limitation, exemplary data center systems that can be used to implement at least one embodiment. In at least one embodiment, one or more data center components of following figure can implement one or more aspects of an embodiment described with respect to one or more of FIGS. 1-26. In at least one embodiment, one or more data center components include one or more components of system 100 of FIG. 1 (e.g., CPU 104, PPU 106, compiler 112, API 108), computer system 202 of FIG. 2 (e.g., processor 204, memory 206, set of APIs 232, compiler 260, code 262, GPU 210, and/or one or more components of set of nodes 264. In at least one embodiment, one or more data center components perform one or more aspects of API 300 of FIG. 3, API 400 of FIG. 4, API 500 of FIG. 5, API 600 of FIG. 6, API 700 of FIG. 7, API 800 of FIG. 8, API 900 of FIG. 9, API 1000 of FIG. 10, API 1100 of FIG. 11, API 1200 of FIG. 12, API 1300 of FIG. 13, and/or API 1400 of FIG. 14. In at least one embodiment, one or more data center components perform one or more aspects of technique 1500 of FIG. 15, technique 1600 of FIG. 16, technique 1700 of FIG. 17, technique 1800 of FIG. 18, technique 1900 of FIG. 19, technique 2000 of FIG. 20, technique 2100 of FIG. 21, technique 2200 of FIG. 22, technique 2300 of FIG. 23, technique 2400 of FIG. 24, technique 2500 of FIG. 25, and/or technique 2600 of FIG. 26.

FIG. 27 illustrates an exemplary data center 2700, in accordance with at least one embodiment. In at least one embodiment, data center 2700 includes, without limitation, a data center infrastructure layer 2710, a framework layer 2720, a software layer 2730 and an application layer 2740.

In at least one embodiment, as shown in FIG. 27, data center infrastructure layer 2710 may include a resource orchestrator 2712, grouped computing resources 2714, and node computing resources ("node C.R.s") 2716(1)-2716(N), where "N" represents any whole, positive integer. In at least one embodiment, node C.R.s 2716(1)-2716(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/ output ("NW I/O") devices, network switches, virtual machines ("VMs"), power modules, and cooling modules, etc. In at least one embodiment, one or more node C.R.s from among node C.R.s 2716(1)-2716(N) may be a server having one or more of above-mentioned computing resources.

In at least one embodiment, grouped computing resources 2714 may include separate groupings of node C.R.s housed within one or more racks (not shown), or many racks housed in data centers at various geographical locations (also not shown). Separate groupings of node C.R.s within grouped computing resources 2714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 2712 may configure or otherwise control one or more node C.R.s 2716(1)-2716(N) and/or grouped computing resources 2714. In at least one embodiment, resource orchestrator 2712 may include a software design infrastructure ("SDI") management entity for data center 2700. In at least one embodiment, resource orchestrator 2712 may include hardware, software or some combination thereof.

In at least one embodiment, as shown in FIG. 27, framework layer 2720 includes, without limitation, a job scheduler 2732, a configuration manager 2734, a resource manager 2736 and a distributed file system 2738. In at least one embodiment, framework layer 2720 may include a framework to support software 2752 of software layer 2730 and/or one or more application(s) 2742 of application layer 2740. In at least one embodiment, software 2752 or application(s) 2742 may respectively include web-based service software or applications, such as those provided by Amazon Web Services, Google Cloud and Microsoft Azure. In at least one embodiment, framework layer 2720 may be, but is not limited to, a type of free and open-source software web application framework such as Apache Spark™ (hereinafter "Spark") that may utilize distributed file system 2738 for large-scale data processing (e.g., "big data"). In at least one embodiment, job scheduler 2732 may include a Spark driver to facilitate scheduling of workloads supported by various layers of data center 2700. In at least one embodiment, configuration manager 2734 may be capable of configuring different layers such as software layer 2730 and framework layer 2720, including Spark and distributed file system 2738 for supporting large-scale data processing. In at least one embodiment, resource manager 2736 may be capable of managing clustered or grouped computing resources mapped to or allocated for support of distributed file system 2738 and job scheduler 2732. In at least one embodiment, clustered or grouped computing resources may include grouped computing resource 2714 at data center infrastructure layer 2710. In at least one embodiment, resource manager 2736 may coordinate with resource orchestrator 2712 to manage these mapped or allocated computing resources.

In at least one embodiment, software 2752 included in software layer 2730 may include software used by at least portions of node C.R.s 2716(1)-2716(N), grouped computing resources 2714, and/or distributed file system 2738 of framework layer 2720. One or more types of software may include, but are not limited to, Internet web page search software, e-mail virus scan software, database software, and streaming video content software.

In at least one embodiment, application(s) 2742 included in application layer 2740 may include one or more types of applications used by at least portions of node C.R.s 2716(1)-2716(N), grouped computing resources 2714, and/or distributed file system 2738 of framework layer 2720. In at least one or more types of applications may include, without limitation, CUDA applications.

In at least one embodiment, any of configuration manager 2734, resource manager 2736, and resource orchestrator 2712 may implement any number and type of self-modifying actions based on any amount and type of data acquired in any technically feasible fashion. In at least one embodiment, self-modifying actions may relieve a data center operator of data center 2700 from making possibly bad configuration decisions and possibly avoiding underutilized and/or poor performing portions of a data center.

Computer-Based Systems

The following figures set forth, without limitation, exemplary computer-based systems that can be used to implement at least one embodiment. In at least one embodiment, one or more computer-based systems of following figures can implement one or more aspects of an embodiment described with respect to one or more of FIGS. 1-26. In at least one embodiment, one or more computer-based systems include one or more components of system 100 of FIG. 1 (e.g., CPU 104, PPU 106, compiler 112, API 108), computer system 202 of FIG. 2 (e.g., processor 204, memory 206, set of APIs 232, compiler 260, code 262, GPU 210, and/or one or more components of set of nodes 264. In at least one embodiment, one or more computer-based systems perform one or more aspects of API 300 of FIG. 3, API 400 of FIG. 4, API 500 of FIG. 5, API 600 of FIG. 6, API 700 of FIG. 7, API 800 of FIG. 8, API 900 of FIG. 9, API 1000 of FIG. 10, API 1100 of FIG. 1, API 1200 of FIG. 12, API 1300 of FIG. 13, and/or API 1400 of FIG. 14. In at least one embodiment, one or more computer-based systems perform one or more aspects of technique 1500 of FIG. 15, technique 1600 of FIG. 16, technique 1700 of FIG. 17, technique 1800 of FIG. 18, technique 1900 of FIG. 19, technique 2000 of FIG. 20, technique 2100 of FIG. 21, technique 2200 of FIG. 22, technique 2300 of FIG. 23, technique 2400 of FIG. 24, technique 2500 of FIG. 25, and/or technique 2600 of FIG. 26.

Figure 28:
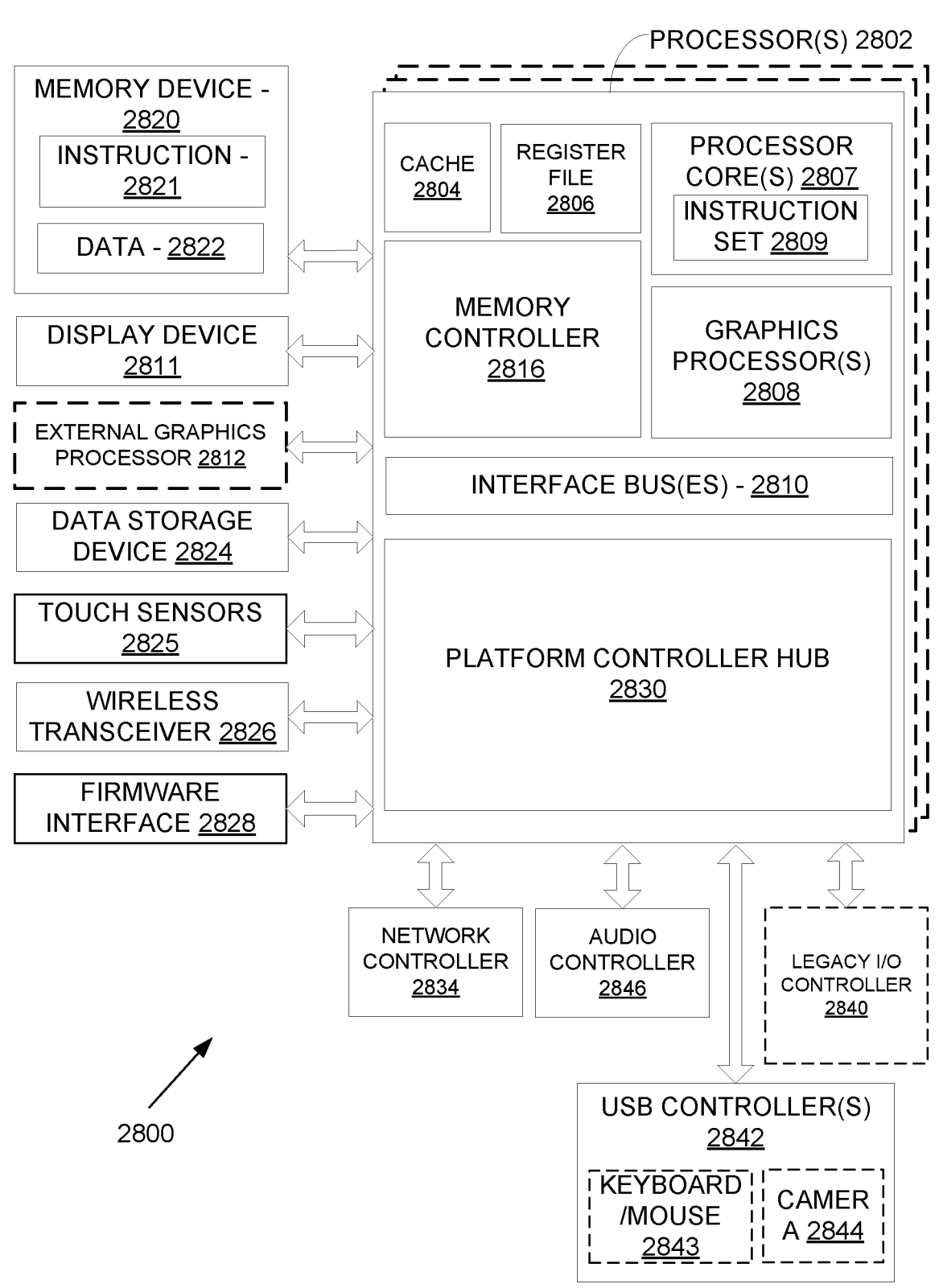
FIG. 28 illustrates a processing system, in accordance with at least one embodiment.

FIG. 28 illustrates a processing system 2800, in accordance with at least one embodiment. In at least one embodiment, processing system 2800 includes one or more processors 2802 and one or more graphics processors 2808, and may be a single processor desktop system, a multiprocessor workstation system, or a server system having a large number of processors 2802 or processor cores 2807. In at least one embodiment, processing system 2800 is a processing platform incorporated within a system-on-a-chip ("SoC") integrated circuit for use in mobile, handheld, or embedded devices. In at least one embodiment, a processors core 2807 is referred to as a computing unit or compute unit.

In at least one embodiment, processing system 2800 can include, or be incorporated within a server-based gaming platform, a game console, a media console, a mobile gaming console, a handheld game console, or an online game console. In at least one embodiment, processing system 2800 is a mobile phone, smart phone, tablet computing device or mobile Internet device. In at least one embodiment, processing system 2800 can also include, couple with, or be integrated within a wearable device, such as a smart watch wearable device, smart eyewear device, augmented reality device, or virtual reality device. In at least one embodiment, processing system 2800 is a television or set top box device having one or more processors 2802 and a graphical interface generated by one or more graphics processors 2808.

In at least one embodiment, one or more processors 2802 each include one or more processor cores 2807 to process instructions which, when executed, perform operations for system and user software. In at least one embodiment, each of one or more processor cores 2807 is configured to process a specific instruction set 2809. In at least one embodiment, instruction set 2809 may facilitate Complex Instruction Set Computing ("CISC"), Reduced Instruction Set Computing ("RISC"), or computing via a Very Long Instruction Word ("VLIW"). In at least one embodiment, processor cores 2807 may each process a different instruction set 2809, which may include instructions to facilitate emulation of other instruction sets. In at least one embodiment, processor core 2807 may also include other processing devices, such as a digital signal processor ("DSP").

In at least one embodiment, processor 2802 includes cache memory ('cache') 2804. In at least one embodiment, processor 2802 can have a single internal cache or multiple levels of internal cache. In at least one embodiment, cache memory is shared among various components of processor 2802. In at least one embodiment, processor 2802 also uses an external cache (e.g., a Level 3 ("L3") cache or Last Level Cache ("LLC")) (not shown), which may be shared among processor cores 2807 using known cache coherency techniques. In at least one embodiment, register file 2806 is additionally included in processor 2802 which may include different types of registers for storing different types of data (e.g., integer registers, floating point registers, status registers, and an instruction pointer register). In at least one embodiment, register file 2806 may include general-purpose registers or other registers.

In at least one embodiment, one or more processor(s) 2802 are coupled with one or more interface bus(es) 2810 to transmit communication signals such as address, data, or control signals between processor 2802 and other components in processing system 2800. In at least one embodiment interface bus 2810, in one embodiment, can be a processor bus, such as a version of a Direct Media Interface ("DMI") bus. In at least one embodiment, interface bus 2810 is not limited to a DMI bus, and may include one or more Peripheral Component Interconnect buses (e.g., "PCI," PCI Express ("PCIe")), memory buses, or other types of interface buses. In at least one embodiment processor(s) 2802 include an integrated memory controller 2816 and a platform controller hub 2830. In at least one embodiment, memory controller 2816 facilitates communication between a memory device and other components of processing system 2800, while platform controller hub ("PCH") 2830 provides connections to Input/Output ("I/O") devices via a local I/O bus.

In at least one embodiment, memory device 2820 can be a dynamic random access memory ("DRAM") device, a static random access memory ("SRAM") device, flash memory device, phase-change memory device, or some other memory device having suitable performance to serve as processor memory. In at least one embodiment memory device 2820 can operate as system memory for processing system 2800, to store data 2822 and instructions 2821 for use when one or more processors 2802 executes an application or process. In at least one embodiment, memory controller 2816 also couples with an optional external graphics processor 2812, which may communicate with one or more graphics processors 2808 in processors 2802 to perform graphics and media operations. In at least one embodiment, a display device 2811 can connect to processor(s) 2802. In at least one embodiment display device 2811 can include one or more of an internal display device, as in a mobile electronic device or a laptop device or an external display device attached via a display interface (e.g., DisplayPort, etc.). In at least one embodiment, display device 2811 can include a head mounted display ("HMD") such as a stereoscopic display device for use in virtual reality ("VR") applications or augmented reality ("AR") applications.

In at least one embodiment, platform controller hub 2830 enables peripherals to connect to memory device 2820 and processor 2802 via a high-speed I/O bus. In at least one embodiment, I/O peripherals include, but are not limited to, an audio controller 2846, a network controller 2834, a firmware interface 2828, a wireless transceiver 2826, touch sensors 2825, a data storage device 2824 (e.g., hard disk drive, flash memory, etc.). In at least one embodiment, data storage device 2824 can connect via a storage interface (e.g., SATA) or via a peripheral bus, such as PCI, or PCIe. In at least one embodiment, touch sensors 2825 can include touch screen sensors, pressure sensors, or fingerprint sensors. In at least one embodiment, wireless transceiver 2826 can be a Wi-Fi transceiver, a Bluetooth transceiver, or a mobile network transceiver such as a 3G, 4G, or Long Term Evolution ("LTE") transceiver. In at least one embodiment, firmware interface 2828 enables communication with system firmware, and can be, for example, a unified extensible firmware interface ("UEFI"). In at least one embodiment, network controller 2834 can enable a network connection to a wired network. In at least one embodiment, a high-performance network controller (not shown) couples with interface bus 2810. In at least one embodiment, audio controller 2846 is a multi-channel high definition audio controller. In at least one embodiment, processing system 2800 includes an optional legacy I/O controller 2840 for coupling legacy (e.g., Personal System 2 ("PS/2")) devices to processing system 2800. In at least one embodiment, platform controller hub 2830 can also connect to one or more Universal Serial Bus ("USB") controllers 2842 connect input devices, such as keyboard and mouse 2843 combinations, a camera 2844, or other USB input devices.

In at least one embodiment, an instance of memory controller 2816 and platform controller hub 2830 may be integrated into a discreet external graphics processor, such as external graphics processor 2812. In at least one embodiment, platform controller hub 2830 and/or memory controller 2816 may be external to one or more processor(s) 2802. For example, in at least one embodiment, processing system 2800 can include an external memory controller 2816 and platform controller hub 2830, which may be configured as a memory controller hub and peripheral controller hub within a system chipset that is in communication with processor(s) 2802.

Figure 29:
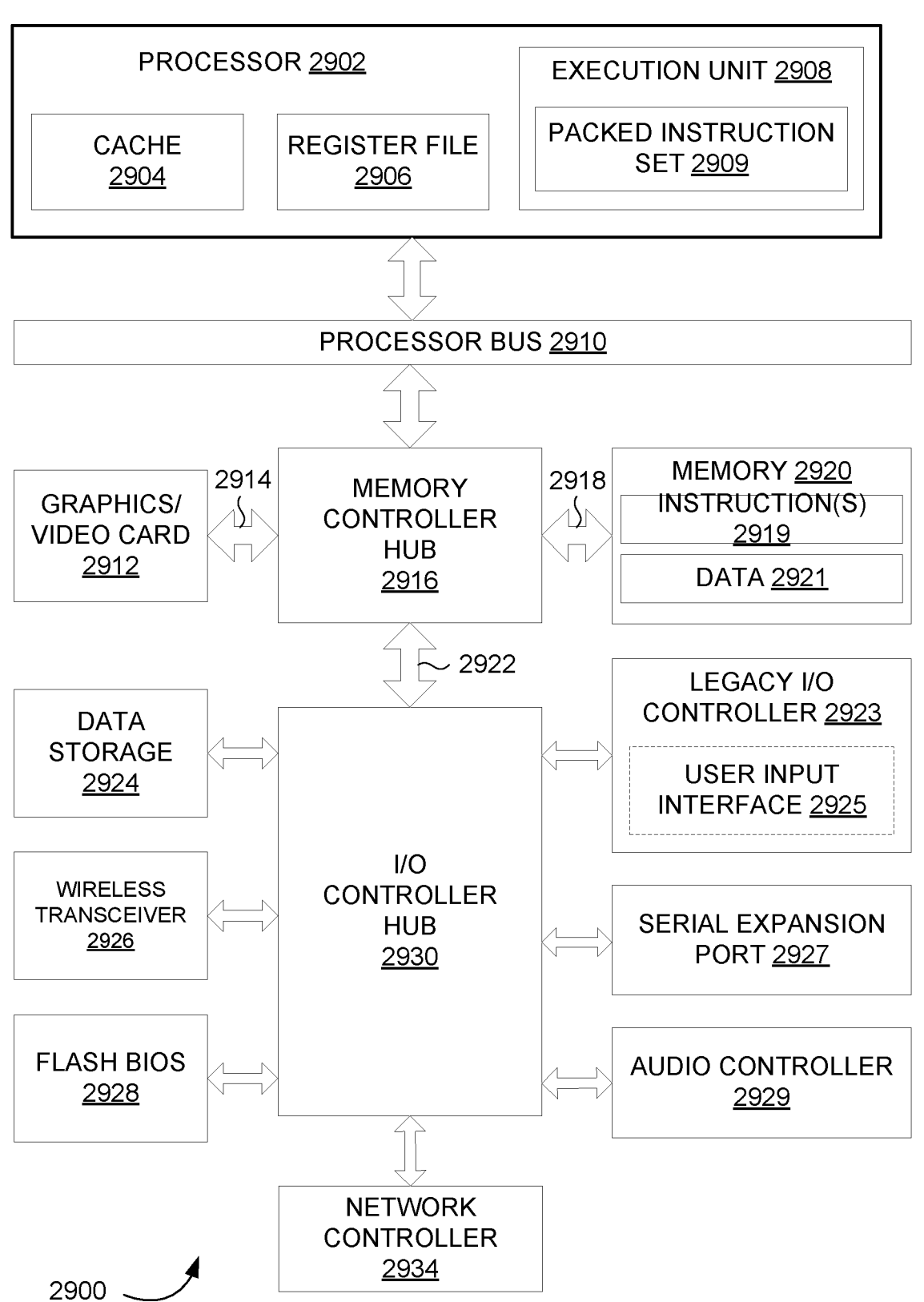
FIG. 29 illustrates a computer system, in accordance with at least one embodiment.

FIG. 29 illustrates a computer system 2900, in accordance with at least one embodiment. In at least one embodiment, computer system 2900 may be a system with interconnected devices and components, an SOC, or some combination. In at least on embodiment, computer system 2900 is formed with a processor 2902 that may include execution units to execute an instruction. In at least one embodiment, computer system 2900 may include, without limitation, a component, such as processor 2902 to employ execution units including logic to perform algorithms for processing data. In at least one embodiment, computer system 2900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 2900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 2900 may include, without limitation, processor 2902 that may include, without limitation, one or more execution units 2908 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 2900 is a single processor desktop or server system. In at least one embodiment, computer system 2900 may be a multiprocessor system. In at least one embodiment, processor 2902 may include, without limitation, a CISC microprocessor, a RISC microprocessor, a VLIW microprocessor, a processor implementing a combination of instruction sets, or any other processor device, such as a digital signal processor, for example. In at least one embodiment, processor 2902 may be coupled to a processor bus 2910 that may transmit data signals between processor 2902 and other components in computer system 2900.

In at least one embodiment, processor 2902 may include, without limitation, a Level 1 ("L1") internal cache memory ("cache") 2904. In at least one embodiment, processor 2902 may have a single internal cache or multiple levels of internal cache. In at least one embodiment, cache memory may reside external to processor 2902. In at least one embodiment, processor 2902 may also include a combination of both internal and external caches. In at least one embodiment, a register file 2906 may store different types of data in various registers including, without limitation, integer registers, floating point registers, status registers, and instruction pointer register.

In at least one embodiment, execution unit 2908, including, without limitation, logic to perform integer and floating point operations, also resides in processor 2902. Processor 2902 may also include a microcode ("ucode") read only memory ("ROM") that stores microcode for certain macro instructions. In at least one embodiment, execution unit 2908 may include logic to handle a packed instruction set 2909. In at least one embodiment, by including packed instruction set 2909 in an instruction set of a general-purpose processor 2902, along with associated circuitry to execute instructions, operations used by many multimedia applications may be performed using packed data in a general-purpose processor 2902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 2908 may also be used in microcontrollers, embedded processors, graphics devices, DSPs, and other types of logic circuits. In at least one embodiment, computer system 2900 may include, without limitation, a memory 2920. In at least one embodiment, memory 2920 may be implemented as a DRAM device, an SRAM device, flash memory device, or other memory device. Memory 2920 may store instruction(s) 2919 and/or data 2921 represented by data signals that may be executed by processor 2902.

In at least one embodiment, a system logic chip may be coupled to processor bus 2910 and memory 2920. In at least one embodiment, the system logic chip may include, without limitation, a memory controller hub ("MCH") 2916, and processor 2902 may communicate with MCH 2916 via processor bus 2910. In at least one embodiment, MCH 2916 may provide a high bandwidth memory path 2918 to memory 2920 for instruction and data storage and for storage of graphics commands, data and textures. In at least one embodiment, MCH 2916 may direct data signals between processor 2902, memory 2920, and other components in computer system 2900 and to bridge data signals between processor bus 2910, memory 2920, and a system I/O 2922. In at least one embodiment, system logic chip may provide a graphics port for coupling to a graphics controller. In at least one embodiment, MCH 2916 may be coupled to memory 2920 through high bandwidth memory path 2918 and graphics/video card 2912 may be coupled to MCH 2916 through an Accelerated Graphics Port ("AGP") interconnect 2914.

In at least one embodiment, computer system 2900 may use system I/O 2922 that is a proprietary hub interface bus to couple MCH 2916 to I/O controller hub ("ICH") 2930. In at least one embodiment, ICH 2930 may provide direct connections to some I/O devices via a local I/O bus. In at least one embodiment, local I/O bus may include, without limitation, a high-speed I/O bus for connecting peripherals to memory 2920, a chipset, and processor 2902. Examples may include, without limitation, an audio controller 2929, a firmware hub ("flash BIOS") 2928, a wireless transceiver 2926, a data storage 2924, a legacy I/O controller 2923 containing a user input interface 2925 and a keyboard interface, a serial expansion port 2927, such as a USB, and a network controller 2934. Data storage 2924 may comprise a hard disk drive, a floppy disk drive, a CD-ROM device, a flash memory device, or other mass storage device.

In at least one embodiment, FIG. 29 illustrates a system, which includes interconnected hardware devices or "chips." In at least one embodiment, FIG. 29 may illustrate an exemplary SoC. In at least one embodiment, devices illustrated in FIG. 29 may be interconnected with proprietary interconnects, standardized interconnects (e.g., PCIe), or some combination thereof. In at least one embodiment, one or more components of system 2900 are interconnected using compute express link ("CXL") interconnects.

Figure 30:
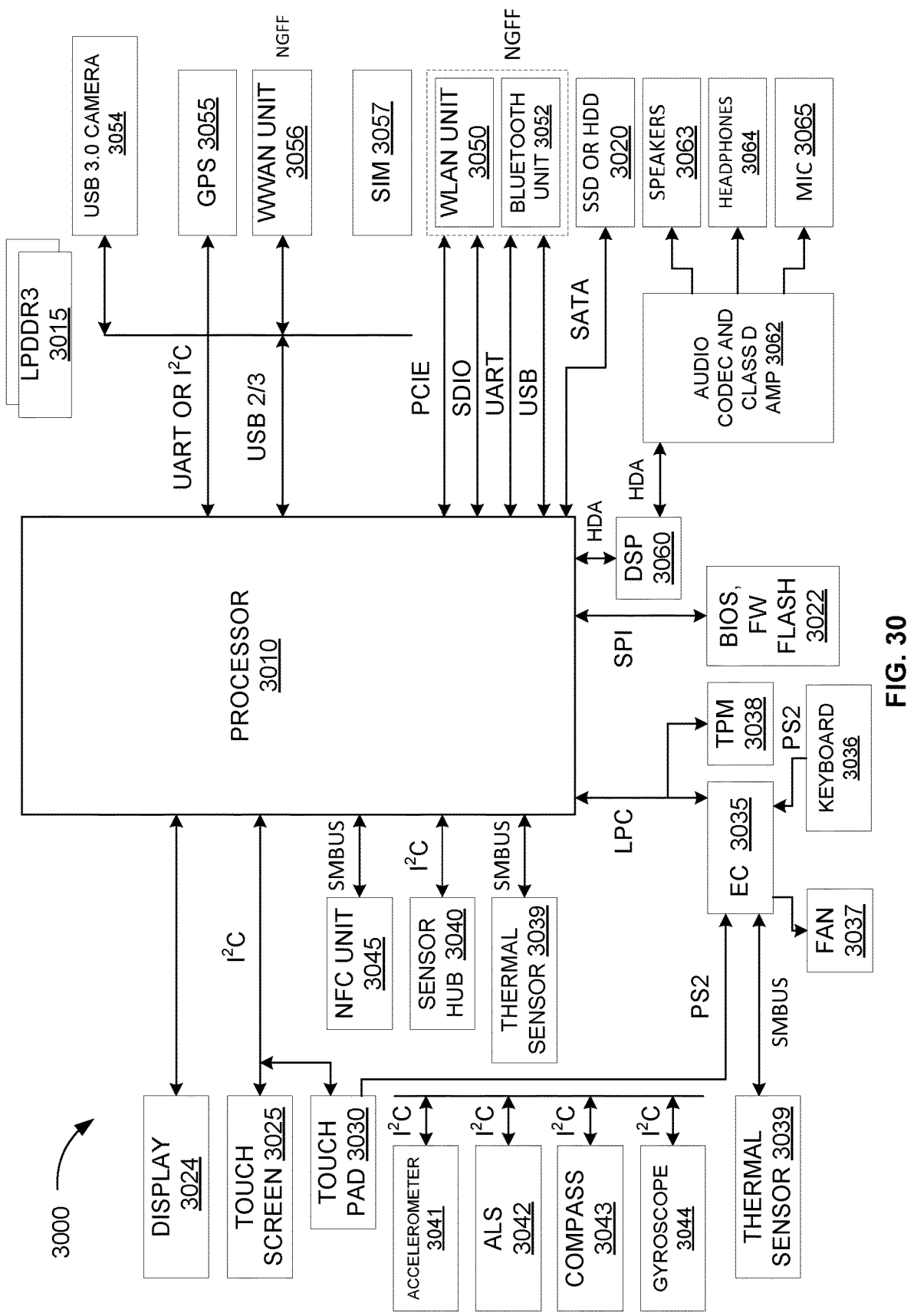
FIG. 30 illustrates a system, in accordance with at least one embodiment.

FIG. 30 illustrates a system 3000, in accordance with at least one embodiment. In at least one embodiment, system 3000 is an electronic device that utilizes a processor 3010. In at least one embodiment, system 3000 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 3000 may include, without limitation, processor 3010 communicatively coupled to any suitable number or kind of components, peripherals, modules, or devices. In at least one embodiment, processor 3010 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/ Transmitter ("UART") bus. In at least one embodiment, FIG. 30 illustrates a system which includes interconnected hardware devices or "chips." In at least one embodiment, FIG. 30 may illustrate an exemplary SoC. In at least one embodiment, devices illustrated in FIG. 30 may be interconnected with proprietary interconnects, standardized interconnects (e.g., PCIe) or some combination thereof. In at least one embodiment, one or more components of FIG. 30 are interconnected using CXL interconnects.

In at least one embodiment, FIG. 30 may include a display 3024, a touch screen 3025, a touch pad 3030, a Near Field Communications unit ("NFC") 3045, a sensor hub 3040, a thermal sensor 3046, an Express Chipset ("EC") 3035, a Trusted Platform Module ("TPM") 3038, BIOS/firmware/ flash memory ("BIOS, FW Flash") 3022, a DSP 3060, a Solid State Disk ("SSD") or Hard Disk Drive ("HDD") 3020, a wireless local area network unit ("WLAN") 3050, a Bluetooth unit 3052, a Wireless Wide Area Network unit ("WWAN") 3056, a Global Positioning System ("GPS") 3055, a camera ("USB 3.0 camera") 3054 such as a USB 3.0 camera, or a Low Power Double Data Rate ("LPDDR") memory unit ("LPDDR3") 3015 implemented in, for example, LPDDR3 standard. These components may each be implemented in any suitable manner.

In at least one embodiment, other components may be communicatively coupled to processor 3010 through components discussed above. In at least one embodiment, an accelerometer 3041, an Ambient Light Sensor ("ALS") 3042, a compass 3043, and a gyroscope 3044 may be communicatively coupled to sensor hub 3040. In at least one embodiment, a thermal sensor 3039, a fan 3037, a keyboard 3036, and a touch pad 3030 may be communicatively coupled to EC 3035. In at least one embodiment, a speaker 3063, a headphones 3064, and a microphone ("mic") 3065 may be communicatively coupled to an audio unit ("audio codec and class d amp") 3062, which may in turn be communicatively coupled to DSP 3060. In at least one embodiment, audio unit 3062 may include, for example and without limitation, an audio coder/decoder ("codec") and a class D amplifier. In at least one embodiment, a SIM card ("SIM") 3057 may be communicatively coupled to WWAN unit 3056. In at least one embodiment, components such as WLAN unit 3050 and Bluetooth unit 3052, as well as WWAN unit 3056 may be implemented in a Next Generation Form Factor ("NGFF").

Figure 31:
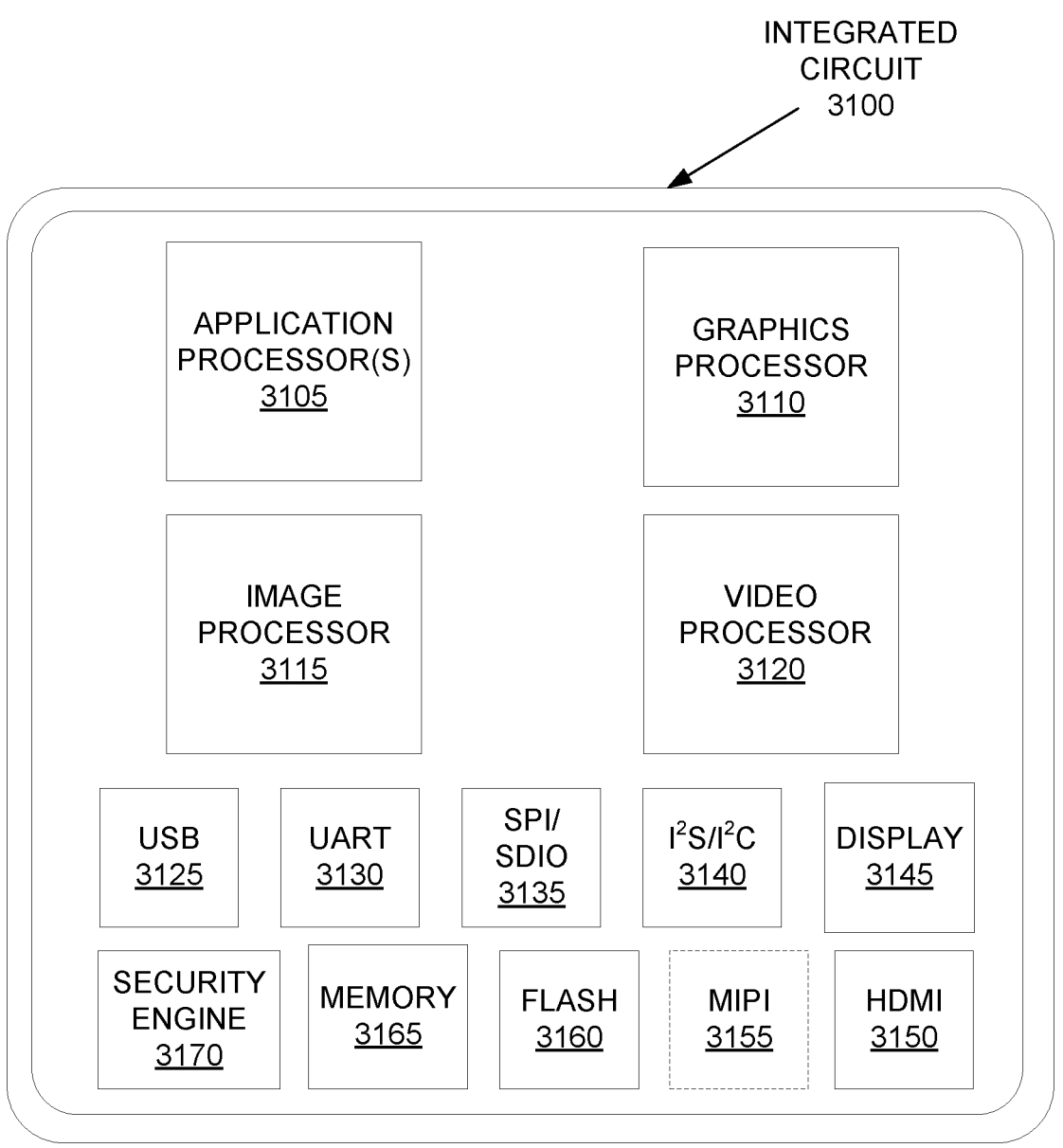
FIG. 31 illustrates an exemplary integrated circuit, in accordance with at least one embodiment.

FIG. 31 illustrates an exemplary integrated circuit 3100, in accordance with at least one embodiment. In at least one embodiment, exemplary integrated circuit 3100 is an SoC that may be fabricated using one or more IP cores. In at least one embodiment, integrated circuit 3100 includes one or more application processor(s) 3105 (e.g., CPUs, DPUs), at least one graphics processor 3110, and may additionally include an image processor 3115 and/or a video processor 3120, any of which may be a modular IP core. In at least one embodiment, integrated circuit 3100 includes peripheral or bus logic including a USB controller 3125, a UART controller 3130, an SPI/SDIO controller 3135, and an I²S/I²C controller 3140. In at least one embodiment, integrated circuit 3100 can include a display device 3145 coupled to one or more of a high-definition multimedia interface ("HDMI") controller 3150 and a mobile industry processor interface ("MIPI") display interface 3155. In at least one embodiment, storage may be provided by a flash memory subsystem 3160 including flash memory and a flash memory controller. In at least one embodiment, a memory interface may be provided via a memory controller 3165 for access to SDRAM or SRAM memory devices. In at least one embodiment, some integrated circuits additionally include an embedded security engine 3170.

Figure 32:
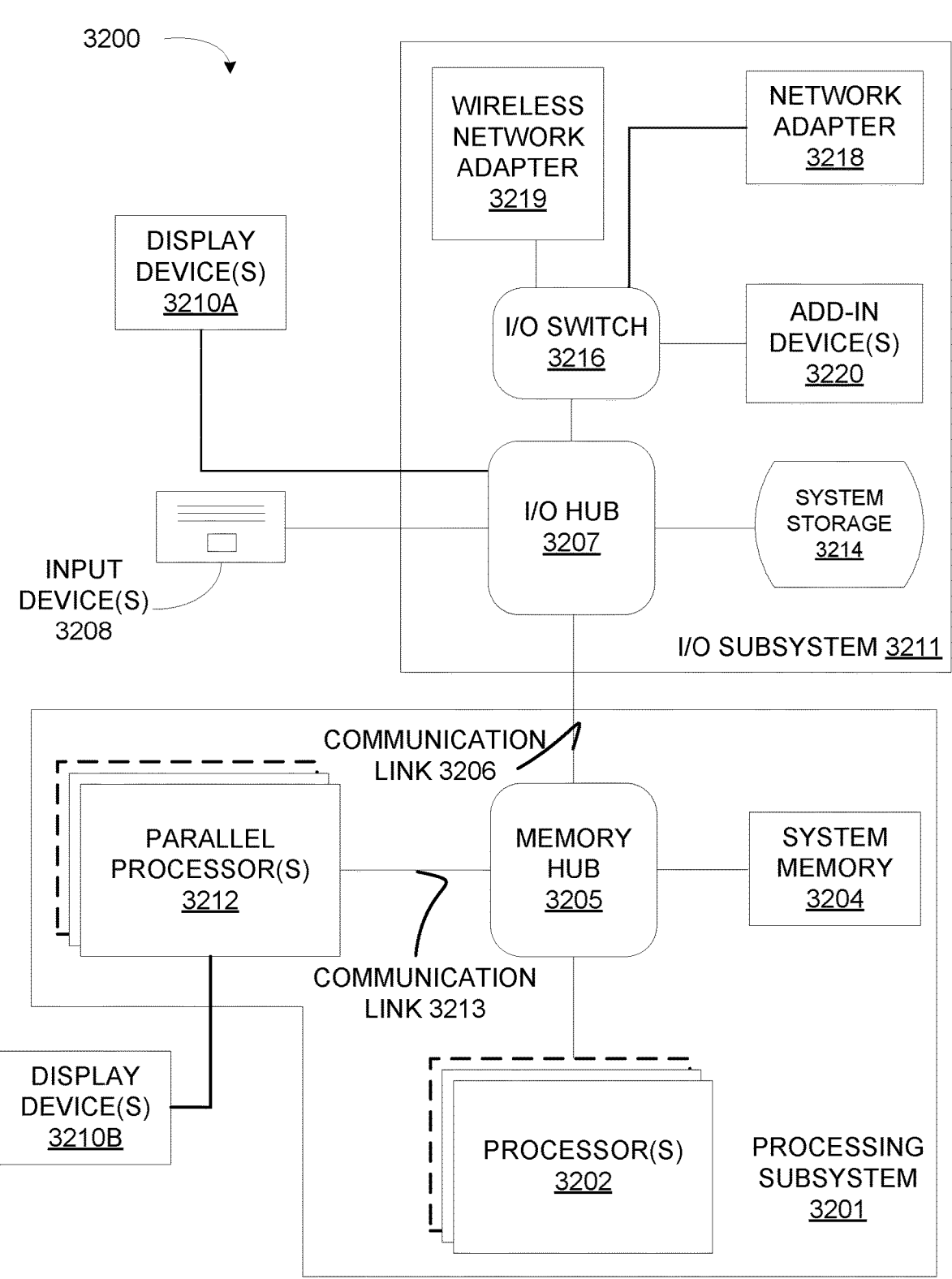
FIG. 32 illustrates a computing system, according to at least one embodiment.

FIG. 32 illustrates a computing system 3200, according to at least one embodiment; In at least one embodiment, computing system 3200 includes a processing subsystem 3201 having one or more processor(s) 3202 and a system memory 3204 communicating via an interconnection path that may include a memory hub 3205. In at least one embodiment, memory hub 3205 may be a separate component within a chipset component or may be integrated within one or more processor(s) 3202. In at least one embodiment, memory hub 3205 couples with an I/O subsystem 3211 via a communication link 3206. In at least one embodiment, I/O subsystem 3211 includes an I/O hub 3207 that can enable computing system 3200 to receive input from one or more input device(s) 3208. In at least one embodiment, I/O hub 3207 can enable a display controller, which may be included in one or more processor(s) 3202, to provide outputs to one or more display device(s) 3210A. In at least one embodiment, one or more display device(s) 3210A coupled with I/O hub 3207 can include a local, internal, or embedded display device.

In at least one embodiment, processing subsystem 3201 includes one or more parallel processor(s) 3212 coupled to memory hub 3205 via a bus or other communication link 3213. In at least one embodiment, communication link 3213 may be one of any number of standards based communication link technologies or protocols, such as, but not limited to PCIe, or may be a vendor specific communications interface or communications fabric. In at least one embodiment, one or more parallel processor(s) 3212 form a computationally focused parallel or vector processing system that can include a large number of processing cores and/or processing clusters, such as a many integrated core processor or compute units. In at least one embodiment, one or more parallel processor(s) 3212 form a graphics processing subsystem that can output pixels to one of one or more display device(s) 3210A coupled via I/O Hub 3207. In at least one embodiment, one or more parallel processor(s) 3212 can also include a display controller and display interface (not shown) to enable a direct connection to one or more display device(s) 3210B.

In at least one embodiment, a system storage unit 3214 can connect to I/O hub 3207 to provide a storage mechanism for computing system 3200. In at least one embodiment, an I/O switch 3216 can be used to provide an interface mechanism to enable connections between I/O hub 3207 and other components, such as a network adapter 3218 and/or wireless network adapter 3219 that may be integrated into a platform, and various other devices that can be added via one or more add-in device(s) 3220. In at least one embodiment, network adapter 3218 can be an Ethernet adapter or another wired network adapter. In at least one embodiment, wireless network adapter 3219 can include one or more of a Wi-Fi, Bluetooth, NFC, or other network device that includes one or more wireless radios.

In at least one embodiment, computing system 3200 can include other components not explicitly shown, including USB or other port connections, optical storage drives, video capture devices, and the like, that may also be connected to I/O hub 3207. In at least one embodiment, communication paths interconnecting various components in FIG. 32 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3212 incorporate circuitry optimized for graphics and video processing, including, for example, video output circuitry, and constitutes a graphics processing unit ("GPU"). In at least one embodiment, one or more parallel processor(s) 3212 incorporate circuitry optimized for general purpose processing. In at least embodiment, components of computing system 3200 may be integrated with one or more other system elements on a single integrated circuit. For example, in at least one embodiment, one or more parallel processor(s) 3212, memory hub 3205, processor(s) 3202, and I/O hub 3207 can be integrated into an SoC integrated circuit. In at least one embodiment, components of computing system 3200 can be integrated into a single package to form a system in package ("SIP") configuration. In at least one embodiment, at least a portion of the components of computing system 3200 can be integrated into a multi-chip module ("MCM"), which can be interconnected with other multi-chip modules into a modular computing system. In at least one embodiment, I/O subsystem 3211 and display devices 3210B are omitted from computing system 3200.

Processing Systems

The following figures set forth, without limitation, exemplary processing systems that can be used to implement at least one embodiment. In at least one embodiment, one or more processing systems of following figures can implement one or more aspects of an embodiment described with respect to one or more of FIGS. 1-26. In at least one embodiment, one or more processing systems include one or more components of system 100 of FIG. 1 (e.g., CPU 104, PPU 106, compiler 112, API 108), computer system 202 of FIG. 2 (e.g., processor 204, memory 206, set of APIs 232, compiler 260, code 262, GPU 210, and/or one or more components of set of nodes 264. In at least one embodiment, one or more processing systems perform one or more aspects of API 300 of FIG. 3, API 400 of FIG. 4, API 500 of FIG. 5, API 600 of FIG. 6, API 700 of FIG. 7, API 800 of FIG. 8, API 900 of FIG. 9, API 1000 of FIG. 10, API 1100 of FIG. 12, API 1300 of FIG. 13, and/or API 1400 of FIG. 14. In at least one embodiment, one or more processing systems perform one or more aspects of technique 1500 of FIG. 15, technique 1600 of FIG. 16, technique 1700 of FIG. 17, technique 1800 of FIG. 18, technique 1900 of FIG. 19, technique 2000 of FIG. 20, technique 2100 of FIG. 21, technique 2200 of FIG. 22, technique 2300 of FIG. 23, technique 2400 of FIG. 24, technique 2500 of FIG. 25, and/or technique 2600 of FIG. 26.

Figure 33:
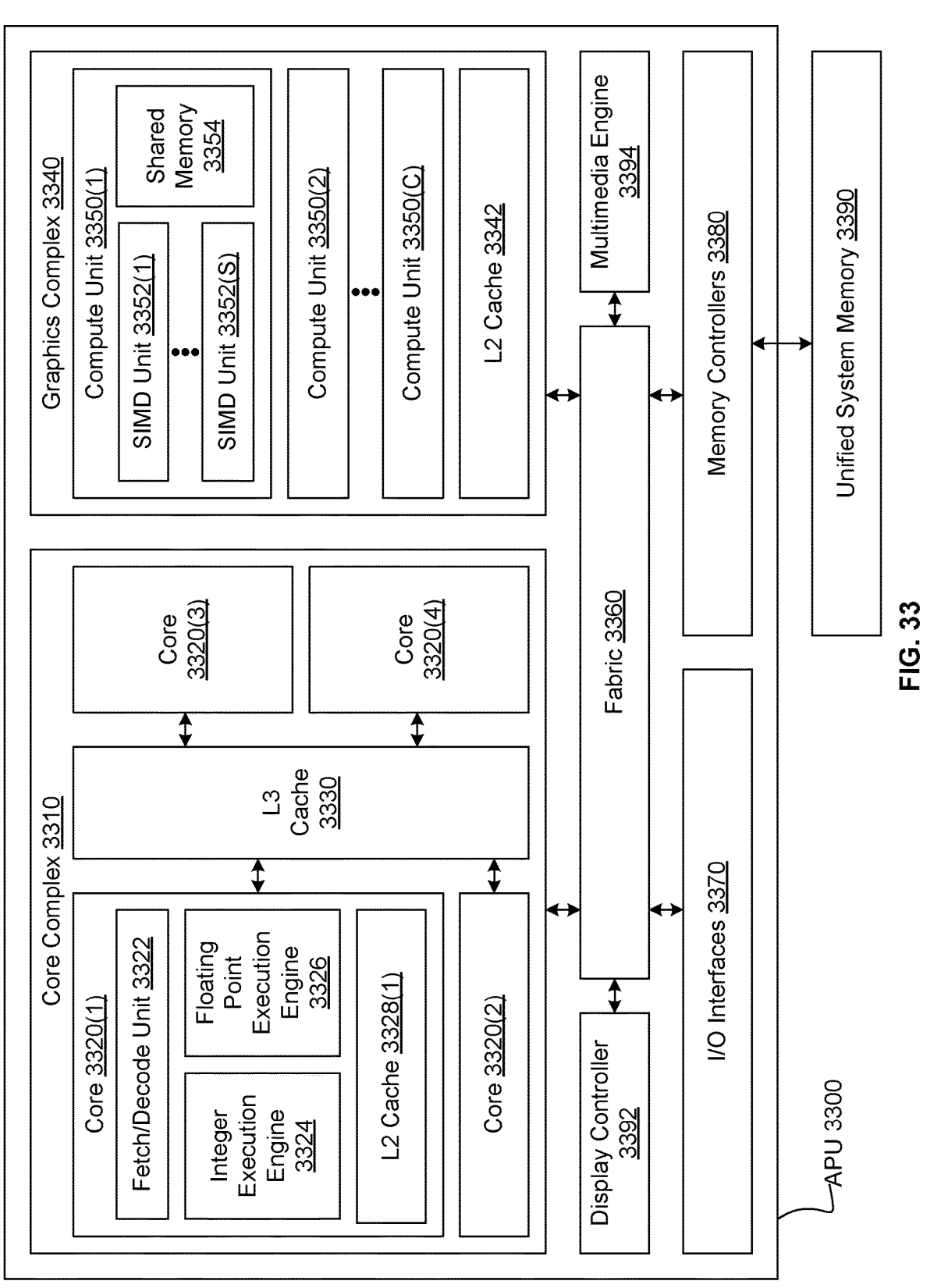
FIG. 33 illustrates an APU, in accordance with at least one embodiment.

FIG. 33 illustrates an accelerated processing unit ("APU") 3300, in accordance with at least one embodiment. In at least one embodiment, APU 3300 is developed by AMD Corporation of Santa Clara, CA. In at least one embodiment, APU 3300 can be configured to execute an application program, such as a CUDA program. In at least one embodiment, APU 3300 includes, without limitation, a core complex 3310, a graphics complex 3340, fabric 3360, I/O interfaces 3370, memory controllers 3380, a display controller 3392, and a multimedia engine 3394. In at least one embodiment, APU 3300 may include, without limitation, any number of core complexes 3310, any number of graphics complexes 3350, any number of display controllers 3392, and any number of multimedia engines 3394 in any combination. For explanatory purposes, multiple instances of like objects are denoted herein with reference numbers identifying the object and parenthetical numbers identifying the instance where needed.

In at least one embodiment, core complex 3310 is a CPU, graphics complex 3340 is a GPU, and APU 3300 is a processing unit that integrates, without limitation, 3310 and 3340 onto a single chip. In at least one embodiment, some tasks may be assigned to core complex 3310 and other tasks may be assigned to graphics complex 3340. In at least one embodiment, core complex 3310 is configured to execute main control software associated with APU 3300, such as an operating system. In at least one embodiment, core complex 3310 is the master processor of APU 3300, controlling and coordinating operations of other processors. In at least one embodiment, core complex 3310 issues commands that control the operation of graphics complex 3340. In at least one embodiment, core complex 3310 can be configured to execute host executable code derived from CUDA source code, and graphics complex 3340 can be configured to execute device executable code derived from CUDA source code.

In at least one embodiment, core complex 3310 includes, without limitation, cores 3320(1)-3320(4) and an L3 cache 3330. In at least one embodiment, core complex 3310 may include, without limitation, any number of cores 3320 and any number and type of caches in any combination. In at least one embodiment, cores 3320 are configured to execute instructions of a particular instruction set architecture ("ISA"). In at least one embodiment, each core 3320 is a CPU core. In at least one embodiment, core 3320 is referred to as a computing unit or compute unit.

In at least one embodiment, each core 3320 includes, without limitation, a fetch/decode unit 3322, an integer execution engine 3324, a floating point execution engine 3326, and an L2 cache 3328. In at least one embodiment, fetch/decode unit 3322 fetches instructions, decodes such instructions, generates micro-operations, and dispatches separate micro-instructions to integer execution engine 3324 and floating point execution engine 3326. In at least one embodiment, fetch/decode unit 3322 can concurrently dispatch one micro-instruction to integer execution engine 3324 and another micro-instruction to floating point execution engine 3326. In at least one embodiment, integer execution engine 3324 executes, without limitation, integer and memory operations. In at least one embodiment, floating point engine 3326 executes, without limitation, floating point and vector operations. In at least one embodiment, fetch-decode unit 3322 dispatches micro-instructions to a single execution engine that replaces both integer execution engine 3324 and floating point execution engine 3326.

In at least one embodiment, each core 3320(i), where i is an integer representing a particular instance of core 3320, may access L2 cache 3328(i) included in core 3320(i). In at least one embodiment, each core 3320 included in core complex 3310(j), where j is an integer representing a particular instance of core complex 3310, is connected to other cores 3320 included in core complex 3310(j) via L3 cache 3330(j) included in core complex 3310(j). In at least one embodiment, cores 3320 included in core complex 3310(j), where j is an integer representing a particular instance of core complex 3310, can access all of L3 cache 3330(j) included in core complex 3310(j). In at least one embodiment, L3 cache 3330 may include, without limitation, any number of slices.

In at least one embodiment, graphics complex 3340 can be configured to perform compute operations in a highly-parallel fashion. In at least one embodiment, graphics complex 3340 is configured to execute graphics pipeline operations such as draw commands, pixel operations, geometric computations, and other operations associated with rendering an image to a display. In at least one embodiment, graphics complex 3340 is configured to execute operations unrelated to graphics. In at least one embodiment, graphics complex 3340 is configured to execute both operations related to graphics and operations unrelated to graphics.

In at least one embodiment, graphics complex 3340 includes, without limitation, any number of compute units 3350 and an L2 cache 3342. In at least one embodiment, compute units 3350 share L2 cache 3342. In at least one embodiment, L2 cache 3342 is partitioned. In at least one embodiment, graphics complex 3340 includes, without limitation, any number of compute units 3350 and any number (including zero) and type of caches. In at least one embodiment, graphics complex 3340 includes, without limitation, any amount of dedicated graphics hardware.

In at least one embodiment, each compute unit 3350 includes, without limitation, any number of SIMD units 3352 and a shared memory 3354. In at least one embodiment, each SIMD unit 3352 implements a SIMD architecture and is configured to perform operations in parallel. In at least one embodiment, each compute unit 3350 may execute any number of thread blocks, but each thread block executes on a single compute unit 3350. In at least one embodiment, a thread block includes, without limitation, any number of threads of execution. In at least one embodiment, a workgroup is a thread block. In at least one embodiment, each SIMD unit 3352 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3354.

In at least one embodiment, fabric 3360 is a system interconnect that facilitates data and control transmissions across core complex 3310, graphics complex 3340, I/O interfaces 3370, memory controllers 3380, display controller 3392, and multimedia engine 3394. In at least one embodiment, APU 3300 may include, without limitation, any amount and type of system interconnect in addition to or instead of fabric 3360 that facilitates data and control transmissions across any number and type of directly or indirectly linked components that may be internal or external to APU 3300. In at least one embodiment, I/O interfaces 3370 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3370 In at least one embodiment, peripheral devices that are coupled to I/O interfaces 3370 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3394 includes, without limitation, any amount and type of circuitry that is related to multimedia, such as a video decoder, a video encoder, an image signal processor, etc. In at least one embodiment, memory controllers 3380 facilitate data transfers between APU 3300 and a unified system memory 3390. In at least one embodiment, core complex 3310 and graphics complex 3340 share unified system memory 3390.

In at least one embodiment, APU 3300 implements a memory subsystem that includes, without limitation, any amount and type of memory controllers 3380 and memory devices (e.g., shared memory 3354) that may be dedicated to one component or shared among multiple components. In at least one embodiment, APU 3300 implements a cache subsystem that includes, without limitation, one or more cache memories (e.g., L2 caches 3428, L3 cache 3330, and L2 cache 3342) that may each be private to or shared between any number of components (e.g., cores 3320, core complex 3310, SIMD units 3352, compute units 3350, and graphics complex 3340).

Figure 34:
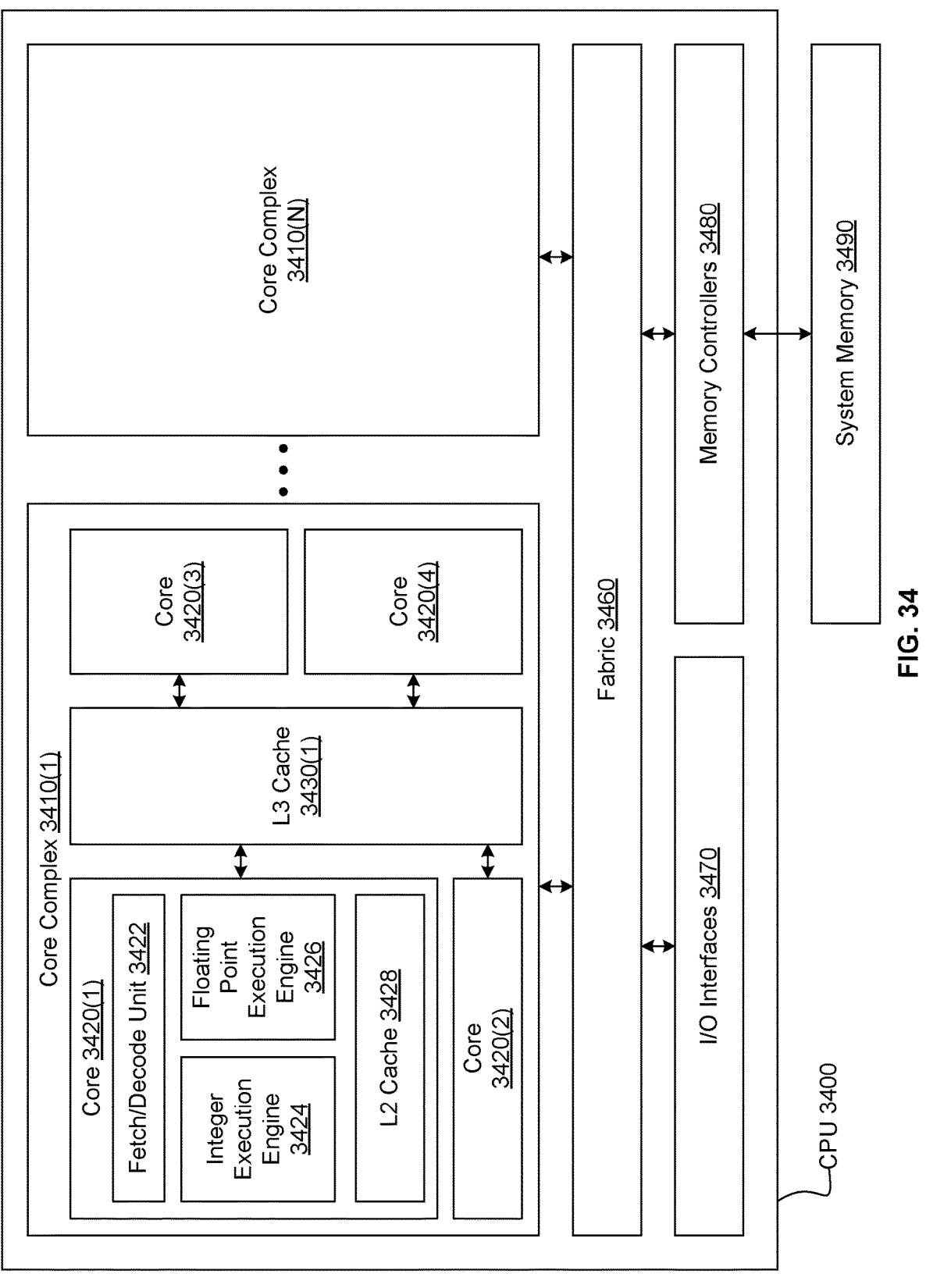
FIG. 34 illustrates a CPU, in accordance with at least one embodiment.

FIG. 34 illustrates a CPU 3400, in accordance with at least one embodiment. In at least one embodiment, CPU 3400 is developed by AMD Corporation of Santa Clara, CA. In at least one embodiment, CPU 3400 can be configured to execute an application program. In at least one embodiment, CPU 3400 is configured to execute main control software, such as an operating system. In at least one embodiment, CPU 3400 issues commands that control the operation of an external GPU (not shown). In at least one embodiment, CPU 3400 can be configured to execute host executable code derived from CUDA source code, and an external GPU can be configured to execute device executable code derived from such CUDA source code. In at least one embodiment, CPU 3400 includes, without limitation, any number of core complexes 3410, fabric 3460, I/O interfaces 3470, and memory controllers 3480.

In at least one embodiment, core complex 3410 includes, without limitation, cores 3420(1)-3420(4) and an L3 cache 3430. In at least one embodiment, core complex 3410 may include, without limitation, any number of cores 3420 and any number and type of caches in any combination. In at least one embodiment, cores 3420 are configured to execute instructions of a particular ISA. In at least one embodiment, each core 3420 is a CPU core.

In at least one embodiment, each core 3420 includes, without limitation, a fetch/decode unit 3422, an integer execution engine 3424, a floating point execution engine 3426, and an L2 cache 3428. In at least one embodiment, fetch/decode unit 3422 fetches instructions, decodes such instructions, generates micro-operations, and dispatches separate micro-instructions to integer execution engine 3424 and floating point execution engine 3426. In at least one embodiment, fetch/decode unit 3422 can concurrently dispatch one micro-instruction to integer execution engine 3424 and another micro-instruction to floating point execution engine 3426. In at least one embodiment, integer execution engine 3424 executes, without limitation, integer and memory operations. In at least one embodiment, floating point engine 3426 executes, without limitation, floating point and vector operations. In at least one embodiment, fetch-decode unit 3422 dispatches micro-instructions to a single execution engine that replaces both integer execution engine 3424 and floating point execution engine 3426.

In at least one embodiment, each core 3420(i), where i is an integer representing a particular instance of core 3420, may access L2 cache 3428(i) included in core 3420(i). In at least one embodiment, each core 3420 included in core complex 3410(j), where j is an integer representing a particular instance of core complex 3410, is connected to other cores 3420 in core complex 3410(j) via L3 cache 3430(j) included in core complex 3410(j). In at least one embodiment, cores 3420 included in core complex 3410(j), where j is an integer representing a particular instance of core complex 3410, can access all of L3 cache 3430(j) included in core complex 3410(j). In at least one embodiment, L3 cache 3430 may include, without limitation, any number of slices.

In at least one embodiment, fabric 3460 is a system interconnect that facilitates data and control transmissions across core complexes 3410(1)-3410(N) (where N is an integer greater than zero), I/O interfaces 3470, and memory controllers 3480. In at least one embodiment, CPU 3400 may include, without limitation, any amount and type of system interconnect in addition to or instead of fabric 3460 that facilitates data and control transmissions across any number and type of directly or indirectly linked components that may be internal or external to CPU 3400. In at least one embodiment, I/O interfaces 3470 are representative of any number and type of I/O interfaces (e.g., PCI, PCI-X, PCIe, GBE, USB, etc.). In at least one embodiment, various types of peripheral devices are coupled to I/O interfaces 3470 In at least one embodiment, peripheral devices that are coupled to I/O interfaces 3470 may include, without limitation, displays, keyboards, mice, printers, scanners, joysticks or other types of game controllers, media recording devices, external storage devices, network interface cards, and so forth.

In at least one embodiment, memory controllers 3480 facilitate data transfers between CPU 3400 and a system memory 3490. In at least one embodiment, core complex 3410 and graphics complex 3440 share system memory 3490. In at least one embodiment, CPU 3400 implements a memory subsystem that includes, without limitation, any amount and type of memory controllers 3480 and memory devices that may be dedicated to one component or shared among multiple components. In at least one embodiment, CPU 3400 implements a cache subsystem that includes, without limitation, one or more cache memories (e.g., L2 caches 3428 and L3 caches 3430) that may each be private to or shared between any number of components (e.g., cores 3420 and core complexes 3410).

Figure 35:
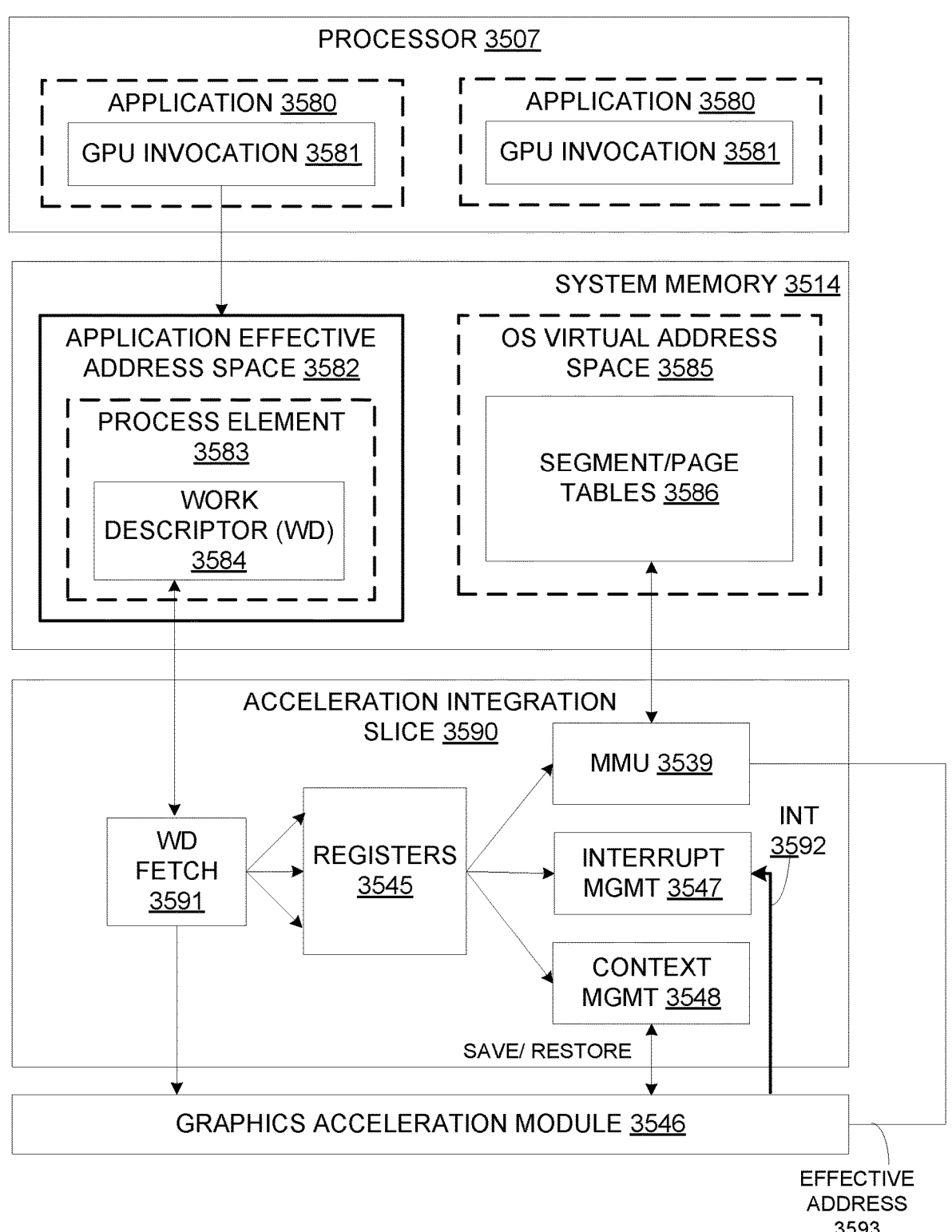
FIG. 35 illustrates an exemplary accelerator integration slice, in accordance with at least one embodiment.

FIG. 35 illustrates an exemplary accelerator integration slice 3590, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 3582 within system memory 3514 stores process elements 3583. In one embodiment, process elements 3583 are stored in response to GPU invocations 3581 from applications 3580 executed on processor 3507. A process element 3583 contains process state for corresponding application 3580. A work descriptor ("WD") 3584 contained in process element 3583 can be a single job requested by an application or may contain a pointer to a queue of jobs. In at least one embodiment, WD 3584 is a pointer to a job request queue in application effective address space 3582.

Graphics acceleration module 3546 and/or individual graphics processing engines can be shared by all or a subset of processes in a system. In at least one embodiment, an infrastructure for setting up process state and sending WD 3584 to graphics acceleration module 3546 to start a job in a virtualized environment may be included.

In at least one embodiment, a dedicated-process programming model is implementation-specific. In this model, a single process owns graphics acceleration module 3546 or an individual graphics processing engine. Because graphics acceleration module 3546 is owned by a single process, a hypervisor initializes an accelerator integration circuit for an owning partition and an operating system initializes accelerator integration circuit for an owning process when graphics acceleration module 3546 is assigned.

In operation, a WD fetch unit 3591 in accelerator integration slice 3590 fetches next WD 3584 which includes an indication of work to be done by one or more graphics processing engines of graphics acceleration module 3546. Data from WD 3584 may be stored in registers 3545 and used by a memory management unit ("MMU") 3539, interrupt management circuit 3547 and/or context management circuit 3548 as illustrated. For example, one embodiment of MMU 3539 includes segment/page walk circuitry for accessing segment/page tables 3586 within OS virtual address space 3585. Interrupt management circuit 3547 may process interrupt events ("INT") 3592 received from graphics acceleration module 3546. When performing graphics operations, an effective address 3593 generated by a graphics processing engine is translated to a real address by MMU 3539.

In one embodiment, a same set of registers 3545 are duplicated for each graphics processing engine and/or graphics acceleration module 3546 and may be initialized by a hypervisor or operating system. Each of these duplicated registers may be included in accelerator integration slice 3590. Exemplary registers that may be initialized by a hypervisor are shown in Table 1.

TABLE 1

| Hypervisor Initialized Registers |
| --- |
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by an operating system are shown in Table 2.

TABLE 2

| Operating System Initialized Registers |
| --- |
| 1  Process and Thread Identification |
| 2  Effective Address (EA) Context Save/Restore Pointer |
| 3  Virtual Address (VA) Accelerator Utilization Record Pointer |
| 4  Virtual Address (VA) Storage Segment Table Pointer |
| 5  Authority Mask |
| 6  Work descriptor |

In one embodiment, each WD 3584 is specific to a particular graphics acceleration module 3546 and/or a particular graphics processing engine. It contains all information required by a graphics processing engine to do work or it can be a pointer to a memory location where an application has set up a command queue of work to be completed.

Figure 36B:
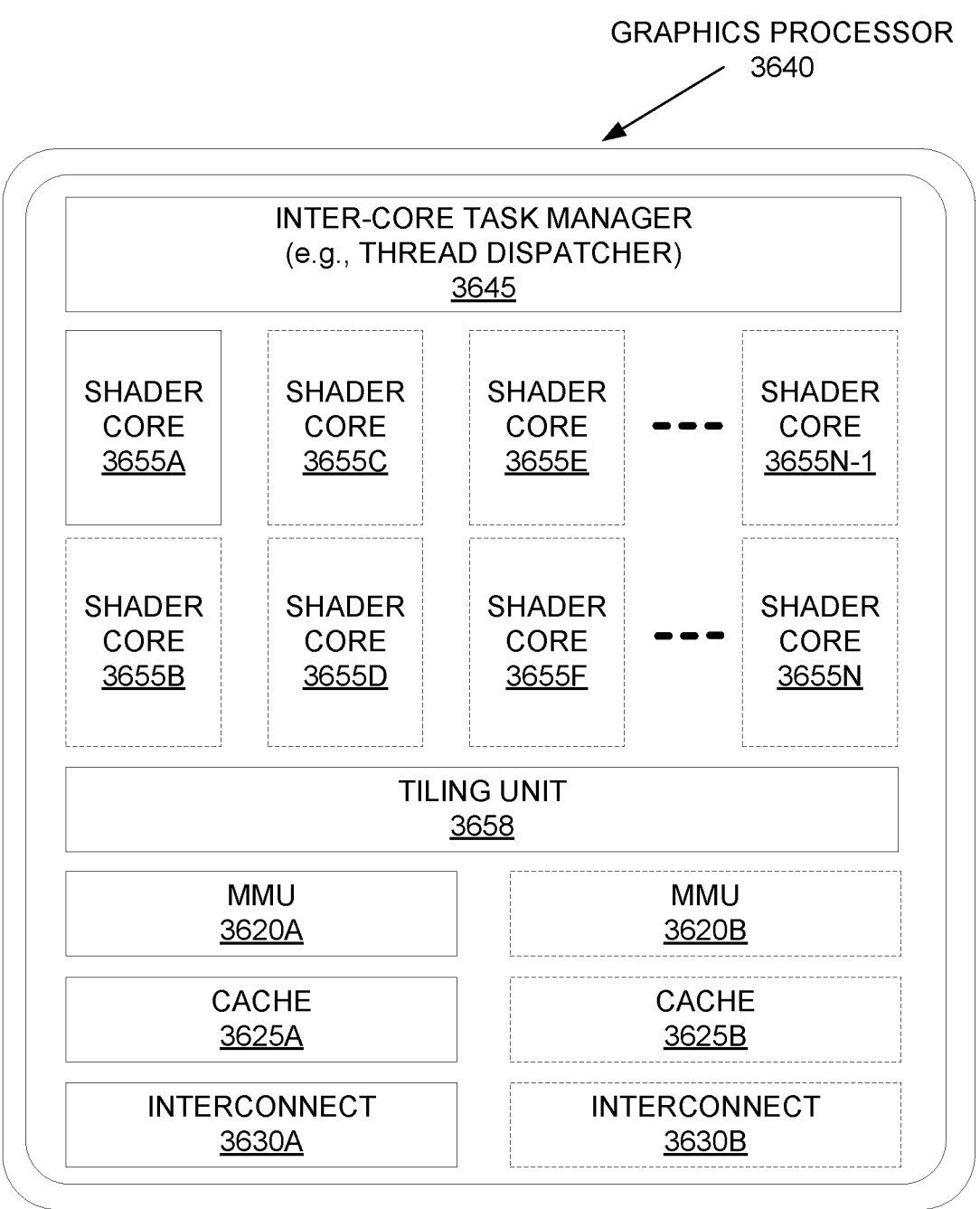

FIGS. 36A-36B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 36A illustrates an exemplary graphics processor 3610 of an SoC integrated circuit that may be fabricated using one or more IP cores, in accordance with at least one embodiment. FIG. 36B illustrates an additional exemplary graphics processor 3640 of an SoC integrated circuit that may be fabricated using one or more IP cores, in accordance with at least one embodiment. In at least one embodiment, graphics processor 3610 of FIG. 36A is a low power graphics processor core. In at least one embodiment, graphics processor 3640 of FIG. 36B is a higher performance graphics processor core. In at least one embodiment, each of graphics processors 3610, 3640 can be variants of graphics processor 3110 of FIG. 31.

In at least one embodiment, graphics processor 3610 includes a vertex processor 3605 and one or more fragment processor(s) 3615A-3615N (e.g., 3615A, 3615B, 3615C, 3615D, through 3615N-1, and 3615N). In at least one embodiment, graphics processor 3610 can execute different shader programs via separate logic, such that vertex processor 3605 is optimized to execute operations for vertex shader programs, while one or more fragment processor(s) 3615A-3615N execute fragment (e.g., pixel) shading operations for fragment or pixel shader programs. In at least one embodiment, vertex processor 3605 performs a vertex processing stage of a 3D graphics pipeline and generates primitives and vertex data. In at least one embodiment, fragment processor(s) 3615A-3615N use primitive and vertex data generated by vertex processor 3605 to produce a framebuffer that is displayed on a display device. In at least one embodiment, fragment processor(s) 3615A-3615N are optimized to execute fragment shader programs as provided for in an OpenGL API, which may be used to perform similar operations as a pixel shader program as provided for in a Direct 3D API.

In at least one embodiment, graphics processor 3610 additionally includes one or more MMU(s) 3620A-3620B, cache(s) 3625A-3625B, and circuit interconnect(s) 3630A-3630B. In at least one embodiment, one or more MMU(s) 3620A-3620B provide for virtual to physical address mapping for graphics processor 3610, including for vertex processor 3605 and/or fragment processor(s) 3615A-3615N, which may reference vertex or image/texture data stored in memory, in addition to vertex or image/texture data stored in one or more cache(s) 3625A-3625B. In at least one embodiment, one or more MMU(s) 3620A-3620B may be synchronized with other MMUs within a system, including one or more MMUs associated with one or more application processor(s) 3105, image processors 3115, and/or video processors 3120 of FIG. 31, such that each processor 3105-3120 can participate in a shared or unified virtual memory system. In at least one embodiment, one or more circuit interconnect(s) 3630A-3630B enable graphics processor 3610 to interface with other IP cores within an SoC, either via an internal bus of the SoC or via a direct connection.

In at least one embodiment, graphics processor 3640 includes one or more MMU(s) 3620A-3620B, caches 3625A-3625B, and circuit interconnects 3630A-3630B of graphics processor 3610 of FIG. 36A. In at least one embodiment, graphics processor 3640 includes one or more shader core(s) 3655A-3655N (e.g., 3655A, 3655B, 3655C, 3655D, 3655E, 3655F, through 3655N-1, and 3655N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3640 includes an inter-core task manager 3645, which acts as a thread dispatcher to dispatch execution threads to one or more shader cores 3655A-3655N and a tiling unit 3658 to accelerate tiling operations for tile-based rendering, in which rendering operations for a scene are subdivided in image space, for example to exploit local spatial coherence within a scene or to optimize use of internal caches.

Figure 37A:
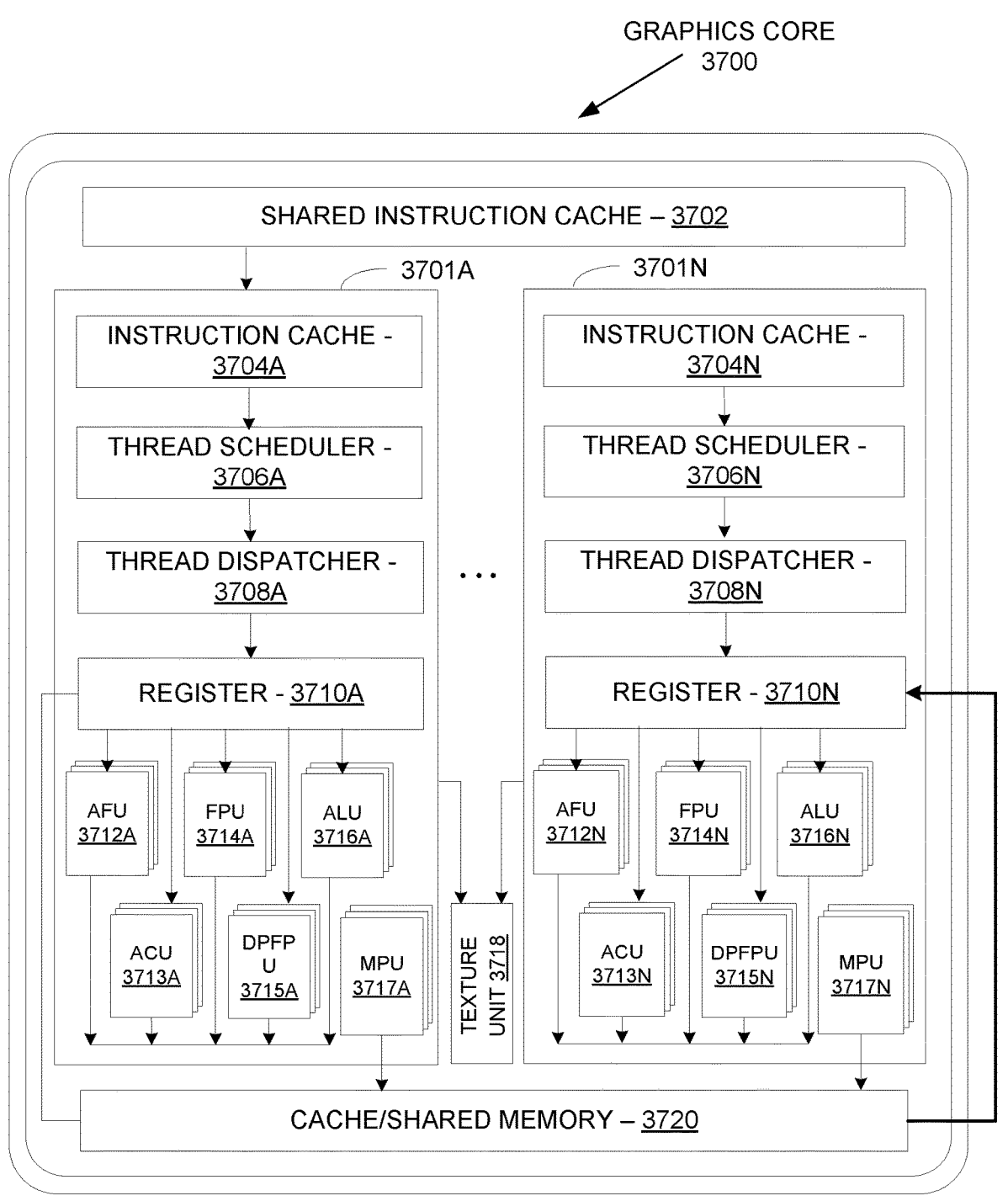
FIG. 37A illustrates a graphics core, in accordance with at least one embodiment.

FIG. 37A illustrates a graphics core 3700, in accordance with at least one embodiment. In at least one embodiment, graphics core 3700 may be included within graphics processor 3110 of FIG. 31. In at least one embodiment, graphics core 3700 may be a unified shader core 3655A-3655N as in FIG. 36B. In at least one embodiment, graphics core 3700 includes a shared instruction cache 3702, a texture unit 3718, and a cache/shared memory 3720 that are common to execution resources within graphics core 3700. In at least one embodiment, graphics core 3700 can include multiple slices 3701A-3701N or partition for each core, and a graphics processor can include multiple instances of graphics core 3700. Slices 3701A-3701N can include support logic including a local instruction cache 3704A-3704N, a thread scheduler 3706A-3706N, a thread dispatcher 3708A-3708N, and a set of registers 3710A-3710N. In at least one embodiment, slices 3701A-3701N can include a set of additional function units ("AFUs") 3712A-3712N, floating-point units ("FPUs") 3714A-3714N, integer arithmetic logic units ("ALUs") 3716-3716N, address computational units ("ACUs") 3713A-3713N, double-precision floating-point units ("DPFPUs") 3715A-3715N, and matrix processing units ("MPUs") 3717A-3717N. In at least one embodiment, a graphics core 3700 is referred to as a compute unit or computing unit.

In at least one embodiment, FPUs 3714A-3714N can perform single-precision (32-bit) and half-precision (16-bit) floating point operations, while DPFPUs 3715A-3715N perform double precision (64-bit) floating point operations. In at least one embodiment, ALUs 3716A-3716N can perform variable precision integer operations at 8-bit, 16-bit, and 32-bit precision, and can be configured for mixed precision operations. In at least one embodiment, MPUs 3717A-3717N can also be configured for mixed precision matrix operations, including half-precision floating point and 8-bit integer operations. In at least one embodiment, MPUs 3717-3717N can perform a variety of matrix operations to accelerate CUDA programs, including enabling support for accelerated general matrix to matrix multiplication ("GEMM"). In at least one embodiment, AFUs 3712A-3712N can perform additional logic operations not supported by floating-point or integer units, including trigonometric operations (e.g., Sine, Cosine, etc.).

Figure 37B:
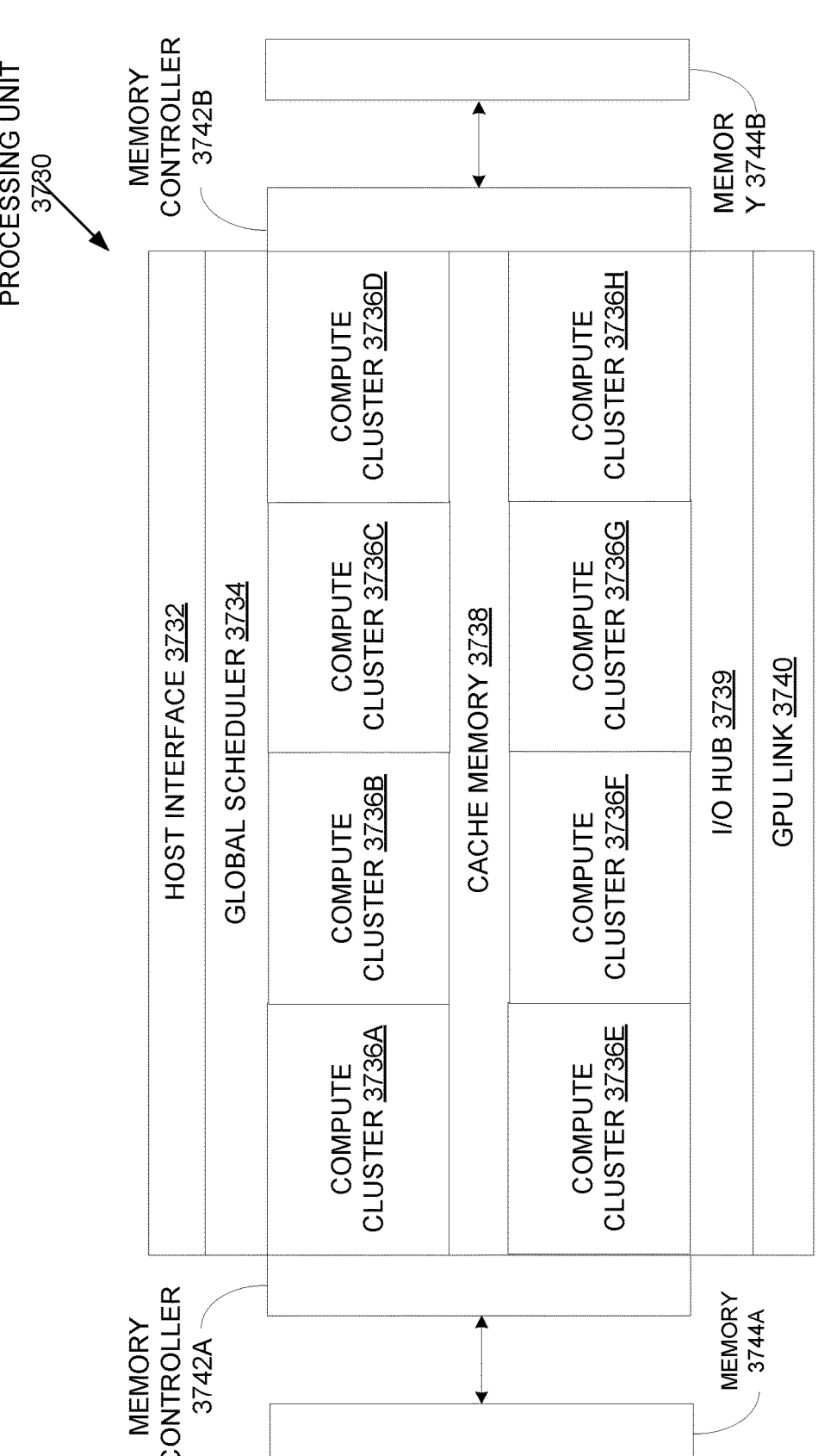
FIG. 37B illustrates a GPGPU, in accordance with at least one embodiment.

FIG. 37B illustrates a general-purpose graphics processing unit ("GPGPU") 3730, in accordance with at least one embodiment. In at least one embodiment, GPGPU 3730 is highly-parallel and suitable for deployment on a multi-chip module. In at least one embodiment, GPGPU 3730 can be configured to enable highly-parallel compute operations to be performed by an array of GPUs. In at least one embodiment, GPGPU 3730 can be linked directly to other instances of GPGPU 3730 to create a multi-GPU cluster to improve execution time for CUDA programs. In at least one embodiment, GPGPU 3730 includes a host interface 3732 to enable a connection with a host processor. In at least one embodiment, host interface 3732 is a PCIe interface. In at least one embodiment, host interface 3732 can be a vendor specific communications interface or communications fabric. In at least one embodiment, GPGPU 3730 receives commands from a host processor and uses a global scheduler 3734 to distribute execution threads associated with those commands to a set of compute clusters 3736A-3736H. In at least one embodiment, compute clusters 3736A-3736H share a cache memory 3738. In at least one embodiment, cache memory 3738 can serve as a higher-level cache for cache memories within compute clusters 3736A-3736H.

In at least one embodiment, GPGPU 3730 includes memory 3744A-3744B coupled with compute clusters 3736A-3736H via a set of memory controllers 3742A-3742B. In at least one embodiment, memory 3744A-3744B can include various types of memory devices including DRAM or graphics random access memory, such as synchronous graphics random access memory ("SGRAM"), including graphics double data rate ("GDDR") memory.

In at least one embodiment, compute clusters 3736A-3736H each include a set of graphics cores, such as graphics core 3700 of FIG. 37A, which can include multiple types of integer and floating point logic units that can perform computational operations at a range of precisions including suited for computations associated with CUDA programs. For example, in at least one embodiment, at least a subset of floating point units in each of compute clusters 3736A-3736H can be configured to perform 16-bit or 32-bit floating point operations, while a different subset of floating point units can be configured to perform 64-bit floating point operations.

In at least one embodiment, multiple instances of GPGPU 3730 can be configured to operate as a compute cluster. Compute clusters 3736A-3736H may implement any technically feasible communication techniques for synchronization and data exchange. In at least one embodiment, multiple instances of GPGPU 3730 communicate over host interface 3732. In at least one embodiment, GPGPU 3730 includes an I/O hub 3739 that couples GPGPU 3730 with a GPU link 3740 that enables a direct connection to other instances of GPGPU 3730. In at least one embodiment, GPU link 3740 is coupled to a dedicated GPU-to-GPU bridge that enables communication and synchronization between multiple instances of GPGPU 3730. In at least one embodiment GPU link 3740 couples with a high speed interconnect to transmit and receive data to other GPGPUs 3730 or parallel processors. In at least one embodiment, multiple instances of GPGPU 3730 are located in separate data processing systems and communicate via a network device that is accessible via host interface 3732. In at least one embodiment GPU link 3740 can be configured to enable a connection to a host processor in addition to or as an alternative to host interface 3732. In at least one embodiment, GPGPU 3730 can be configured to execute a CUDA program.

Figure 38A:
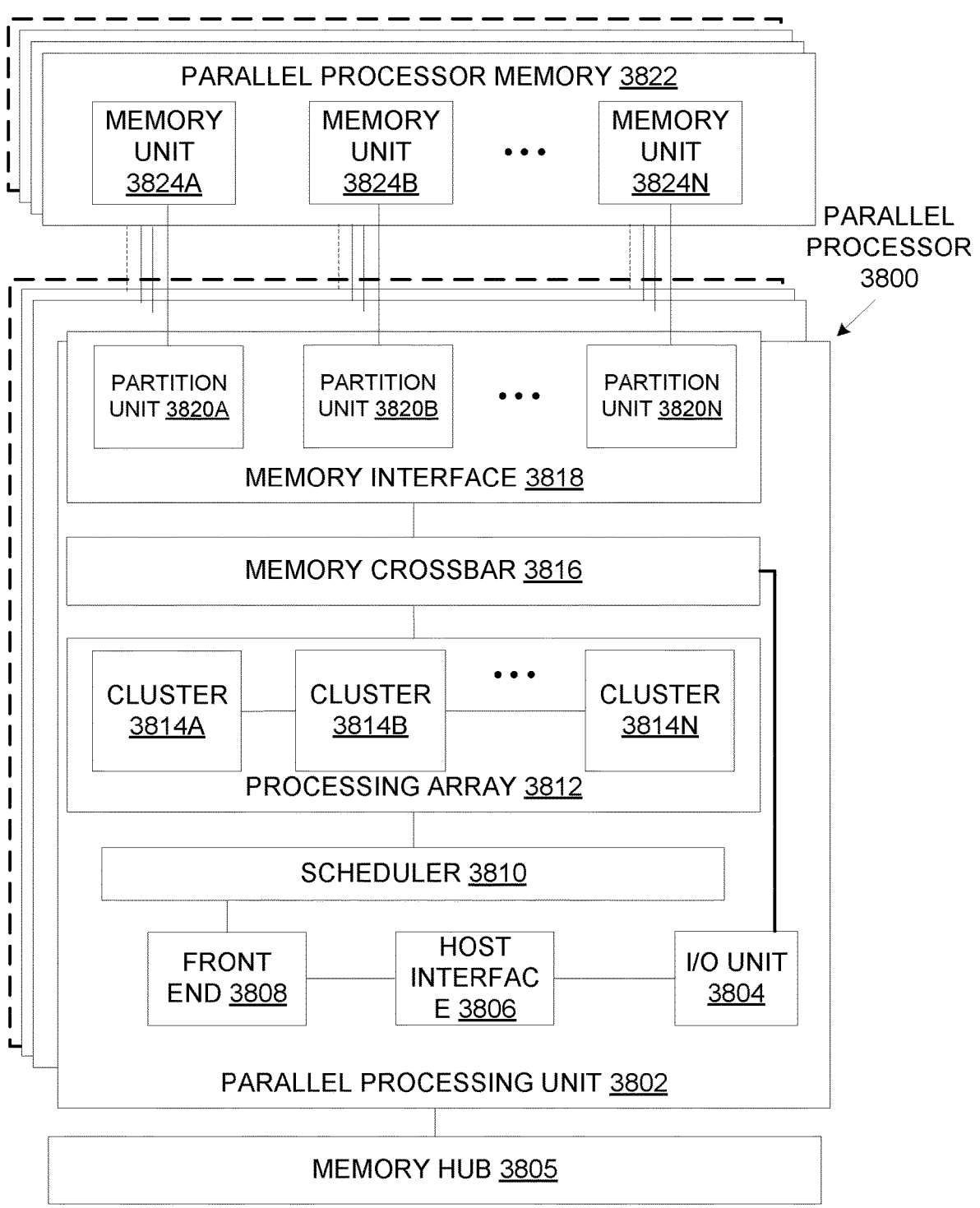
FIG. 38A illustrates a parallel processor, in accordance with at least one embodiment.

FIG. 38A illustrates a parallel processor 3800, in accordance with at least one embodiment. In at least one embodiment, various components of parallel processor 3800 may be implemented using one or more integrated circuit devices, such as programmable processors, application specific integrated circuits ("ASICs"), or FPGAs.

In at least one embodiment, parallel processor 3800 includes a parallel processing unit 3802. In at least one embodiment, parallel processing unit 3802 includes an I/O unit 3804 that enables communication with other devices, including other instances of parallel processing unit 3802. In at least one embodiment, I/O unit 3804 may be directly connected to other devices. In at least one embodiment, I/O unit 3804 connects with other devices via use of a hub or switch interface, such as memory hub 3805. In at least one embodiment, connections between memory hub 3805 and I/O unit 3804 form a communication link. In at least one embodiment, I/O unit 3804 connects with a host interface 3806 and a memory crossbar 3816, where host interface 3806 receives commands directed to performing processing operations and memory crossbar 3816 receives commands directed to performing memory operations.

In at least one embodiment, when host interface 3806 receives a command buffer via I/O unit 3804, host interface 3806 can direct work operations to perform those commands to a front end 3808. In at least one embodiment, front end 3808 couples with a scheduler 3810, which is configured to distribute commands or other work items to a processing array 3812. In at least one embodiment, scheduler 3810 ensures that processing array 3812 is properly configured and in a valid state before tasks are distributed to processing array 3812. In at least one embodiment, scheduler 3810 is implemented via firmware logic executing on a microcontroller. In at least one embodiment, microcontroller implemented scheduler 3810 is configurable to perform complex scheduling and work distribution operations at coarse and fine granularity, enabling rapid preemption and context switching of threads executing on processing array 3812. In at least one embodiment, host software can prove workloads for scheduling on processing array 3812 via one of multiple graphics processing doorbells. In at least one embodiment, workloads can then be automatically distributed across processing array 3812 by scheduler 3810 logic within a microcontroller including scheduler 3810.

In at least one embodiment, processing array 3812 can include up to "N" clusters (e.g., cluster 3814A, cluster 3814B, through cluster 3814N). In at least one embodiment, each cluster 3814A-3814N of processing array 3812 can execute a large number of concurrent threads. In at least one embodiment, scheduler 3810 can allocate work to clusters 3814A-3814N of processing array 3812 using various scheduling and/or work distribution algorithms, which may vary depending on the workload arising for each type of program or computation. In at least one embodiment, scheduling can be handled dynamically by scheduler 3810, or can be assisted in part by compiler logic during compilation of program logic configured for execution by processing array 3812. In at least one embodiment, different clusters 3814A-3814N of processing array 3812 can be allocated for processing different types of programs or for performing different types of computations.

In at least one embodiment, processing array 3812 can be configured to perform various types of parallel processing operations. In at least one embodiment, processing array 3812 is configured to perform general-purpose parallel compute operations. For example, in at least one embodiment, processing array 3812 can include logic to execute processing tasks including filtering of video and/or audio data, performing modeling operations, including physics operations, and performing data transformations.

In at least one embodiment, processing array 3812 is configured to perform parallel graphics processing operations. In at least one embodiment, processing array 3812 can include additional logic to support execution of such graphics processing operations, including, but not limited to texture sampling logic to perform texture operations, as well as tessellation logic and other vertex processing logic. In at least one embodiment, processing array 3812 can be configured to execute graphics processing related shader programs such as, but not limited to vertex shaders, tessellation shaders, geometry shaders, and pixel shaders. In at least one embodiment, parallel processing unit 3802 can transfer data from system memory via I/O unit 3804 for processing. In at least one embodiment, during processing, transferred data can be stored to on-chip memory (e.g., a parallel processor memory 3822) during processing, then written back to system memory.

In at least one embodiment, when parallel processing unit 3802 is used to perform graphics processing, scheduler 3810 can be configured to divide a processing workload into approximately equal sized tasks, to better enable distribution of graphics processing operations to multiple clusters 3814A-3814N of processing array 3812. In at least one embodiment, portions of processing array 3812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3814A-3814N may be stored in buffers to allow intermediate data to be transmitted between clusters 3814A-3814N for further processing.

In at least one embodiment, processing array 3812 can receive processing tasks to be executed via scheduler 3810, which receives commands defining processing tasks from front end 3808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3810 may be configured to fetch indices corresponding to tasks or may receive indices from front end 3808. In at least one embodiment, front end 3808 can be configured to ensure processing array 3812 is configured to a valid state before a workload specified by incoming command buffers (e.g., batch-buffers, push buffers, etc.) is initiated.

In at least one embodiment, each of one or more instances of parallel processing unit 3802 can couple with parallel processor memory 3822. In at least one embodiment, parallel processor memory 3822 can be accessed via memory crossbar 3816, which can receive memory requests from processing array 3812 as well as I/O unit 3804. In at least one embodiment, memory crossbar 3816 can access parallel processor memory 3822 via a memory interface 3818. In at least one embodiment, memory interface 3818 can include multiple partition units (e.g., a partition unit 3820A, partition unit 3820B, through partition unit 3820N) that can each couple to a portion (e.g., memory unit) of parallel processor memory 3822. In at least one embodiment, a number of partition units 3820A-3820N is configured to be equal to a number of memory units, such that a first partition unit 3820A has a corresponding first memory unit 3824A, a second partition unit 3820B has a corresponding memory unit 3824B, and an Nth partition unit 3820N has a corresponding Nth memory unit 3824N. In at least one embodiment, a number of partition units 3820A-3820N may not be equal to a number of memory devices.

In at least one embodiment, memory units 3824A-3824N can include various types of memory devices, including DRAM or graphics random access memory, such as SGRAM, including GDDR memory. In at least one embodiment, memory units 3824A-3824N may also include 3D stacked memory, including but not limited to high bandwidth memory ("HBM"). In at least one embodiment, render targets, such as frame buffers or texture maps may be stored across memory units 3824A-3824N, allowing partition units 3820A-3820N to write portions of each render target in parallel to efficiently use available bandwidth of parallel processor memory 3822. In at least one embodiment, a local instance of parallel processor memory 3822 may be excluded in favor of a unified memory design that utilizes system memory in conjunction with local cache memory.

In at least one embodiment, any one of clusters 3814A-3814N of processing array 3812 can process data that will be written to any of memory units 3824A-3824N within parallel processor memory 3822. In at least one embodiment, memory crossbar 3816 can be configured to transfer an output of each cluster 3814A-3814N to any partition unit 3820A-3820N or to another cluster 3814A-3814N, which can perform additional processing operations on an output. In at least one embodiment, each cluster 3814A-3814N can communicate with memory interface 3818 through memory crossbar 3816 to read from or write to various external memory devices. In at least one embodiment, memory crossbar 3816 has a connection to memory interface 3818 to communicate with I/O unit 3804, as well as a connection to a local instance of parallel processor memory 3822, enabling processing units within different clusters 3814A-3814N to communicate with system memory or other memory that is not local to parallel processing unit 3802. In at least one embodiment, memory crossbar 3816 can use virtual channels to separate traffic streams between clusters 3814A-3814N and partition units 3820A-3820N.

In at least one embodiment, multiple instances of parallel processing unit 3802 can be provided on a single add-in card, or multiple add-in cards can be interconnected. In at least one embodiment, different instances of parallel processing unit 3802 can be configured to interoperate even if different instances have different numbers of processing cores, different amounts of local parallel processor memory, and/or other configuration differences. For example, in at least one embodiment, some instances of parallel processing unit 3802 can include higher precision floating point units relative to other instances. In at least one embodiment, systems incorporating one or more instances of parallel processing unit 3802 or parallel processor 3800 can be implemented in a variety of configurations and form factors, including but not limited to desktop, laptop, or handheld personal computers, servers, workstations, game consoles, and/or embedded systems.

Figure 38B:
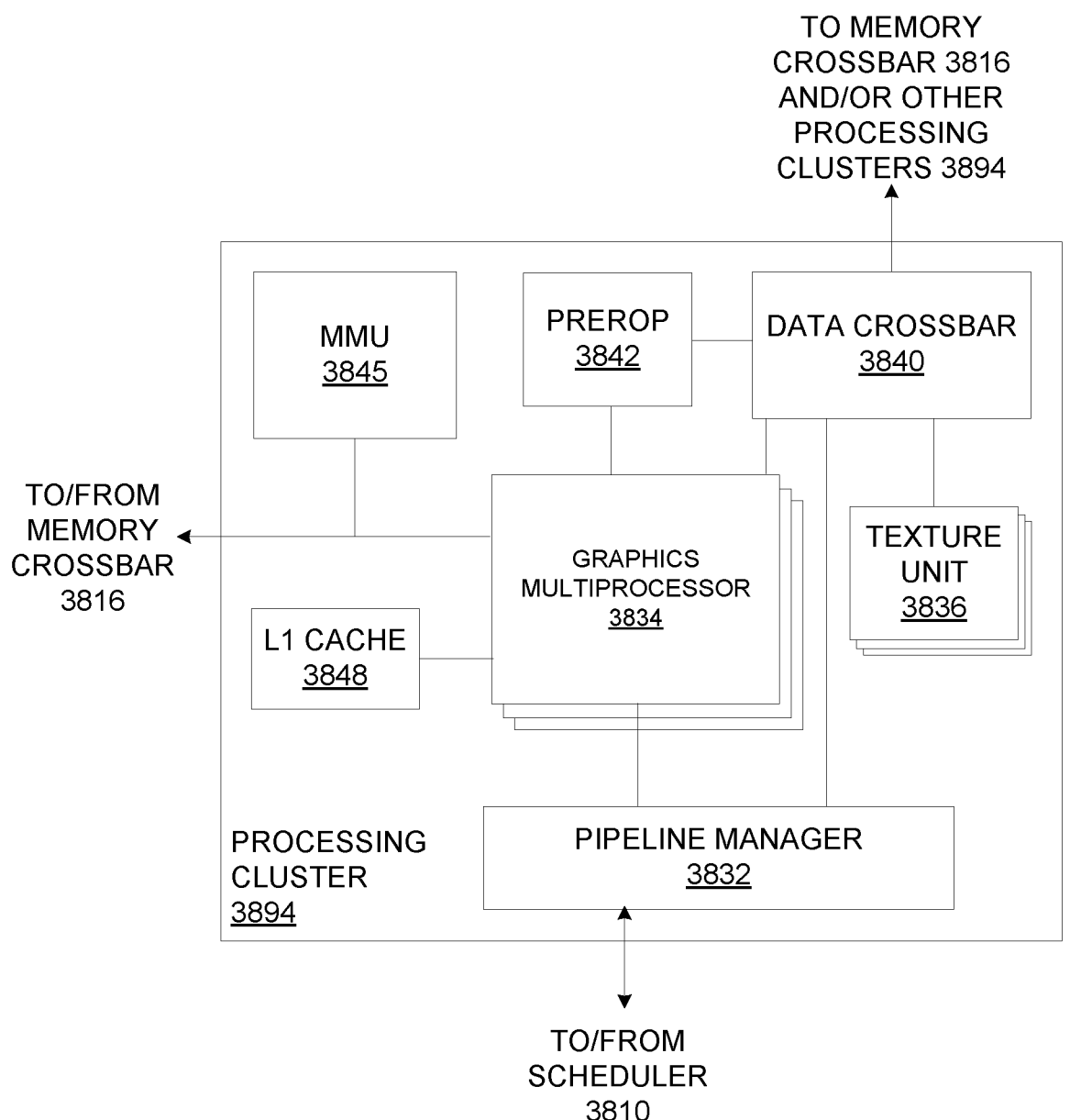
FIG. 38B illustrates a processing cluster, in accordance with at least one embodiment.

FIG. 38B illustrates a processing cluster 3894, in accordance with at least one embodiment. In at least one embodiment, processing cluster 3894 is included within a parallel processing unit. In at least one embodiment, processing cluster 3894 is one of processing clusters 3814A-3814N of FIG. 38. In at least one embodiment, processing cluster 3894 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 3894.

In at least one embodiment, operation of processing cluster 3894 can be controlled via a pipeline manager 3832 that distributes processing tasks to SIMT parallel processors. In at least one embodiment, pipeline manager 3832 receives instructions from scheduler 3810 of FIG. 38 and manages execution of those instructions via a graphics multiprocessor 3834 and/or a texture unit 3836. In at least one embodiment, graphics multiprocessor 3834 is an exemplary instance of a SIMT parallel processor. However, in at least one embodiment, various types of SIMT parallel processors of differing architectures may be included within processing cluster 3894. In at least one embodiment, one or more instances of graphics multiprocessor 3834 can be included within processing cluster 3894. In at least one embodiment, graphics multiprocessor 3834 can process data and a data crossbar 3840 can be used to distribute processed data to one of multiple possible destinations, including other shader units. In at least one embodiment, pipeline manager 3832 can facilitate distribution of processed data by specifying destinations for processed data to be distributed via data crossbar 3840.

In at least one embodiment, each graphics multiprocessor 3834 within processing cluster 3894 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3894 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 3834. In at least one embodiment, a thread group may include fewer threads than a number of processing engines within graphics multiprocessor 3834. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 3834. In at least one embodiment, when a thread group includes more threads than the number of processing engines within graphics multiprocessor 3834, processing can be performed over consecutive clock cycles. In at least one embodiment, multiple thread groups can be executed concurrently on graphics multiprocessor 3834.

In at least one embodiment, graphics multiprocessor 3834 includes an internal cache memory to perform load and store operations. In at least one embodiment, graphics multiprocessor 3834 can forego an internal cache and use a cache memory (e.g., L1 cache 3848) within processing cluster 3894. In at least one embodiment, each graphics multiprocessor 3834 also has access to Level 2 ("L2") caches within partition units (e.g., partition units 3820A-3820N of FIG. 38A) that are shared among all processing clusters 3894 and may be used to transfer data between threads. In at least one embodiment, graphics multiprocessor 3834 may also access off-chip global memory, which can include one or more of local parallel processor memory and/or system memory. In at least one embodiment, any memory external to parallel processing unit 3802 may be used as global memory. In at least one embodiment, processing cluster 3894 includes multiple instances of graphics multiprocessor 3834 that can share common instructions and data, which may be stored in L1 cache 3848.

In at least one embodiment, each processing cluster 3894 may include an MMU 3845 that is configured to map virtual addresses into physical addresses. In at least one embodiment, one or more instances of MMU 3845 may reside within memory interface 3818 of FIG. 38. In at least one embodiment, MMU 3845 includes a set of page table entries ("PTEs") used to map a virtual address to a physical address of a tile and optionally a cache line index. In at least one embodiment, MMU 3845 may include address translation lookaside buffers ("TLBs") or caches that may reside within graphics multiprocessor 3834 or L1 cache 3848 or processing cluster 3894. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 3894 may be configured such that each graphics multiprocessor 3834 is coupled to a texture unit 3836 for performing texture mapping operations, e.g., determining texture sample positions, reading texture data, and filtering texture data. In at least one embodiment, texture data is read from an internal texture L1 cache (not shown) or from an L1 cache within graphics multiprocessor 3834 and is fetched from an L2 cache, local parallel processor memory, or system memory, as needed. In at least one embodiment, each graphics multiprocessor 3834 outputs a processed task to data crossbar 3840 to provide the processed task to another processing cluster 3894 for further processing or to store the processed task in an L2 cache, a local parallel processor memory, or a system memory via memory crossbar 3816. In at least one embodiment, a pre-raster operations unit ("preROP") 3842 is configured to receive data from graphics multiprocessor 3834, direct data to ROP units, which may be located with partition units as described herein (e.g., partition units 3820A-3820N of FIG. 38). In at least one embodiment, PreROP 3842 can perform optimizations for color blending, organize pixel color data, and perform address translations.

Figure 38C:
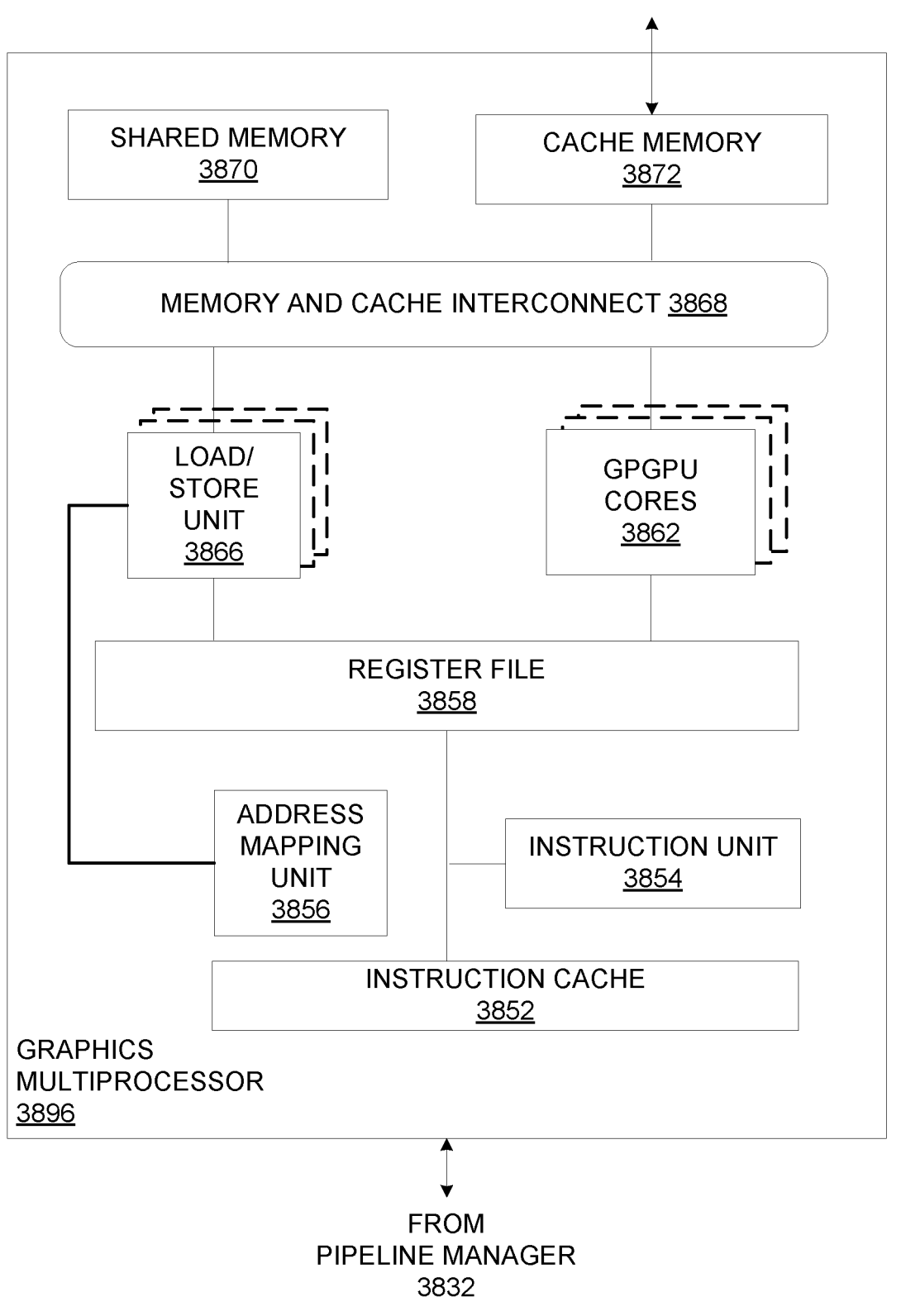
FIG. 38C illustrates a graphics multiprocessor, in accordance with at least one embodiment.

FIG. 38C illustrates a graphics multiprocessor 3896, in accordance with at least one embodiment. In at least one embodiment, graphics multiprocessor 3896 is graphics multiprocessor 3834 of FIG. 38B. In at least one embodiment, graphics multiprocessor 3896 couples with pipeline manager 3832 of processing cluster 3894. In at least one embodiment, graphics multiprocessor 3896 has an execution pipeline including but not limited to an instruction cache 3852, an instruction unit 3854, an address mapping unit 3856, a register file 3858, one or more GPGPU cores 3862, and one or more LSUs 3866. GPGPU cores 3862 and LSUs 3866 are coupled with cache memory 3872 and shared memory 3870 via a memory and cache interconnect 3868.

In at least one embodiment, instruction cache 3852 receives a stream of instructions to execute from pipeline manager 3832. In at least one embodiment, instructions are cached in instruction cache 3852 and dispatched for execution by instruction unit 3854. In at least one embodiment, instruction unit 3854 can dispatch instructions as thread groups (e.g., warps), with each thread of a thread group assigned to a different execution unit within GPGPU core 3862. In at least one embodiment, an instruction can access any of a local, shared, or global address space by specifying an address within a unified address space. In at least one embodiment, address mapping unit 3856 can be used to translate addresses in a unified address space into a distinct memory address that can be accessed by LSUs 3866.

In at least one embodiment, register file 3858 provides a set of registers for functional units of graphics multiprocessor 3896. In at least one embodiment, register file 3858 provides temporary storage for operands connected to data paths of functional units (e.g., GPGPU cores 3862, LSUs 3866) of graphics multiprocessor 3896. In at least one embodiment, register file 3858 is divided between each of functional units such that each functional unit is allocated a dedicated portion of register file 3858. In at least one embodiment, register file 3858 is divided between different thread groups being executed by graphics multiprocessor 3896.

In at least one embodiment, GPGPU cores 3862 can each include FPUs and/or integer ALUs that are used to execute instructions of graphics multiprocessor 3896. GPGPU cores 3862 can be similar in architecture or can differ in architecture. In at least one embodiment, a first portion of GPGPU cores 3862 include a single precision FPU and an integer ALU while a second portion of GPGPU cores 3862 include a double precision FPU. In at least one embodiment, FPUs can implement IEEE 754-2008 standard for floating point arithmetic or enable variable precision floating point arithmetic. In at least one embodiment, graphics multiprocessor 3896 can additionally include one or more fixed function or special function units to perform specific functions such as copy rectangle or pixel blending operations. In at least one embodiment one or more of GPGPU cores 3862 can also include fixed or special function logic.

In at least one embodiment, GPGPU cores 3862 include SIMD logic capable of performing a single instruction on multiple sets of data. In at least one embodiment GPGPU cores 3862 can physically execute SIMD4, SIMD8, and SIMD16 instructions and logically execute SIMD1, SIMD2, and SIMD32 instructions. In at least one embodiment, SIMD instructions for GPGPU cores 3862 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 3868 is an interconnect network that connects each functional unit of graphics multiprocessor 3896 to register file 3858 and to shared memory 3870. In at least one embodiment, memory and cache interconnect 3868 is a crossbar interconnect that allows LSU 3866 to implement load and store operations between shared memory 3870 and register file 3858. In at least one embodiment, register file 3858 can operate at a same frequency as GPGPU cores 3862, thus data transfer between GPGPU cores 3862 and register file 3858 is very low latency. In at least one embodiment, shared memory 3870 can be used to enable communication between threads that execute on functional units within graphics multiprocessor 3896. In at least one embodiment, cache memory 3872 can be used as a data cache for example, to cache texture data communicated between functional units and texture unit 3836. In at least one embodiment, shared memory 3870 can also be used as a program managed cached. In at least one embodiment, threads executing on GPGPU cores 3862 can programmatically store data within shared memory in addition to automatically cached data that is stored within cache memory 3872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 39:
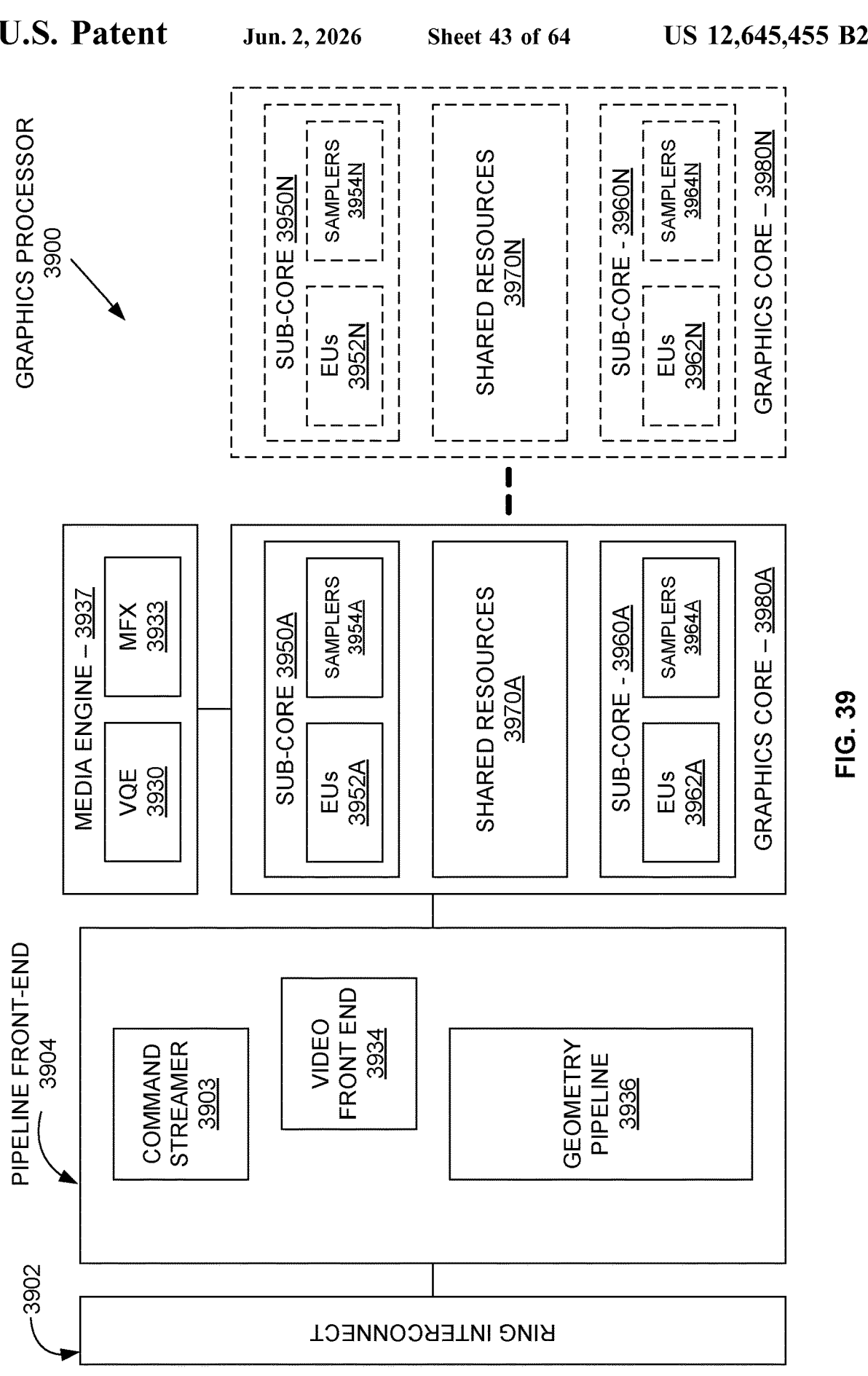
FIG. 39 illustrates a graphics processor, in accordance with at least one embodiment.

FIG. 39 illustrates a graphics processor 3900, in accordance with at least one embodiment. In at least one embodiment, graphics processor 3900 includes a ring interconnect 3902, a pipeline front-end 3904, a media engine 3937, and graphics cores 3980A-3980N. In at least one embodiment, ring interconnect 3902 couples graphics processor 3900 to other processing units, including other graphics processors or one or more general-purpose processor cores. In at least one embodiment, graphics processor 3900 is one of many processors integrated within a multi-core processing system.

In at least one embodiment, graphics processor 3900 receives batches of commands via ring interconnect 3902. In at least one embodiment, incoming commands are interpreted by a command streamer 3903 in pipeline front-end 3904. In at least one embodiment, graphics processor 3900 includes scalable execution logic to perform 3D geometry processing and media processing via graphics core(s) 3980A-3980N. In at least one embodiment, for 3D geometry processing commands, command streamer 3903 supplies commands to geometry pipeline 3936. In at least one embodiment, for at least some media processing commands, command streamer 3903 supplies commands to a video front end 3934, which couples with a media engine 3937. In at least one embodiment, media engine 3937 includes a Video Quality Engine ("VQE") 3930 for video and image post-processing and a multi-format encode/decode ("MFX") engine 3933 to provide hardware-accelerated media data encode and decode. In at least one embodiment, geometry pipeline 3936 and media engine 3937 each generate execution threads for thread execution resources provided by at least one graphics core 3980A.

In at least one embodiment, graphics processor 3900 includes scalable thread execution resources featuring modular graphics cores 3980A-3980N (sometimes referred to as core slices), each having multiple sub-cores 3950A-550N, 3960A-3960N (sometimes referred to as core sub-slices). In at least one embodiment, graphics processor 3900 can have any number of graphics cores 3980A through 3980N. In at least one embodiment, graphics processor 3900 includes a graphics core 3980A having at least a first sub-core 3950A and a second sub-core 3960A. In at least one embodiment, graphics processor 3900 is a low power processor with a single sub-core (e.g., sub-core 3950A). In at least one embodiment, graphics processor 3900 includes multiple graphics cores 3980A-3980N, each including a set of first sub-cores 3950A-3950N and a set of second sub-cores 3960A-3960N. In at least one embodiment, each sub-core in first sub-cores 3950A-3950N includes at least a first set of execution units ("EUs") 3952A-3952N and media/texture samplers 3954A-3954N. In at least one embodiment, each sub-core in second sub-cores 3960A-3960N includes at least a second set of execution units 3962A-3962N and samplers 3964A-3964N. In at least one embodiment, each sub-core 3950A-3950N, 3960A-3960N shares a set of shared resources 3970A-3970N. In at least one embodiment, shared resources 3970 include shared cache memory and pixel operation logic.

Figure 40:
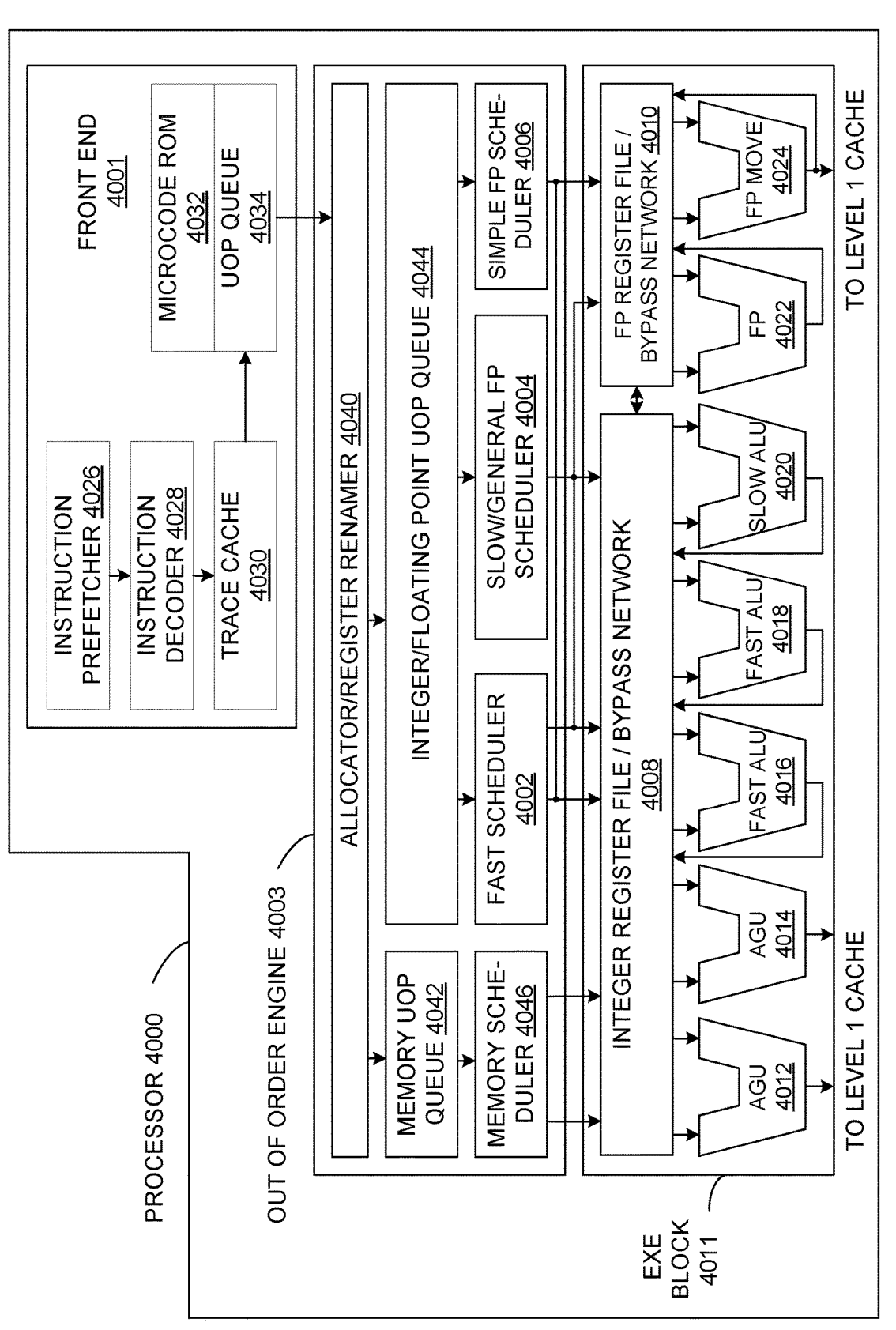
FIG. 40 illustrates a processor, in accordance with at least one embodiment.

FIG. 40 illustrates a processor 4000, in accordance with at least one embodiment. In at least one embodiment, processor 4000 may include, without limitation, logic circuits to perform instructions. In at least one embodiment, processor 4000 may perform instructions, including x86 instructions, ARM instructions, specialized instructions for ASICs, etc. In at least one embodiment, processor 4010 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 4010 may perform instructions to accelerate CUDA programs.

In at least one embodiment, processor 4000 includes an in-order front end ("front end") 4001 to fetch instructions to be executed and prepare instructions to be used later in processor pipeline. In at least one embodiment, front end 4001 may include several units. In at least one embodiment, an instruction prefetcher 4026 fetches instructions from memory and feeds instructions to an instruction decoder 4028 which in turn decodes or interprets instructions. For example, in at least one embodiment, instruction decoder 4028 decodes a received instruction into one or more operations called "micro-instructions" or "micro-operations" (also called "micro ops" or "uops") for execution. In at least one embodiment, instruction decoder 4028 parses instruction into an opcode and corresponding data and control fields that may be used by micro-architecture to perform operations. In at least one embodiment, a trace cache 4030 may assemble decoded uops into program ordered sequences or traces in a uop queue 4034 for execution. In at least one embodiment, when trace cache 4030 encounters a complex instruction, a microcode ROM 4032 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 4028 may access microcode ROM 4032 to perform instruction. In at least one embodiment, an instruction may be decoded into a small number of micro-ops for processing at instruction decoder 4028. In at least one embodiment, an instruction may be stored within microcode ROM 4032 should a number of micro-ops be needed to accomplish operation. In at least one embodiment, trace cache 4030 refers to an entry point programmable logic array ("PLA") to determine a correct micro-instruction pointer for reading microcode sequences to complete one or more instructions from microcode ROM 4032. In at least one embodiment, after microcode ROM 4032 finishes sequencing micro-ops for an instruction, front end 4001 of machine may resume fetching micro-ops from trace cache 4030.

In at least one embodiment, out-of-order execution engine ("out of order engine") 4003 may prepare instructions for execution. In at least one embodiment, out-of-order execution logic has a number of buffers to smooth out and re-order the flow of instructions to optimize performance as they go down a pipeline and get scheduled for execution. Out-of-order execution engine 4003 includes, without limitation, an allocator/register renamer 4040, a memory uop queue 4042, an integer/floating point uop queue 4044, a memory scheduler 4046, a fast scheduler 4002, a slow/general floating point scheduler ("slow/general FP scheduler") 4004, and a simple floating point scheduler ("simple FP scheduler") 4006. In at least one embodiment, fast schedule 4002, slow/general floating point scheduler 4004, and simple floating point scheduler 4006 are also collectively referred to herein as "uop schedulers 4002, 4004, 4006." Allocator/register renamer 4040 allocates machine buffers and resources that each uop needs in order to execute. In at least one embodiment, allocator/register renamer 4040 renames logic registers onto entries in a register file. In at least one embodiment, allocator/register renamer 4040 also allocates an entry for each uop in one of two uop queues, memory uop queue 4042 for memory operations and integer/floating point uop queue 4044 for non-memory operations, in front of memory scheduler 4046 and uop schedulers 4002, 4004, 4006. In at least one embodiment, uop schedulers 4002, 4004, 4006, determine when a uop is ready to execute based on readiness of their dependent input register operand sources and availability of execution resources uops need to complete their operation. In at least one embodiment, fast scheduler 4002 of at least one embodiment may schedule on each half of main clock cycle while slow/general floating point scheduler 4004 and simple floating point scheduler 4006 may schedule once per main processor clock cycle. In at least one embodiment, uop schedulers 4002, 4004, 4006 arbitrate for dispatch ports to schedule uops for execution.

In at least one embodiment, execution block 4011 includes, without limitation, an integer register file/bypass network 4008, a floating point register file/bypass network ("FP register file/bypass network") 4010, address generation units ("AGUs") 4012 and 4014, fast ALUs 4016 and 4018, a slow ALU 4020, a floating point ALU ("FP") 4022, and a floating point move unit ("FP move") 4024. In at least one embodiment, integer register file/bypass network 4008 and floating point register file/bypass network 4010 are also referred to herein as "register files 4008, 4010." In at least one embodiment, AGUSs 4012 and 4014, fast ALUs 4016 and 4018, slow ALU 4020, floating point ALU 4022, and floating point move unit 4024 are also referred to herein as "execution units 4012, 4014, 4016, 4018, 4020, 4022, and 4024." In at least one embodiment, an execution block may include, without limitation, any number (including zero) and type of register files, bypass networks, address generation units, and execution units, in any combination.

In at least one embodiment, register files 4008, 4010 may be arranged between uop schedulers 4002, 4004, 4006, and execution units 4012, 4014, 4016, 4018, 4020, 4022, and 4024. In at least one embodiment, integer register file/bypass network 4008 performs integer operations. In at least one embodiment, floating point register file/bypass network 4010 performs floating point operations. In at least one embodiment, each of register files 4008, 4010 may include, without limitation, a bypass network that may bypass or forward just completed results that have not yet been written into register file to new dependent uops. In at least one embodiment, register files 4008, 4010 may communicate data with each other. In at least one embodiment, integer register file/bypass network 4008 may include, without limitation, two separate register files, one register file for low-order thirty-two bits of data and a second register file for high order thirty-two bits of data. In at least one embodiment, floating point register file/bypass network 4010 may include, without limitation, 128-bit wide entries because floating point instructions typically have operands from 64 to 128 bits in width.

In at least one embodiment, execution units 4012, 4014, 4016, 4018, 4020, 4022, 4024 may execute instructions. In at least one embodiment, register files 4008, 4010 store integer and floating point data operand values that micro-instructions need to execute. In at least one embodiment, processor 4000 may include, without limitation, any number and combination of execution units 4012, 4014, 4016, 4018, 4020, 4022, 4024. In at least one embodiment, floating point ALU 4022 and floating point move unit 4024 may execute floating point, MMX, SIMD, AVX and SSE, or other operations. In at least one embodiment, floating point ALU 4022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 4016, 4018. In at least one embodiment, fast ALUS 4016, 4018 may execute fast operations with an effective latency of half a clock cycle. In at least one embodiment, most complex integer operations go to slow ALU 4020 as slow ALU 4020 may include, without limitation, integer execution hardware for long-latency type of operations, such as a multiplier, shifts, flag logic, and branch processing. In at least one embodiment, memory load/store operations may be executed by AGUs 4012, 4014. In at least one embodiment, fast ALU 4016, fast ALU 4018, and slow ALU 4020 may perform integer operations on 64-bit data operands. In at least one embodiment, fast ALU 4016, fast ALU 4018, and slow ALU 4020 may be implemented to support a variety of data bit sizes including sixteen, thirty-two, 128, 256, etc. In at least one embodiment, floating point ALU 4022 and floating point move unit 4024 may be implemented to support a range of operands having bits of various widths. In at least one embodiment, floating point ALU 4022 and floating point move unit 4024 may operate on 128-bit wide packed data operands in conjunction with SIMD and multimedia instructions.

In at least one embodiment, uop schedulers 4002, 4004, 4006 dispatch dependent operations before parent load has finished executing. In at least one embodiment, as uops may be speculatively scheduled and executed in processor 4000, processor 4000 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 41:
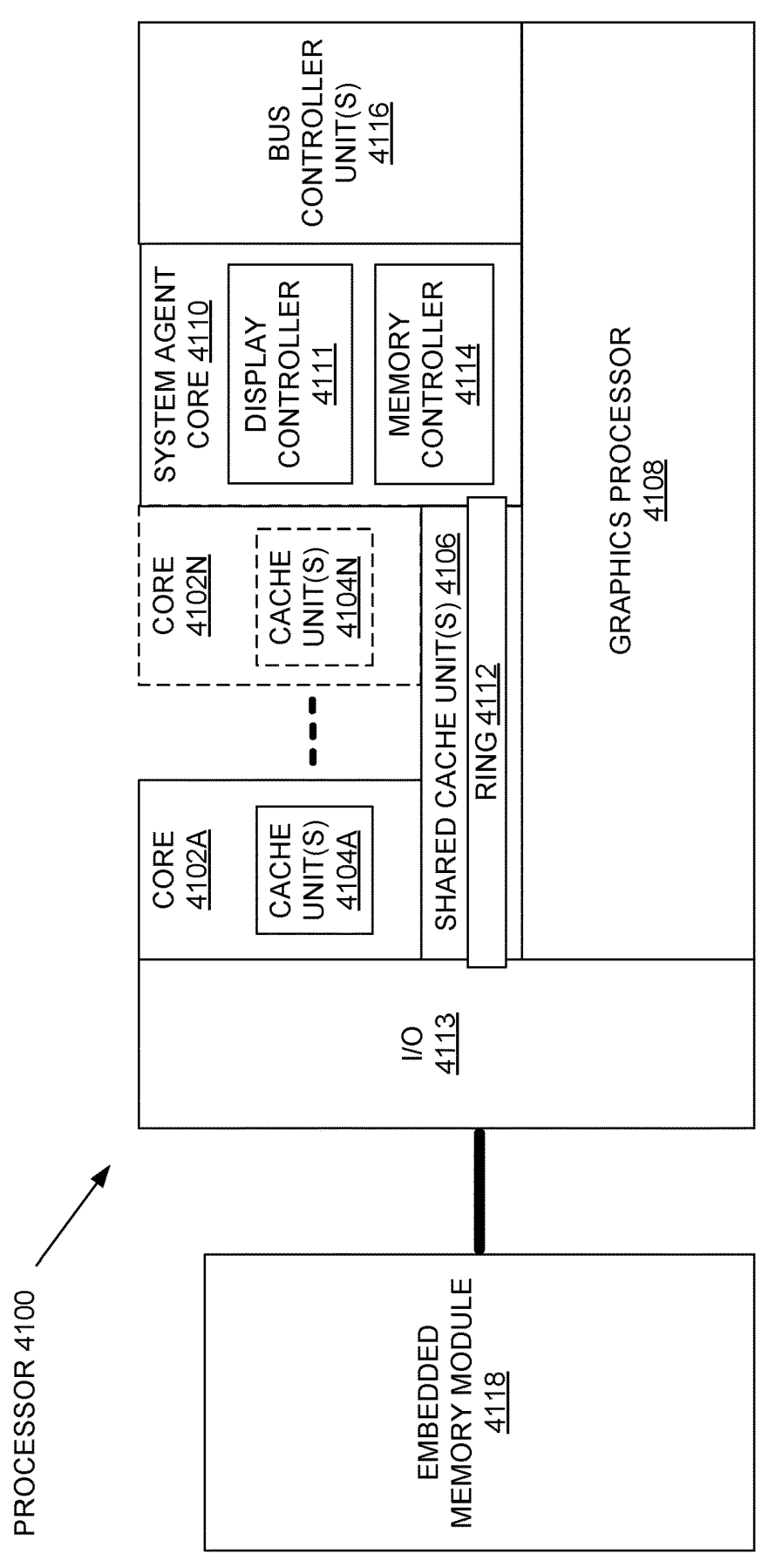
FIG. 41 illustrates a processor, in accordance with at least one embodiment.

FIG. 41 illustrates a processor 4100, in accordance with at least one embodiment. In at least one embodiment, processor 4100 includes, without limitation, one or more processor cores ("cores") 4102A-4102N, an integrated memory controller 4114, and an integrated graphics processor 4108. In at least one embodiment, processor 4100 can include additional cores up to and including additional processor core 4102N represented by dashed lined boxes. In at least one embodiment, each of processor cores 4102A-4102N includes one or more internal cache units 4104A-4104N. In at least one embodiment, each processor core also has access to one or more shared cached units 4106. In at least one embodiment, one or more processor cores 4102A-4102N are referred to as one or more compute units or computing units.

In at least one embodiment, internal cache units 4104A-4104N and shared cache units 4106 represent a cache memory hierarchy within processor 4100. In at least one embodiment, cache memory units 4104A-4104N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 4106 and 4104A-4104N.

In at least one embodiment, processor 4100 may also include a set of one or more bus controller units 4116 and a system agent core 4110. In at least one embodiment, one or more bus controller units 4116 manage a set of peripheral buses, such as one or more PCI or PCI express buses. In at least one embodiment, system agent core 4110 provides management functionality for various processor components. In at least one embodiment, system agent core 4110 includes one or more integrated memory controllers 4114 to manage access to various external memory devices (not shown).

In at least one embodiment, one or more of processor cores 4102A-4102N include support for simultaneous multi-threading. In at least one embodiment, system agent core 4110 includes components for coordinating and operating processor cores 4102A-4102N during multi-threaded processing. In at least one embodiment, system agent core 4110 may additionally include a power control unit ("PCU"), which includes logic and components to regulate one or more power states of processor cores 4102A-4102N and graphics processor 4108.

In at least one embodiment, processor 4100 additionally includes graphics processor 4108 to execute graphics processing operations. In at least one embodiment, graphics processor 4108 couples with shared cache units 4106, and system agent core 4110, including one or more integrated memory controllers 4114. In at least one embodiment, system agent core 4110 also includes a display controller 4111 to drive graphics processor output to one or more coupled displays. In at least one embodiment, display controller 4111 may also be a separate module coupled with graphics processor 4108 via at least one interconnect, or may be integrated within graphics processor 4108.

In at least one embodiment, a ring based interconnect unit 4112 is used to couple internal components of processor 4100. In at least one embodiment, an alternative interconnect unit may be used, such as a point-to-point interconnect, a switched interconnect, or other techniques. In at least one embodiment, graphics processor 4108 couples with ring interconnect 4112 via an I/O link 4113.

In at least one embodiment, I/O link 4113 represents at least one of multiple varieties of I/O interconnects, including an on package I/O interconnect which facilitates communication between various processor components and a high-performance embedded memory module 4118, such as an eDRAM module. In at least one embodiment, each of processor cores 4102A-4102N and graphics processor 4108 use embedded memory modules 4118 as a shared LLC.

In at least one embodiment, processor cores 4102A-4102N are homogeneous cores executing a common instruction set architecture. In at least one embodiment, processor cores 4102A-4102N are heterogeneous in terms of ISA, where one or more of processor cores 4102A-4102N execute a common instruction set, while one or more other cores of processor cores 4102A-41-02N executes a subset of a common instruction set or a different instruction set. In at least one embodiment, processor cores 4102A-4102N are heterogeneous in terms of microarchitecture, where one or more cores having a relatively higher power consumption couple with one or more cores having a lower power consumption. In at least one embodiment, processor 4100 can be implemented on one or more chips or as an SoC integrated circuit.

Figure 42:
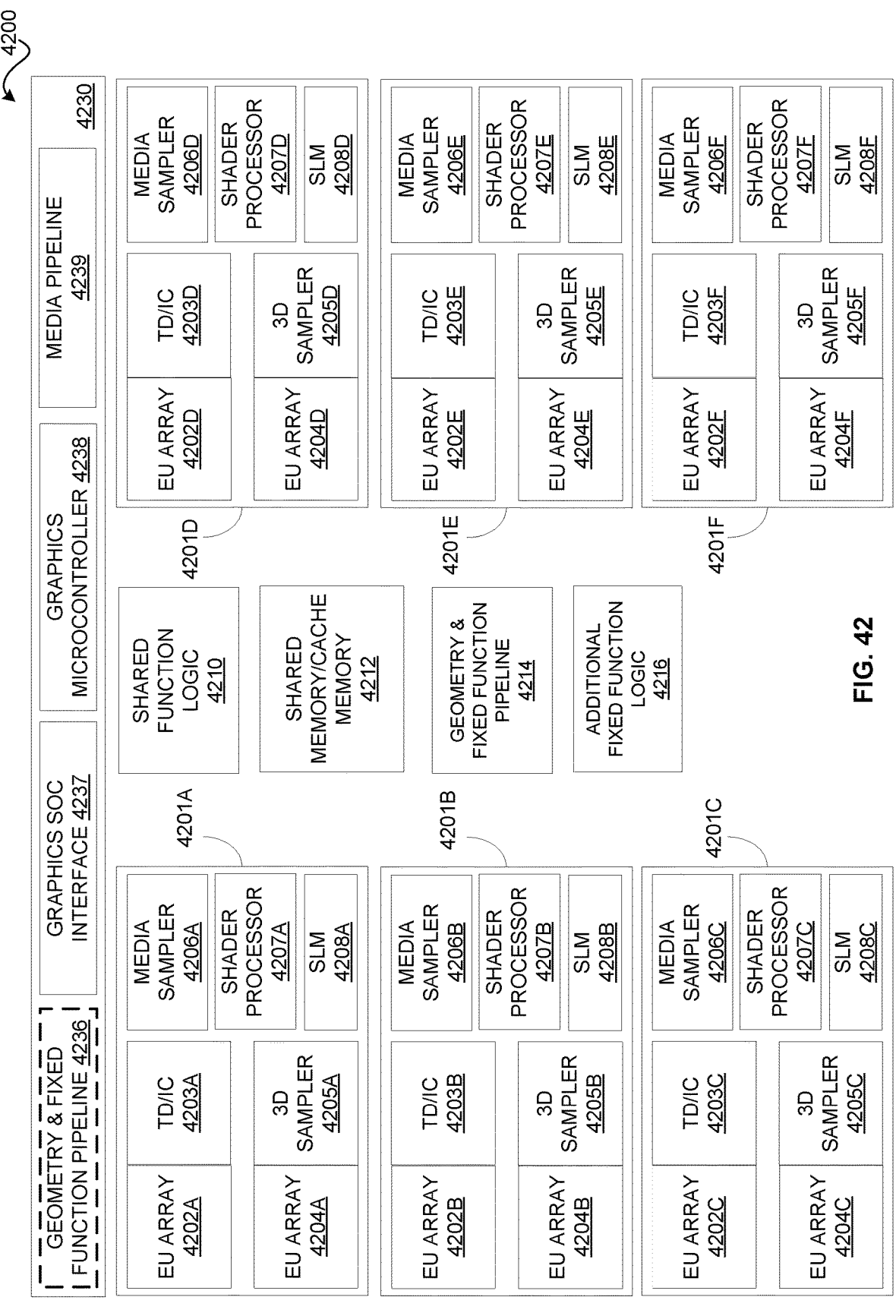
FIG. 42 illustrates a graphics processor core, in accordance with at least one embodiment.

FIG. 42 illustrates a graphics processor core 4200, in accordance with at least one embodiment described. In at least one embodiment, graphics processor core 4200 is included within a graphics core array. In at least one embodiment, graphics processor core 4200, sometimes referred to as a core slice, can be one or multiple graphics cores within a modular graphics processor. In at least one embodiment, graphics processor core 4200 is exemplary of one graphics core slice, and a graphics processor as described herein may include multiple graphics core slices based on target power and performance envelopes. In at least one embodiment, each graphics core 4200 can include a fixed function block 4230 coupled with multiple sub-cores 4201A-4201F, also referred to as sub-slices, that include modular blocks of general-purpose and fixed function logic.

In at least one embodiment, fixed function block 4230 includes a geometry/fixed function pipeline 4236 that can be shared by all sub-cores in graphics processor 4200, for example, in lower performance and/or lower power graphics processor implementations. In at least one embodiment, geometry/fixed function pipeline 4236 includes a 3D fixed function pipeline, a video front-end unit, a thread spawner and thread dispatcher, and a unified return buffer manager, which manages unified return buffers.

In at least one embodiment, fixed function block 4230 also includes a graphics SoC interface 4237, a graphics microcontroller 4238, and a media pipeline 4239. Graphics SoC interface 4237 provides an interface between graphics core 4200 and other processor cores within an SoC integrated circuit. In at least one embodiment, graphics microcontroller 4238 is a programmable sub-processor that is configurable to manage various functions of graphics processor 4200, including thread dispatch, scheduling, and pre-emption. In at least one embodiment, media pipeline 4239 includes logic to facilitate decoding, encoding, preprocessing, and/or post-processing of multimedia data, including image and video data. In at least one embodiment, media pipeline 4239 implements media operations via requests to compute or sampling logic within sub-cores 4201-4201F.

In at least one embodiment, SoC interface 4237 enables graphics core 4200 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 4237 can also enable communication with fixed function devices within an SoC, such as camera imaging pipelines, and enables use of and/or implements global memory atomics that may be shared between graphics core 4200 and CPUs within an SoC. In at least one embodiment, SoC interface 4237 can also implement power management controls for graphics core 4200 and enable an interface between a clock domain of graphic core 4200 and other clock domains within an SoC. In at least one embodiment, SoC interface 4237 enables receipt of command buffers from a command streamer and global thread dispatcher that are configured to provide commands and instructions to each of one or more graphics cores within a graphics processor. In at least one embodiment, commands and instructions can be dispatched to media pipeline 4239, when media operations are to be performed, or a geometry and fixed function pipeline (e.g., geometry and fixed function pipeline 4236, geometry and fixed function pipeline 4214) when graphics processing operations are to be performed.

In at least one embodiment, graphics microcontroller 4238 can be configured to perform various scheduling and management tasks for graphics core 4200. In at least one embodiment, graphics microcontroller 4238 can perform graphics and/or compute workload scheduling on various graphics parallel engines within execution unit (EU) arrays 4202A-4202F, 4204A-4204F within sub-cores 4201A-4201F. In at least one embodiment, host software executing on a CPU core of an SoC including graphics core 4200 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 4238 can also facilitate low-power or idle states for graphics core 4200, providing graphics core 4200 with an ability to save and restore registers within graphics core 4200 across low-power state transitions independently from an operating system and/or graphics driver software on a system.

In at least one embodiment, graphics core 4200 may have greater than or fewer than illustrated sub-cores 4201A-4201F, up to N modular sub-cores. For each set of N sub-cores, in at least one embodiment, graphics core 4200 can also include shared function logic 4210, shared and/or cache memory 4212, a geometry/fixed function pipeline 4214, as well as additional fixed function logic 4216 to accelerate various graphics and compute processing operations. In at least one embodiment, shared function logic 4210 can include logic units (e.g., sampler, math, and/or inter-thread communication logic) that can be shared by each N sub-cores within graphics core 4200. Shared and/or cache memory 4212 can be an LLC for N sub-cores 4201A-4201F within graphics core 4200 and can also serve as shared memory that is accessible by multiple sub-cores. In at least one embodiment, geometry/fixed function pipeline 4214 can be included instead of geometry/fixed function pipeline 4236 within fixed function block 4230 and can include same or similar logic units.

In at least one embodiment, graphics core 4200 includes additional fixed function logic 4216 that can include various fixed function acceleration logic for use by graphics core 4200. In at least one embodiment, additional fixed function logic 4216 includes an additional geometry pipeline for use in position only shading. In position-only shading, at least two geometry pipelines exist, whereas in a full geometry pipeline within geometry/fixed function pipeline 4216, 4236, and a cull pipeline, which is an additional geometry pipeline which may be included within additional fixed function logic 4216. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 4216 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 4216 can also include general purpose processing acceleration logic, such as fixed function matrix multiplication logic, for accelerating CUDA programs.

In at least one embodiment, each graphics sub-core 4201A-4201F includes a set of execution resources that may be used to perform graphics, media, and compute operations in response to requests by graphics pipeline, media pipeline, or shader programs. In at least one embodiment, graphics sub-cores 4201A-4201F include multiple EU arrays 4202A-4202F, 4204A-4204F, thread dispatch and inter-thread communication ("TD/IC") logic 4203A-4203F, a 3D (e.g., texture) sampler 4205A-4205F, a media sampler 4206A-4206F, a shader processor 4207A-4207F, and shared local memory ("SLM") 4208A-4208F. EU arrays 4202A-4202F, 4204A-4204F each include multiple execution units, which are GPGPUs capable of performing floating-point and integer/fixed-point logic operations in service of a graphics, media, or compute operation, including graphics, media, or compute shader programs. In at least one embodiment, TD/IC logic 4203A-4203F performs local thread dispatch and thread control operations for execution units within a sub-core and facilitate communication between threads executing on execution units of a sub-core. In at least one embodiment, 3D sampler 4205A-4205F can read texture or other 3D graphics related data into memory. In at least one embodiment, 3D sampler can read texture data differently based on a configured sample state and texture format associated with a given texture. In at least one embodiment, media sampler 4206A-4206F can perform similar read operations based on a type and format associated with media data. In at least one embodiment, each graphics sub-core 4201A-4201F can alternately include a unified 3D and media sampler. In at least one embodiment, threads executing on execution units within each of sub-cores 4201A-4201F can make use of shared local memory 4208A-4208F within each sub-core, to enable threads executing within a thread group to execute using a common pool of on-chip memory.

Figure 43:
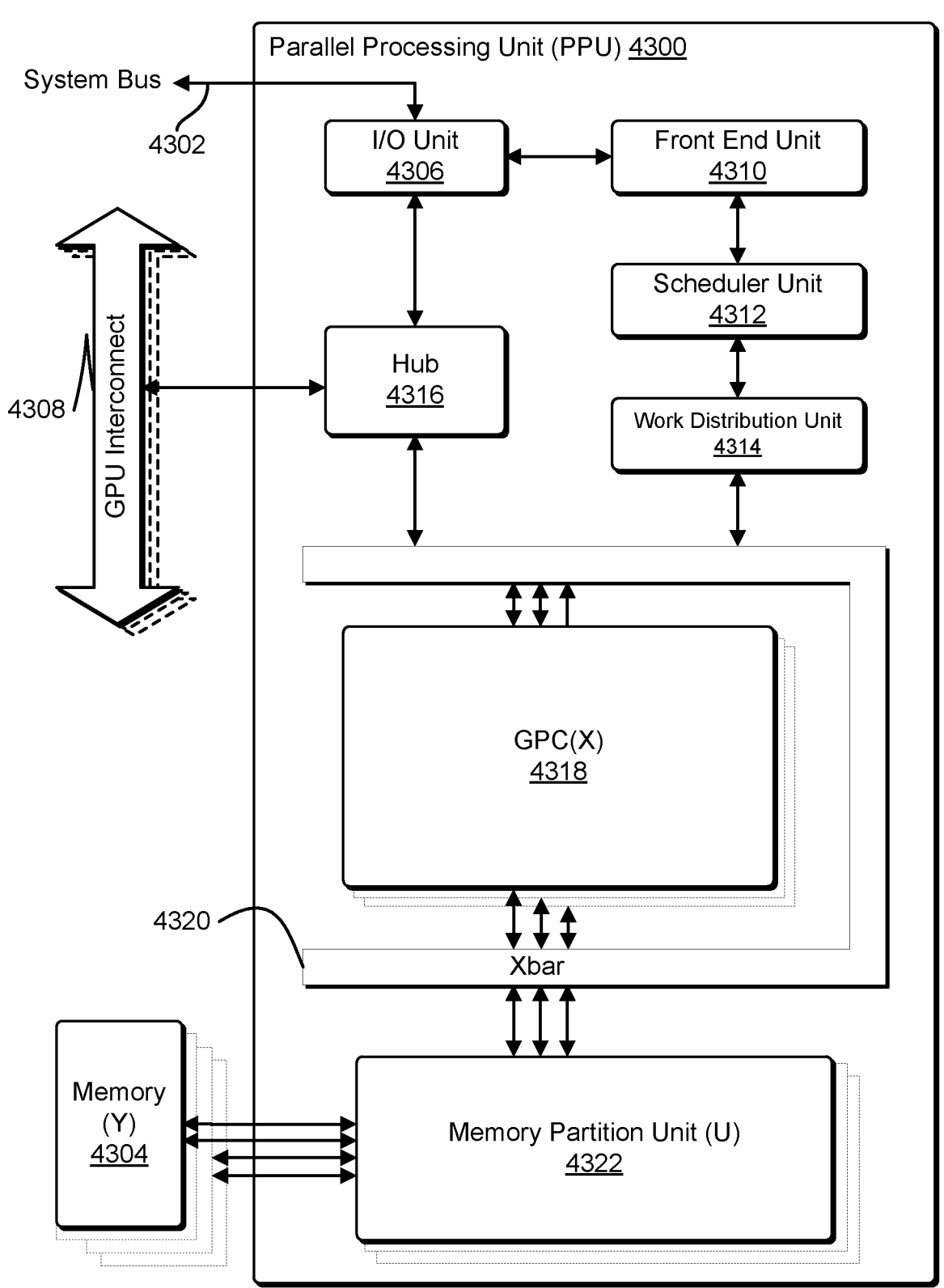
FIG. 43 illustrates a PPU, in accordance with at least one embodiment.

FIG. 43 illustrates a parallel processing unit ("PPU") 4300, in accordance with at least one embodiment. In at least one embodiment, PPU 4300 is configured with machine-readable code that, if executed by PPU 4300, causes PPU 4300 to perform some or all of processes and techniques described herein. In at least one embodiment, PPU 4300 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4300. In at least one embodiment, PPU 4300 is a GPU configured to implement a graphics rendering pipeline for processing three-dimensional ("3D") graphics data in order to generate two-dimensional ("2D") image data for display on a display device such as an LCD device. In at least one embodiment, PPU 4300 is utilized to perform computations such as linear algebra operations and machine-learning operations. FIG. 43 illustrates an example parallel processor for illustrative purposes only and should be construed as a non-limiting example of a processor architecture that may be implemented in at least one embodiment.

In at least one embodiment, one or more PPUs 4300 are configured to accelerate High Performance Computing ("HPC"), data center, and machine learning applications. In at least one embodiment, one or more PPUs 4300 are configured to accelerate CUDA programs. In at least one embodiment, PPU 4300 includes, without limitation, an I/O unit 4306, a front-end unit 4310, a scheduler unit 4312, a work distribution unit 4314, a hub 4316, a crossbar ("Xbar") 4320, one or more general processing clusters ("GPCs") 4318, and one or more partition units ("memory partition units") 4322. In at least one embodiment, PPU 4300 is connected to a host processor or other PPUs 4300 via one or more high-speed GPU interconnects ("GPU interconnects") 4308. In at least one embodiment, PPU 4300 is connected to a host processor or other peripheral devices via a system bus or interconnect 4302. In at least one embodiment, PPU 4300 is connected to a local memory comprising one or more memory devices ("memory") 4304. In at least one embodiment, memory devices 4304 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4308 may refer to a wire-based multi-lane communications link that is used by systems to scale and include one or more PPUs 4300 combined with one or more CPUs, supports cache coherence between PPUs 4300 and CPUs, and CPU mastering. In at least one embodiment, data and/or commands are transmitted by high-speed GPU interconnect 4308 through hub 4316 to/from other units of PPU 4300 such as one or more copy engines, video encoders, video decoders, power management units, and other components which may not be explicitly illustrated in FIG. 43.

In at least one embodiment, I/O unit 4306 is configured to transmit and receive communications (e.g., commands, data) from a host processor (not illustrated in FIG. 43) over system bus 4302. In at least one embodiment, I/O unit 4306 communicates with host processor directly via system bus 4302 or through one or more intermediate devices such as a memory bridge. In at least one embodiment, I/O unit 4306 may communicate with one or more other processors, such as one or more of PPUs 4300 via system bus 4302. In at least one embodiment, I/O unit 4306 implements a PCIe interface for communications over a PCIe bus. In at least one embodiment, I/O unit 4306 implements interfaces for communicating with external devices.

In at least one embodiment, I/O unit 4306 decodes packets received via system bus 4302. In at least one embodiment, at least some packets represent commands configured to cause PPU 4300 to perform various operations. In at least one embodiment, I/O unit 4306 transmits decoded commands to various other units of PPU 4300 as specified by commands. In at least one embodiment, commands are transmitted to front-end unit 4310 and/or transmitted to hub 4316 or other units of PPU 4300 such as one or more copy engines, a video encoder, a video decoder, a power management unit, etc. (not explicitly illustrated in FIG. 43). In at least one embodiment, I/O unit 4306 is configured to route communications between and among various logical units of PPU 4300.

In at least one embodiment, a program executed by host processor encodes a command stream in a buffer that provides workloads to PPU 4300 for processing. In at least one embodiment, a workload comprises instructions and data to be processed by those instructions. In at least one embodiment, buffer is a region in a memory that is accessible (e.g., read/write) by both a host processor and PPU 4300—a host interface unit may be configured to access buffer in a system memory connected to system bus 4302 via memory requests transmitted over system bus 4302 by I/O unit 4306. In at least one embodiment, a host processor writes a command stream to a buffer and then transmits a pointer to the start of the command stream to PPU 4300 such that front-end unit 4310 receives pointers to one or more command streams and manages one or more command streams, reading commands from command streams and forwarding commands to various units of PPU 4300.

In at least one embodiment, front-end unit 4310 is coupled to scheduler unit 4312 that configures various GPCs 4318 to process tasks defined by one or more command streams. In at least one embodiment, scheduler unit 4312 is configured to track state information related to various tasks managed by scheduler unit 4312 where state information may indicate which of GPCs 4318 a task is assigned to, whether task is active or inactive, a priority level associated with task, and so forth. In at least one embodiment, scheduler unit 4312 manages execution of a plurality of tasks on one or more of GPCs 4318.

In at least one embodiment, scheduler unit 4312 is coupled to work distribution unit 4314 that is configured to dispatch tasks for execution on GPCs 4318. In at least one embodiment, work distribution unit 4314 tracks a number of scheduled tasks received from scheduler unit 4312 and work distribution unit 4314 manages a pending task pool and an active task pool for each of GPCs 4318. In at least one embodiment, pending task pool comprises a number of slots (e.g., 32 slots) that contain tasks assigned to be processed by a particular GPC 4318; active task pool may comprise a number of slots (e.g., 4 slots) for tasks that are actively being processed by GPCs 4318 such that as one of GPCs 4318 completes execution of a task, that task is evicted from active task pool for GPC 4318 and one of other tasks from pending task pool is selected and scheduled for execution on GPC 4318. In at least one embodiment, if an active task is idle on GPC 4318, such as while waiting for a data dependency to be resolved, then the active task is evicted from GPC 4318 and returned to a pending task pool while another task in the pending task pool is selected and scheduled for execution on GPC 4318.

In at least one embodiment, work distribution unit 4314 communicates with one or more GPCs 4318 via XBar 4320. In at least one embodiment, XBar 4320 is an interconnect network that couples many units of PPU 4300 to other units of PPU 4300 and can be configured to couple work distribution unit 4314 to a particular GPC 4318. In at least one embodiment, one or more other units of PPU 4300 may also be connected to XBar 4320 via hub 4316.

In at least one embodiment, tasks are managed by scheduler unit 4312 and dispatched to one of GPCs 4318 by work distribution unit 4314. GPC 4318 is configured to process task and generate results. In at least one embodiment, results may be consumed by other tasks within GPC 4318, routed to a different GPC 4318 via XBar 4320, or stored in memory 4304. In at least one embodiment, results can be written to memory 4304 via partition units 4322, which implement a memory interface for reading and writing data to/from memory 4304. In at least one embodiment, results can be transmitted to another PPU 4304 or CPU via high-speed GPU interconnect 4308. In at least one embodiment, PPU 4300 includes, without limitation, a number U of partition units 4322 that is equal to number of separate and distinct memory devices 4304 coupled to PPU 4300.

In at least one embodiment, a host processor executes a driver kernel that implements an application programming interface ("API") that enables one or more applications executing on host processor to schedule operations for execution on PPU 4300. In at least one embodiment, multiple compute applications are simultaneously executed by PPU 4300 and PPU 4300 provides isolation, quality of service ("QoS"), and independent address spaces for multiple compute applications. In at least one embodiment, an application generates instructions (e.g., in the form of API calls) that cause a driver kernel to generate one or more tasks for execution by PPU 4300 and the driver kernel outputs tasks to one or more streams being processed by PPU 4300. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 44:
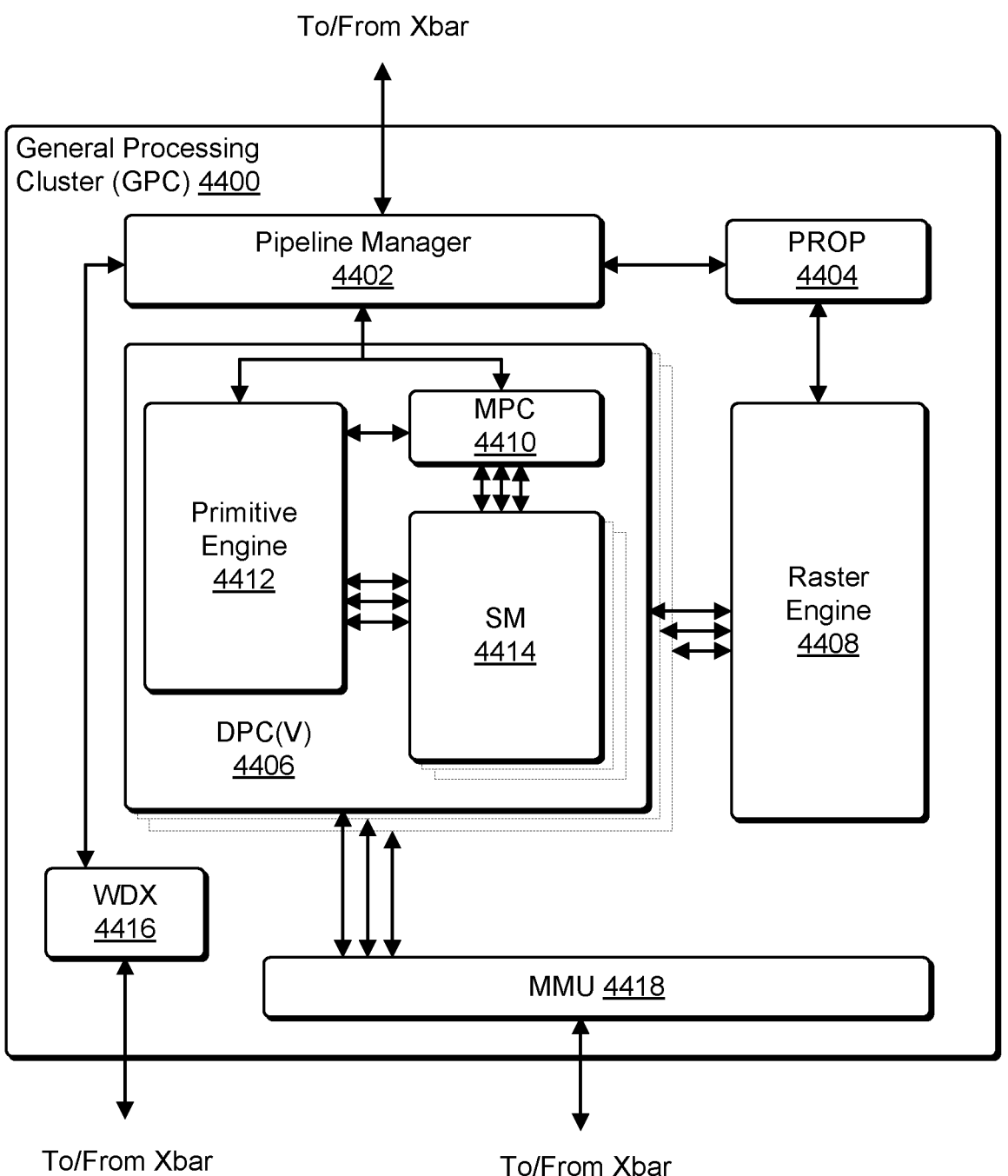
FIG. 44 illustrates a GPC, in accordance with at least one embodiment.

FIG. 44 illustrates a GPC 4400, in accordance with at least one embodiment. In at least one embodiment, GPC 4400 is GPC 4318 of FIG. 43. In at least one embodiment, each GPC 4400 includes, without limitation, a number of hardware units for processing tasks and each GPC 4400 includes, without limitation, a pipeline manager 4402, a pre-raster operations unit ("PROP") 4404, a raster engine 4408, a work distribution crossbar ("WDX") 4416, an MMU 4418, one or more Data Processing Clusters ("DPCs") 4406, and any suitable combination of parts.

In at least one embodiment, operation of GPC 4400 is controlled by pipeline manager 4402. In at least one embodiment, pipeline manager 4402 manages configuration of one or more DPCs 4406 for processing tasks allocated to GPC 4400. In at least one embodiment, pipeline manager 4402 configures at least one of one or more DPCs 4406 to implement at least a portion of a graphics rendering pipeline. In at least one embodiment, DPC 4406 is configured to execute a vertex shader program on a programmable streaming multiprocessor ("SM") 4414. In at least one embodiment, pipeline manager 4402 is configured to route packets received from a work distribution unit to appropriate logical units within GPC 4400 and, in at least one embodiment, some packets may be routed to fixed function hardware units in PROP 4404 and/or raster engine 4408 while other packets may be routed to DPCs 4406 for processing by a primitive engine 4412 or SM 4414. In at least one embodiment, pipeline manager 4402 configures at least one of DPCs 4406 to implement a computing pipeline. In at least one embodiment, pipeline manager 4402 configures at least one of DPCs 4406 to execute at least a portion of a CUDA program.

In at least one embodiment, PROP unit 4404 is configured to route data generated by raster engine 4408 and DPCs 4406 to a Raster Operations ("ROP") unit in a partition unit, such as memory partition unit 4322 described in more detail above in conjunction with FIG. 43. In at least one embodiment, PROP unit 4404 is configured to perform optimizations for color blending, organize pixel data, perform address translations, and more. In at least one embodiment, raster engine 4408 includes, without limitation, a number of fixed function hardware units configured to perform various raster operations and, in at least one embodiment, raster engine 4408 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 4408 comprises fragments to be processed by any suitable entity such as by a fragment shader implemented within DPC 4406.

In at least one embodiment, each DPC 4406 included in GPC 4400 comprise, without limitation, an M-Pipe Controller ("MPC") 4410; primitive engine 4412; one or more SMs 4414; and any suitable combination thereof. In at least one embodiment, MPC 4410 controls operation of DPC 4406, routing packets received from pipeline manager 4402 to appropriate units in DPC 4406. In at least one embodiment, packets associated with a vertex are routed to primitive engine 4412, which is configured to fetch vertex attributes associated with vertex from memory; in contrast, packets associated with a shader program may be transmitted to SM 4414.

In at least one embodiment, SM 4414 comprises, without limitation, a programmable streaming processor that is configured to process tasks represented by a number of threads. In at least one embodiment, SM 4414 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 4414 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 4414 is described in more detail in conjunction with FIG. 45.

In at least one embodiment, MMU 4418 provides an interface between GPC 4400 and a memory partition unit (e.g., partition unit 4322 of FIG. 43) and MMU 4418 provides translation of virtual addresses into physical addresses, memory protection, and arbitration of memory requests. In at least one embodiment, MMU 4418 provides one or more translation lookaside buffers (TLBs) for performing translation of virtual addresses into physical addresses in memory.

Figure 45:
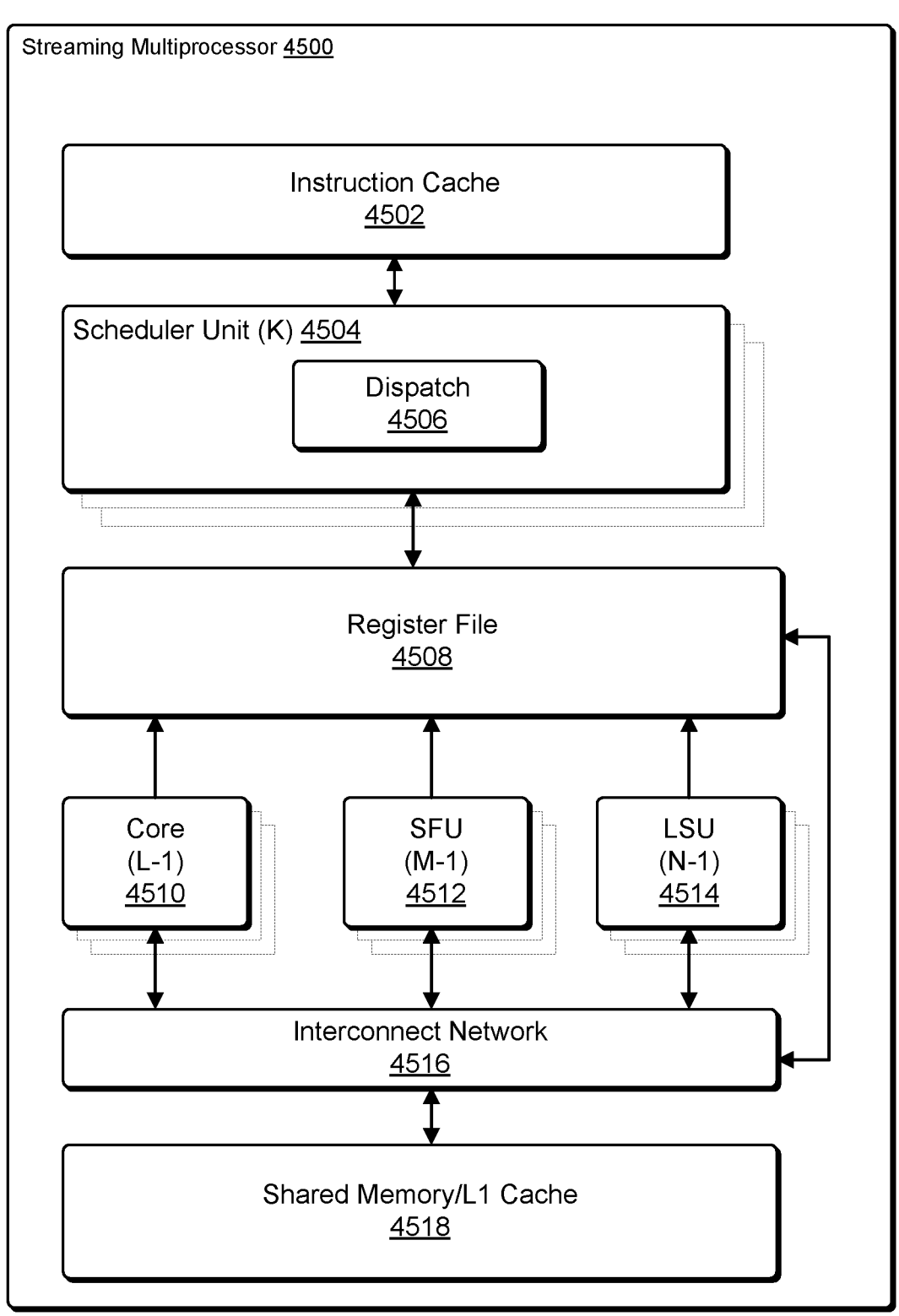
FIG. 45 illustrates a streaming multiprocessor, in accordance with at least one embodiment.

FIG. 45 illustrates a streaming multiprocessor ("SM") 4500, in accordance with at least one embodiment. In at least one embodiment, SM 4500 is SM 4414 of FIG. 44. In at least one embodiment, SM 4500 includes, without limitation, an instruction cache 4502; one or more scheduler units 4504; a register file 4508; one or more processing cores ("cores") 4510; one or more special function units ("SFUs") 4512; one or more LSUs 4514; an interconnect network 4516; a shared memory/L1 cache 4518; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 4500. In at least one embodiment, scheduler unit 4504 receives tasks from a work distribution unit and manages instruction scheduling for one or more thread blocks assigned to SM 4500. In at least one embodiment, scheduler unit 4504 schedules thread blocks for execution as warps of parallel threads, wherein each thread block is allocated at least one warp. In at least one embodiment, each warp executes threads. In at least one embodiment, scheduler unit 4504 manages a plurality of different thread blocks, allocating warps to different thread blocks and then dispatching instructions from a plurality of different cooperative groups to various functional units (e.g., processing cores 4510, SFUs 4512, and LSUs 4514) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 4506 is configured to transmit instructions to one or more of functional units and scheduler unit 4504 includes, without limitation, two dispatch units 4506 that enable two different instructions from same warp to be dispatched during each clock cycle. In at least one embodiment, each scheduler unit 4504 includes a single dispatch unit 4506 or additional dispatch units 4506.

In at least one embodiment, each SM 4500, in at least one embodiment, includes, without limitation, register file 4508 that provides a set of registers for functional units of SM 4500. In at least one embodiment, register file 4508 is divided between each of the functional units such that each functional unit is allocated a dedicated portion of register file 4508. In at least one embodiment, register file 4508 is divided between different warps being executed by SM 4500 and register file 4508 provides temporary storage for operands connected to data paths of functional units. In at least one embodiment, each SM 4500 comprises, without limitation, a plurality of L processing cores 4510. In at least one embodiment, SM 4500 includes, without limitation, a large number (e.g., 128 or more) of distinct processing cores 4510. In at least one embodiment, each processing core 4510 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4510 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 4510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 4500 comprises, without limitation, M SFUs 4512 that perform special functions (e.g., attribute evaluation, reciprocal square root, and like). In at least one embodiment, SFUs 4512 include, without limitation, a tree traversal unit configured to traverse a hierarchical tree data structure. In at least one embodiment, SFUs 4512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4500. In at least one embodiment, texture maps are stored in shared memory/L1 cache 4518. In at least one embodiment, texture units implement texture operations such as filtering operations using mip-maps (e.g., texture maps of varying levels of detail). In at least one embodiment, each SM 4500 includes, without limitation, two texture units.

In at least one embodiment, each SM 4500 comprises, without limitation, N LSUs 4514 that implement load and store operations between shared memory/L1 cache 4518 and register file 4508. In at least one embodiment, each SM 4500 includes, without limitation, interconnect network 4516 that connects each of the functional units to register file 4508 and LSU 4514 to register file 4508 and shared memory/L1 cache 4518. In at least one embodiment, interconnect network 4516 is a crossbar that can be configured to connect any of the functional units to any of the registers in register file 4508 and connect LSUs 4514 to register file 4508 and memory locations in shared memory/L1 cache 4518.

In at least one embodiment, shared memory/L1 cache 4518 is an array of on-chip memory that allows for data storage and communication between SM 4500 and a primitive engine and between threads in SM 4500. In at least one embodiment, shared memory/L1 cache 4518 comprises, without limitation, 128 KB of storage capacity and is in a path from SM 4500 to a partition unit. In at least one embodiment, shared memory/L1 cache 4518 is used to cache reads and writes. In at least one embodiment, one or more of shared memory/L1 cache 4518, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 4518 enables shared memory/L1 cache 4518 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 4500 to execute a program and perform calculations, shared memory/L1 cache 4518 to communicate between threads, and LSU 4514 to read and write global memory through shared memory/L1 cache 4518 and a memory partition unit. In at least one embodiment, when configured for general purpose parallel computation, SM 4500 writes commands that scheduler unit 4504 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructs for General-Purpose Computing

The following figures set forth, without limitation, exemplary software constructs for implementing at least one embodiment.

Figure 46:
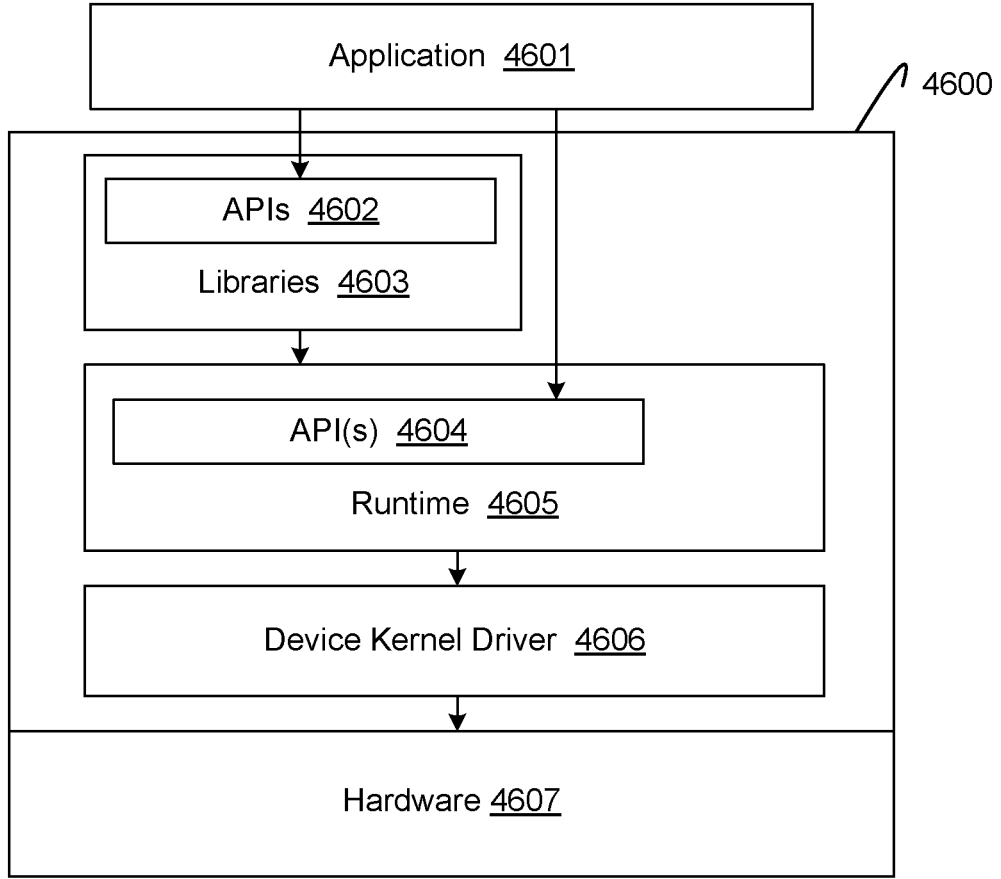
FIG. 46 illustrates a software stack of a programming platform, in accordance with at least one embodiment.

FIG. 46 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4600 of a programming platform provides an execution environment for an application 4601. In at least one embodiment, application 4601 may include any computer software capable of being launched on software stack 4600. In at least one embodiment, application 4601 may include, but is not limited to, an artificial intelligence ("AI")/machine learning ("ML") application, a high performance computing ("HPC") application, a virtual desktop infrastructure ("VDI"), or a data center workload.

In at least one embodiment, application 4601 and software stack 4600 run on hardware 4607. Hardware 4607 may include one or more GPUs, CPUs, FPGAs, AI engines, and/or other types of compute devices that support a programming platform, in at least one embodiment. In at least one embodiment, such as with CUDA, software stack 4600 may be vendor specific and compatible with only devices from particular vendor(s). In at least one embodiment, such as in with OpenCL, software stack 4600 may be used with devices from different vendors. In at least one embodiment, hardware 4607 includes a host connected to one more devices that can be accessed to perform computational tasks via application programming interface ("API") calls. A device within hardware 4607 may include, but is not limited to, a GPU, FPGA, AI engine, or other compute device (but may also include a CPU) and its memory, as opposed to a host within hardware 4607 that may include, but is not limited to, a CPU (but may also include a compute device) and its memory, in at least one embodiment.

In at least one embodiment, software stack 4600 of a programming platform includes, without limitation, a number of libraries 4603, a runtime 4605, and a device kernel driver 4606. Each of libraries 4603 may include data and programming code that can be used by computer programs and leveraged during software development, in at least one embodiment. In at least one embodiment, libraries 4603 may include, but are not limited to, pre-written code and subroutines, classes, values, type specifications, configuration data, documentation, help data, and/or message templates. In at least one embodiment, libraries 4603 include functions that are optimized for execution on one or more types of devices. In at least one embodiment, libraries 4603 may include, but are not limited to, functions for performing mathematical, deep learning, and/or other types of operations on devices. In at least one embodiment, libraries 4603 are associated with corresponding APIs 4602, which may include one or more APIs, that expose functions implemented in libraries 4603.

In at least one embodiment, application 4601 is written as source code that is compiled into executable code, as discussed in greater detail below in conjunction with FIGS. 51-53. Executable code of application 4601 may run, at least in part, on an execution environment provided by software stack 4600, in at least one embodiment. In at least one embodiment, during execution of application 4601, code may be reached that needs to run on a device, as opposed to a host. In such a case, runtime 4605 may be called to load and launch requisite code on the device, in at least one embodiment. In at least one embodiment, runtime 4605 may include any technically feasible runtime system that is able to support execution of application S01.

In at least one embodiment, runtime 4605 is implemented as one or more runtime libraries associated with corresponding APIs, which are shown as API(s) 4604. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4604 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4606 is configured to facilitate communication with an underlying device. In at least one embodiment, device kernel driver 4606 may provide low-level functionalities upon which APIs, such as API(s) 4604, and/or other software relies. In at least one embodiment, device kernel driver 4606 may be configured to compile intermediate representation ("IR") code into binary code at runtime. For CUDA, device kernel driver 4606 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4606 to compile IR code at runtime.

Figure 47:
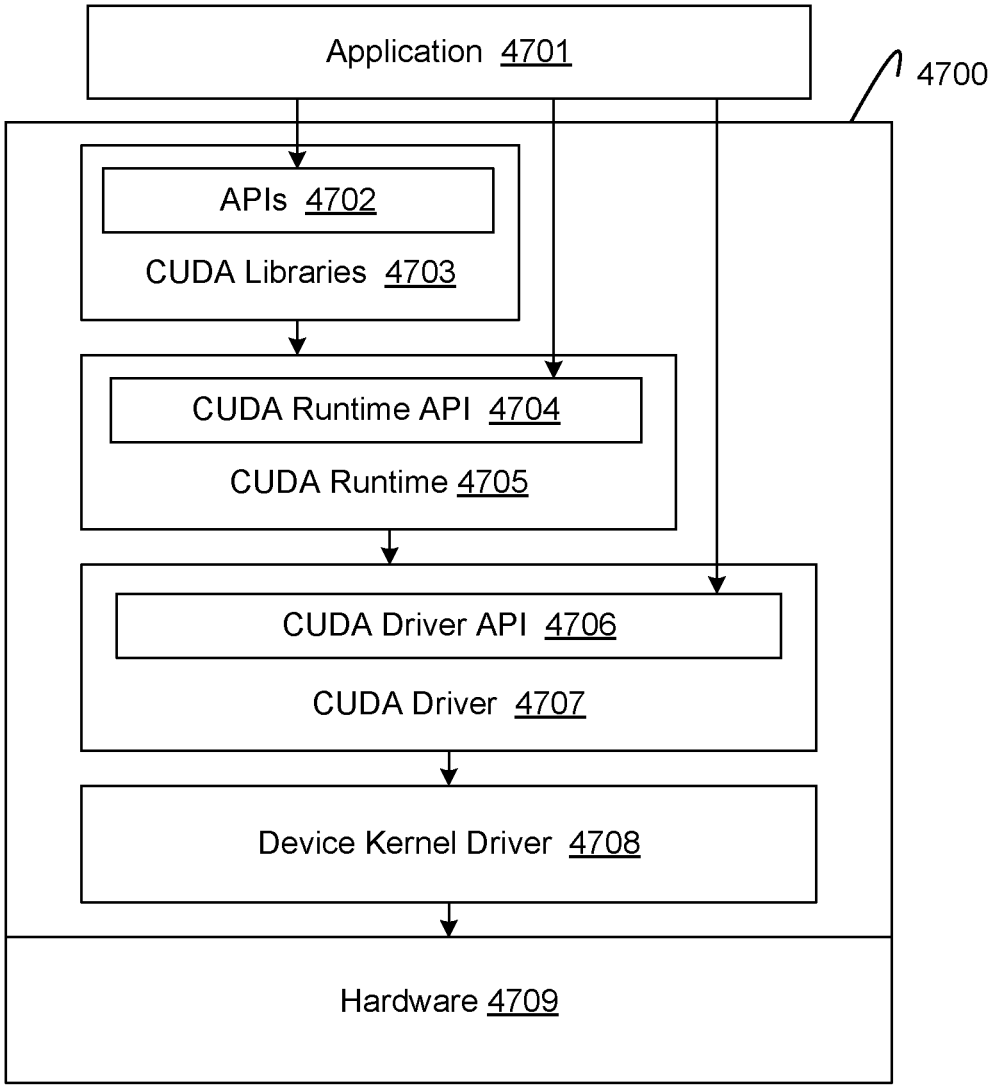
FIG. 47 illustrates a CUDA implementation of a software stack of FIG. 46, in accordance with at least one embodiment.

FIG. 47 illustrates a CUDA implementation of software stack 4600 of FIG. 46, in accordance with at least one embodiment. In at least one embodiment, a CUDA software stack 4700, on which an application 4701 may be launched, includes CUDA libraries 4703, a CUDA runtime 4705, a CUDA driver 4707, and a device kernel driver 4708. In at least one embodiment, CUDA software stack 4700 executes on hardware 4709, which may include a GPU that supports CUDA and is developed by NVIDIA Corporation of Santa Clara, CA.

In at least one embodiment, application 4701, CUDA runtime 4705, and device kernel driver 4708 may perform similar functionalities as application 4601, runtime 4605, and device kernel driver 4606, respectively, which are described above in conjunction with FIG. 46. In at least one embodiment, CUDA driver 4707 includes a library (libcuda.so) that implements a CUDA driver API 4706. Similar to a CUDA runtime API 4704 implemented by a CUDA runtime library (cudart), CUDA driver API 4706 may, without limitation, expose functions for memory management, execution control, device management, error handling, synchronization, and/or graphics interoperability, among other things, in at least one embodiment. In at least one embodiment, CUDA driver API 4706 differs from CUDA runtime API 4704 in that CUDA runtime API 4704 simplifies device code management by providing implicit initialization, context (analogous to a process) management, and module (analogous to dynamically loaded libraries) management. In contrast to high-level CUDA runtime API 4704, CUDA driver API 4706 is a low-level API providing more fine-grained control of the device, particularly with respect to contexts and module loading, in at least one embodiment. In at least one embodiment, CUDA driver API 4706 may expose functions for context management that are not exposed by CUDA runtime API 4704. In at least one embodiment, CUDA driver API 4706 is also language-independent and supports, e.g., OpenCL in addition to CUDA runtime API 4704. Further, in at least one embodiment, development libraries, including CUDA runtime

4705, may be considered as separate from driver components, including user-mode CUDA driver 4707 and kernel-mode device driver 4708 (also sometimes referred to as a "display" driver).

In at least one embodiment, CUDA libraries 4703 may include, but are not limited to, mathematical libraries, deep learning libraries, parallel algorithm libraries, and/or signal/image/video processing libraries, which parallel computing applications such as application 4701 may utilize. In at least one embodiment, CUDA libraries 4703 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4703 may include deep learning libraries such as a cuDNN library of primitives for deep neural networks and a TensorRT platform for high-performance deep learning inference, among others.

Figure 48:
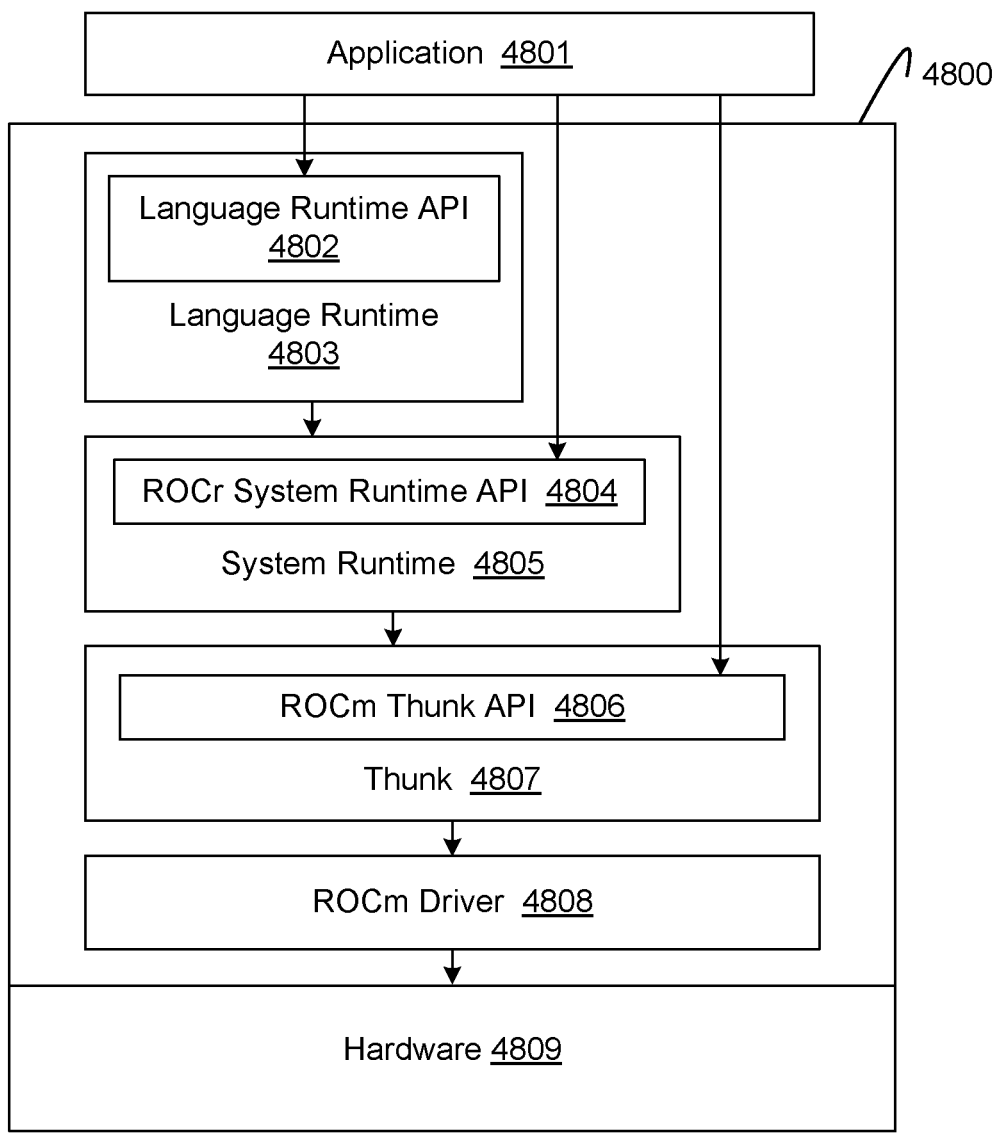
FIG. 48 illustrates a ROCm implementation of a software stack of FIG. 46, in accordance with at least one embodiment.

FIG. 48 illustrates a ROCm implementation of software stack 4600 of FIG. 46, in accordance with at least one embodiment. In at least one embodiment, a ROCm software stack 4800, on which an application 4801 may be launched, includes a language runtime 4803, a system runtime 4805, a thunk 4807, and a ROCm kernel driver 4808. In at least one embodiment, ROCm software stack 4800 executes on hardware 4809, which may include a GPU that supports ROCm and is developed by AMD Corporation of Santa Clara, CA.

In at least one embodiment, application 4801 may perform similar functionalities as application 4601 discussed above in conjunction with FIG. 46. In addition, language runtime 4803 and system runtime 4805 may perform similar functionalities as runtime 4605 discussed above in conjunction with FIG. 46, in at least one embodiment. In at least one embodiment, language runtime 4803 and system runtime 4805 differ in that system runtime 4805 is a language-independent runtime that implements a ROCr system runtime API 4804 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4805, language runtime 4803 is an implementation of a language-specific runtime API 4802 layered on top of ROCr system runtime API 4804, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4704 discussed above in conjunction with FIG. 47, such as functions for memory management, execution control, device management, error handling, and synchronization, among other things.

In at least one embodiment, thunk (ROCt) 4807 is an interface 4806 that can be used to interact with underlying ROCm driver 4808. In at least one embodiment, ROCm driver 4808 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 4606 discussed above in conjunction with FIG. 46. In at least one embodiment, HSA kernel driver is a driver permitting different types of processors to share system resources more effectively via hardware features.

In at least one embodiment, various libraries (not shown) may be included in ROCm software stack 4800 above language runtime 4803 and provide functionality similarity to CUDA libraries 4703, discussed above in conjunction with FIG. 47. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 49:
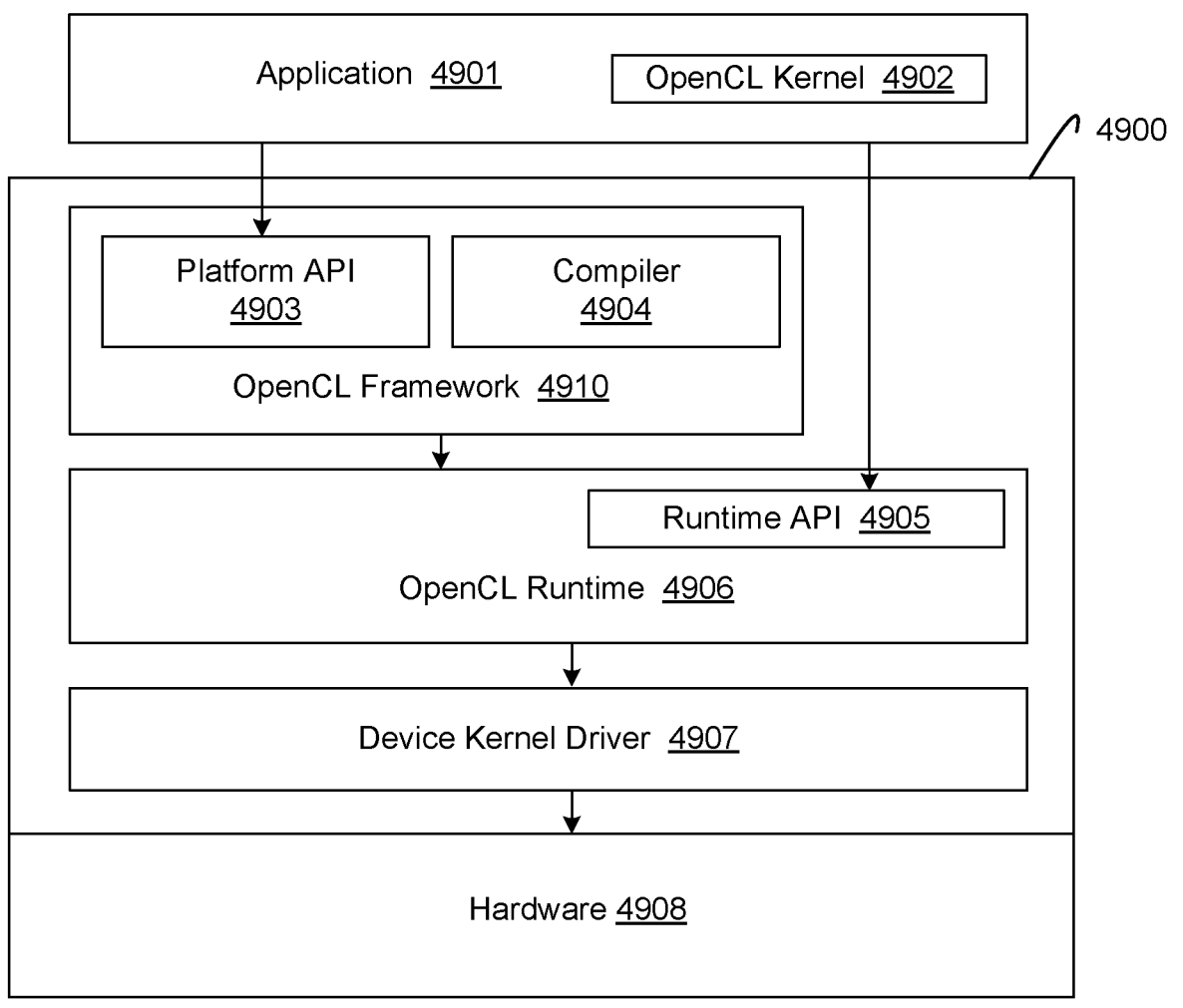
FIG. 49 illustrates an OpenCL implementation of a software stack of FIG. 46, in accordance with at least one embodiment.

FIG. 49 illustrates an OpenCL implementation of software stack 4600 of FIG. 46, in accordance with at least one embodiment. In at least one embodiment, an OpenCL software stack 4900, on which an application 4901 may be launched, includes an OpenCL framework 4910, an OpenCL runtime 4906, and a driver 4907. In at least one embodiment, OpenCL software stack 4900 executes on hardware 4709 that is not vendor-specific. As OpenCL is supported by devices developed by different vendors, specific OpenCL drivers may be required to interoperate with hardware from such vendors, in at least one embodiment.

In at least one embodiment, application 4901, OpenCL runtime 4906, device kernel driver 4907, and hardware 4908 may perform similar functionalities as application 4601, runtime 4605, device kernel driver 4606, and hardware 4607, respectively, that are discussed above in conjunction with FIG. 46. In at least one embodiment, application 4901 further includes an OpenCL kernel 4902 with code that is to be executed on a device.

In at least one embodiment, OpenCL defines a "platform" that allows a host to control devices connected to the host. In at least one embodiment, an OpenCL framework provides a platform layer API and a runtime API, shown as platform API 4903 and runtime API 4905. In at least one embodiment, runtime API 4905 uses contexts to manage execution of kernels on devices. In at least one embodiment, each identified device may be associated with a respective context, which runtime API 4905 may use to manage command queues, program objects, and kernel objects, share memory objects, among other things, for that device. In at least one embodiment, platform API 4903 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4904 is also included in OpenCL frame-work 4910. Source code may be compiled offline prior to executing an application or online during execution of an application, in at least one embodiment. In contrast to CUDA and ROCm, OpenCL applications in at least one embodiment may be compiled online by compiler 4904, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 50:
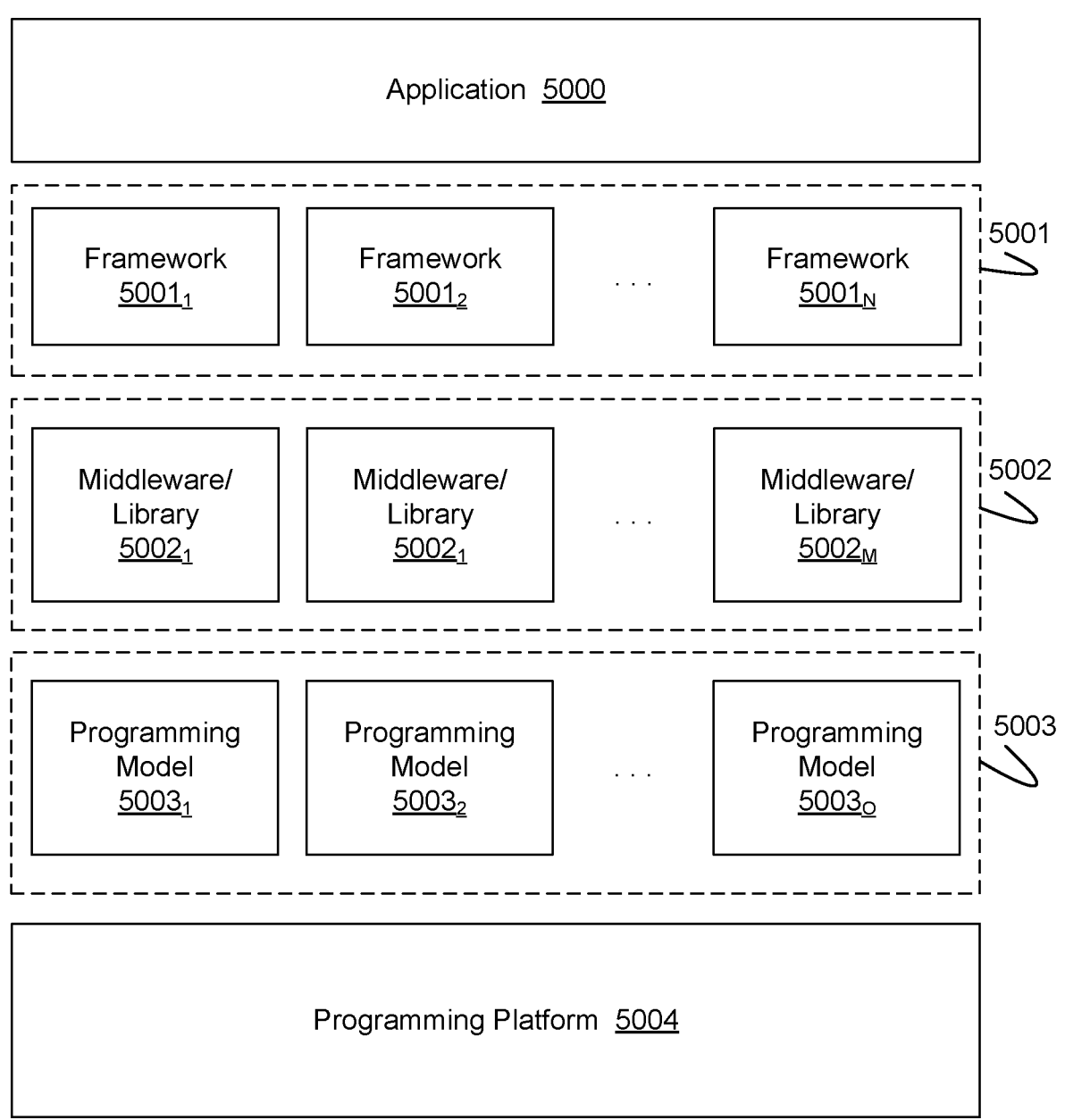
FIG. 50 illustrates software that is supported by a programming platform, in accordance with at least one embodiment.

FIG. 50 illustrates software that is supported by a programming platform, in accordance with at least one embodiment. In at least one embodiment, a programming platform 5004 is configured to support various programming models 5003, middlewares and/or libraries 5002, and frameworks 5001 that an application 5000 may rely upon. In at least one embodiment, application 5000 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDIA Developer Data Loading Library ("DALI") CUDA libraries to provide accelerated computing on underlying hardware.

In at least one embodiment, programming platform 5004 may be one of a CUDA, ROCm, or OpenCL platform described above in conjunction with FIG. 47, FIG. 48, and FIG. 49, respectively. In at least one embodiment, programming platform 5004 supports multiple programming models 5003, which are abstractions of an underlying computing system permitting expressions of algorithms and data structures. Programming models 5003 may expose features of underlying hardware in order to improve performance, in at least one embodiment. In at least one embodiment, programming models 5003 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 5002 provide implementations of abstractions of programming models 5004. In at least one embodiment, such libraries include data and programming code that may be used by computer programs and leveraged during software development. In at least one embodiment, such middlewares include software that provides services to applications beyond those available from programming platform 5004. In at least one embodiment, libraries and/or middlewares 5002 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 5002 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 5001 depend on libraries and/or middlewares 5002. In at least one embodiment, each of application frameworks 5001 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 51:
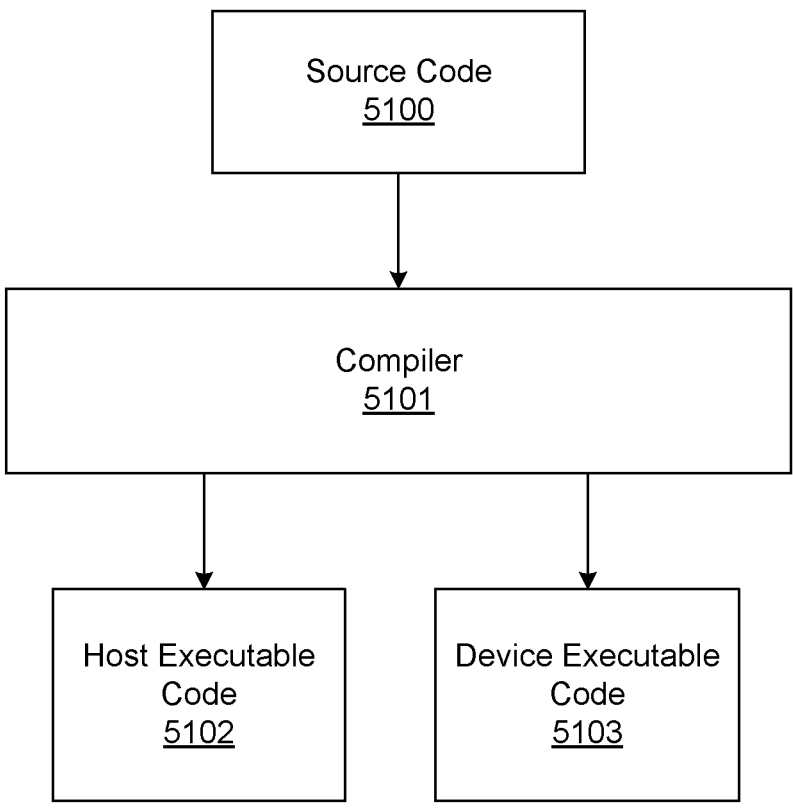
FIG. 51 illustrates compiling code to execute on programming platforms of FIGS. 46-49, in accordance with at least one embodiment.

FIG. 51 illustrates compiling code to execute on one of programming platforms of FIGS. 46-49, in accordance with at least one embodiment. In at least one embodiment, a compiler 5101 receives source code 5100 that includes both host code as well as device code. In at least one embodiment, complier 5101 is configured to convert source code 5100 into host executable code 5102 for execution on a host and device executable code 5103 for execution on a device. In at least one embodiment, source code 5100 may either be compiled offline prior to execution of an application, or online during execution of an application.

In at least one embodiment, source code 5100 may include code in any programming language supported by compiler 5101, such as C++, C, Fortran, etc. In at least one embodiment, source code 5100 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 5100 may include multiple source code files, rather than a single-source file, into which host code and device code are separated.

In at least one embodiment, compiler 5101 is configured to compile source code 5100 into host executable code 5102 for execution on a host and device executable code 5103 for execution on a device. In at least one embodiment, compiler 5101 performs operations including parsing source code 5100 into an abstract system tree (AST), performing optimizations, and generating executable code. In at least one embodiment in which source code 5100 includes a single-source file, compiler 5101 may separate device code from host code in such a single-source file, compile device code and host code into device executable code 5103 and host executable code 5102, respectively, and link device executable code 5103 and host executable code 5102 together in a single file, as discussed in greater detail below with respect to FIG. 52.

In at least one embodiment, host executable code 5102 and device executable code 5103 may be in any suitable format, such as binary code and/or IR code. In the case of CUDA, host executable code 5102 may include native object code and device executable code 5103 may include code in PTX intermediate representation, in at least one embodiment. In the case of ROCm, both host executable code 5102 and device executable code 5103 may include target binary code, in at least one embodiment.

Figure 52:
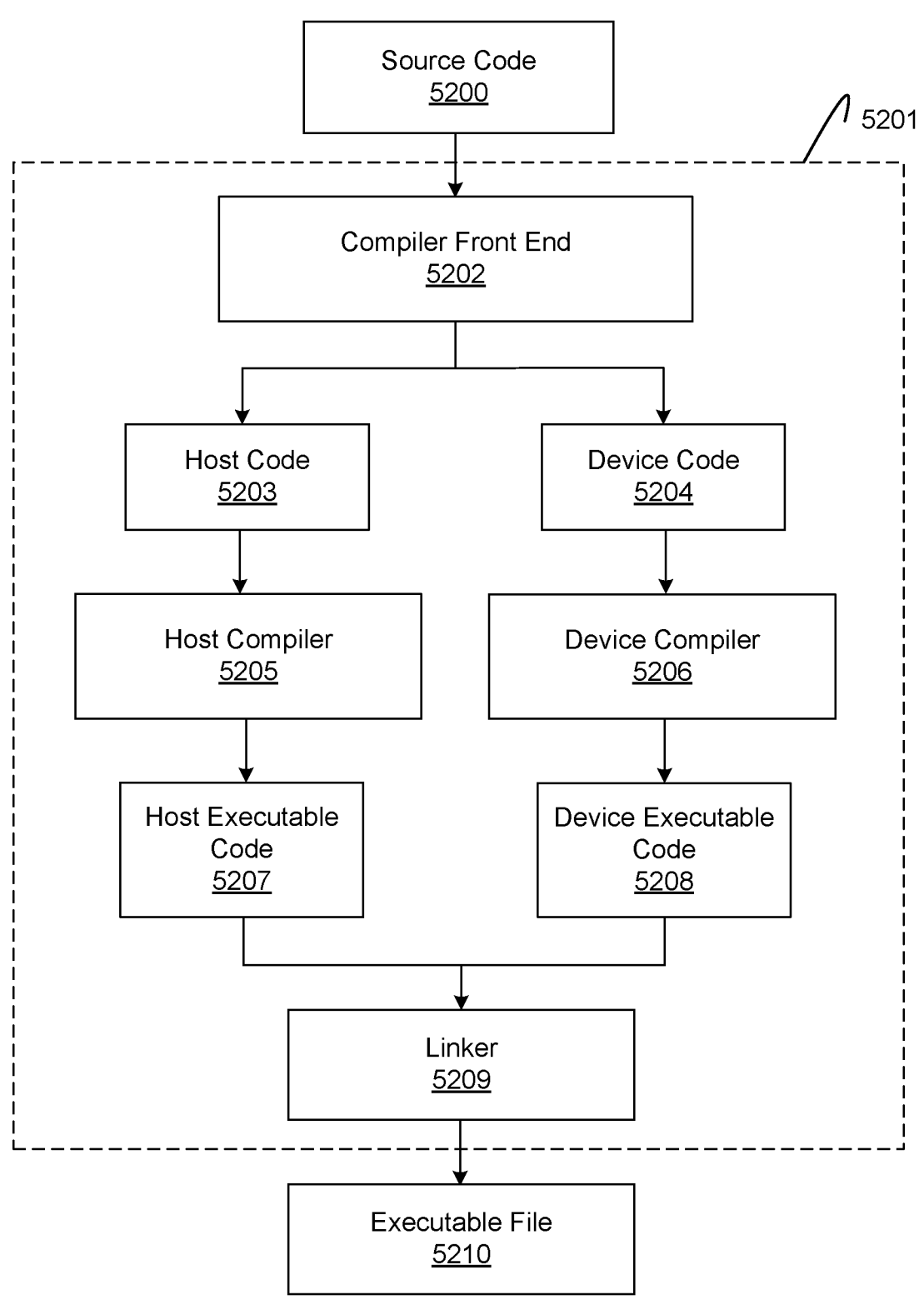
FIG. 52 illustrates in greater detail compiling code to execute on programming platforms of FIGS. 46-49, in accordance with at least one embodiment.

FIG. 52 is a more detailed illustration of compiling code to execute on one of programming platforms of FIGS. 46-49, in accordance with at least one embodiment. In at least one embodiment, a compiler 5201 is configured to receive source code 5200, compile source code 5200, and output an executable file 5210. In at least one embodiment, source code 5200 is a single-source file, such as a .cu file, a .hip.cpp file, or a file in another format, that includes both host and device code. In at least one embodiment, compiler 5201 may be, but is not limited to, an NVIDIA CUDA compiler ("NVCC") for compiling CUDA code in .cu files, or a HCC compiler for compiling HIP code in .hip.cpp files.

In at least one embodiment, compiler 5201 includes a compiler front end 5202, a host compiler 5205, a device compiler 5206, and a linker 5209. In at least one embodiment, compiler front end 5202 is configured to separate device code 5204 from host code 5203 in source code 5200. Device code 5204 is compiled by device compiler 5206 into device executable code 5208, which as described may include binary code or IR code, in at least one embodiment. Separately, host code 5203 is compiled by host compiler 5205 into host executable code 5207, in at least one embodiment. For NVCC, host compiler 5205 may be, but is not limited to, a general purpose C/C++ compiler that outputs native object code, while device compiler 5206 may be, but is not limited to, a Low Level Virtual Machine ("LLVM")-based compiler that forks a LLVM compiler infrastructure and outputs PTX code or binary code, in at least one embodiment. For HCC, both host compiler 5205 and device compiler 5206 may be, but are not limited to, LLVM-based compilers that output target binary code, in at least one embodiment.

Subsequent to compiling source code 5200 into host executable code 5207 and device executable code 5208, linker 5209 links host and device executable code 5207 and 5208 together in executable file 5210, in at least one embodiment. In at least one embodiment, native object code for a host and PTX or binary code for a device may be linked together in an Executable and Linkable Format ("ELF") file, which is a container format used to store object code.

Figure 53:
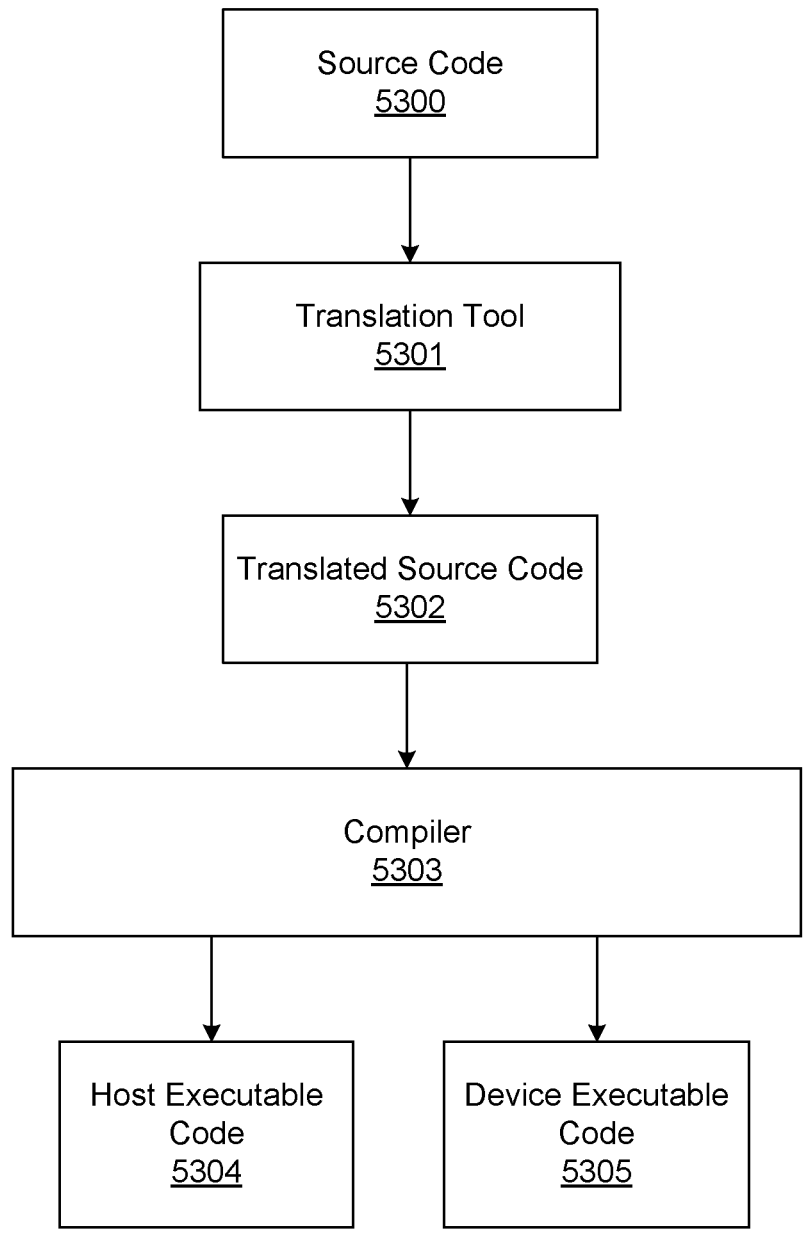
FIG. 53 illustrates translating source code prior to compiling source code, in accordance with at least one embodiment.

FIG. 53 illustrates translating source code prior to compiling source code, in accordance with at least one embodiment. In at least one embodiment, source code 5300 is passed through a translation tool 5301, which translates source code 5300 into translated source code 5302. In at least one embodiment, a compiler 5303 is used to compile translated source code 5302 into host executable code 5304 and device executable code 5305 in a process that is similar to compilation of source code 5100 by compiler 5101 into host executable code 5102 and device executable code 5103, as discussed above in conjunction with FIG. 51.

In at least one embodiment, a translation performed by translation tool 5301 is used to port source 5300 for execution in a different environment than that in which it was originally intended to run. In at least one embodiment, translation tool 5301 may include, but is not limited to, a HIP translator that is used to "hipify" CUDA code intended for a CUDA platform into HIP code that can be compiled and executed on a ROCm platform. In at least one embodiment, translation of source code 5300 may include parsing source code 5300 and converting calls to API(s) provided by one programming model (e.g., CUDA) into corresponding calls to API(s) provided by another programming model (e.g., HIP), as discussed in greater detail below in conjunction with FIGS. 54A-55. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 5301 may sometimes be incomplete, requiring additional, manual effort to fully port source code 5300.

Configuring GPUs for General-Purpose Computing

The following figures set forth, without limitation, exemplary architectures for compiling and executing compute source code, in accordance with at least one embodiment.

Figure 54A:
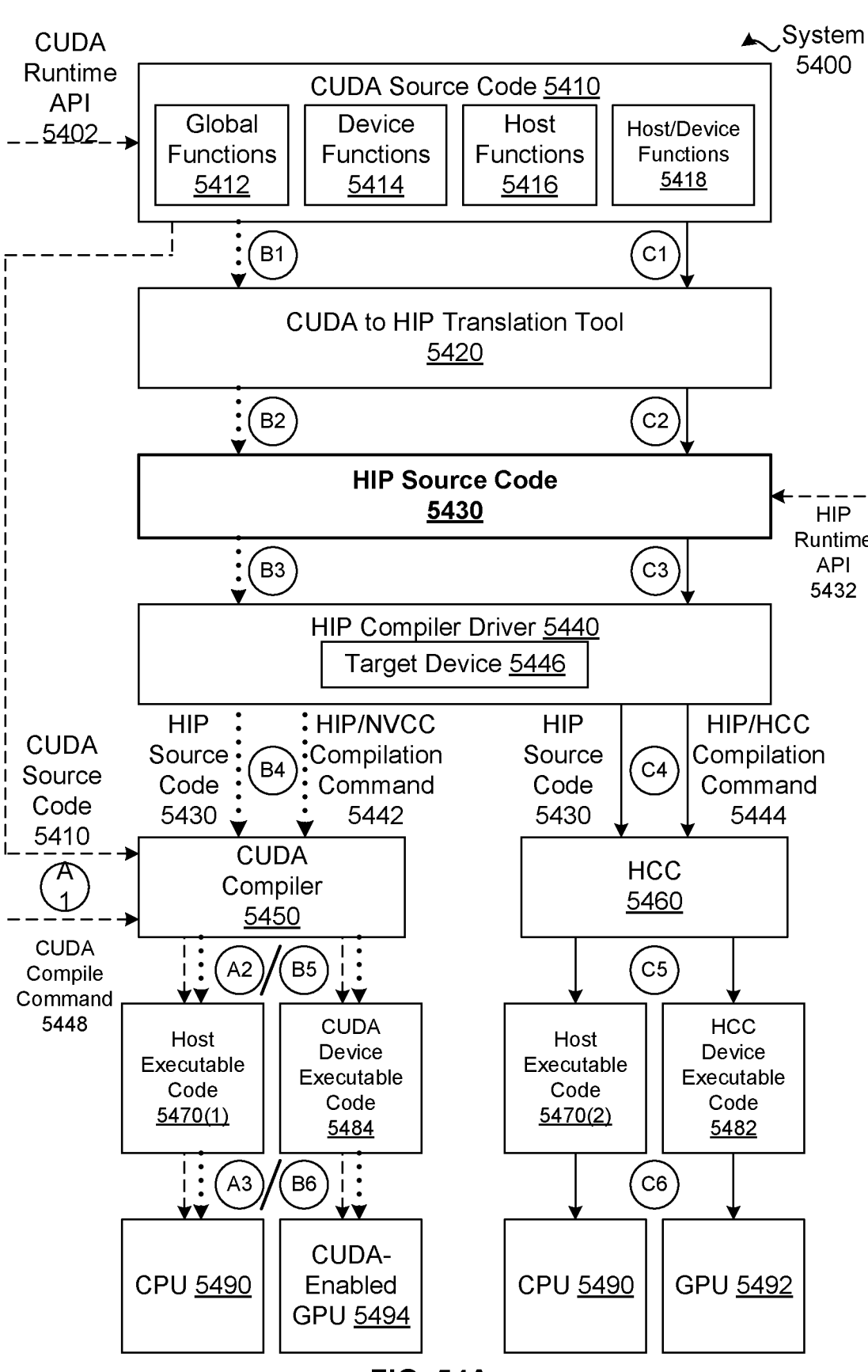
FIG. 54A illustrates a system configured to compile and execute CUDA source code using different types of processing units, in accordance with at least one embodiment.

FIG. 54A illustrates a system 5400 configured to compile and execute CUDA source code 5410 using different types of processing units, in accordance with at least one embodiment. In at least one embodiment, system 5400 includes, without limitation, CUDA source code 5410, a CUDA compiler 5450, host executable code 5470(1), host executable code 5470(2), CUDA device executable code 5484, a CPU 5490, a CUDA-enabled GPU 5494, a GPU 5492, a CUDA to HIP translation tool 5420, HIP source code 5430, a HIP compiler driver 5440, an HCC 5460, and HCC device executable code 5482.

In at least one embodiment, CUDA source code 5410 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 5490, GPU 54192, or another GPGPU, etc. In at least one embodiment, host code is source code that, after compilation, is executable on a host. In at least one embodiment, a host is a processor that is optimized for sequential instruction processing, such as CPU 5490.

In at least one embodiment, CUDA source code 5410 includes, without limitation, any number (including zero) of global functions 5412, any number (including zero) of device functions 5414, any number (including zero) of host functions 5416, and any number (including zero) of host/device functions 5418. In at least one embodiment, global functions 5412, device functions 5414, host functions 5416, and host/device functions 5418 may be mixed in CUDA source code 5410. In at least one embodiment, each of global functions 5412 is executable on a device and callable from a host. In at least one embodiment, one or more of global functions 5412 may therefore act as entry points to a device. In at least one embodiment, each of global functions 5412 is a kernel. In at least one embodiment and in a technique known as dynamic parallelism, one or more of global functions 5412 defines a kernel that is executable on a device and callable from such a device. In at least one embodiment, a kernel is executed N (where N is any positive integer) times in parallel by N different threads on a device during execution.

In at least one embodiment, each of device functions 5414 is executed on a device and callable from such a device only. In at least one embodiment, each of host functions 5416 is executed on a host and callable from such a host only. In at least one embodiment, each of host/device functions 5416 defines both a host version of a function that is executable on a host and callable from such a host only and a device version of the function that is executable on a device and callable from such a device only.

In at least one embodiment, CUDA source code 5410 may also include, without limitation, any number of calls to any number of functions that are defined via a CUDA runtime API 5402. In at least one embodiment, CUDA runtime API 5402 may include, without limitation, any number of functions that execute on a host to allocate and deallocate device memory, transfer data between host memory and device memory, manage systems with multiple devices, etc. In at least one embodiment, CUDA source code 5410 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 5402, a CUDA driver API, APIs for any number of CUDA libraries, etc. In at least one embodiment and relative to CUDA runtime API 5402, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 5450 compiles input CUDA code (e.g., CUDA source code 5410) to generate host executable code 5470(1) and CUDA device executable code 5484. In at least one embodiment, CUDA compiler 5450 is NVCC. In at least one embodiment, host executable code 5470(1) is a compiled version of host code included in input source code that is executable on CPU

5490. In at least one embodiment, CPU 5490 may be any processor that is optimized for sequential instruction processing.

In at least one embodiment, CUDA device executable code 5484 is a compiled version of device code included in input source code that is executable on CUDA-enabled GPU 5494. In at least one embodiment, CUDA device executable code 5484 includes, without limitation, binary code. In at least one embodiment, CUDA device executable code 5484 includes, without limitation, IR code, such as PTX code, that is further compiled at runtime into binary code for a specific target device (e.g., CUDA-enabled GPU 5494) by a device driver. In at least one embodiment, CUDA-enabled GPU 5494 may be any processor that is optimized for parallel instruction processing and that supports CUDA. In at least one embodiment, CUDA-enabled GPU 5494 is developed by NVIDIA Corporation of Santa Clara, CA.

In at least one embodiment, CUDA to HIP translation tool 5420 is configured to translate CUDA source code 5410 to functionally similar HIP source code 5430. In a least one embodiment, HIP source code 5430 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 5412, but such a HIP programming language may lack support for dynamic parallelism and therefore global functions 5412 defined in HIP code may be callable from a host only.

In at least one embodiment, HIP source code 5430 includes, without limitation, any number (including zero) of global functions 5412, any number (including zero) of device functions 5414, any number (including zero) of host functions 5416, and any number (including zero) of host/device functions 5418. In at least one embodiment, HIP source code 5430 may also include any number of calls to any number of functions that are specified in a HIP runtime API 5432. In at least one embodiment, HIP runtime API 5432 includes, without limitation, functionally similar versions of a subset of functions included in CUDA runtime API 5402. In at least one embodiment, HIP source code 5430 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 5432, a HIP driver API, APIs for any number of HIP libraries, APIs for any number of ROCm libraries, etc.

In at least one embodiment, CUDA to HIP translation tool 5420 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 5420 converts any number of calls to functions specified in CUDA runtime API 5402 to any number of calls to functions specified in HIP runtime API 5432.

In at least one embodiment, CUDA to HIP translation tool 5420 is a tool known as hipify-perl that executes a text-based translation process. In at least one embodiment, CUDA to HIP translation tool 5420 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 5420.

In at least one embodiment, HIP compiler driver 5440 is a front end that determines a target device 5446 and then configures a compiler that is compatible with target device 5446 to compile HIP source code 5430. In at least one embodiment, target device 5446 is a processor that is optimized for parallel instruction processing. In at least one embodiment, HIP compiler driver 5440 may determine target device 5446 in any technically feasible fashion.

In at least one embodiment, if target device 5446 is compatible with CUDA (e.g., CUDA-enabled GPU 5494), then HIP compiler driver 5440 generates a HIP/NVCC compilation command 5442. In at least one embodiment and as described in greater detail in conjunction with FIG. 54B, HIP/NVCC compilation command 5442 configures CUDA compiler 5450 to compile HIP source code 5430 using, without limitation, a HIP to CUDA translation header and a CUDA runtime library. In at least one embodiment and in response to HIP/NVCC compilation command 5442, CUDA compiler 5450 generates host executable code 5470(1) and CUDA device executable code 5484.

In at least one embodiment, if target device 5446 is not compatible with CUDA, then HIP compiler driver 5440 generates a HIP/HCC compilation command 5444. In at least one embodiment and as described in greater detail in conjunction with FIG. 54C, HIP/HCC compilation command 5444 configures HCC 5460 to compile HIP source code 5430 using, without limitation, an HCC header and a HIP/HCC runtime library. In at least one embodiment and in response to HIP/HCC compilation command 5444, HCC 5460 generates host executable code 5470(2) and HCC device executable code 5482. In at least one embodiment, HCC device executable code 5482 is a compiled version of device code included in HIP source code 5430 that is executable on GPU 5492. In at least one embodiment, GPU 5492 may be any processor that is optimized for parallel instruction processing, is not compatible with CUDA, and is compatible with HCC. In at least one embodiment, GPU 5492 is developed by AMD Corporation of Santa Clara, CA. In at least one embodiment GPU, 5492 is a non-CUDA-enabled GPU 5492.

For explanatory purposes only, three different flows that may be implemented in at least one embodiment to compile CUDA source code 5410 for execution on CPU 5490 and different devices are depicted in FIG. 54A. In at least one embodiment, a direct CUDA flow compiles CUDA source code 5410 for execution on CPU 5490 and CUDA-enabled GPU 5494 without translating CUDA source code 5410 to HIP source code 5430. In at least one embodiment, an indirect CUDA flow translates CUDA source code 5410 to HIP source code 5430 and then compiles HIP source code 5430 for execution on CPU 5490 and CUDA-enabled GPU 5494. In at least one embodiment, a CUDA/HCC flow translates CUDA source code 5410 to HIP source code 5430 and then compiles HIP source code 5430 for execution on CPU 5490 and GPU 5492.

A direct CUDA flow that may be implemented in at least one embodiment is depicted via dashed lines and a series of bubbles annotated A1-A3. In at least one embodiment and as depicted with bubble annotated A1, CUDA compiler 5450 receives CUDA source code 5410 and a CUDA compile command 5448 that configures CUDA compiler 5450 to compile CUDA source code 5410. In at least one embodiment, CUDA source code 5410 used in a direct CUDA flow is written in a CUDA programming language that is based on a programming language other than C++ (e.g., C, Fortran, Python, Java, etc.). In at least one embodiment and in response to CUDA compile command 5448, CUDA compiler 5450 generates host executable code 5470(1) and CUDA device executable code 5484 (depicted with bubble annotated A2). In at least one embodiment and as depicted with bubble annotated A3, host executable code 5470(1) and CUDA device executable code 5484 may be executed on, respectively, CPU 5490 and CUDA-enabled GPU 5494. In at least one embodiment, CUDA device executable code 5484 includes, without limitation, binary code. In at least one embodiment, CUDA device executable code 5484 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 5420 receives CUDA source code 5410. In at least one embodiment and as depicted with bubble annotated B2, CUDA to HIP translation tool 5420 translates CUDA source code 5410 to HIP source code 5430. In at least one embodiment and as depicted with bubble annotated B3, HIP compiler driver 5440 receives HIP source code 5430 and determines that target device 5446 is CUDA-enabled.

In at least one embodiment and as depicted with bubble annotated B4, HIP compiler driver 5440 generates HIP/NVCC compilation command 5442 and transmits both HIP/NVCC compilation command 5442 and HIP source code 5430 to CUDA compiler 5450. In at least one embodiment and as described in greater detail in conjunction with FIG. 54B, HIP/NVCC compilation command 5442 configures CUDA compiler 5450 to compile HIP source code 5430 using, without limitation, a HIP to CUDA translation header and a CUDA runtime library. In at least one embodiment and in response to HIP/NVCC compilation command 5442, CUDA compiler 5450 generates host executable code 5470(1) and CUDA device executable code 5484 (depicted with bubble annotated B5). In at least one embodiment and as depicted with bubble annotated B6, host executable code 5470(1) and CUDA device executable code 5484 may be executed on, respectively, CPU 5490 and CUDA-enabled GPU 5494. In at least one embodiment, CUDA device executable code 5484 includes, without limitation, binary code. In at least one embodiment, CUDA device executable code 5484 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 5420 receives CUDA source code 5410. In at least one embodiment and as depicted with bubble annotated C2, CUDA to HIP translation tool 5420 translates CUDA source code 5410 to HIP source code 5430. In at least one embodiment and as depicted with bubble annotated C3, HIP compiler driver 5440 receives HIP source code 5430 and determines that target device 5446 is not CUDA-enabled.

In at least one embodiment, HIP compiler driver 5440 generates HIP/HCC compilation command 5444 and transmits both HIP/HCC compilation command 5444 and HIP source code 5430 to HCC 5460 (depicted with bubble annotated C4). In at least one embodiment and as described in greater detail in conjunction with FIG. 54C, HIP/HCC compilation command 5444 configures HCC 5460 to compile HIP source code 5430 using, without limitation, an HCC header and a HIP/HCC runtime library. In at least one embodiment and in response to HIP/HCC compilation command 5444, HCC 5460 generates host executable code 5470(2) and HCC device executable code 5482 (depicted with bubble annotated C5). In at least one embodiment and as depicted with bubble annotated C6, host executable code 5470(2) and HCC device executable code 5482 may be executed on, respectively, CPU 5490 and GPU 5492.

In at least one embodiment, after CUDA source code 5410 is translated to HIP source code 5430, HIP compiler driver 5440 may subsequently be used to generate executable code for either CUDA-enabled GPU 5494 or GPU 5492 without re-executing CUDA to HIP translation tool 5420. In at least one embodiment, CUDA to HIP translation tool 5420 translates CUDA source code 5410 to HIP source code 5430 that is then stored in memory. In at least one embodiment, HIP compiler driver 5440 then configures HCC 5460 to generate host executable code 5470(2) and HCC device executable code 5482 based on HIP source code 5430. In at least one embodiment, HIP compiler driver 5440 subsequently configures CUDA compiler 5450 to generate host executable code 5470(1) and CUDA device executable code 5484 based on stored HIP source code 5430.

Figure 54B:
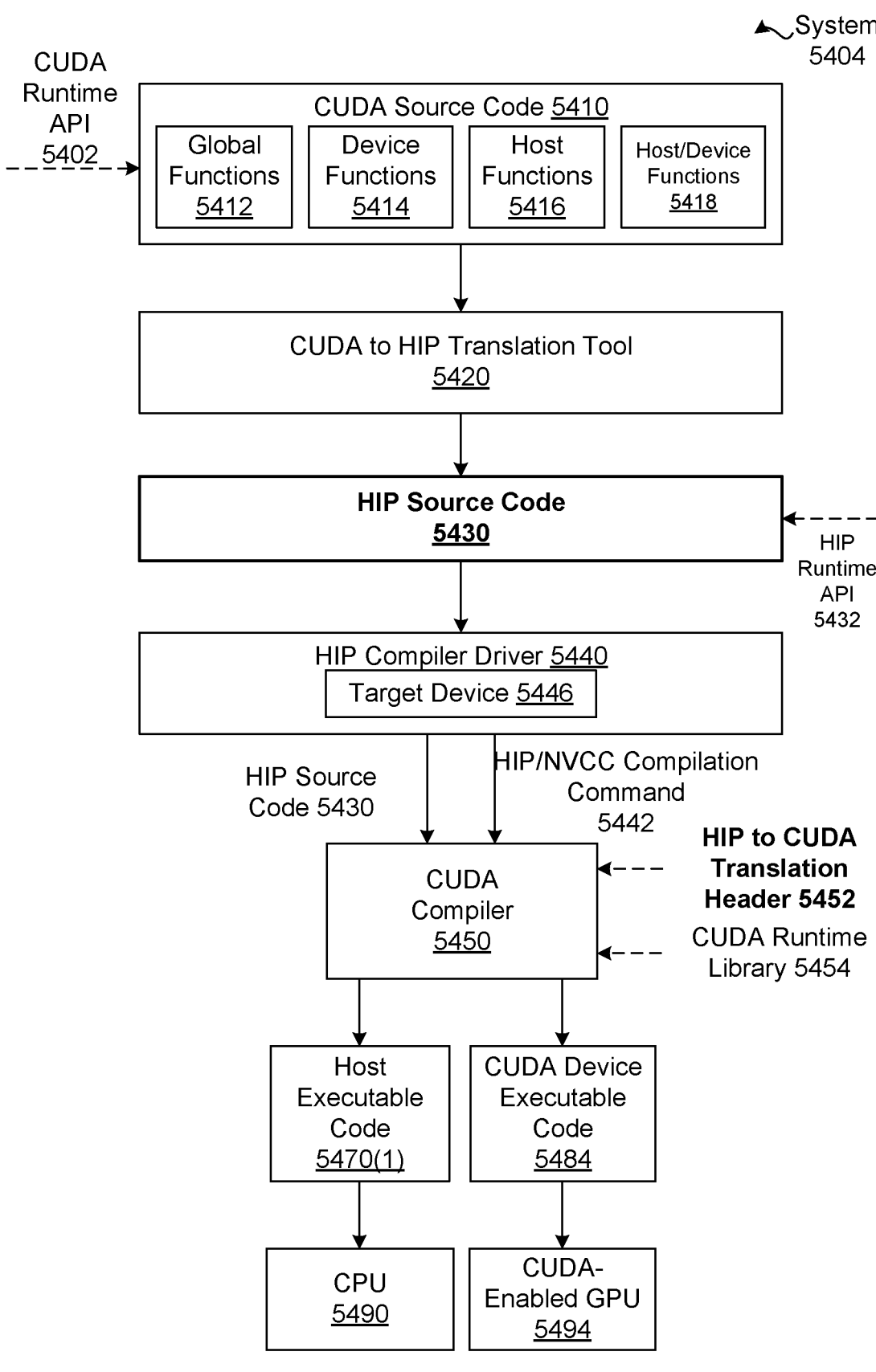
FIG. 54B illustrates a system configured to compile and execute CUDA source code of FIG. 54A using a CPU and a CUDA-enabled GPU, in accordance with at least one embodiment.

FIG. 54B illustrates a system 5404 configured to compile and execute CUDA source code 5410 of FIG. 54A using CPU 5490 and CUDA-enabled GPU 5494, in accordance with at least one embodiment. In at least one embodiment, system 5404 includes, without limitation, CUDA source code 5410, CUDA to HIP translation tool 5420, HIP source code 5430, HIP compiler driver 5440, CUDA compiler 5450, host executable code 5470(1), CUDA device executable code 5484, CPU 5490, and CUDA-enabled GPU 5494.

In at least one embodiment and as described previously herein in conjunction with FIG. 54A, CUDA source code 5410 includes, without limitation, any number (including zero) of global functions 5412, any number (including zero) of device functions 5414, any number (including zero) of host functions 5416, and any number (including zero) of host/device functions 5418. In at least one embodiment, CUDA source code 5410 also includes, without limitation, any number of calls to any number of functions that are specified in any number of CUDA APIs.

In at least one embodiment, CUDA to HIP translation tool 5420 translates CUDA source code 5410 to HIP source code 5430. In at least one embodiment, CUDA to HIP translation tool 5420 converts each kernel call in CUDA source code 5410 from a CUDA syntax to a HIP syntax and converts any number of other CUDA calls in CUDA source code 5410 to any number of other functionally similar HIP calls.

In at least one embodiment, HIP compiler driver 5440 determines that target device 5446 is CUDA-enabled and generates HIP/NVCC compilation command 5442. In at least one embodiment, HIP compiler driver 5440 then configures CUDA compiler 5450 via HIP/NVCC compilation command 5442 to compile HIP source code 5430. In at least one embodiment, HIP compiler driver 5440 provides access to a HIP to CUDA translation header 5452 as part of configuring CUDA compiler 5450. In at least one embodiment, HIP to CUDA translation header 5452 translates any number of mechanisms (e.g., functions) specified in any number of HIP APIs to any number of mechanisms specified in any number of CUDA APIs. In at least one embodiment, CUDA compiler 5450 uses HIP to CUDA translation header 5452 in conjunction with a CUDA runtime library 5454 corresponding to CUDA runtime API 5402 to generate host executable code 5470(1) and CUDA device executable code 5484. In at least one embodiment, host executable code 5470(1) and CUDA device executable code 5484 may then be executed on, respectively, CPU 5490 and CUDA-enabled GPU 5494. In at least one embodiment, CUDA device executable code 5484 includes, without limitation, binary code. In at least one embodiment, CUDA device executable code 5484 includes, without limitation, PTX code and is further compiled into binary code for a specific target device at runtime.

Figure 54C:
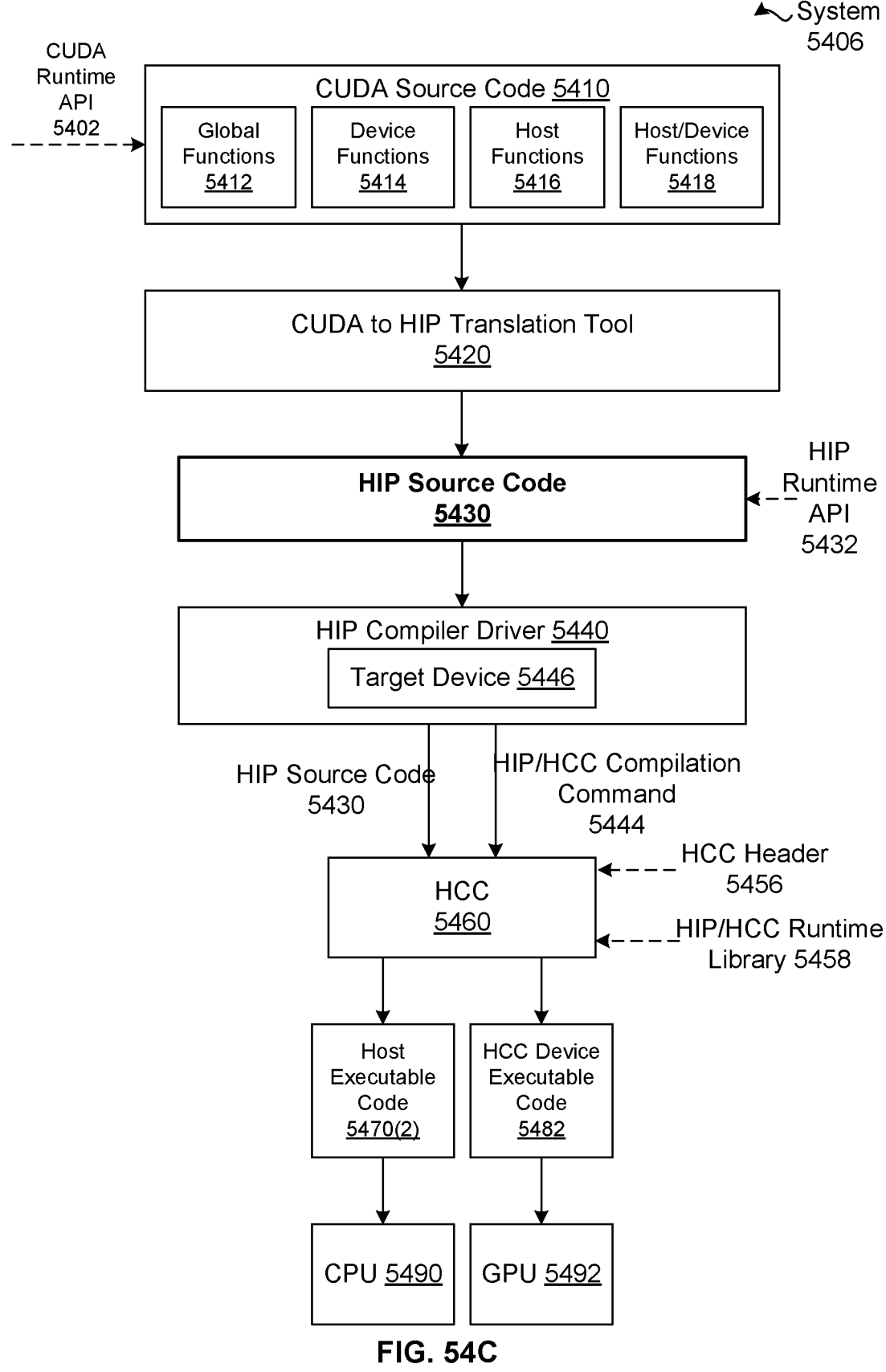
FIG. 54C illustrates a system configured to compile and execute CUDA source code of FIG. 54A using a CPU and a non-CUDA-enabled GPU, in accordance with at least one embodiment.

FIG. 54C illustrates a system 5406 configured to compile and execute CUDA source code 5410 of FIG. 54A using CPU 5490 and non-CUDA-enabled GPU 5492, in accordance with at least one embodiment. In at least one embodiment, system 5406 includes, without limitation, CUDA source code 5410, CUDA to HIP translation tool 5420, HIP source code 5430, HIP compiler driver 5440, HCC 5460, host executable code 5470(2), HCC device executable code 5482, CPU 5490, and GPU 5492.

In at least one embodiment and as described previously herein in conjunction with FIG. 54A, CUDA source code 5410 includes, without limitation, any number (including zero) of global functions 5412, any number (including zero) of device functions 5414, any number (including zero) of host functions 5416, and any number (including zero) of host/device functions 5418. In at least one embodiment, CUDA source code 5410 also includes, without limitation, any number of calls to any number of functions that are specified in any number of CUDA APIs.

In at least one embodiment, CUDA to HIP translation tool 5420 translates CUDA source code 5410 to HIP source code 5430. In at least one embodiment, CUDA to HIP translation tool 5420 converts each kernel call in CUDA source code 5410 from a CUDA syntax to a HIP syntax and converts any number of other CUDA calls in source code 5410 to any number of other functionally similar HIP calls.

In at least one embodiment, HIP compiler driver 5440 subsequently determines that target device 5446 is not CUDA-enabled and generates HIP/HCC compilation command 5444. In at least one embodiment, HIP compiler driver 5440 then configures HCC 5460 to execute HIP/HCC compilation command 5444 to compile HIP source code 5430. In at least one embodiment, HIP/HCC compilation command 5444 configures HCC 5460 to use, without limitation, a HIP/HCC runtime library 5458 and an HCC header 5456 to generate host executable code 5470(2) and HCC device executable code 5482. In at least one embodiment, HIP/HCC runtime library 5458 corresponds to HIP runtime API 5432. In at least one embodiment, HCC header 5456 includes, without limitation, any number and type of interoperability mechanisms for HIP and HCC. In at least one embodiment, host executable code 5470(2) and HCC device executable code 5482 may be executed on, respectively, CPU 5490 and GPU 5492.

FIG. 55 illustrates an exemplary kernel translated by CUDA-to-HIP translation tool 5420 of FIG. 54C, in accordance with at least one embodiment. In at least one embodiment, CUDA source code 5410 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 5410 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 5510. In at least one embodiment, CUDA kernel launch syntax 5510 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 5510 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 5510, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 5510, SharedMemorySize defaults to zero. In at least one embodiment and with respect to CUDA kernel launch syntax 5510, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 5410 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 5510, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 5410 to HIP source code 5430, CUDA to HIP translation tool 5420 translates each kernel call in CUDA source code 5410 from CUDA kernel launch syntax 5510 to a HIP kernel launch syntax 5520 and converts any number of other CUDA calls in source code 5410 to any number of other functionally similar HIP calls. In at least one embodiment, HIP kernel launch syntax 5520 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 5520 as in CUDA kernel launch syntax 5510 (described previously herein). In at least one embodiment, arguments SharedMemorySize and Stream are required in HIP kernel launch syntax 5520 and are optional in CUDA kernel launch syntax 5510.

In at least one embodiment, a portion of HIP source code 5430 depicted in FIG. 55 is identical to a portion of CUDA source code 5410 depicted in FIG. 55 except for a kernel call that causes kernel MatAdd to execute on a device. In at least one embodiment, kernel MatAdd is defined in HIP source code 5430 with the same "_global_" declaration specifier with which kernel MatAdd is defined in CUDA source code 5410. In at least one embodiment, a kernel call in HIP source code 5430 is "hipLaunchKernelGGL(MatAdd, numBlocks, threadsPerBlock, 0, 0, A, B, C);", while a corresponding kernel call in CUDA source code 5410 is "MatAdd<<<numBlocks, threadsPerBlock>>>(A, B, C);".

Figure 56:
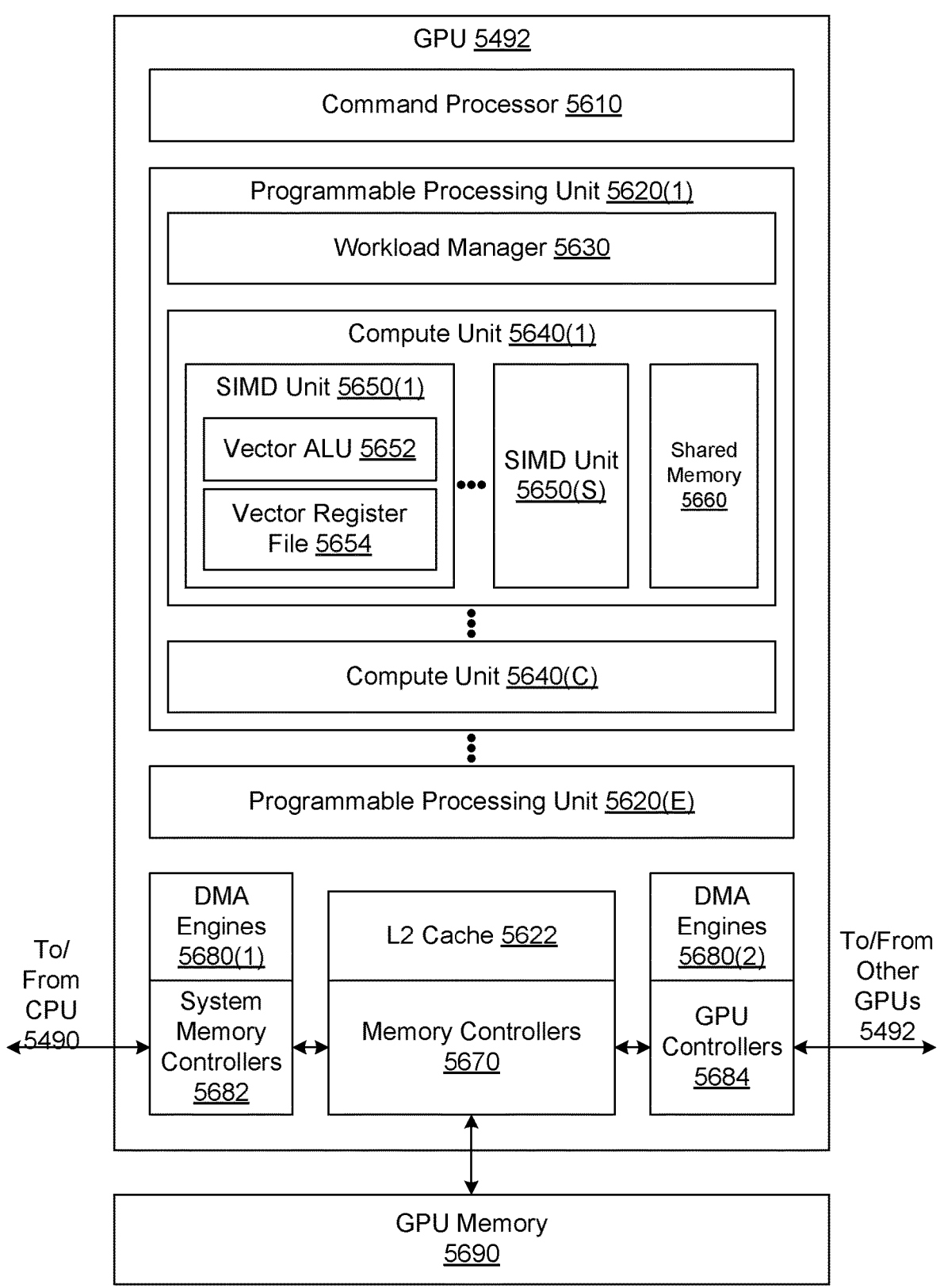
FIG. 56 illustrates non-CUDA-enabled GPU of FIG. 54C in greater detail, in accordance with at least one embodiment.

FIG. 56 illustrates non-CUDA-enabled GPU 5492 of FIG. 54C in greater detail, in accordance with at least one embodiment. In at least one embodiment, GPU 5492 is developed by AMD corporation of Santa Clara. In at least one embodiment, GPU 5492 can be configured to perform compute operations in a highly-parallel fashion. In at least one embodiment, GPU 5492 is configured to execute graphics pipeline operations such as draw commands, pixel operations, geometric computations, and other operations associated with rendering an image to a display. In at least one embodiment, GPU 5492 is configured to execute operations unrelated to graphics. In at least one embodiment, GPU 5492 is configured to execute both operations related to graphics and operations unrelated to graphics. In at least one embodiment, GPU 5492 can be configured to execute device code included in HIP source code 5430.

In at least one embodiment, GPU 5492 includes, without limitation, any number of programmable processing units 5620, a command processor 5610, an L2 cache 5622, memory controllers 5670, DMA engines 5680(1), system memory controllers 5682, DMA engines 5680(2), and GPU controllers 5684. In at least one embodiment, each programmable processing unit 5620 includes, without limitation, a workload manager 5630 and any number of compute units 5640. In at least one embodiment, command processor 5610 reads commands from one or more command queues (not shown) and distributes commands to workload managers 5630. In at least one embodiment, for each programmable processing unit 5620, associated workload manager 5630 distributes work to compute units 5640 included in programmable processing unit 5620. In at least one embodiment, each compute unit 5640 may execute any number of thread blocks, but each thread block executes on a single compute unit 5640. In at least one embodiment, a workgroup is a thread block.

In at least one embodiment, each compute unit 5640 includes, without limitation, any number of SIMD units 5650 and a shared memory 5660. In at least one embodiment, each SIMD unit 5650 implements a SIMD architecture and is configured to perform operations in parallel. In at least one embodiment, each SIMD unit 5650 includes, without limitation, a vector ALU 5652 and a vector register file 5654. In at least one embodiment, each SIMD unit 5650 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 5660.

In at least one embodiment, programmable processing units 5620 are referred to as "shader engines." In at least one embodiment, each programmable processing unit 5620 includes, without limitation, any amount of dedicated graphics hardware in addition to compute units 5640. In at least one embodiment, each programmable processing unit 5620 includes, without limitation, any number (including zero) of geometry processors, any number (including zero) of rasterizers, any number (including zero) of render back ends, workload manager 5630, and any number of compute units 5640.

In at least one embodiment, compute units 5640 share L2 cache 5622. In at least one embodiment, L2 cache 5622 is partitioned. In at least one embodiment, a GPU memory 5690 is accessible by all compute units 5640 in GPU 5492. In at least one embodiment, memory controllers 5670 and system memory controllers 5682 facilitate data transfers between GPU 5492 and a host, and DMA engines 5680(1) enable asynchronous memory transfers between GPU 5492 and such a host. In at least one embodiment, memory controllers 5670 and GPU controllers 5684 facilitate data transfers between GPU 5492 and other GPUs 5492, and DMA engines 5680(2) enable asynchronous memory transfers between GPU 5492 and other GPUs 5492.

In at least one embodiment, GPU 5492 includes, without limitation, any amount and type of system interconnect that facilitates data and control transmissions across any number and type of directly or indirectly linked components that may be internal or external to GPU 5492. In at least one embodiment, GPU 5492 includes, without limitation, any number and type of I/O interfaces (e.g., PCIe) that are coupled to any number and type of peripheral devices. In at least one embodiment, GPU 5492 may include, without limitation, any number (including zero) of display engines and any number (including zero) of multimedia engines. In at least one embodiment, GPU 5492 implements a memory subsystem that includes, without limitation, any amount and type of memory controllers (e.g., memory controllers 5670 and system memory controllers 5682) and memory devices (e.g., shared memories 5660) that may be dedicated to one component or shared among multiple components. In at least one embodiment, GPU 5492 implements a cache subsystem that includes, without limitation, one or more cache memories (e.g., L2 cache 5622) that may each be private to or shared between any number of components (e.g., SIMD units 5650, compute units 5640, and programmable processing units 5620).

Figure 57:
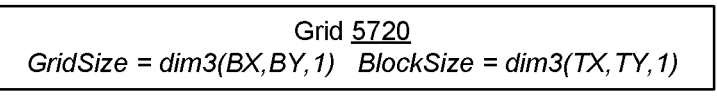
FIG. 57 illustrates how threads of an exemplary CUDA grid are mapped to different compute units of FIG. 56, in accordance with at least one embodiment.

FIG. 57 illustrates how threads of an exemplary CUDA grid 5720 are mapped to different compute units 5640 of FIG. 56, in accordance with at least one embodiment. In at least one embodiment and for explanatory purposes only, grid 5720 has a GridSize of BX by BY by 1 and a BlockSize of TX by TY by 1. In at least one embodiment, grid 5720 therefore includes, without limitation, (BX*BY) thread blocks 5730 and each thread block 5730 includes, without limitation, (TX*TY) threads 5740. Threads 5740 are depicted in FIG. 57 as squiggly arrows.

In at least one embodiment, grid 5720 is mapped to programmable processing unit 5620(1) that includes, without limitation, compute units 5640(1)-5640(C). In at least one embodiment and as shown, (BJ*BY) thread blocks 5730 are mapped to compute unit 5640(1), and the remaining thread blocks 5730 are mapped to compute unit 5640(2). In at least one embodiment, each thread block 5730 may include, without limitation, any number of warps, and each warp is mapped to a different SIMD unit 5650 of FIG. 56.

In at least one embodiment, warps in a given thread block 5730 may synchronize together and communicate through shared memory 5660 included in associated compute unit 5640. For example and in at least one embodiment, warps in thread block 5730(BJ,1) can synchronize together and communicate through shared memory 5660(1). For example and in at least one embodiment, warps in thread block 5730(BJ+1,1) can synchronize together and communicate through shared memory 5660(2).

Figure 58:
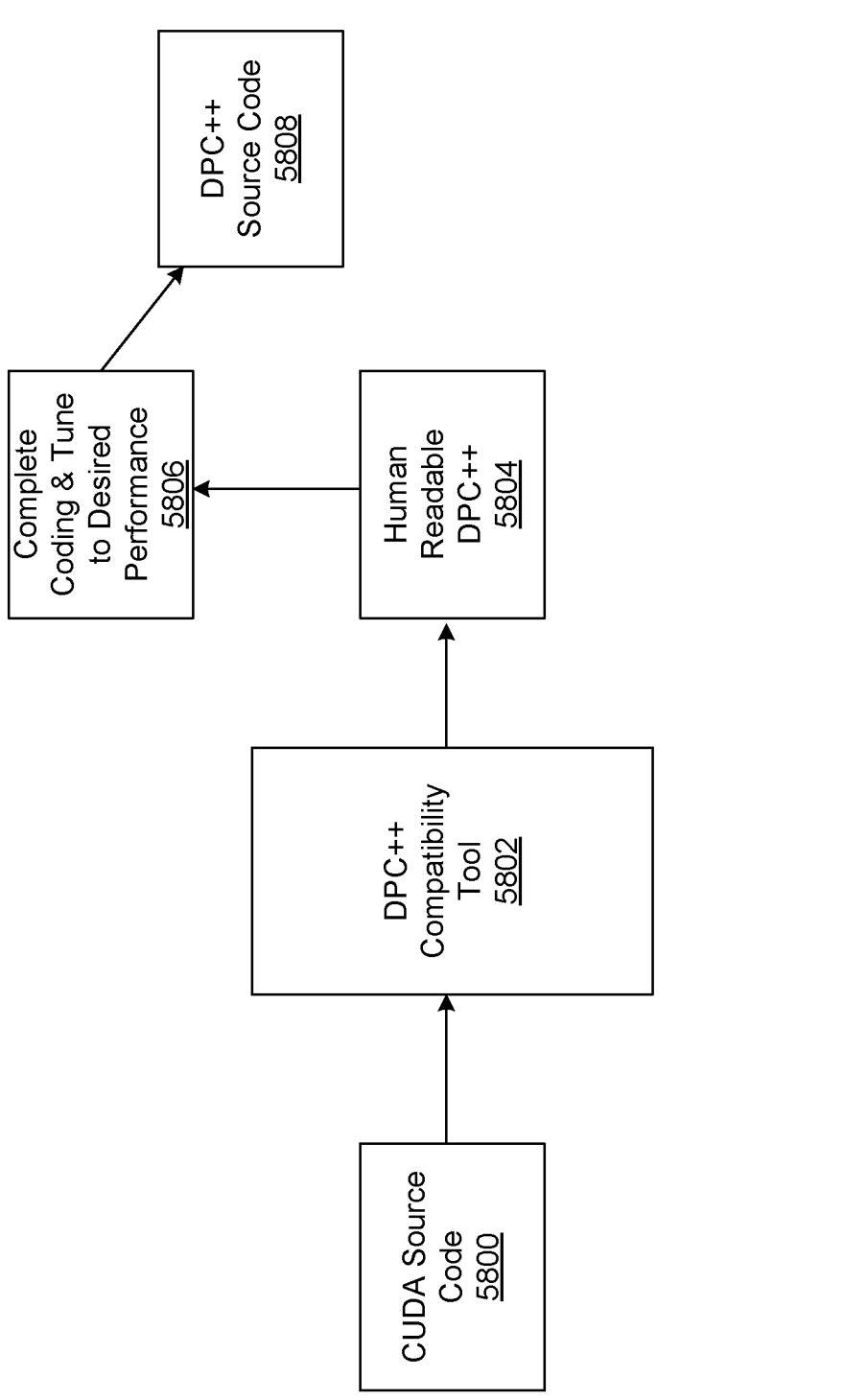
FIG. 58 illustrates how to migrate existing CUDA code to Data Parallel C++ code, in accordance with at least one embodiment.

FIG. 58 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 5800 is provided as an input to a DPC++ compatibility tool 5802 to generate human readable DPC++ 5804. In at least one embodiment, human readable DPC++ 5804 includes inline comments generated by DPC++ compatibility tool 5802 that guides a developer on how and/or where to modify DPC++ code to complete coding and tuning to desired performance 5806, thereby generating DPC++ source code 5808.

In at least one embodiment, CUDA source code 5800 is or includes a collection of human-readable source code in a CUDA programming language. In at least one embodiment, CUDA source code 5800 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 5800 described in connection with FIG. 58 may be in accordance with those discussed elsewhere in this document.

In at least one embodiment, DPC++ compatibility tool 5802 refers to an executable tool, program, application, or any other suitable type of tool that is used to facilitate migration of CUDA source code 5800 to DPC++ source code 5808. In at least one embodiment, DPC++ compatibility tool 5802 is a command-line-based code migration tool available as part of a DPC++ tool kit that is used to port existing CUDA sources to DPC++. In at least one embodiment, DPC++ compatibility tool 5802 converts some or all source code of a CUDA application from CUDA to DPC++ and generates a resulting file that is written at least partially in DPC++, referred to as human readable DPC++ 5804. In at least one embodiment, human readable DPC++ 5804 includes comments that are generated by DPC++ compatibility tool 5802 to indicate where user intervention may be necessary. In at least one embodiment, user intervention is necessary when CUDA source code 5800 calls a CUDA API that has no analogous DPC++ API; other examples where user intervention is required are discussed later in greater detail.

In at least one embodiment, a workflow for migrating CUDA source code 5800 (e.g., application or portion thereof) includes creating one or more compilation database files; migrating CUDA to DPC++ using a DPC++ compatibility tool 5802; completing migration and verifying correctness, thereby generating DPC++ source code 5808; and compiling DPC++ source code 5808 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 5802 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 5802 migrates CUDA code (e.g., applications) written in CUDA to DPC++ by generating DPC++ wherever possible. In at least one embodiment, DPC++ compatibility tool 5802 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 5802 to migrate CUDA code to DPC++. In at least one embodiment, non-CUDA C++ code and files are migrated as is. In at least one embodiment, DPC++ compatibility tool 5802 generates human readable DPC++ 5804 which may be DPC++ code that, as generated by DPC++ compatibility tool 5802, cannot be compiled by DPC++ compiler and requires additional plumbing for verifying portions of code that were not migrated correctly, and may involve manual intervention, such as by a developer. In at least one embodiment, DPC++ compatibility tool 5802 provides hints or tools embedded in code to help developers manually migrate additional code that could not be migrated automatically. In at least one embodiment, migration is a one-time activity for a source file, project, or application.

In at least one embodiment, DPC++ compatibility tool 58002 is able to successfully migrate all portions of CUDA code to DPC++ and there may simply be an optional step for manually verifying and tuning performance of DPC++ source code that was generated. In at least one embodiment, DPC++ compatibility tool 5802 directly generates DPC++ source code 5808 which is compiled by a DPC++ compiler without requiring or utilizing human intervention to modify DPC++ code generated by DPC++ compatibility tool 5802. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 5802. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR SIZE 256
[] global void_VectorAddKernel(float* A, float* B, float* C)
   A[threadIdx.x] = threadIdx.x + 1.0f;
   B[threadIdx.x] = threadIdx.x + 1.0f;
   C[threadIdx.x]= A[threadIdx.x] + B[threadIdx.x];
}
int main( )
{
   float *d_A, *d_B, *d_C;
   cudaMalloc(&d_A, VECTOR_SIZE*sizeof(float));
   cudaMalloc(&d_B, VECTOR_SIZE*sizeof(float));
   cudaMalloc(&d_C, VECTOR_SIZE*sizeof(float));
   VectorAddKernel<<<1, VECTOR_SIZE>>>(d_A,d_B, d_C);
   float Result[VECTOR_SIZE] = { };
   cudaMemcpy(Result, d_C, VECTOR_SIZE*sizeof(float),
cudaMemcpyDeviceToHost);
   cudaFree(d_A);
   cudaFree(d_B);
   cudaFree(d_C);
   for (int i=0; i<VECTOR_SIZE; i++ {
      if (i % 16 == 0) {
         printf("\n");
      }
      printf("%f ", Result[i]);
   }
   return 0;
}
```

In at least one embodiment and in connection with CUDA source file presented above, DPC++ compatibility tool 5802 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 5802 converts CUDA thread IDs used to index work elements to SYCL standard addressing for work elements via a local ID as part of migrating CUDA code to DPC++ code. In at least one embodiment, DPC++ code generated by DPC++ compatibility tool 5802 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 5802. In at least one embodiment, DPC++ compatibility tool 5802 modify CUDA APIs for memory setup and/or host calls to execute kernel on the acceleration device. In at least one embodiment and in connection with CUDA source file presented above, a corresponding human readable DPC++ 5804 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
                                 sycl::nd_item<3> item_ct1)
{
   A[item_ct1.get_local_id(2)]=item_ct1.get_local_id(2)+ 1.0f;
   B[item_ct1.get_local_id(2)] =item_ct1.get_local_id(2) + 1.0f;
   C[item_ct1.get_local_id(2)] =
      A[item_ct1.get_local_id(2)]+ B[item_ct1.get_local_id(2)];
}
int main()
{
   float *d_A, *d_B, *d_C;
   d_A = (float *)sycl::malloc_device(VECTOR_SIZE * sizeof(float),
      dpct::get_current_device( ),
      dpct::get_default_context( ));
   d_B = (float *)sycl::malloc_device(VECTOR_SIZE * sizeof(float),
      dpct::get_current_device( ),
      dpct::get_default_context( ));
   d_C = (float *)sycl::malloc_device(VECTOR_SIZE * sizeof(float),
      dpct::get_current_device( ),
      dpct::get_default_context( ));
   dpct::get_default_queue_wait( ).submit([&](sycl::handler &cgh) {
      cgh.parallel_for(
      sycl::nd_range<3>(sycl::range<3>(1, 1, 1)*
                                 sycl::range<3>(1, 1, VECTOR_SIZE) *
                                 sycl::range<3>(1, 1, VECTOR_SIZE)),
      [=](sycl:nd_items<3> item_ct1) {
         VectorAddKernel(d_A, d_B, d_C, item_ct1);
      });
   });
   float Result[VECTOR_SIZE] = { };
   dpct::get_default_queue_wait( )
      .memcpy(Result, d_C, VECTOR_SIZE * sizeof(float))
      .wait();
   sycl::free(d_A, dpct::get_default_context( ));
   sycl::free(d_B, dpct::get_default_context( ));
```

-continued

```
sycl::free(d_C, dpct::get_default_context( ));
for (int i=0; i<VECTOR_SIZE; i++ {
    if (i % 16 == 0) {
        printf("\n");
    }
    printf("%f ", Result[i]);
}
return 0;
}
```

In at least one embodiment, human readable DPC++ 5804 refers to output generated by DPC++ compatibility tool 5802 and may be optimized in one manner or another. In at least one embodiment, human readable DPC++ 5804 generated by DPC++ compatibility tool 5802 can be manually edited by a developer after migration to make it more maintainable, performance, or other considerations. In at least one embodiment, DPC++ code generated by DPC++ compatibility tool 58002 such as DPC++ disclosed can be optimized by removing repeat calls to get current device( ) and/or get default context( ) for each malloc device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 5802 replace uses of unified shared memory with accessors. In at least one embodiment, DPC++ compatibility tool 5802 has an option to change how it migrates CUDA code to DPC++ code. In at least one embodiment, DPC++ compatibility tool 5802 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 5802; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

At least one embodiment of the disclosure can be described in view of the following clauses:

1. A processor, comprising: one or more circuits to perform an application programming interface (API) to cause information corresponding to one or more memory transactions resulting from performance of the API to be transformed and stored.
2. The processor of clause 1, wherein the one or more memory transactions are asynchronous reduction operations to be performed by a graphics processing unit (GPU).
3. The processor of any one of clauses 1-2, wherein the one or more memory transactions are asynchronous reduction operations to be performed by a graphics processing unit (GPU), and the information includes data from a first memory of the GPU and a second memory of the GPU.
4. The processor of any one of clauses 1-3, wherein the one or more memory transactions are to move information to be moved between shared memory of a graphics processing unit (GPU) and global memory of the GPU.
5. The processor of any one of clauses 1-4, wherein the API is to receive one or more inputs indicating a source memory location and a destination memory location of the one or more memory transactions.
6. The processor of any one of clauses 1-5, wherein the API is to receive information indicating a shape of the information.
7. The processor of any one of clauses 1-6, wherein the API is to provide an indication of whether a type of hardware unit is used to transform the information.
8. A system, comprising: one or more processors to perform an application programming interface (API) to cause information corresponding to one or more memory transactions resulting from performance of the API to be transformed and stored.
9. The system of clause 8, wherein the one or more memory transactions comprise asynchronous operations to be performed by a graphics processing unit (GPU).
10. The system of any one of clauses 8-9, wherein the one or more memory transactions comprise reduction operations to be performed by a graphics processing unit (GPU).
11. The system of any one of clauses 8-10, wherein the one or more memory transactions are asynchronous reduction operations to be performed by a graphics processing unit (GPU), and the information includes data from a first memory of the GPU and a second memory of the GPU.
12. The system of any one of clauses 8-11, wherein the API is to receive as input an identifier of a synchronization object.
13. The system of any one of clauses 8-12, wherein the API is to receive as input an indication of a reduction operation to be performed.
14. A method, comprising: performing an application programming interface (API) to cause information corresponding to one or more memory transactions resulting from performance of the API to be transformed and stored.

15. The method of clause 14, wherein the one or more memory transactions comprise asynchronous operations to be performed by a graphics processing unit (GPU).

16. The method of any one of clauses 14-15, wherein the one or more memory transactions comprise one or more asynchronous reduction operations to be performed by a graphics processing unit (GPU).

17. The method of any one of clauses 14-16, wherein the API is to indicate whether a particular hardware unit is to be used to perform the one or more memory transactions.

18. The method of any one of clauses 14-17, wherein the API is to be performed using automatic transaction accounting.

19. The method of any one of clauses 14-18, wherein the API is to receive as input information indicating a plurality of characteristics of data to be transformed.

20. A non-transitory computer-readable medium having stored thereon a set of instructions, which if performed by one or more processors, cause the one or more processors to at least perform the method of any one of clauses 14-19.

21. A processor, comprising: one or more circuits to perform an application programming interface (API) to cause information corresponding to one or more memory transactions resulting from performance of the API to be transformed.

22. The processor of clause 21, wherein the one or more memory transactions are asynchronous reduction operations to be performed by a graphics processing unit (GPU) using manual transaction accounting.

23. The processor of any one of clauses 21-22, wherein the one or more memory transactions are asynchronous reduction operations to be performed by a graphics processing unit (GPU) using manual transaction accounting, and the information includes data from a first memory of the GPU and a second memory of the GPU.

24. The processor of any one of clauses 21-23, wherein the API is to receive as input information indicating a source memory location and a destination memory location to be used to perform the one or more memory transactions.

25. The processor of any one of clauses 21-24, wherein the API is to receive as input information indicating a shape of data to be copied using the one or more memory transactions.

26. The processor of any one of clauses 21-25, wherein the one or more memory transactions are to move data between shared memory of a graphics processing unit (GPU) and global memory of the GPU.

27. The processor of any one of clauses 21-26, wherein the API is to provide to a user an indication of one or more hardware units to be used to perform the one or more memory transactions.

28. A system, comprising: one or more processors to perform an application programming interface (API) to cause information corresponding to one or more memory transactions resulting from performance of the API to be transformed.

29. The system of clause 28, wherein the one or more memory transactions are asynchronous reduction operations to be performed by a graphics processing unit (GPU) using manual transaction accounting.

30, The system of any one of clauses 28-29, wherein the one or more memory transactions are asynchronous reduction operations to be performed by a graphics processing unit (GPU).

31. The system of any one of clauses 28-30, wherein the information to be stored is to be used to perform manual transaction accounting.

32, The system of any one of clauses 28-31, wherein the API is to receive as input one or more characteristics of data to be transformed.

33. The system of any one of clauses 28-32, wherein the API is to indicate whether a particular hardware unit on a graphics processing unit (GPU) is to perform the one or more memory transactions.

34. A method, comprising: performing an application programming interface (API) to cause information corresponding to one or more memory transactions resulting from performance of the API to be transformed.

35. The method of clause 34, wherein the one or more memory transactions are to be performed by a graphics processing unit (GPU) using manual transaction accounting.

36. The method of any one of clauses 34-35, wherein the API is to perform a reduction operation.

37. The method of any one of clauses 34-36, wherein the one or more memory transactions are to be performed by a graphics processing unit (GPU) using manual transaction accounting, and the information includes data from a first memory of the GPU and a second memory of the GPU.

38. The method of any one of clauses 34-37, wherein the API is to receive as input an identifier of information to be used to perform transaction accounting.

39. The method of any one of clauses 34-38, wherein the API is to be performed using global memory of a graphics processing unit (GPU) and shared memory of the GPU.

40. A non-transitory computer-readable medium having stored thereon a set of instructions, which if performed by one or more processors, cause the one or more processors to at least perform the method of any one of clauses 34-39.

41. A processor, comprising: one or more circuits to perform an application programming interface (API) to cause information to be stored in a plurality of storage locations allocated to a first graphics processing unit (GPU).

42. The processor of clause 41, wherein the one or more circuits are to perform the API to cause an asynchronous copy operation to be performed to copy the information from a first memory location of the first GPU to a plurality of second memory locations of the GPU.

43. The processor of any one of clauses 41-42, wherein the API is to cause the information to be stored in the plurality of locations asynchronously.

44. The processor of any one of clauses 41-43, wherein the API is to receive as input a data structure to indicate the plurality of storage locations.

45. The processor of any one of clauses 41-44, wherein the API is to receive as input a shape of the information to be used to store the information.

46. The processor of any one of clauses 41-45, wherein the API is to receive as input a synchronization object to be updated when storing the information in the plurality of storage locations.

47. The processor of any one of clauses 41-46, wherein the API is to further indicate whether a particular hardware unit is to be used to store the information in the plurality of storage locations.

48. A system, comprising: one or more processors to perform an application programming interface (API) to cause information to be stored in a plurality of storage locations allocated to a first graphics processing unit (GPU).

49. The system of clause 48, wherein the one or more circuits are to perform the API to cause an asynchronous copy operation to be performed to copy the information from a first memory location of the first GPU to a plurality of second memory locations of the GPU.

50, The system of any one of clauses 48-49, wherein the API is to cause the information to asynchronously be stored in the plurality of storage locations.

51. The system of any one of clauses 48-50, wherein the API is to cause the information to be stored multiple times among the plurality of storage locations.

52. The system of any one of clauses 48-51, wherein the API is to receive as input information indicating a data structure storing identifiers of the plurality of storage locations.

53. The system of any one of clauses 48-52, wherein the API is a shape of the information.

54. A method, comprising: performing an application programming interface (API) to cause information to be stored in a plurality of storage locations allocated to a first graphics processing unit (GPU).

55. The method of clause 54, wherein the API is to cause an asynchronous copy operation to be performed to copy the information from a first memory location of the first GPU to a plurality of second memory locations of the GPU.

56. The method of any one of clauses 54-55, wherein the API is to receive as input one or more characteristics of the information.

57. The method of any one of clauses 54-56, wherein the API is to indicate whether a particular hardware unit is to be used to store the information in the plurality of storage locations.

58. The method of any one of clauses 54-57, wherein the API is to receive as input an indicator of a synchronization object to be used to track storage of the information.

59. The method of any one of clauses 54-58, wherein the API is to receive as input a shape of the information.

60. A non-transitory computer-readable medium having stored thereon a set of instructions, which if performed by one or more processors, cause the one or more processors to at least perform the method of any one of clauses 54-59.

61. A processor, comprising: one or more circuits to perform an application programming interface (API) to cause a mapping from a first tensor to a second tensor to be generated.

62. The processor of clause 61, wherein the one or more circuits are to perform the API to cause a data structure that includes the mapping to be generated.

63. The processor of any one of clauses 61-62, wherein the one or more circuits are to perform the API to cause a data structure that includes the mapping to be generated, and the data structure also includes information that indicates a structure of a first tensor stored in a first memory of a graphics processing unit (GPU), and indicates a structure of a second tensor to be stored in a second memory of the GPU based, at least in part, on the mapping and the first tensor.

64. The processor of any one of clauses 61-63, wherein the mapping is to be used to store data of the first tensor to be stored according to the mapping.

65. The processor of any one of clauses 61-64, wherein the API is to receive as input information indicating a storage location in which to store the mapping.

66. The processor of any one of clauses 61-65, wherein the API is to receive as input a tensor data type.

67. The processor of any one of clauses 61-66, wherein the API is to receive as input a tensor rank.

68. A system, comprising: one or more processors to perform an application programming interface (API) to cause a mapping from a first tensor to a second tensor to be generated.

69. The system of clause 68, wherein the one or more circuits are to perform the API to cause a data structure that includes the mapping to be generated.

70. The system of any one of clauses 68-69, wherein the API is to further cause to be generated information that indicates a structure of a first tensor stored in a first memory of a graphics processing unit (GPU), and indicates a structure of a second tensor to be stored in a second memory of the GPU based, at least in part, on the mapping.

71. The system of any one of clauses 68-70, wherein the mapping is to be used to store data of the first tensor to be stored according to the mapping.

72. The system of any one of clauses 68-71, wherein the API is to receive as input information indicating where to store the mapping.

73. The system of any one of clauses 68-72, wherein the API is to receive as input a plurality of characteristics of the first tensor.

74. A method, comprising: performing an application programming interface (API) to cause a mapping from a first tensor to a second tensor to be generated.

75. The method of clause 74, wherein the one or more circuits are to perform the API to cause a data structure that includes the mapping to be generated.

76. The method of any one of clauses 74-75, wherein the API is to receive as input a plurality of characteristics of the first tensor.

77. The method of any one of clauses 74-76, wherein the API is to receive as input an indication where to store the mapping.

78. The method of any one of clauses 74-77, wherein the mapping indicates how to obtain data of the first tensor from global memory of a graphics processing unit (GPU), to transform the data of the first tensor to obtain the second tensor, and a location in shared memory of the GPU in which to store the second tensor.

79. The method of any one of clauses 74-78, wherein the API is to receive as input information indicating how the first tensor is laid out in memory.

80. A non-transitory computer-readable medium having stored thereon a set of instructions, which if performed by one or more processors, cause the one or more processors to at least perform the method of any one of clauses 74-79.

81. A processor, comprising: one or more circuits to perform an application programming interface (API) to indicate how to generate one or more image-to-column transformations.

82. The processor of clause 81, wherein the one or more circuits are to perform the API to cause a data structure to be generated that indicates how to use one or more image-to-column transformations to generate one or more second tensors based, at least in part, on one or more first tensors.

83. The processor of any one of clauses 81-82, wherein API is further to cause a mapping from a first tensor to a second tensor to be generated.

84. The processor of any one of clauses 81-83, wherein the one or more image-to-column transformations are to store tensor data of a tensor into columns of a matrix.

85. The processor of any one of clauses 81-84, wherein the API is to receive as input information indicating how data in a tensor to be used in the one or more image-to-column transformations is stored.

86. The processor of any one of clauses 81-85, wherein the API is to receive as input information indicating a location into which information indicating how to generate one or more image-to-columns transformations is to be stored.

87. The processor of any one of clauses 81-86, wherein the API is to receive as input a layout of tensor data in memory to be used to perform the one or more image-to-column transformations.

88. A system, comprising: one or more processors to perform an application programming interface (API) to indicate how to generate one or more image-to-column transformations.

89. The system of clause 88, wherein API is further to cause a mapping from a first tensor to a second tensor to be generated.

90, The system of any one of clauses 88-89, wherein the one or more image-to-column transformations are to store tensor data of a tensor into columns of a matrix.

91. The system of any one of clauses 88-90, wherein the one or more image-to-column transformations is to enable a convolution operation to be performed as a matrix multiplication operation.

92, The system of any one of clauses 88-91, wherein the API is to receive as input information indicating a portion of a tensor to which the one or more image-to-column transformations are to be applied.

93. The system of any one of clauses 88-92, wherein the API is to receive as input a layout of one or more tensors to be used to perform the one or more image-to-column transformations.

94. A method, comprising: performing an application programming interface (API) to indicate how to generate one or more image-to-column transformations.

95. The method of clause 94, wherein the API is to generate a data structure to store data to indicate how to generate the one or more image-to-column transformations.

96. The method of any one of clauses 94-95, further comprising storing a data structure indicating how to generate the one or more image-to-column transformations in a memory location indicated in an input of the API.

97. The method of any one of clauses 94-96, wherein performing the API does not comprise performing the one or more image-to-column transformations.

98. The method of any one of clauses 94-97, wherein performing the API comprises generating a data structure with data indicating how to perform the one or more image-to-column transformations.

99. The method of any one of clauses 94-98, wherein the API is to receive, as input, information indicating a plurality of characteristics of a tensor to be an operand of the one or more image-to-column transformations.

100. A non-transitory computer-readable medium having stored thereon a set of instructions, which if performed by one or more processors, cause the one or more processors to at least perform the method of any one of clauses 94-99.

101. A processor, comprising: one or more circuits to perform an application programming interface (API) to indicate one or more storage locations of information to be mapped from a first tensor to a second tensor.

102. The processor of clause 101, wherein the one or more circuits are to perform the API to indicate the one or more storage locations based, at least in part, replacing an indication of a first memory location with an indication of a second memory location.

103. The processor of any one of clauses 101-102, wherein the API is to modify a data structure that indicates a mapping of the first tensor to the second tensor.

104. The processor of any one of clauses 101-103, wherein the API is to update a mapping of a third tensor to the second tensor to a mapping of the first tensor to the second tensor.

105. The processor of any one of clauses 101-104, wherein the API is to reuse a mapping with a different set of tensors.

106. The processor of any one of clauses 101-105, wherein the API is to receive as input an indication of a storage location in which a mapping between tensors is stored.

107. The processor of any one of clauses 101-106, wherein the API is to replace a first memory address with a second memory address in a data structure.

108. A system, comprising: one or more processors to perform an application programming interface (API) to indicate one or more storage locations of information to be mapped from a first tensor to a second tensor.

109. The system of clause 108, wherein the API is to indicate the one or more storage locations based, at least in part, replacing an indication of a first memory location with an indication of a second memory location.

110. The system of any one of clauses 108-109, wherein the API is to update a data structure to replace a first memory address of a third tensor with a memory address of the first tensor.

111. The system of any one of clauses 108-110, wherein the API is to update a mapping of a third tensor to the second tensor to a mapping of the first tensor to the second tensor.

112. The system of any one of clauses 108-111, wherein the API is to reuse a tensor map with at least one different tensor.

113. The system of any one of clauses 108-112, wherein the API is to indicate a memory location of a mapping to be updated.

114. A method, comprising: performing an application programming interface (API) to indicate one or more storage locations of information to be mapped from a first tensor to a second tensor.

115. The method of clause 114, wherein the storage location corresponds to a tensor.

116. The method of any one of clauses 114-115, wherein the API is to replace an indication of another storage location with an indication of the storage location.

117. The method of any one of clauses 114-116, wherein performing the API comprises updating a tensor map.

118. The method of any one of clauses 114-117, wherein performing the API comprises replacing one or more indications of one or more storage locations.

119. The method of any one of clauses 114-118, wherein performing the API comprises updating a data structure that stores information indicating how to transform the first tensor to obtain the second tensor.

120. A non-transitory computer-readable medium having stored thereon a set of instructions, which if performed by one or more processors, cause the one or more processors to at least perform the method of any one of clauses 114-119.

121. A processor, comprising: one or more circuits to perform an application programming interface (API) to cause a first tensor to be translated into a second tensor according to a tensor map.

122. The processor of clause 121, wherein the one or more circuits are to perform the API to asynchronously store the second tensor.

123. The processor of any one of clauses 121-122, wherein the one or more circuits are to perform the API to asynchronously store the second tensor in a memory of a graphics processing unit (GPU).

124. The processor of any one of clauses 121-123, wherein the first tensor is to be stored in a first memory of a graphics processing unit (GPU), and the one or more circuits are to perform the API to asynchronously translate the first tensor into the second tensor and store the second tensor in a second memory of the GPU.

125. The processor of any one of clauses 121-124, wherein the API is to be performed using automatic transaction accounting.

126. The processor of any one of clauses 121-125, wherein the API is to receive as input an indication of a location in which the tensor map is stored.

127. The processor of any one of clauses 121-126, wherein the API is to receive as input an indication of a portion of the first tensor to be translated into the second tensor.

128. A system, comprising: one or more processors to perform an application programming interface (API) to cause a first tensor to be translated into a second tensor according to a tensor map.

129. The system of clause 128, wherein the API is to cause the first tensor to be translated into the second tensor asynchronously.

130. The system of any one of clauses 128-129, wherein the API is to asynchronously store the second tensor in a memory of a graphics processing unit (GPU).

131. The system of any one of clauses 128-130, wherein the API is to be performed using automatic transaction accounting.

132. The system of any one of clauses 128-131, wherein the API is to asynchronously copy data from the first tensor according to the tensor map.

133. The system of any one of clauses 128-132, wherein the API is to indicate whether a particular hardware unit is to be used to perform the API.

134. A method, comprising: performing an application programming interface (API) to cause a first tensor to be translated into a second tensor according to a tensor map.

135. The method of clause 134, wherein performing the API comprises initiating one or more memory copy operations to be performed asynchronously.

136. The method of any one of clauses 134-135, wherein the API is to use transaction accounting different from manual transaction accounting.

137. The method of any one of clauses 134-136, wherein the tensor map is stored in a data structure that indicates information about the first tensor and the second tensor.

138. The method of any one of clauses 134-137, wherein performing the API comprises using an input of the API to obtain the tensor map from memory.

139. The method of any one of clauses 134-138, wherein performing the API comprises using an input of the API to obtain a portion of the first tensor to be translated into the second tensor.

140. A non-transitory computer-readable medium having stored thereon a set of instructions, which if performed by one or more processors, cause the one or more processors to at least perform the method of any one of clauses 134-139.

141. A processor, comprising: one or more circuits to perform an application programming interface (API) to cause a first tensor to be translated into a second tensor according to a tensor map without storing information about one or more memory transactions corresponding to the translation.

142. The processor of clause 141, wherein the one or more circuits are to perform the API to cause the first tensor to be translated based, at least in part, on asynchronously storing second tensor in one or more second memory locations based, at least in part, on first tensor data stored in one or more first memory locations.

143. The processor of any one of clauses 141-142, wherein the one or more circuits are to perform the API to cause the first tensor to be translated based, at least in part, on asynchronously storing second tensor in one or more second memory locations of a graphics processing unit (GPU) based, at least in part, on first tensor data stored in one or more first memory locations of the GPU.

144. The processor of any one of clauses 141-143, wherein the one or more circuits are to perform the API to cause the first tensor to be translated based, at least in part, on a data structure that includes a tensor map, and the one or more circuits are to perform the API to cause the second tensor to be asynchronously stored.

145. The processor of any one of clauses 141-144, wherein the API is to cause the first tensor to be translated into the second tensor without storing the information by using manual transaction accounting.

146. The processor of any one of clauses 141-145, wherein the API is to be performed using one or more asynchronous memory transactions.

147. The processor of any one of clauses 141-146 1, wherein the API is to receive as input a data structure to indicate how to translate the first tensor into the second tensor.

148. A system, comprising: one or more processors to perform an application programming interface (API) to cause a first tensor to be translated into a second tensor according to a tensor map without storing information about one or more memory transactions corresponding to the translation.

149. The system of clause 148, wherein the API is to cause the first tensor to be translated based, at least in part, on asynchronously storing second tensor in one or more second memory locations based, at least in part, on first tensor data stored in one or more first memory locations.

150, The system of any one of clauses 148-149, wherein the API is to cause the first tensor to be translated based, at least in part, on asynchronously storing second tensor in one or more second memory locations of a graphics processing unit (GPU) based, at least in part, on first tensor data stored in one or more first memory locations of the GPU.

151. The system of any one of clauses 148-150, wherein the API is to cause the first tensor to be translated based, at least in part, on a data structure that includes a tensor map, and the one or more circuits are to perform the API to cause the second tensor to be asynchronously stored.

152. The system of any one of clauses 148-151, wherein the API is to cause the first tensor to be translated into the second tensor using manual transaction accounting.

153. The system of any one of clauses 148-152, the API is to receive as input a data structure to indicate how to translate the first tensor into the second tensor.

154. A method, comprising: performing an application programming interface (API) to cause a first tensor to be translated into a second tensor according to a tensor map without storing information about one or more memory transactions corresponding to the translation.

155. The method of clause 154, wherein performing the API comprises causing asynchronous storage of second tensor of the second tensor in one or more second memory locations based, at least in part, on first tensor data of the first tensor stored in one or more first memory locations.

156. The method of any one of clauses 154-155, wherein performing the API comprises causing asynchronous storage of second tensor in one or more second memory locations of a graphics processing unit (GPU) based, at least in part, on first tensor data stored in one or more first memory locations of the GPU.

157. The method of any one of clauses 154-156, performing the API comprises causing the first tensor to be translated based, at least in part, on a data structure that comprises a tensor map.

158. The method of any one of clauses 154-157, wherein performing the API comprises using a type of transaction accounting different from automatic transaction accounting.

159. The method of any one of clauses 154-158, wherein performing the API uses manual transaction accounting.

160. A non-transitory computer-readable medium having stored thereon a set of instructions, which if performed by one or more processors, cause the one or more processors to at least perform the method of any one of clauses 154-159.

161. A processor, comprising: one or more circuits to perform an application programming interface (API) to cause a first tensor to be translated into a second tensor according to a tensor map.

162. The processor of clause 161, wherein the API is to cause the second tensor to be stored by overwriting at least a portion of memory storing the first tensor.

163. The processor of any one of clauses 161-162, wherein the API is to cause memory storing the first tensor to be used to store the second tensor.

164. The processor of any one of clauses 161-163, wherein the API is to indicate whether a particular hardware unit is to perform the API.

165. The processor of any one of clauses 161-164, wherein the API is to cause the second tensor to be asynchronously stored in memory that stores the first tensor.

166. The processor of any one of clauses 161-165, wherein the API is to indicate complete performance of the API before the second tensor is stored.

167. The processor of any one of clauses 161-166, wherein the API is to cause at least a portion of memory storing the first tensor to store the second tensor.

168. A system, comprising: one or more processors to perform an application programming interface (API) to cause a first tensor to be translated into a second tensor according to a tensor map.

169. The system of clause 168, wherein the one or more memory transactions includes at least one memory transaction to be asynchronously performed.

170. The system of any one of clauses 168-169, wherein the API is to perform an in-place transform involving the first tensor and second tensor.

171. The system of any one of clauses 168-170, wherein the API is to receive as input an indication of a location of the first tensor in storage.

172. The system of any one of clauses 168-171, wherein the API is to cause memory storing the first tensor to be used to store the second tensor.

173. The system of any one of clauses 168-172, wherein the API is to cause the second tensor to be stored in memory asynchronously.

174. A method, comprising: performing an application programming interface (API) to cause a first tensor to be translated into a second tensor according to a tensor map.

175. The method of clause 174, wherein the API is to be performed using manual transaction accounting.

176. The method of any one of clauses 174-175, wherein the API is to cause the second tensor to be stored by overwriting at least a portion of memory storing the first tensor.

177. The method of any one of clauses 174-176, wherein performing the API comprises obtaining the tensor map from a storage location determined based, at least in part, on an input to the API.

178. The method of any one of clauses 174-177, wherein performing the API comprises overwriting tensor data in memory.

179. The method of any one of clauses 174-178, wherein performing the API comprises indicating whether indicating whether performing the API causes one or more particular hardware units to be used.

180. A non-transitory computer-readable medium having stored thereon a set of instructions, which if performed by one or more processors, cause the one or more processors to at least perform the method of any one of clauses 174-170.

181. A graphics processing unit (GPU), comprising: one or more circuits to perform a GPU prefetch instruction to cause a variable amount of information to be stored into one or more GPU caches.

182. The GPU of clause 181, wherein the one or more GPU caches comprise one or more level two (L2) caches.

183. The GPU of any one of clauses 181-182, wherein the GPU prefetch instruction is compiled from an assembly-level instruction to cause the information to be stored into the one or more GPU caches.

184. The GPU of any one of clauses 181-183, wherein the instructions is part of an graphics instruction set architecture (ISA).

185. The GPU of any one of clauses 181-184, wherein the GPU prefetch instruction is to be compiled to executable binary code to be performed by the GPU.

186. The GPU of any one of clauses 181-185, wherein the GPU is to perform GPU prefetch instruction by obtaining the information from GPU global memory.

187. The GPU of any one of clauses 181-186, wherein an input to the GPU prefetch instruction comprises a pointer to a source location of the information.

188. A system, comprising: one or more processors to perform a graphics processing unit (GPU) prefetch instruction to cause a variable amount of information to be stored into one or more GPU caches.

189. The system of clause 188, wherein the one or more GPU caches comprise one or more level two (L2) caches.

190. The system of any one of clauses 188-189, wherein the GPU prefetch instruction is an assembly-level instruction.

191. The system of any one of clauses 188-190, wherein the instruction is part of a graphics instruction set architecture (ISA).

192. The system of any one of clauses 188-191, wherein the GPU prefetch instruction is to be compiled to executable binary code.

193. The system of any one of clauses 188-192, wherein the system comprises a GPU and wherein the one or more processors are to perform the GPU prefetch instruction by compiling the GPU prefetch instruction into one or more instructions in binary executable code to be performed by a GPU of the system.

194. A method, comprising: performing a graphics processing unit (GPU) prefetch instruction to cause a variable amount of information to be stored into one or more GPU caches.

195. The method of clause 194, wherein the one or more GPU caches comprise one or more level two (L2) caches.

196. The method of any one of clauses 194-195, wherein performing the GPU prefetch instruction comprises compiling the GPU prefetch instruction to executable binary code to be performed by a GPU.

197. The method of any one of clauses 194-196, wherein an input to the GPU prefetch instruction comprises an indication of a storage location from which the information is to be obtained to be stored into the one or more GPU caches.

198. The method of any one of clauses 194-197, wherein the GPU prefetch instruction is an assembly-level instruction.

199. The method of any one of clauses 194-198, wherein the instruction is of a graphics instruction set architecture (ISA).

200. A non-transitory computer-readable medium having stored thereon a set of instructions, which if performed by one or more processors, cause the one or more processors to at least perform the method of any one of clauses 194-199.

201. A graphics processing unit (GPU), comprising: one or more circuits to perform a tensor prefetch instruction to cause one or more tensors to be stored into one or more GPU caches.

202. The GPU of clause 201, wherein the tensor prefetch instruction is to further cause a first tensor to be transformed to a second tensor comprising the one or more tensors.

203. The GPU of any one of clauses 201-202, wherein the one or more GPU caches comprise a level two (L2) cache.

204. The GPU of any one of clauses 201-203, wherein the instruction is to further cause the GPU to use a tensor map when causing the one or more tensors to be stored.

205. The GPU of any one of clauses 201-204, wherein the tensor prefetch instruction in a graphics instruction set architecture (ISA).

206. The GPU of any one of clauses 201-205, wherein the tensor prefetch instruction is to obtain the one or more tensors from GPU global memory.

207. The GPU of any one of clauses 201-206, wherein an input to the tensor prefetch instruction comprises a pointer to a location in which is the one or more tensors are stored.

208. A system, comprising: one or more processors to perform a tensor prefetch instruction to cause one or more tensors to be stored into one or more graphics processing unit (GPU) caches.

209. The system of clause 208, wherein the tensor prefetch instruction is to further cause a first tensor to be transformed to a second tensor comprising the one or more tensors.

210. The system of any one of clauses 208-209, wherein the one or more GPU caches comprise one or more level two (L2) caches.

211. The system of any one of clauses 208-210, wherein an input to the tensor prefetch instruction indicates a transformation to be performed on the first tensor.

212. The system of any one of clauses 208-211, wherein an input to the tensor prefetch instruction indicates a tensor map.

213. The system of any one of clauses 208-212, wherein the tensor prefetch instruction is to obtain the one or more tensors from GPU memory different from the one or more GPU caches.

214. A method, comprising: performing a tensor prefetch instruction to cause one or more tensors to be stored into one or more graphics processing unit (GPU) caches.

215. The method of clause 214, wherein performing the tensor prefetch instruction comprises transforming one or more tensors.

216. The method of any one of clauses 214-215, wherein performing the tensor prefetch instruction comprises obtaining a tensor map indicating a transformation to apply to one or more tensors.

217. The method of any one of clauses 214-216, wherein the one or more caches comprise one or more level two (L2) caches.

218. The method of any one of clauses 214-217, wherein performing the tensor prefetch instruction comprises generating executable binary code based, at least in part, on the tensor prefetch instruction.

219. The method of any one of clauses 214-218, wherein an input to the tensor prefetch instruction indicates a tensor and a transformation to apply to the tensor prior to storing the one or more tensors into the one or more GPU caches.

220. A non-transitory computer-readable medium having stored thereon a set of instructions, which if performed by one or more processors, cause the one or more processors to at least perform the method of any one of clauses 214-219.

221. A graphics processing unit (GPU), comprising: one or more circuits to perform a tensor prefetch instruction to cause one or more tensors to be transformed and stored into one or more GPU caches.

222. The GPU of clause 221, wherein the tensor prefetch instruction is to cause the one or more tensors to be stored asynchronously.

223. The GPU of any one of clauses 221-222, wherein the one or more GPU caches comprise a level two (L2) cache.

224. The GPU of any one of clauses 221-223, wherein an input to the tensor prefetch instruction indicates a tensor map data structure to use to transform the one or more tensors.

225. The GPU of any one of clauses 221-224, wherein the one or more tensors are to be transformed using one or more image-to-column transformations.

226. The GPU of any one of clauses 221-225, wherein an input to the tensor prefetch instruction indicates a portion of a tensor to be transformed.

227. The GPU of any one of clauses 221-226, wherein an input to the tensor prefetch instruction comprises an offset to be used to transform the one or more tensors.

228. A system, comprising: one or more processors to perform a tensor prefetch instruction to cause one or more tensors to be transformed and stored into one or more graphics processing unit (GPU) caches.

229. The system of clause 228, wherein the tensor prefetch instruction is to cause the one or more tensors to be transformed and stored asynchronously.

230. The system of any one of clauses 228-229, wherein the tensor prefetch instruction is to cause the tensor data to be stored asynchronously.

231. The system of any one of clauses 228-230, wherein the one or more GPU caches comprise a level two (L2) cache.

232. The system of any one of clauses 228-231, wherein the one or more tensors are to be transformed using one or more image-to-column transformations.

233. The system of any one of clauses 228-232, wherein an input to the tensor prefetch instruction indicates a memory location to be used to transform the one or more tensors.

234. A method, comprising: performing a tensor prefetch instruction to cause one or more tensors to be transformed and stored into one or more graphics processing unit (GPU) caches.

235. The method of clause 234, wherein an input to the tensor prefetch instruction indicates a tensor map data structure to use to transform the one or more tensors.

236. The method of any one of clauses 234-235, wherein performing the tensor prefetch instruction comprises performing one or more image-to-column transformations.

237. The method of any one of clauses 234-236, wherein performing the tensor prefetch instruction comprises compiling the tensor prefetch instruction to obtain one or more instructions performable by the GPU.

238. The method of any one of clauses 234-237, wherein performing the tensor prefetch instruction comprises using a tensor map to obtain the one or more tensors.

239. The method of any one of clauses 234-238, wherein performing the tensor prefetch instruction comprises obtaining a portion of a tensor based, at least in part, on an input to the tensor prefetch instruction.

240. A non-transitory computer-readable medium having stored thereon a set of instructions, which if performed by one or more processors, cause the one or more processors to at least perform the method of any one of clauses 234-239.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof)

is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A graphics processing unit (GPU), comprising:
circuitry to execute a tensor prefetch instruction to cause one or more tensors to be stored into one or more GPU caches based, at least in part, on an indication of a location of a tensor map in storage and an indication of a tile of a tensor to which the tensor map is to be applied.

2. The GPU of claim 1, wherein the tensor prefetch instruction is to further cause a first tensor to be transformed to a second tensor comprising the one or more tensors.

3. The GPU of claim 1, wherein the one or more GPU caches comprise a level two (L2) cache.

4. The GPU of claim 1, wherein the tensor prefetch instruction is to further cause the GPU to use the tensor map when causing the one or more tensors to be stored.

5. The GPU of claim 1, wherein the tensor prefetch instruction is in a graphics instruction set architecture (ISA).

6. The GPU of claim 1, wherein the tensor prefetch instruction is to obtain the one or more tensors from GPU global memory.

7. The GPU of claim 1, wherein an input to the tensor prefetch instruction comprises a pointer to a location in which the one or more tensors are stored.

8. The GPU of claim 1, wherein the indication of the location of the tensor map in storage is a pointer.

9. The GPU of claim 1, wherein the tensor prefetch instruction is to cause the one or more tensors to be stored asynchronously into the one or more GPU caches.

10. A system, comprising:
one or more processors to execute a tensor prefetch instruction to cause one or more tensors to be stored into one or more graphics processing unit (GPU) caches based, at least in part, on an indication of a location of a tensor map in storage and an indication of a tile of a tensor to which the tensor map is to be applied.

11. The system of claim 10, wherein the tensor prefetch instruction is to further cause a first tensor to be transformed to a second tensor comprising the one or more tensors.

12. The system of claim 10, wherein the one or more GPU caches comprise one or more level two (L2) caches.

13. The system of claim 10, wherein an input to the tensor prefetch instruction indicates a transformation to be performed on a first tensor.

14. The system of claim 10, wherein an input to the tensor prefetch instruction is the indication of the location of the tensor map in storage.

15. The system of claim 10, wherein the tensor prefetch instruction is to obtain the one or more tensors from GPU memory different from the one or more GPU caches.

16. A method, comprising:
receiving a tensor prefetch instruction; and
executing the tensor prefetch instruction to cause one or more tensors to be stored into one or more graphics processing unit (GPU) caches based, at least in part, on an indication of a location of a tensor map in storage and an indication of a tile of a tensor to which the tensor map is to be applied.

17. The method of claim 16, wherein performing the tensor prefetch instruction comprises transforming one or more tensors.

18. The method of claim 16, wherein performing the tensor prefetch instruction comprises obtaining a tensor map indicating a transformation to apply to one or more tensors.

19. The method of claim 16, wherein the one or more GPU caches comprise one or more level two (L2) caches.

20. The method of claim 16, wherein performing the tensor prefetch instruction comprises generating executable binary code based, at least in part, on the tensor prefetch instruction.

21. The method of claim 16, wherein an input to the tensor prefetch instruction indicates a tensor and a transformation to apply to the tensor prior to storing the one or more tensors into the one or more GPU caches.

22. A non-transitory computer-readable medium having stored thereon a set of instructions, which if performed by one or more processors, cause the one or more processors to at least perform the method of claim 16.

* * * * *